US011727430B2

(12) United States Patent
Mitchell

(10) Patent No.: US 11,727,430 B2
(45) Date of Patent: Aug. 15, 2023

(54) TRACKING TRANSACTIONS ACROSS MULTIPLE PAYMENT PROCESSING NETWORKS

(71) Applicant: Bruce Mitchell, San Francisco, CA (US)

(72) Inventor: Bruce Mitchell, San Francisco, CA (US)

( * ) Notice: Subject to any disclaimer, the term of this patent is extended or adjusted under 35 U.S.C. 154(b) by 0 days.

(21) Appl. No.: 16/984,837

(22) Filed: Aug. 4, 2020

(65) Prior Publication Data

US 2020/0387923 A1 Dec. 10, 2020

Related U.S. Application Data

(63) Continuation-in-part of application No. 16/656,024, filed on Oct. 17, 2019, now abandoned, which is a continuation-in-part of application No. 15/435,737, filed on Feb. 17, 2017, now Pat. No. 10,546,315, which is a continuation-in-part of application No. 14/329,781, filed on Jul. 11, 2014, now abandoned.

(60) Provisional application No. 61/845,984, filed on Jul. 13, 2013.

(51) Int. Cl.

| | |
|---|---|
| ***G06Q 30/02*** | (2023.01) |
| ***G06Q 20/26*** | (2012.01) |
| ***G06Q 20/24*** | (2012.01) |
| ***G06Q 30/0226*** | (2023.01) |

(52) U.S. Cl.
CPC ......... *G06Q 30/0229* (2013.01); *G06Q 20/24* (2013.01); *G06Q 20/26* (2013.01)

(58) Field of Classification Search
CPC ..... G06Q 30/0229; G06Q 20/24; G06Q 20/26
See application file for complete search history.

(56) References Cited

U.S. PATENT DOCUMENTS

| | | | | |
|---|---|---|---|---|
| 5,948,040 | A | 9/1999 | DeLorme et al. | |
| 6,327,573 | B1 | 12/2001 | Walker et al. | |
| 6,351,467 | B1 | 2/2002 | Dillon | |
| 7,991,666 | B2 | 8/2011 | Haggerty et al. | |
| 8,429,009 | B2 | 4/2013 | Connor, Jr. | |
| 8,505,813 | B2 | 8/2013 | Grossman et al. | |
| 10,262,303 | B2 * | 4/2019 | Powell .................. | G06Q 20/40 |

(Continued)

FOREIGN PATENT DOCUMENTS

| | | | |
|---|---|---|---|
| KR | 1020110008739 | A | 1/2011 |
| KR | 1020110033994 | A | 4/2011 |

(Continued)

OTHER PUBLICATIONS

Ikano to utilize incentivated for mobile CRM solutions. (2012). Wireless News, , NA. Retrieved from https://dialog.proquest.com/professional/docview/1066365981?accountid=131444 (Year: 2012).*

*Primary Examiner* — James M Detweiler
*Assistant Examiner* — Monica A Mandel
(74) *Attorney, Agent, or Firm* — Neo IP

(57) ABSTRACT

Systems and methods for tracking transactions across multiple payment processing networks, wherein the system is operable to, in one embodiment, receive at least one real-time purchase record and match elements of the real-time purchase record to a consumer profile, wherein the system is operable to provide financing offers, incentives, and rewards based on the matching and the at least one real-time purchase record.

17 Claims, 99 Drawing Sheets

(56) References Cited

U.S. PATENT DOCUMENTS

2001/0056410 A1 12/2001 Ishigaki
2002/0062249 A1 5/2002 Iannacci
2002/0111859 A1 8/2002 Sheldon et al.
2002/0128916 A1 9/2002 Beinecke
2002/0147663 A1 * 10/2002 Walker .................. G06Q 20/00 705/26.1
2003/0110136 A1 * 6/2003 Wells .................... G06Q 40/12 705/64
2003/0236704 A1 12/2003 Antonucci
2004/0140361 A1 7/2004 Paul et al.
2005/0067483 A1 3/2005 Palumbo et al.
2005/0204047 A1 9/2005 Mitchell et al.
2007/0027803 A1 2/2007 Brandes et al.
2007/0094114 A1 4/2007 Bufford et al.
2007/0198352 A1 8/2007 Kannegiesser
2008/0114694 A1 5/2008 Hamdane et al.
2008/0201230 A1 8/2008 Hardison
2009/0182630 A1 7/2009 Otto et al.
2009/0187463 A1 7/2009 daCosta
2010/0057580 A1 3/2010 Raghunathan
2010/0082420 A1 4/2010 Trifiletti et al.
2010/0248698 A1 9/2010 In et al.
2010/0250354 A1 9/2010 Waucampt
2011/0010238 A1 1/2011 Postrel
2011/0029364 A1 * 2/2011 Roeding .................. G01S 5/18 705/14.16
2011/0099525 A1 4/2011 Krysiuk et al.
2011/0106607 A1 5/2011 Alfonso et al.
2011/0125565 A1 5/2011 MacIlwaine et al.
2011/0137716 A1 6/2011 Reuthe et al.
2011/0153403 A1 6/2011 Postrel
2011/0307318 A1 12/2011 Laporte et al.
2012/0101884 A1 4/2012 Duroux et al.
2012/0185321 A1 7/2012 Lal
2012/0191525 A1 7/2012 Singh et al.
2012/0221391 A1 8/2012 Wolf et al.
2012/0239500 A1 9/2012 Monahan
2012/0310826 A1 12/2012 Chatterjee
2013/0054454 A1 2/2013 Purves et al.
2013/0073361 A1 3/2013 Silver
2013/0073377 A1 3/2013 Heath
2013/0117126 A1 5/2013 Coppinger
2013/0204690 A1 * 8/2013 Liebmann ........... G06Q 20/327 705/14.26
2013/0211886 A1 8/2013 Kennamer et al.
2013/0254028 A1 9/2013 Salci
2013/0256403 A1 10/2013 Keith
2013/0268333 A1 10/2013 Ovick et al.
2013/0282468 A1 * 10/2013 Michael ............ G06Q 30/0227 705/14.28
2013/0297422 A1 11/2013 Hunter et al.
2013/0339124 A1 12/2013 Postrel
2014/0025457 A1 1/2014 Martinez et al.
2014/0025540 A1 1/2014 Hendrickson
2014/0114737 A1 4/2014 Espejo
2014/0244495 A1 8/2014 Davis et al.
2014/0249941 A1 9/2014 Hicks et al.
2014/0268205 A1 9/2014 DuBois
2015/0019317 A1 1/2015 Mitchell
2020/0051117 A1 2/2020 Mitchell

FOREIGN PATENT DOCUMENTS

NO 2005098702 A2 10/2005
WO WO-2010068466 A2 * 6/2010 ............ G06Q 20/12
WO 2012024109 A1 2/2012

* cited by examiner

FIGURE 13
SPRING
MY SPRING
SPRING SPECIALS
PLACES
ABOUT
Home » Spring Specials » Nando Milano Trattoria » Cash Back Offer
Spend $50 get $10 back
Nando Milano Trattoria
WICKER PARK, Chicago, IL
FOOD & DRINK
ACTIVATE BY: 7/3/2013
EXPIRES: 7/10/2013
ABOUT
Nando Milano Trattoria offers a true taste of Italy with traditional Sicilian-inspired food in a casual setting. Enjoy the artfully prepared food made from scratch each day while indulging in wines imported from various regions throughout Italy.
LOCATION
Map
Satellite
Open Map In New Window »
OFFER DETAILS & RESTRICTIONS
ACTIVATE BY: 7/3/2013
EXPIRES: 7/10/2013
IN-STORE PURCHASE/PICKUP ONLY
Offers only valid for one time use. Not to be combined with other Spring offers or discounts. Must reach the minimum spend threshold to activate offer. Cash back reward will be credited back to your account within 48 hours after purchase.

FIGURE 14
SPRING
MY SPRING
SPRING SPECIALS
PLACES
ABOUT
WICKER PARK
Chicago, IL
FOOD & DRINK
Join the Nando Milano Trattoria
Rewards Program Today!
CASH BACK OFFERS
LIMITED SALES EVENTS
ABOUT
Nando Milano Trattoria offers a true taste of Italy with traditional Sicilian-inspired food in a casual setting. Enjoy the artfully prepared food made from scratch each day while indulging in wines imported from various regions throughout Italy.
LOCATION
Map
Satellite
2114 W Division St.
Chicago, IL 60622
Open Map In New Window »
CURRENT SPECIALS
Cash Back Offer
Spend $50 get $10 back
View Details »
Limited Sale Offer
$25 for $50
View Details »

FIGURE 15
SPRING
MY SPRING
SPRING SPECIALS
PLACES
ABOUT
WICKER PARK
Chicago, IL
FOOD & DRINK
Your Nando Milano Trattoria Rewards Program Membership benefits include:
CASH BACK OFFERS
LIMITED SALES EVENTS
ABOUT
LOCATION
CURRENT SPECIALS
Map
Satellite

FIGURE 21
SPRING
MY SPRING
SPRING SPECIALS
PLACES
ABOUT
About Us
We're aiming to transform the way local merchants and customers engage with each other
Spring was founded on the belief that local commerce should be easier than it is. By innovating on the intersection between the customer and the merchant – the transaction – we can unlock value for both parties.
That means richer, actionable intelligence for our merchant partners – and richer rewards for their loyal customers.
With offices in Chicago, San Francisco and Nashville, Spring launched in 2013 focusing on major metropolitan areas. We're rapidly expanding our market coverage so if you are a merchant interested in working with us, please visit Spring for Merchants for more information. If you are a customer, check back often to see when Spring is coming to you!

FIGURE 26
SPRING
MY SPRING
SPRING SPECIALS
PLACES
ABOUT
Welcome to Spring!
A Totally New Rewards and Offers Experience!
Spring turns your Linked Debit or Credit Card into a Universal Rewards Card across the Spring Network.
Cash Back Rewards
When you shop at your Favorite Places across the Spring Network using your Linked Cards.
Special Members-Only Offers
Provided by your Favorite Merchants where you Shop!
Plus
Featured Special Offers and Limited Sales
Presented from Spring showcasing Select Merchants.
Cash Back Offers and Rewards from your Favorite Places
credited to your linked debit or credit cards -- automatically.
It's that simple!
Look out for
and
HOW DOES SPRING WORK?
Merchant Rewards Program
[1] Spring enables you to join the Reward Program of every Merchant in the Spring Network. This happens automatically when you shop with your linked cards or take advantage of Offers from Spring Merchants.
[2] For all Spring Merchants you join, you earn Automatic Cash Back Rewards they offer just by shopping and will also receive Special Cash Back Offers and Limited Sales they provide only to valued members.
Spring Features
[1] Spring also provides you with Special Spring Features. We hand pick high-value Offers from attractive Merchants and make them available exclusively to Spring members.
[2] Spring Features include Free Cash Back Offers that work automatically when you just link them to your card and Limited Sale Events with exclusive purchase opportunities.
Get cash back from your favorite local merchants -- on your card, automatically.
These deals are so fantastic, we can only offer a few at a time and prepayment is required.

FIGURE 28
SPRING DELI
POWERED BY
SPRING
CONGRATULATIONS! You Just Earned a Reward.
Hi, Jack.
Here is your purchase receipt from Spring Deli. You have earned a Reward, PLUS $0.78 toward your next Spring Deli Reward!
Your $0.70 Reward from Spring Deli has been automatically linked to your account.
Simply pay with any of your Spring enrolled cards accepted by Spring Deli on your next qualifying visit, and we will automatically credit you back $0.70. No coupons, vouchers, or printouts needed... how easy is that?
Your Rewards Progress
39%
$0.78/$2.00
Spend $2, Get $0.70 back
Reward automatically applies to your next purchase with your registered debit or credit card
Your Rewards Progress
100%
$2.00/$2.00
Congratulations!
$0.70
will be applied automatically to your next purchase

SPRING DELI POWERED BY SPRING

Cash Back Offer Redeemed

FIGURE 33

Hi, Jack.

You just redeemed your latest Cash Back Offer from Spring Deli. We have credited your card on file #-1005 for $0.25.

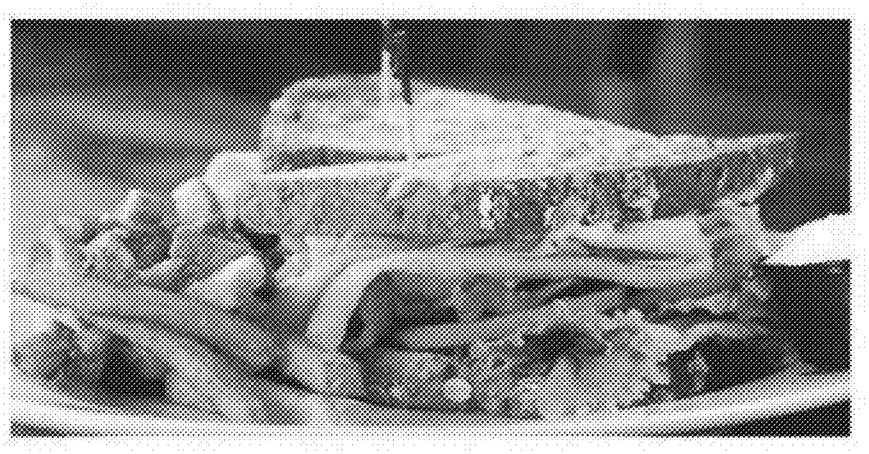

REDEEMED

Spend $0.50 get $0.25

Spring Deli

RIVER NORTH, CHICAGO, IL

FOOD & DRINK

REDEEMED ON

Thanks for stopping by, and come back again soon!

HAVE QUESTIONS?

Check out our Spring 101 page to get the details on how Spring works, or view our Frequently Asked Questions page to browse common questions.

FIGURE 38
SPRING DELI
POWERED BY SPRING
Welcome
You're now enrolled in:
Spring Deli
Rewards Program
POWERED BY SPRING
Why am I getting this email?
You are a member of the Spring Deli Rewards Program, part of the Spring Network
Because we are part of the Spring Network, by shopping with us you have been automatically added to the Spring Deli Rewards Program – with some great benefits!
(Opt-Out to be removed from this Rewards Program)
Spring Deli
Primary
222 W. Hubbard St
Chicago, IL 60654
(800)-137-3181
http://www.springrewards.com/
Map & Directions »
More information About Spring Deli »
Automatic Cash Back Rewards
Just by using your linked card, you will earn Cash Back Rewards. For every $2.00 you spend with us, you will earn a $0.70 credit on your next purchase – automatically.
Members-Only Offers
On occasion, we will send you Free Cash Back Offers and Limited Sale Events – exclusive Members-Only specials!
Potential VIP Status
You can also reach VIP Status in our Rewards Program when you visit us 25 times – get elite access to special offers and privileges we reserve for our most valued customers.

OVERVIEW > TABLET ENROLLMENT > EMAIL ENROLLMENT > IN-STORE COLLATERAL > WEBSITE AND SOCIAL WIDGET > SPRING PROMOTION > ORGANIC > ONLINE PROMOTION > SUMMARY

FIGURE 57

Email Invitations and Promotions

Spring creates branded emails for each merchant to invite their customers to their new rewards program and makes it easy for them to sign up online.

All subsequent emails with Offers also drive sign-ups – To claim the Offer, the user joins Spring.

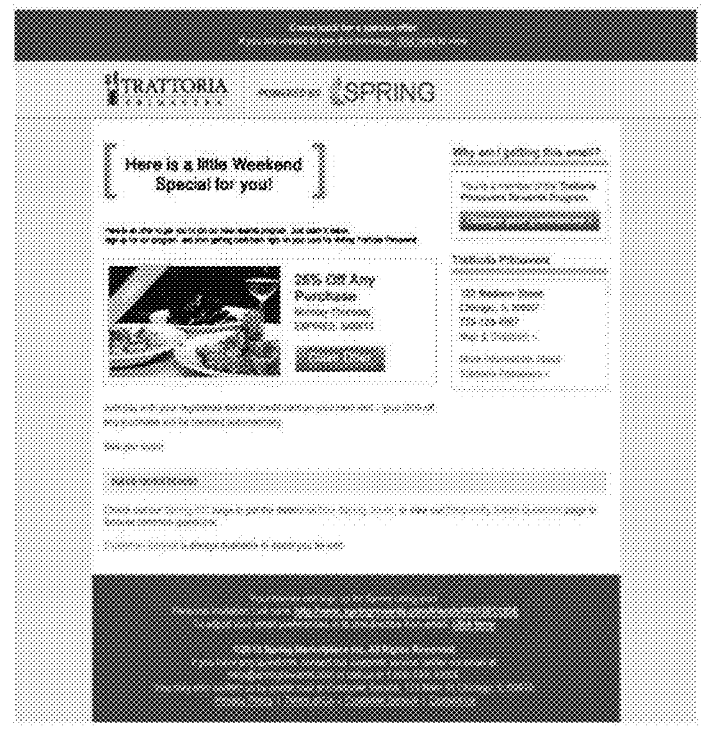

OVERVIEW > TABLET ENROLLMENT > EMAIL ENROLLMENT > IN STORE COLLATERAL > WEBSITE AND SOCIAL WIDGET > SPRING PROMOTION > ORGANIC > ONLINE PROMOTION > SUMMARY

FIGURE 63

Online Advertising

Spring enables companies to connect online advertising directly to consumer spend.
When consumers claim the offer, they sign-up for Spring – and the Merchant's Rewards Program.
The Merchant gains performance-based media, track-able spend and a new Rewards Member.

1 Consumer Clicks Advertisement

2 Directed to Spring Sign Up

OVERVIEW > TABLET ENROLLMENT > EMAIL ENROLLMENT > IN STORE COLLATERAL > WEBSITE AND SOCIAL WIDGET > SPRING PROMOTION > ORGANIC > ONLINE PROMOTION > SUMMARY

Rapid Self-Reinforcing Network Growth and Differentiation

FIGURE 65

Merchants Contribute Valuable Offer and Reward Content

Merchants Contribute a High Volume of Members Rapidly – 000,000s

Participation Attracts More Participation: Merchants and Consumers

More Transactions and Increased Spend in the Spring Ecosystem

Ecosystem Develops Differentiated Level of Content and Engagement

OVERVIEW > CUSTOMER REWARDS > NEW CUSTOMER ACQUISITION > SPRING INTELLIGENCE > PRICING > SUMMARY

FIGURE 67

Spring Customer Rewards

A customizable and easy-to-use program that turns the credit and debit card everyone already carries into a loyalty card that works directly with your business.

KEY BENEFITS

- Easy and Automatic on the Card they Already Carry
- Increase Frequency of Visits and Spend per Visit
- Happy Customers, Love Rewards
- Know More About Your Business

HOW IT WORKS

① ENROLL
- In-store, on-line, everywhere in your store
- Every visit is a chance to enroll

→

② REWARD
- Customized deliver real cash-back
- Zero friction
- Status & privileges

→

③ REACH
- Full email CRM platform with embedded offers
- Turns your email/social activity on steroids OVERVIEW > CUSTOMER REWARDS > NEW CUSTOMER ACQUISITION > SPRING INTELLIGENCE > PRICING > SUMMARY

FIGURE 72

① CASH BACK

- Used for a variety of goals
- Works automatically on the customer's card
- Customer activates the promotion by clicking to add to their card
- User receives a cash back credit directly in their account, within 48 hours

② LIMITED SALE OFFERS

- Promote aggressively; to acquire customers, liquidate inventory or time slots
- Requires pre-purchase of the offer online; a later transaction and redemption in-store
- Customer notified of redemption within 5 seconds of purchase
- User receives cash-back within 48 hours

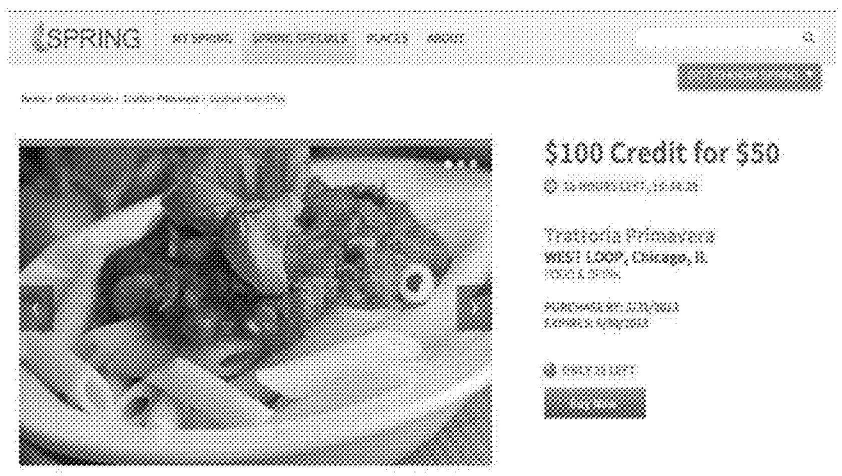

OVERVIEW > CUSTOMER REWARDS > NEW CUSTOMER ACQUISITION > SPRING INTELLIGENCE > PRICING > SUMMARY

FIGURE 73 Spring Business Intelligence

KEY BENEFITS

Spring provides you information about:

- Your overall business
- Your rewards program and spend of its members
- Reach campaigns you run to your rewards customers

Examples include:

- How many customers you have
- How much they visit and spend; where they live and shop
- Size of your average order; slow times and fast times
- Are your revenues higher/lower/on target this month
- How do your VIPs and rewards members compare to your other customers
- How have each of your offers, campaigns and targeting plans performed and which ones work the best

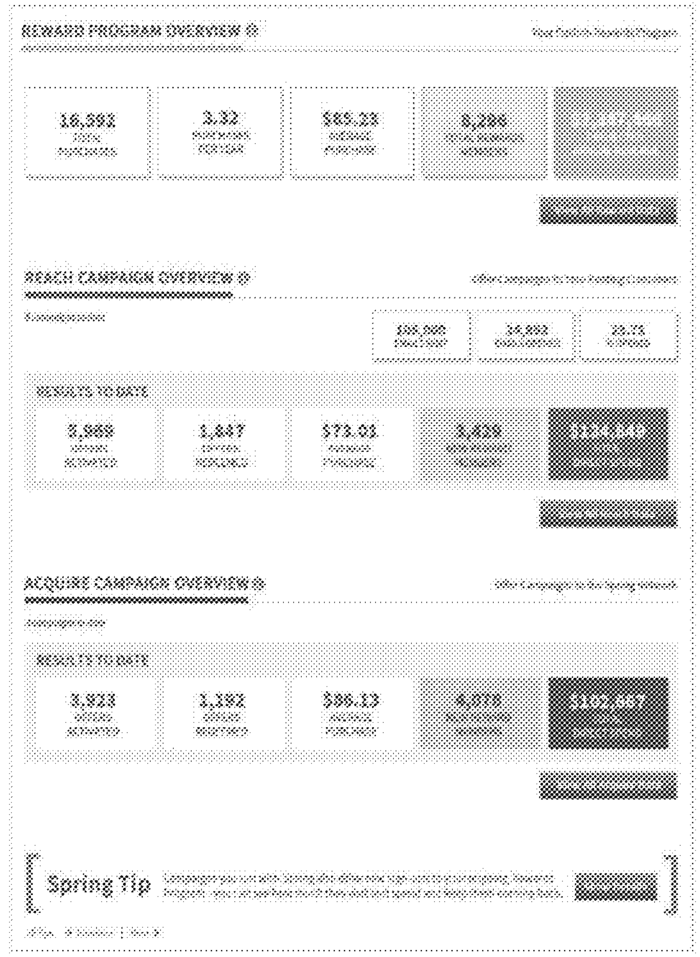

Figure 87

1. A user makes a purchase with a Spring enrolled card at a Spring enabled merchant.
2. Spring sees the transaction instantly and notifies the user giving them the option to transfer the transaction amount to their account.
3. If they accept, Spring credits the card used in the amount of the transaction which is funded, and the user pays over time according the terms agreed.

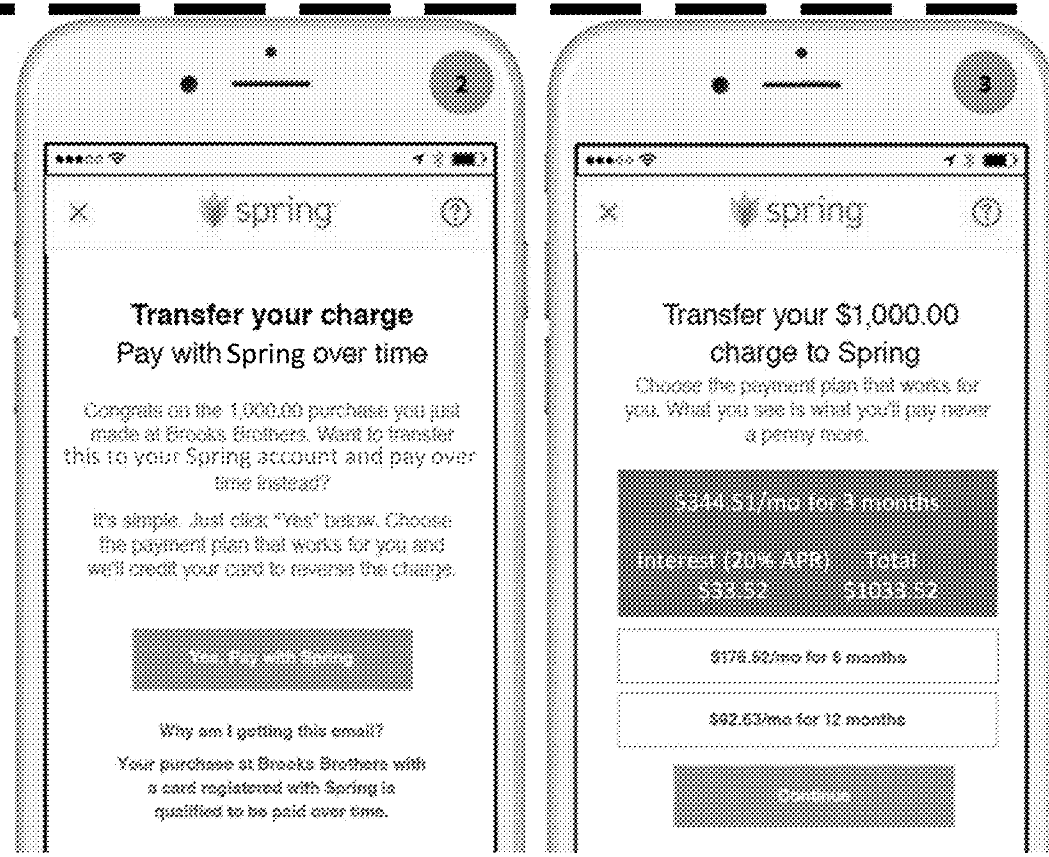

Figure 88

*Spring members pay normally with an enrolled payment card and are offered an opportunity to transfer the charge and pay over time*

1. A Spring user makes a purchase with a Spring enrolled card at a Spring enabled merchant.
2. Spring sees the transaction instantly and notifies the user presenting them with the opportunity to transfer the transaction and open a new credit account.
3. With very little friction, in a high-intent real-time context including in-store, the user can accept the offer and establish a new credit account.

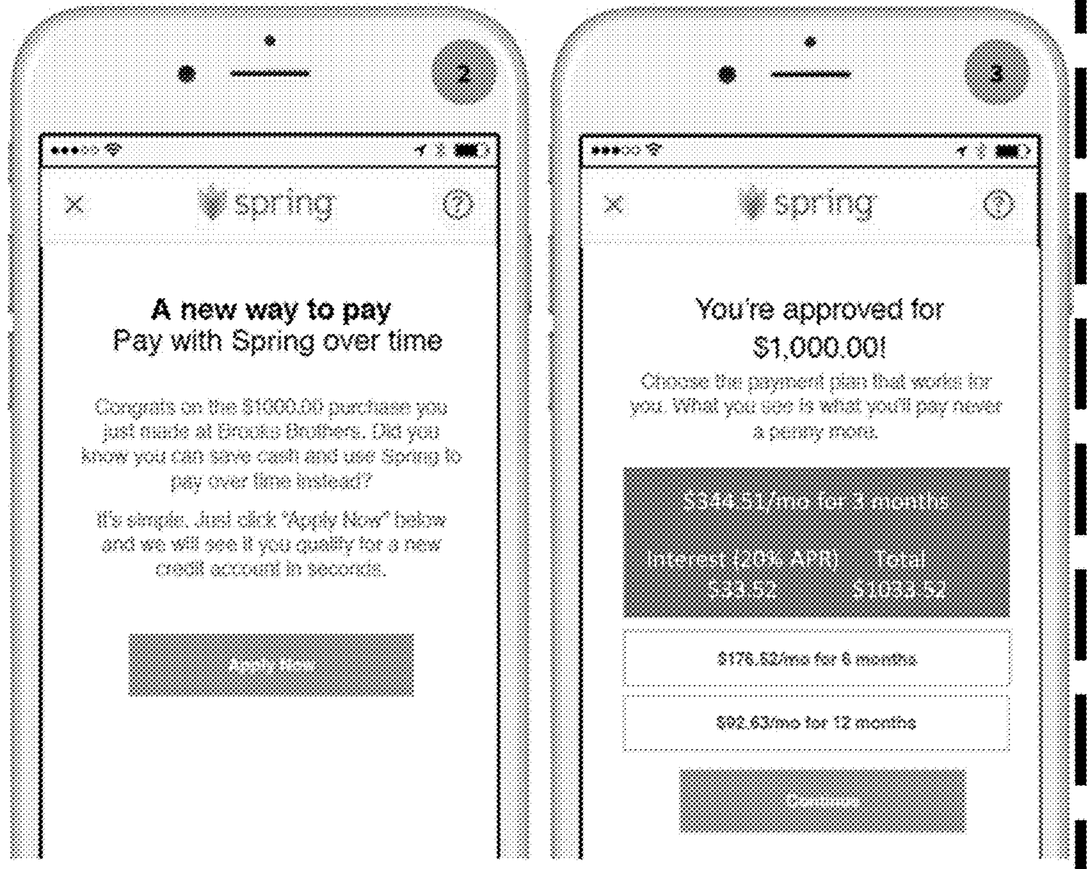

Figure 89

1. Before they make a purchase with the merchant, eligible users or new prospects among Spring members can be presented with an offer that includes free financing.
2. Because the offer enjoys all of the targeting and attribution capabilities of Spring's performance-based marketing solution for merchants, the merchant funds the financing costs.
3. The offer can be triggered by real time purchase activity or detecting a user's phone through WiFi. Plus, free financing can be offered at one featured merchant or many. Users can take advantage of a merchant funded holiday shopping spree, interest free, until June.

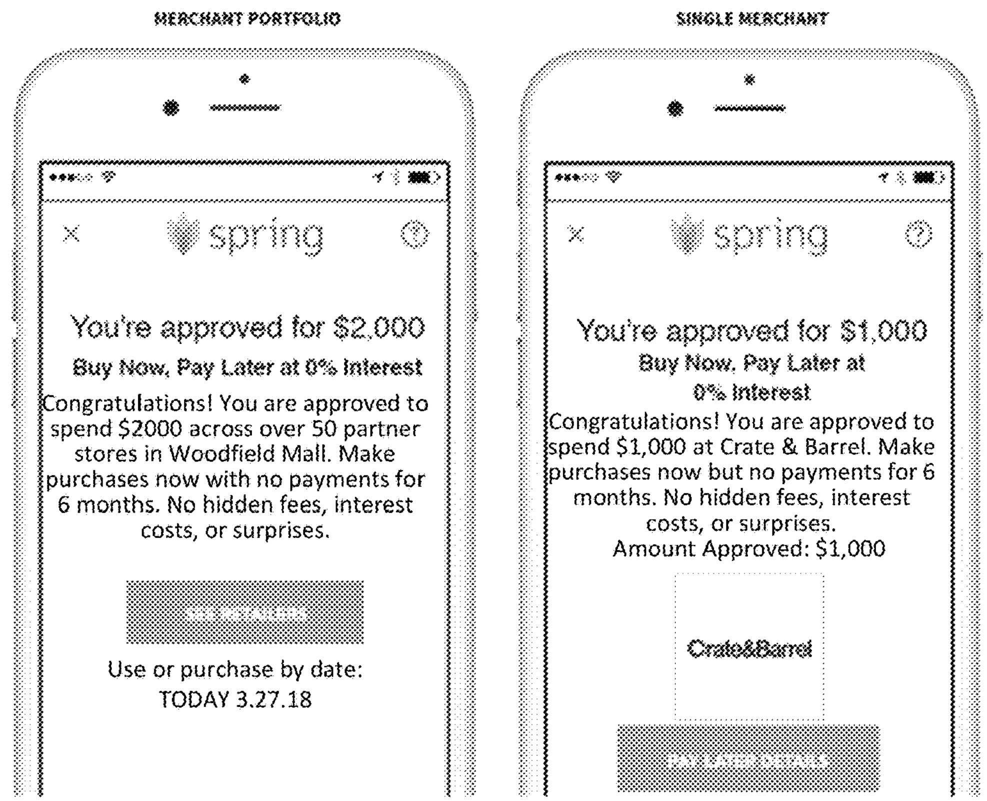

Figure 90

Card issuer rewards convertible into merchant funded offers

Spring Payment Connected Marketing turns merchant funded promotions into a new structurally more efficient way to fund rewards. The cardholder converts rewards into a cash back offer at a merchant.

CARD HOLDER BENEFITS

The cardholder converts rewards into cash – and can receive an offer worth more than their rewards.

CARD ISSUER BENEFITS

The issuer funds a portion – gaining a subsidy from the merchant.

MERCHANT BENEFITS

The merchant funds a portion – gaining a subsidy from the issuer and leverage from the rewards.

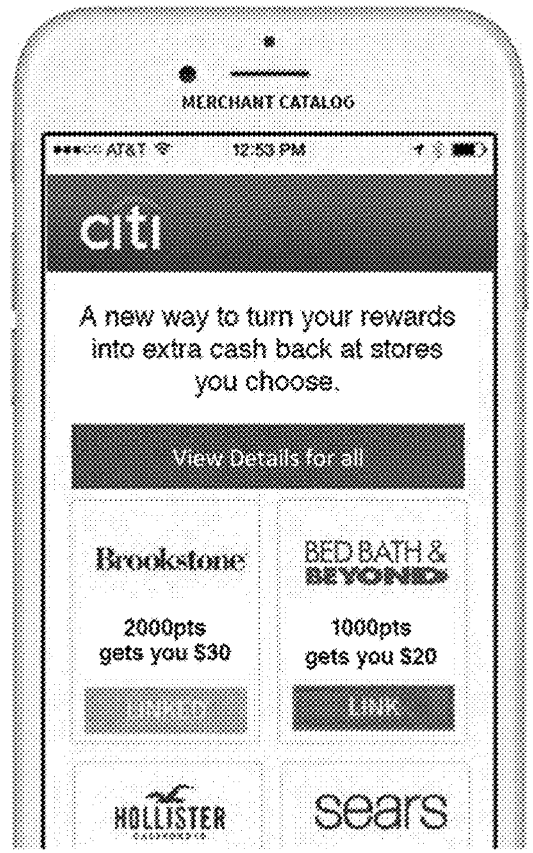

Figure 92

New credit products funded by merchant promotions

Spring Payment Connected Marketing can turn merchant funded promotions into new credit products with significant synergies.

USER BENEFITS

Eligible users are presented with the opportunity to use the credit on their account to — Buy Now, but Pay Later at 0% — with the financing costs funded by the merchant.

MERCHANT BENEFITS

Merchants gain purchase financing and an offer format that does not discount price or brand.

SPRING BENEFITS

Spring gains high margins because merchants are willing to fund offers frequently 15 – 25% or more when using Spring solutions. Plus, the product line adds value to Spring offerings for both merchants and consumers.

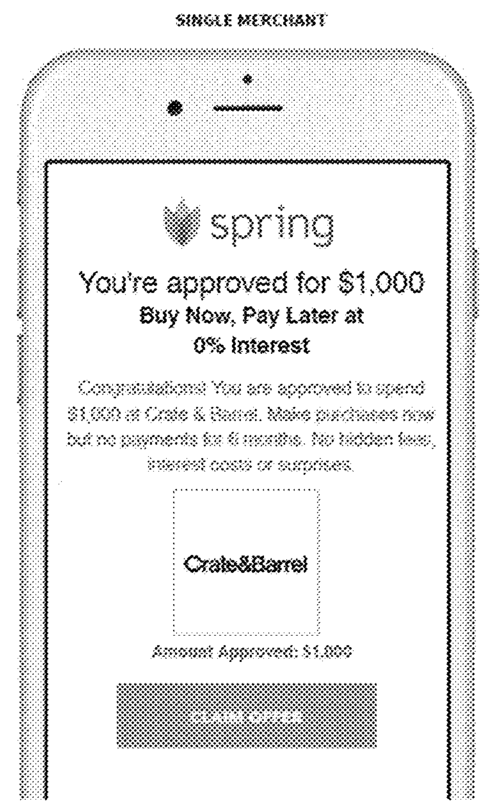

Figure 93

Spring makes it easy to use an offer and pay in store with Spring

Spring users just claim an offer and then pay normally with any enrolled payment card including in-store. Spring then transfers the charge to Spring and the user pays Spring according to the terms of the offer.

1. A Spring user claims an available offer through the Spring site, app, email or text.
2. The user then makes a purchase and pays normally with any Spring enrolled card at the relevant Spring enabled merchant.
3. Spring sees the transaction instantly and notifies the user that the charge on that card will be credited back and the transaction and amount owed transfered to their Spring account.
4. The user then just pays Spring over time according to the offer terms agreed.

*Functional elements can also be used for new pay in store solution for Spring products generally.*

*Works online too.*

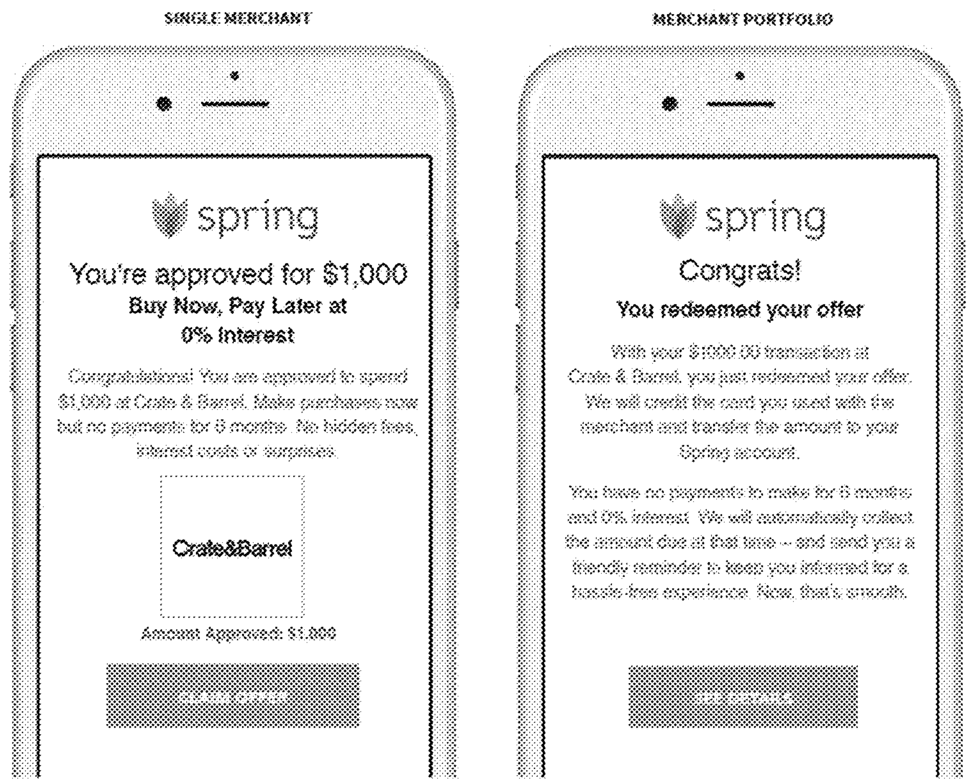

Figure 94

Spring can make it easy to pay in store with Spring in general

Spring users pay normally with an enrolled payment card at a participating merchant location – then Spring allows them to transfer the charge to Spring.

1. The merchant opts-in to the the Spring Network and Spring onboards the merchant payment terminal locations with all three payment networks.
2. A Spring user claims the option to pay with Spring at a selected retailer via the Spring app or site. [Not required, but relevant to user attribution.]
3. When a Spring user makes a purchase with a Spring enrolled card at a Spring enabled merchant, Spring sees the transaction instantly and notifies the user giving them the option to confirm the transfer of the transaction amount to their Spring account.
4. If confirmed, Spring credits back the charge on that card and transfers the amount owed to their Spring account.
5. The user then just pays Spring over time according to the offer terms agreed.

*Works online too – without the need for a ghost card.*

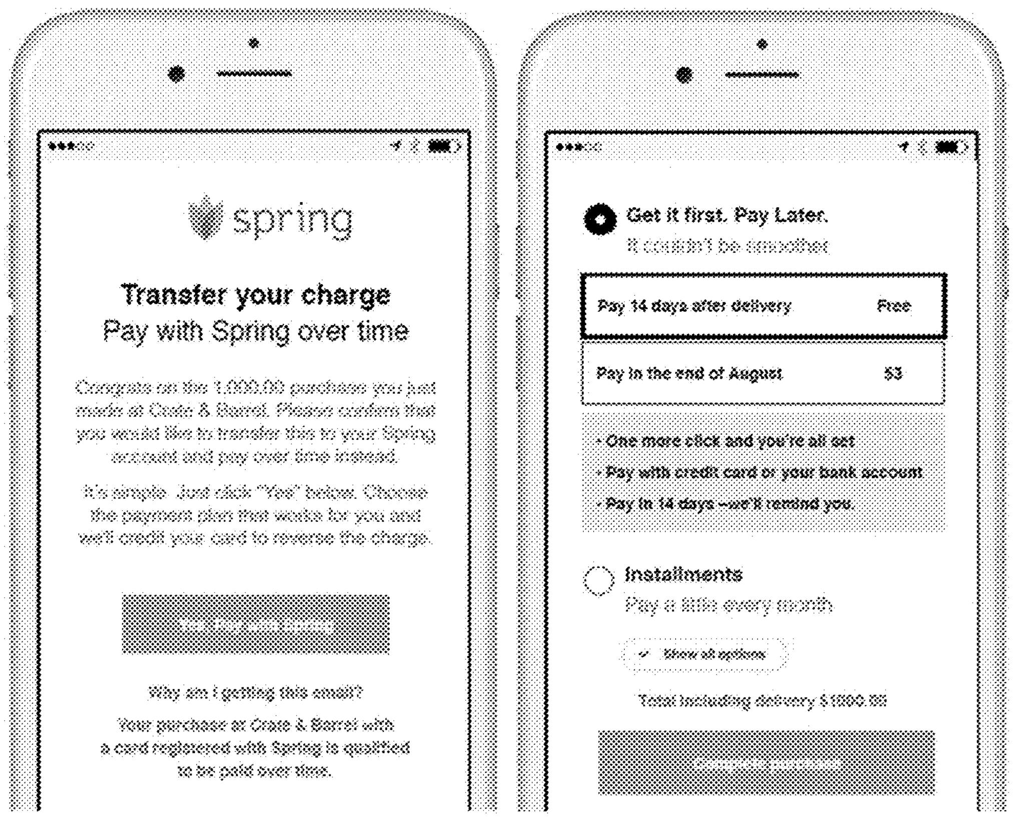

Figure 95

Spring also makes it easy to pay with Spring even after the transaction

Even when users do not think to pay with Spring in advance, Spring can make it easy for them to transfer the charge to Spring after the original transaction 1. A Spring user makes a purchase with a Spring enrolled card at a Spring enabled merchant.
2. Spring sees the transaction instantly and notifies the user giving them the option to transfer the transaction amount to their Spring account.
3. If they accept, Spring credits the card used in the amount of the transaction and the user pays Spring over time according the terms agreed.

*Every transaction by a Spring user with a registered card at a participating merchant across the network is an opportunity to transfer the charge and pay over time with Spring.*

*Works both in-store and online.*

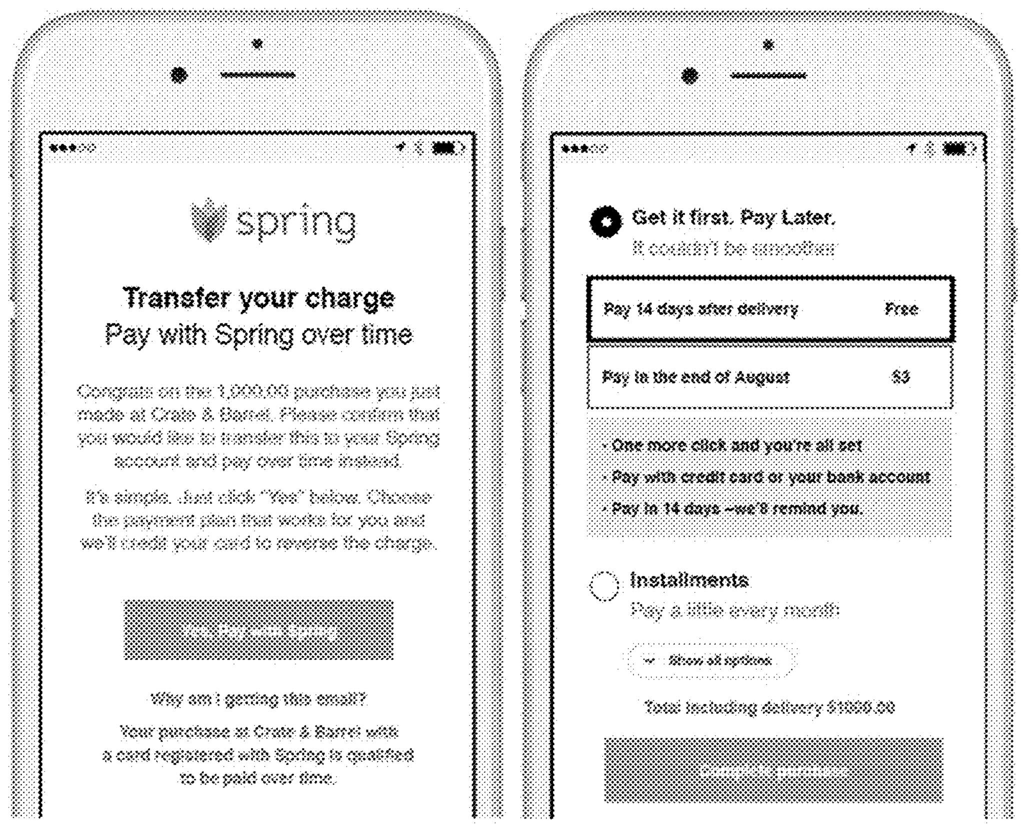

Figure 97

Smarter loyalty programs for card issuers and national brands

Spring has the ability to extend Private Label and Dual Credit Card programs into a complete multitender loyalty solution - addressing a merchant's entire customer base.

Powerful features that work on customers' existing payment cards with a simple opt-in:

- Promotions and Loyalty solution work together
- Instant feedback from in-store transactions
- WiFi solution connects visits with spend activity across in-store and online channels
- Custom program terms, benefits and tiers Typically, only ~10% of customers join a specialty retailer's private label credit card loyalty program and over half of their spend is still on another card

Spring can increase participation by 3x or more

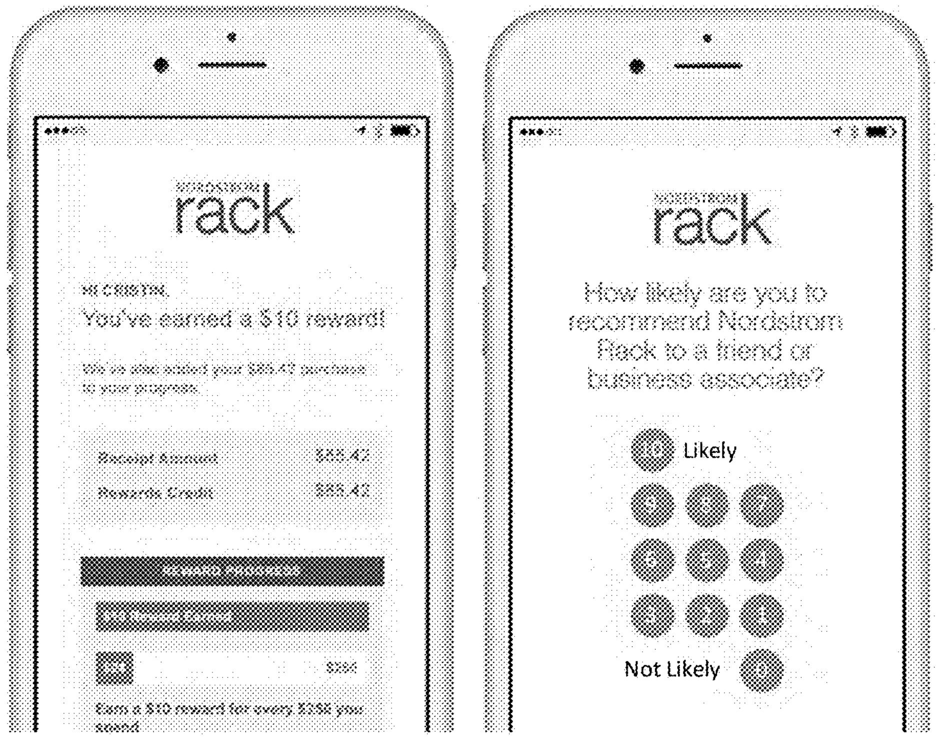

Figure 98

Convenient new financing at time of purchase in-store – to grow private label credit programs With Spring turned on, retailers can leverage every transaction by a customer with another enrolled payment card as an instant low friction way to grow their branded credit programs.

1. At time of purchase, the user is instantly presented with the opportunity to transfer the charge and open a new account.
2. If they accept and are approved, Spring credits the card, and the user pays under their new account.

MERCHANT AND CARD ISSUER BENEFITS

A high value no cost way to increase adoption of co-brand, dual card and PLCC programs and to grow a bank's customer and credit portfolio.

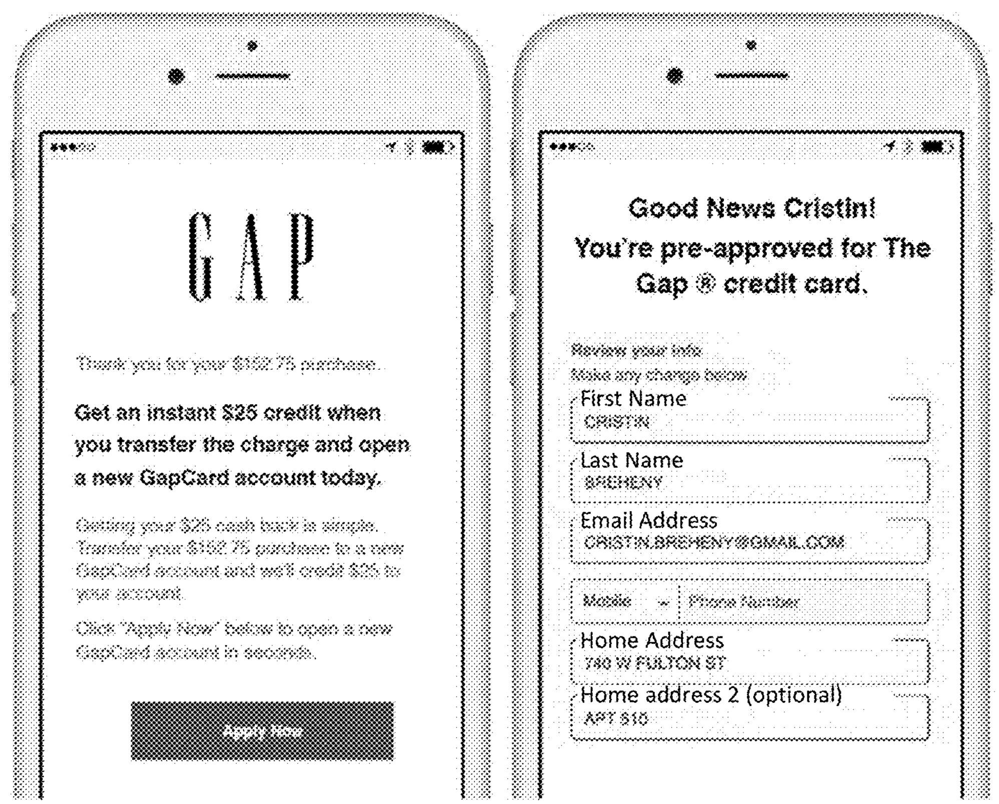

TRACKING TRANSACTIONS ACROSS MULTIPLE PAYMENT PROCESSING NETWORKS

CROSS-REFERENCE TO RELATED APPLICATIONS

This application is related to and claims priority to and the benefit of one or more prior filed applications. This application is a continuation-in-part application of U.S. application Ser. No. 16/656,024, which is a continuation-in-part of U.S. application Ser. No. 15/435,737, filed Feb. 17, 2017, now U.S. Pat. No. 10,546,315, which is a continuation-in-part of U.S. application Ser. No. 14/329,781, filed Jul. 11, 2014, which claims the benefit of U.S. Provisional Application No. 61/845,984, filed Jul. 13, 2013, each of which is incorporated herein by reference in its entirety.

BACKGROUND OF THE INVENTION

1. Field of the Invention

The present invention relates to a cloud-based platform for enrolling accounts and administering one or more customer loyalty and rewards programs in electronic communications networks, and more particularly, systems and methods for providing and operating a customer loyalty and rewards platform including consumer or customer network-based and merchant-based registration and the management thereof.

2. Description of the Prior Art

Generally, prior art is known to provide digital loyalty and rewards system and methods. By way of example, relevant prior art includes the following U.S. Patents and Publications:

U.S. Publication 2013/0073361 for "Methods and systems for offering targeted deals to customers and real-time automatic redemption thereof" filed on Sep. 20, 2012, describes wherein a customer can select from coupons to them, such as offers made to the customer (which may need to be purchased), vouchers purchased by the customer, and the like. A redemption choice is received from the cardholder indicating one or more coupons to 'load' onto the cardholder's card product. Information about offers, coupons, vouchers, etc., loaded onto a cardholder's card product can be stored in an offer deployment system. When the cardholder uses the card product to purchase a good or service, a transaction approval request is generated from at least one of a merchant, an acquirer, an association, a bank, and an issuer. The transaction approval request is processed wherein the step of processing comprises at least one of querying the offer deployment system which determines whether an offer loaded onto the cardholder's card product can be applied to the purchase. If so, the value of the offer is applied to the transaction. Preferably, offer value is applied to the amount of the transaction approval request before the request is received by the ultimate financial institution or card transaction processing system responsible for approving the transaction such that the amount of the transaction which must be approved is the purchase price of the good or service less the applied value of the offer. A receipt can be issued to the cardholder wherein the receipt indicates the purchase and use of the coupon.

U.S. Publication 2012/0191525 for "Systems and Methods to Facilitate Loyalty Reward Transactions" filed Jan. 23, 2012, describes wherein Reward communications can be processed as transactions over the communications system in a way similar to credit/debit transactions. The enhanced communications system allows simpler and/or more efficient implementation of complex loyalty programs, and provides new options for creating new loyalty programs. In one embodiment, a transaction handler for the processing of transactions on financial accounts, such as credit accounts, debit accounts, prepaid accounts, bank accounts, stored value accounts and the like, is configured to support transactions for crediting rewards to a reward account and/or transactions for redeeming rewards from a reward account.

U.S. Pat. No. 6,327,573 for "Multiple party reward system utilizing single account" filed Dec. 31, 1998, describes using one reward/loyalty card for multiple accounts and enabling a frequent shopper reward system capable of tracking performance data of a plurality of members or account holders linked to a single frequent shopper account. Additionally, the document discloses transacting with at least one of the present sub-account holders, calculating a reward level, allocating, to at least one of the present sub-account holders, at least a portion of the determined reward level, and updating the retrieved customer record.

U.S. Pat. No. 8,429,009 for "Universal Affinity System" filed Jul. 16, 2008, describes tracking loyalty/reward programs through the use of a third-party card or other medium. The system enables: a merchant to determine incentives, such as discounts, advertisements, or other offers, for a given customer or set of customers; uploaded these incentives to respective customer "personal account lockers"; and universal ID is encoded as a bar code, the bar code may be provided to a corresponding customer on a variety of different media, such as on an adhesive label that the customer may apply to another device or item, printed on a credit or debit card, printed on a key-chain card, or printed on any other device or item that a customer may be likely to carry with him or her.

U.S. Publication 2013/0054454 for "Wallet Service Enrollment Platform Apparatuses, Methods and Systems" filed Sep. 21, 2012, describes wherein a user may input username and password credentials into the wallet widget (e.g., 210) to get authenticated. The user may have control (e.g., create, view, manage, cancel, etc.) over the individual relationships and may configure permissions for each service they connect to. In one embodiment, the WSEP may allow approved services, issuers and merchants permissions to obtain various information relating to the user and wallet such as consumer profile 225, billing agreement 230, redemption 235, loyalty and rewards 240, coupons/offers 245, wish lists and stored items 250, merchant applications/widgets 255, Value Added Resellers (VAR)/Software-as-a-service (SaaS) commerce wallet plug-ins 260, analytics 265, account or points balance information 270, payments 275, and/or the like. In one implementation for example, the WSEP may manage which services can connect to the wallet. In a further implementation, the WSEP may pass along information from an approved and connected service such as a loyalty program (e.g., STAR WOODS POINTS program) to a merchant such that the merchant may provide the customer a special deal, offer or an opportunity to use or exchange points/currency when transacting. In one implementation, approved commerce services, issuers and merchants may be able to push information relating to any of the above to the wallet.

None of the prior art documents referenced herein or any known prior art provides the solutions to the longstanding unmet needs that are satisfied by the systems and methods of the loyalty platform of the present invention.

SUMMARY OF THE INVENTION

The present invention relates to systems and methods for providing and operating a customer loyalty and rewards platform including network-based and merchant-based registration and management, including mobile and electronic messaging, remote and local customer user registration options, enrollment, and credit, debit, and other electronic payment card account association with the customer loyalty and rewards platform.

The present invention further provides credit, debit, electronic payment, and/or card account enrollment automatically, as well as the functions of adding promotional, financing and/or discount offer(s), and/or other offers to a profile, adding cards, credit, debit, and other electronic payment card accounts or electronic payment accounts, redeeming promotional or discount offers, real-time automated functionality, providing data for a marketplace of vendors and customers, including account and activity data, providing a coalition network model, and combinations thereof.

In one embodiment, the present invention includes a system for providing offers, incentives, and rewards for at least two merchants comprising: a web tier hosted on a cloud network, wherein the web tier is in network communication with one or more consumer applications, merchant applications, or administrative applications; a network services tier hosted on the cloud network and providing a backend set of services, the backend set of services operable for real-time communication with at least one financial services server, wherein the backend set of services is operable to redeem an offer for a consumer account, redeem an incentive for the consumer account, or credit a reward to the consumer account; wherein the remote server computer is operable to store consumer information and at least one loyalty program enrollment associated with the consumer account, and wherein the consumer information includes an account identifier related to at least one payment method; wherein the remote server computer is operable to manage merchant offers, incentives, and rewards across at least two merchants for the consumer account; wherein the web tier is operable to receive a real-time purchase record with at least one corresponding consumer account number and a purchase amount, wherein the real-time purchase record further includes indication of a merchant, at least one purchased product or service, a corresponding device ID, and/or corresponding consumer contact information; wherein the remote server computer is operable to identify a corresponding user account by matching the corresponding consumer account number with the account identifier and/or by matching the corresponding device ID and/or the corresponding consumer contact information with the stored consumer information; wherein the remote server computer is operable to provide the merchant offers, incentives, or rewards based on the merchant of the real-time purchase record and the stored consumer information associated with the identified corresponding user account; wherein the merchant offers, incentives, or rewards include at least one financing offer, incentive or reward; and wherein upon acceptance of the at least one financing offer, the network services tier is operable to reimburse at least some amount of the purchase amount and charge the at least one payment method based on terms of the financing offer.

In another embodiment, the present invention includes a system for providing offers, incentives, and rewards for at least two merchants comprising: a web tier hosted on a cloud network, wherein the web tier is in network communication with one or more consumer applications, merchant applications, or administrative applications; a network services tier hosted on the cloud network and providing a backend set of services, the backend set of services operable for real-time communication with at least one financial services server, wherein the backend set of services is operable to redeem an offer for a consumer account, redeem an incentive for the consumer account, or credit a reward to the consumer account; wherein the remote server computer is operable to store consumer information and at least one loyalty program enrollment associated with the consumer account, and wherein the consumer information includes an account identifier; wherein the remote server computer is operable to communicate at least one offer, incentive, or reward based on the stored consumer information associated with the identified corresponding user account; wherein the remote server computer is operable to manage offers, incentives, and rewards across at least two offers, incentives, or rewards programs for the consumer account; wherein the remote server computer is operable to receive an indication of activation of the at least one offer, incentive, or reward; wherein the web tier is operable to receive a real-time purchase record with at least one corresponding consumer account number and a purchase amount, wherein the real-time purchase record further includes indication of a merchant, at least one purchased product or service, a corresponding device ID, and/or corresponding consumer contact information; wherein the remote server computer is operable to identify a corresponding user account by matching the corresponding consumer account number with the account identifier and/or by matching the corresponding device ID and/or the corresponding consumer contact information with the stored consumer information; and wherein the remote server computer is operable to redeem the at least one offer, incentive, or reward for the consumer account.

In yet another embodiment, the present invention includes a method for providing offers, incentives, and rewards for at least two merchants comprising: storing consumer information and at least one loyalty program enrollment associated with the consumer account, and wherein the consumer information includes an account identifier; managing offers, incentives, and rewards across at least two offers, incentives, or rewards programs for the consumer account; communicating at least one offer, incentive, or reward based on the stored consumer information associated with the identified corresponding user account; receiving an indication of activation of the at least one offer, incentive, or reward; receiving a real-time purchase record with at least one corresponding consumer account number and a purchase amount, wherein the real-time purchase record further includes indication of a merchant, at least one purchased product or service, a corresponding device ID, and/or corresponding consumer contact information; identifying a corresponding user account by matching the corresponding consumer account number with the account identifier and/or by matching the corresponding device ID and/or the corresponding consumer contact information with the stored consumer information; and redeeming the at least one offer, incentive, or reward for the consumer account.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 33 illustrates another GUI of an embodiment of the invention.

FIG. 57 illustrates another GUI of an embodiment of the invention.

FIG. 63 illustrates another GUI of an embodiment of the invention.

FIG. 65 illustrates another GUI of an embodiment of the invention.

FIG. 67 illustrates another GUI of an embodiment of the invention.

FIG. 72 illustrates another GUI of an embodiment of the invention.

FIG. 73 illustrates another GUI of an embodiment of the invention.

FIG. 87 illustrates a GUI diagram of a financing embodiment of the invention.

FIG. 88 illustrates a GUI diagram of another financing embodiment of the invention.

FIG. 89 illustrates a GUI diagram of another financing embodiment of the invention.

FIG. 90 illustrates a GUI diagram of an offers, rewards, and incentives redemption embodiment of the invention.

FIG. 92 illustrates a financing offer, incentive, or reward for a merchant, including a "Buy Now, Pay Later" promotion, according to one embodiment of the present invention.

FIG. 93 illustrates a "Buy Now, Pay Later" promotion, including a pre-approved user notification according to one embodiment of the present invention.

FIG. 94 illustrates a multi-option financing offer including an option to pay via the platform according to one embodiment of the present invention.

FIG. 95 illustrates a multi-option financing offer including user notification of an available financing offer according to one embodiment of the present invention.

FIG. 97 illustrates a loyalty program for a specific merchant, including a user feedback system according to one embodiment of the present invention.

FIG. 98 illustrates a co-brand, dual-brand, or private label payment method registration system according to one embodiment of the present invention.

DETAILED DESCRIPTION

Figure 1:
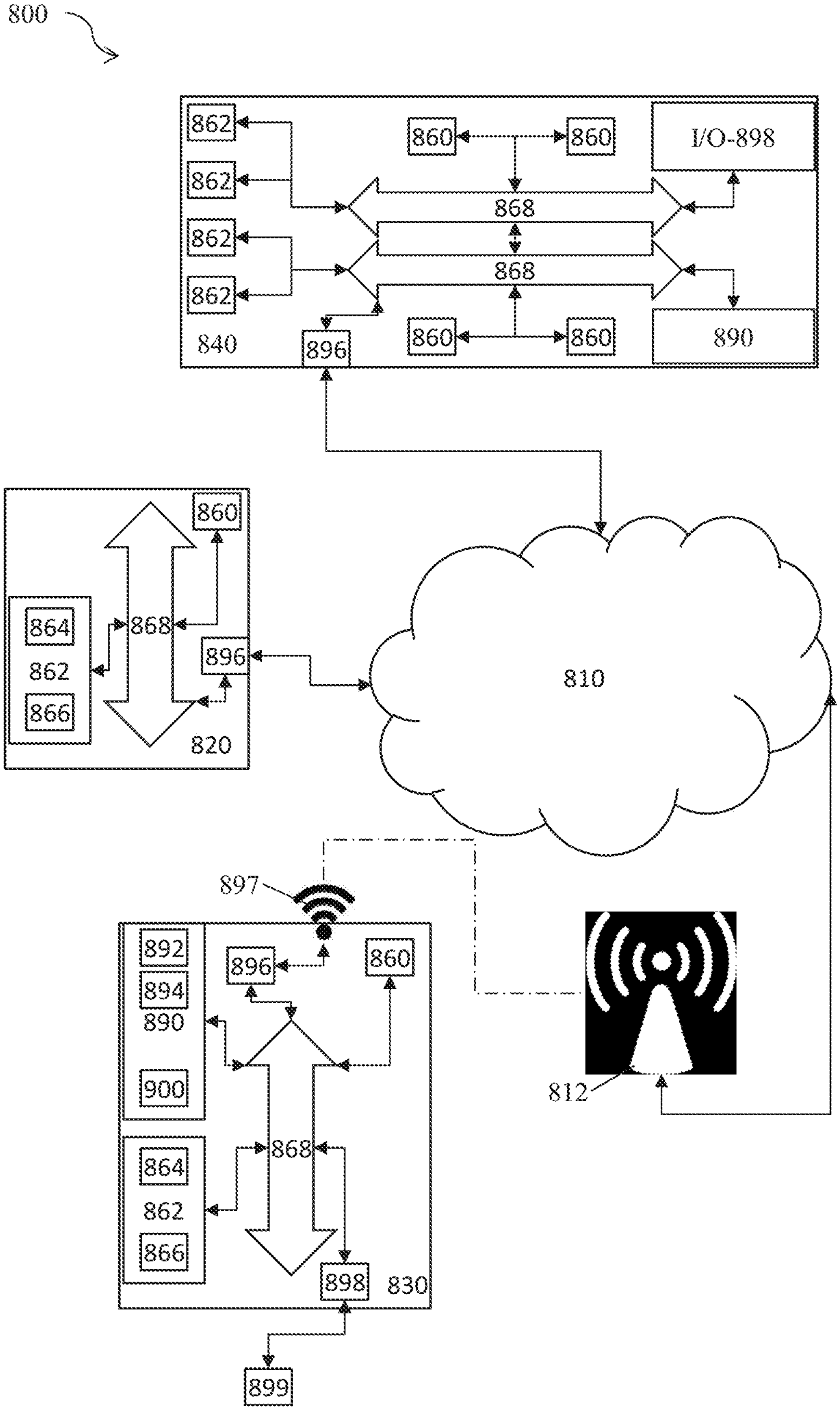
FIG. 1 is a schematic diagram of a virtualized computing system for embodiments of the invention.

The present invention provides systems and methods for providing and operating a customer loyalty and rewards platform including network-based and merchant-based registration and management, including mobile and electronic messaging, remote and local customer registration options, enrollment and credit, debit, and other electronic payment card account association therewith, as well as functions of providing promotional and/or discount offers, adding promotional and/or discount offer(s) to profile, adding cards, credit, debit, and other electronic payment card accounts or electronic payment accounts, redeeming promotional or discount offers, real-time automated functionality, providing data for a marketplace of vendors and customers, including account and activity data, providing a coalition network model, and combinations thereof. In describing the present invention and embodiments thereof, reference to a credit, debit, and/or payment card is directed to any suitable form factor representing the account, rather than merely a physical card per se, because the form factor may change, such as transition to, or addition of, a mobile wallet or functional medium representing the electronic payment account. The platform is sometimes referred to throughout the specification as the Spring platform or Spring.

The systems and methods of the present invention provide for connecting digital network-based environments with payment data, including a rewards platform and/or a loyalty platform for customers with merchants participating in the network. The present invention systems and methods solution provide merchants with ways to acquire new customers as well as a rewards program for existing customers. In one embodiment, any digital media provided over a network, e.g., online media provided over the Internet, is functional and operable to automatically load or input customer loyalty and rewards information to at least one electronic payment media, including incentives or promotions to encourage consumer action with the predetermined merchants for goods and/or services to be automatically electronically associated with at least one credit or debit card account, and/or electronic payment account of a corresponding consumer user.

In one embodiment, the present invention includes a system for providing offers, incentives, and rewards for at least two merchants comprising: a web tier hosted on a cloud network, wherein the web tier is in network communication with one or more consumer applications, merchant applications, or administrative applications; a network services tier hosted on the cloud network and providing a backend set of services, the backend set of services operable for real-time communication with at least one financial services server, wherein the backend set of services is operable to redeem an offer for a consumer account, redeem an incentive for the consumer account, or credit a reward to the consumer account; wherein the remote server computer is operable to store consumer information and at least one loyalty program enrollment associated with the consumer account, and wherein the consumer information includes an account identifier related to at least one payment method; wherein the remote server computer is operable to manage merchant offers, incentives, and rewards across at least two merchants for the consumer account; wherein the web tier is operable to receive a real-time purchase record with at least one corresponding consumer account number and a purchase amount, wherein the real-time purchase record further includes indication of a merchant, at least one purchased product or service, a corresponding device ID, and/or corresponding consumer contact information; wherein the remote server computer is operable to identify a corresponding user account by matching the corresponding consumer account number with the account identifier and/or by matching the corresponding device ID and/or the corresponding consumer contact information with the stored consumer information; wherein the remote server computer is operable to provide the merchant offers, incentives, or rewards based on the merchant of the real-time purchase record and the stored consumer information associated with the identified corresponding user account; wherein the merchant offers, incentives, or rewards include at least one financing offer, incentive or reward; and wherein upon acceptance of the at least one financing offer, the network services tier is operable to reimburse at least some amount of the purchase amount and charge the at least one payment method based on terms of the financing offer.

In another embodiment, the present invention includes a system for providing offers, incentives, and rewards for at least two merchants comprising: a web tier hosted on a cloud network, wherein the web tier is in network communication with one or more consumer applications, merchant applications, or administrative applications; a network services tier hosted on the cloud network and providing a backend set of services, the backend set of services operable for real-time communication with at least one financial services server, wherein the backend set of services is operable to redeem an offer for a consumer account, redeem an incentive for the consumer account, or credit a reward to the consumer account; wherein the remote server computer is operable to store consumer information and at least one loyalty program enrollment associated with the consumer account, and wherein the consumer information includes an account identifier; wherein the remote server computer is operable to communicate at least one offer, incentive, or reward based on the stored consumer information associated with the identified corresponding user account; wherein the remote server computer is operable to manage offers, incentives, and rewards across at least two offers, incentives, or rewards programs for the consumer account; wherein the remote server computer is operable to receive an indication of activation of the at least one offer, incentive, or reward; wherein the web tier is operable to receive a real-time purchase record with at least one corresponding consumer account number and a purchase amount, wherein the real-time purchase record further includes indication of a merchant, at least one purchased product or service, a corresponding device ID, and/or corresponding consumer contact information; wherein the remote server computer is operable to identify a corresponding user account by matching the corresponding consumer account number with the account identifier and/or by matching the corresponding device ID and/or the corresponding consumer contact information with the stored consumer information; and wherein the remote server computer is operable to redeem the at least one offer, incentive, or reward for the consumer account.

In yet another embodiment, the present invention includes a method for providing offers, incentives, and rewards for at least two merchants comprising: storing consumer information and at least one loyalty program enrollment associated with the consumer account, and wherein the consumer information includes an account identifier; managing offers, incentives, and rewards across at least two offers, incentives, or rewards programs for the consumer account; communicating at least one offer, incentive, or reward based on the stored consumer information associated with the identified corresponding user account; receiving an indication of activation of the at least one offer, incentive, or reward; receiving a real-time purchase record with at least one corresponding consumer account number and a purchase amount, wherein the real-time purchase record further includes indication of a merchant, at least one purchased product or service, a corresponding device ID, and/or corresponding consumer contact information; identifying a corresponding user account by matching the corresponding consumer account number with the account identifier and/or by matching the corresponding device ID and/or the corresponding consumer contact information with the stored consumer information; and redeeming the at least one offer, incentive, or reward for the consumer account.

In one embodiment, the present invention is directed to payment architectures, schemes, and/or protocols specially adapted for electronic shopping systems, including those related to the monitoring of transactions across multiple payment methods and payment networks.

Loyalty and Rewards Platform.

In contrast to prior art systems and methods for loyalty and rewards programs wherein each merchant has its own closed loyalty and rewards program, and wherein customers must take specific actions to enroll, the present invention provides for a loyalty and rewards platform including a multiplicity of otherwise unrelated merchants, wherein customers automatically enroll in a single loyalty and rewards platform that provides rewards across the multiplicity of merchants in the platform. In prior art examples, users earn points or a currency that is redeemable not at the merchant where the spend triggered the earn; by contrast to the prior art, the present invention provides systems and methods wherein users earn both a points currency redeemable outside that merchant and earn towards a cash back reward with the merchant at which the user spends. Thus, the present invention systems and methods provide an interactive "ecosystem" that leverages existing financial systems, networks, and infrastructure related to electronic payment, in particular (but not limited to) electronic payment cards, and existing customer behavior (making electronic payment by swiping a magnetic stripe containing digital representation of customer account data and other customer data associated with at least one electronic payment card, for wide scale implementation of a multi-merchant loyalty and rewards, discounts, incentives, benefits, and combinations of these programs. Notably, mobile payments, electronic wallets, etc., or any other form of electronic payment, may be used as well.

Advantageously, the present invention business methods transform customer payment information into marketing functionality information that enables automated performance-based digital promotions tracking and analysis. By way of example, the present invention systems and methods provide automated performance-based digital promotions by tracking customer activity compared with revenue delivered as a result of the promotions, as evidenced by customer electronic payments with merchants within the loyalty and rewards platform (member merchants), including factors such as payment amount, time, and location with respect to the customer spend with the member merchants. Furthermore, the present invention systems and methods include at least one database of customer electronic payment account and corresponding payment information, which is advantageously received from existing card networks, including authorization and settlement data, directly in real time or near real time, thus creating customer spend behavior information and patterns relating to them, including upstream pre-existing, which are transformed to target marketing opportunities with those customers. Merchant friendly targeting of customers to incentivize specific spend behavior includes all promotional media available to deliver targeted advertising, promotions, discounts, incentives and combinations thereof, to existing or past customers and to potential new customers in a plurality of formats and structures that are dynamic and that are customized to satisfy the merchant requirements for results that meet business goals or expectations. For example, a merchant typically does not know if a target customer is an existing customer unless upstream data on that customer is available. Incentive-based discounting by merchants is effective, but only for new customers or to reactivate stale customers. So upstream customer spend behavior and patterns are important and useful in structuring a targeting marketing project with the present invention because they include customer geography, spend behavior information, and provide self-reported automatic information (including zip code and time of business transaction with a given merchant, electronic payment card swipe location and time) that is transformed into a scatterplot or other visual or graphical representation with respect to up to about the past 90 days or less. The targeted marketing or advertising is also customer friendly inasmuch as the incentives extended to the customers are directly relevant to the customer based upon past customer spend behavior, so they provide incentives or promotions that are consistent or related to the customer interests, based upon comparison with the recent past spend behavior, and based upon relationship (active, stale and/or past but inactive, new and/or no relationship yet) with the merchant members of the loyalty and rewards platform.

The present invention further provides smart offer structures that are based on customer spend behavior and that align the business goals or objectives of the member merchants for stimulating and/or increasing customer activities in specific ways. For example, predetermined triggers are established for extending automated offers to the target customers that provide discount-based incentives that deliver yield management in patterns that improve the revenue of the member merchants according to predetermined times, days of the week, days of the month, etc., e.g., restaurant merchant members establish triggers to stimulate business on weekdays without existing high traffic, like Tuesdays. Alternatively or additionally, the present invention provides Smart Offer Structures that provide support for triggers that are selected from: time conditions, spend-level for a transaction conditions (i.e. above $X), spend-level for multiple visits at a merchant transaction/visit frequency or visit threshold conditions, inviting a contact to join the platform or a merchant rewards program wherein the contact is a social media contact and wherein in one embodiment the contact is invited to like the platform page or a merchant page as well as joining the platform or a merchant rewards program, joining the platform or a merchant rewards program, and combinations thereof.

Significantly and advantageously, the loyalty and rewards platform of the present invention uses existing infrastructure for electronic payment and does not require any change in customer payment types or methods, which leverage existing customer payments without conscious steps or actions by the customers (no merchant codes or coupons need to be provided by the customers participating or enrolled in the platform at the time of purchase to engage the loyalty and rewards platform and member merchants incentives). So the customer unconsciously engages the loyalty and rewards platform each time an electronic payment transaction is provided at member merchants within the systems and methods of the present invention; the customer experience is essentially effortless and requires no additional steps other than purchase and electronic payment with merchant members. Furthermore, discrete interactions between customers and merchant members of the loyalty and rewards platform of the present invention are automatically transformed into continuous interactions without steps that are in addition to or extraneous to the purchase transaction by the customer. Merchant members have customer permission-based visibility into customer spend activities, behaviors, and therefore potential interests, which is essentially helpful for successful targeted advertising to generate more business with new and existing customers in predetermined ways. Therefore, customers' interests and merchant members' marketing goals are aligned to provide seamless, effortless interaction within the loyalty and rewards platform of the present invention.

Customer Enrollment.

The present invention provides for a customer to enroll multiple electronic payment cards or devices, including but not limited to credit cards, debit cards, prepaid cards, mobile wallet devices, mobile payment devices, and combinations thereof. Notably, with the present invention, in one embodiment, by way of example and not limitation, enrollment steps include: a user swiping a payment card through a card reader (whether separate from or co-incident with swiping the card to effect a payment transaction), taking a photo of the payment card or entering the number through an online form, including doing any of the above connected to or associated with a Tablet computer or mobile phone computer, and combinations of these options. There are a multiplicity of methods for customers to activate enrollment in the loyalty, rewards, and/or incentive platform of the present invention, including at least one of: providing a physical form factor for receiving inputs from customers at a merchant location; providing an interactive website with graphic user interface via a data and communications network (e.g., the Internet) for receiving inputs from customers at remote locations from the merchant locations; providing a physical marketing collateral at a merchant location, such as by way of example and not limitation, a tablet computer, a smartphone, a computer with display, etc.; automatically activating a customer enrollment by the system, wherein the enrollment is triggered by a purchase made by the customer using an electronic payment either at a merchant and/or via online (remote) purchase from a merchant within the network of merchants associated with the loyalty and rewards platform of the present invention; and combinations thereof. In the case of providing an interactive website with graphic user interface via a data and communications network (by way of example but not limitation, the Internet) for receiving inputs from customers at remote locations from the merchant locations, the website may be accessed by customers after they input a website URL, provide inputs on a merchant website with a link to a URL for registration and creating a customer profile, receive a text message or SMS with a URL link that directs the customers to a URL for registration and creating a customer profile, providing an email invitation to a customer with a link to a URL for registration and creating a customer profile or other interactive website enrollment or registration page; providing any other digital object online, including an ad with an incentive, and combinations thereof. A sign-up or enrollment incentive may be provided in addition to advertising or other promotion of customer enrollment in the loyalty and rewards platform.

In any case, the enrollment automatically provides for express, customer permission-based access to spend information across all registered electronic payment cards for any issuing bank, and for any card type (e.g., the associations providing electronic payment cards, including VISA, MASTERCARD, AMERICAN EXPRESS, or DISCOVER networks for any issuing bank or financial institution). Because the automatic enrollment is independent of a financial institution and independent of any card issuer, the systems and methods of the present invention provide the first comprehensive multi-merchant, multi-electronic payment form (card, etc.) for loyalty and rewards platforms, including real-time or near real-time upstream and downstream data availability relating to customer spend behavior, thus meeting a longstanding, unmet need for this solution. The systems and methods of the present invention provide for customer spend data to be automatically obtained directly from the electronic payment card networks or associations (e.g., VISA, MASTERCARD, AMERICAN EXPRESS, or DISCOVER); additionally or alternatively, data is acquired from issuers or processors of the electronic payment cards. Thus, the present invention provides the ability to take data from one or more financial institutions. Also, the present invention provides the ability to take data from merchant processors or all the processors. With this, the loyalty and rewards platform database includes information and access to information from the electronic payment card or account authorization file or feed; this data is preferably aggregated and integrated by the servers and databases of the systems and methods of the present invention. Furthermore, the systems and methods of the present invention are applicable to function for all merchants that accept any type of payment cards and/or electronic payment, not only those that use a specific processor. That is part of what is a unique attribute of the present invention that provides a ubiquitous solution and marketplace or network configuration of merchants and customer users. In one example, those customers that use a given processor can enroll all card types, but only for the merchants that use that processor.

Other enrollment mechanisms for a consumer to enroll in the platform or in a specific merchant rewards program through the platform include: reading a card or card account number via a magnetic stripe reader, EUROPAY VISA MASTERCARD (EMV), NEAR FIELD COMMUNICATION (NFC), RADIO-FREQUENCY IDENTIFICATION (RFID), smart chip, etc., taking a photo of a card or account number, scanning a bar code, account number entry in a web browser or on a mobile app, selecting a button on a website or mobile app, automatic enrollment after selecting a single incentive offer or a group incentive offer presented on the platform site, a third party site, via a mobile app, email, Multimedia Messaging Service (MMS) message, Short Message Service (SMS) message, or in response to a push notification, and/or via accepting an invitation and/or incentive via a social media or email contact or text message.

Enrollment Mechanism and Business Model.

The systems and methods of the present invention loyalty and rewards platform provides for automatic receipt of all data available to the associations relating to electronic payment card information, while the loyalty and rewards platform provides compensation to the one or more associations only when the loyalty and rewards platform generates revenue under its business model of providing targeted advertising to customers for member merchants. The member merchants preferably have customer-approved visibility to every customer spend event or activity, even though every customer spend event does not generate the redemption of the incentives provided by the member merchants to the target customers under the loyalty and rewards platform of the present invention. By having customer-approved visibility to every customer spend event or activity without having to compensate the associations for access to all of the data (and only providing payment when revenue is generated from the loyalty and rewards platform) the present invention has unique insight into more customer behavior that can inform the targeted advertising and incentives provided under the present invention, and attract more merchant members to participate, which in turn attracts more customer members to participate, thus creating a rapidly automatically growing and evolving loyalty and rewards platform or loyalty and rewards ecosystem that self-perpetuates growth without undue effort by any single member, whether customer or merchant member.

Any and all micro-mechanics of electronic payment device or payment card or payment card account enrollment are considered within the scope of the present invention, such as data entry by customer online or through software on a smartphone, tablet computer, computer, etc., magnetic strip swipe or other reader input at POS or magnetic strip swipe or other reader outside of POS specific to effecting only the consumer card account enrollment, chip and/or PIN, capture image of a card, or any PCI compliant manner, and/or any others described hereinabove, and combinations thereof. By way of example, the enrollment mechanisms include but are not limited to, a web-based API that provides for automatic enrollment with no latency, i.e., the real-time enrollment of an electronic payment card occurs with the customer using the card for a transaction with a participating merchant member, or the customer may register one or more electronic payment cards with an online enrollment with an interactive website, or onsite with a member merchant with a card reader form factor, and/or with an electronic form factor, such as a tablet computer, even without making a purchase at the time of enrollment. Preferably, whenever any payment is made through one or more of the associations or processor, whether cash (in any currency), credit, debit, etc. on electronic payment card accounts, that authorization file and settlement file and corresponding data is automatically provided to the loyalty and rewards platform of the present invention through a communications or data network to the database(s) and server(s) of the loyalty and rewards platform, whenever the customer member makes an electronic payment at the member merchant. The data includes authorization date, time, merchant identifier, location identifier, and combinations thereof.

The loyalty and rewards platform of the present invention provides rewards or loyalty and rewards points or other units to the customer member account, which is associated directly with any of the electronic payment cards of the customer member that are enrolled with the loyalty and rewards platform. The loyalty and rewards points or units are automatically attributed to the customer member account, and are applicable to spend with any and all merchant members within the loyalty and rewards platform in electronic form, without requiring any additional action, selection, or indication by the customer of how or when the loyalty and rewards points or rewards will apply, and to which merchants. Preferably, the loyalty and rewards points are convertible automatically into any incentive available on the loyalty and rewards platform at any time. The format may include automatic credit to the electronic payment card account, prepaid cards, etc., and is preferably "paperless", i.e., the system automatically indicates, tracks, and stores data on the incentives and points available to any customer at any time, and tracks redemption and/or cash credit to the customer accounts.

From business model standpoint, the present invention systems and methods further provide for a seamless settlement of the redeemed offer by providing for automatic debit or automatic payment by the merchant members accounts, as they provide permission to debit the merchant and/or processor account at the time a customer activates and redeems an offer provided by that merchant within the loyalty and rewards platform of the present invention.

Customer Activation of an Offer.

Preferably, real-time data is used to message customer members about offers from member merchants, including offers to join, earn and redeem loyalty and rewards points or units within the loyalty and rewards platform of the present invention. Following customer enrollment in the loyalty and rewards platform, the customer can see all merchant members associated with the system, search for offers and search for merchants of interest, for merchants within the network and also for merchants that are not yet included in the network. Activation of an offer is by click-select and automatic loading to the electronic payment card(s) associated with the customer profile following enrollment. The offer can be added to the electronic payment card automatically for automatic redemption, by the user "claiming the offer" through an action online such as clicking a link, the offer may be added with a purchase transaction (buy now and redeem later), pre-paid cards, the ability for the automatic redemption on a card, and/or a trigger activation of an offer may be provided online or through customer activity or proximity to a merchant member location.

Examples of different types of offers include a cash back offer, an advanced sale offer, a pre-purchased offer, and a credit eligible offer. A cash back offer is preferably an offer for a fixed dollar value or percentage of a transaction amount of cash back when a user has activated the offer and meets all qualifying conditions. A pre-purchased or advanced sale offer is, in one embodiment, an offer which is pre-purchased by the user. Notably, the pre-purchased or advanced sale offer often redeems at higher rates since the user must pay for this offer upfront and the offer preferably has an expiration. A credit eligible offer is, in one embodiment, a special offer which is purchased with rewards currency earned by the user via a purchase transaction or other activity at one or more merchants or partner websites, mobile applications, or other digital assets, including currency, points, rewards, or offers from a Third Party Partner or a mall currency. In one embodiment, a credit eligible offer is supported by (1) an API granting a Third Party Partner user a fixed dollar amount of rewards currency, (2) an API returning a list of credit eligible offers to be used by Third Party Partner, (3) an API allowing a credit eligible offer to be claimed, (4) an API showing details on how the rewards currency has been earned and spent, (5) contacting an API to award the currency, (6) allowing the customer user to select available credit eligible offers, and (7) showing currency balance and details on a user interface.

Targeting rules for offers include targeting, by way of example and not limitation: everyone, existing members of the platform, non-members who have not joined the platform, spenders who have previously transacted through the platform, non-spenders who are members of the platform but have not transacted through the platform, lapsed members who have not transacted in the last X days, hours, minutes, etc. generally or at a specific location/store, and VIP members who have a hit a lifetime level of spending through the platform. The front-end system of the platform provides for implementation of targeting rules as well as tracking membership and summarizing transactional data.

Display rules govern whether an offer should be shown or activated. Redemption rules determine if an offer which has been activated can be redeemed based on a qualifying transaction. By way of example and not limitation, redemption rules include location (is the offer accepted at the store or location where the user transacted?), transaction date (is the offer still valid and not blacked out?), transaction time (is the offer being redeemed at the set time of the day?), and minimum purchase (is the transaction amount sufficient to redeem the offer?). Preferably, the redemption rules are enforced by the platform. The Third Party Partner mobile app and website would need to display and communicate these rules, so users are aware of the restrictions prior to transacting. Location specific offers typically require that location transactional data or real-time location data is transmitted to the Third Party Partner using identifiers readable by the Third Party Partner website and app. Location transactional data or real-time location data is communicated in a variety of ways, including but not limited to, via Global Positioning System (GPS), an IP address of a point of sale system, an IP address of an electronic device involved in a transaction, cellular triangulation, etc.

The present invention systems and methods also preferably leverage email marketing mechanisms to connect customer behavior to customer action with member merchants. So preferably, all promotions in the loyalty and rewards platform of the present invention are provided in a digital format or on a digital "surface", that connect to downstream customer behavior and spend as evidenced by the enrolled electronic payment card transactions of the customers with the member merchants. By way of example and not limitation, the customer click-selects a digital advertisement online or presented in an email or text message or web site format, and load or input or import the corresponding digital incentive to a customer profile or account on the loyalty and rewards platform of the present invention (the Spring profile) and automatically load it to the electronic payment cards (or accounts) that are associated with that customer profile within the loyalty and rewards platform. Then, any subsequent electronic payment with the corresponding customer cards at the member merchant automatically provide for the redemption or discount associated with the digital incentive offered online by the member merchant.

In one embodiment of the present invention, automatic enrollment through a purchase transaction includes the steps of: the system receiving an electronic payment customer account number or identifier (including for example but not limitation, a credit card capture number); receiving a permission from the corresponding customer (user) corresponding to the electronic payment customer account number or identifier; receiving customer contact information (by way of example and not limitation, name, address, phone number, email address, and combinations thereof); automatically creating a customer profile from the information received; automatically enrolling the customer and corresponding customer profile as a participant (or member) in the loyalty and rewards platform. The present invention systems and methods provide for at least two ways for customers to join the marketplace or network: 1) when a user purchases something, whether an online e-commerce check out or a card present transaction at POS in a store, that transaction also is functionally equivalent to an automated enrollment (and importantly, because the user so indicates and provides a permission); 2) a customer user first joins through one of many potential entry points—for example at a first merchant, Merchant #1 or other connected/and or registered loyalty system. After that, when the user simply pays with an enrolled card at another merchant in the network, that creates the potential for the user to "join" the rewards program of that #2-N merchant on an automatic, opt-out or opt-in basis. This is a very powerful way for all merchants and partners that participate in the network to build their rewards member list because normal swipes are functionally equivalent to joining to customers, if already in from somewhere else. Real-time notice to users based on authorization data (or data coming out of the POS) is important to make this work for the user when swiping and automatically joining thereby at merchant 2-N.

Notably, the present invention systems and methods provide for automatic customer enrollment of multiple cards (or electronic payment devices) of any card type, and/or from different issuing banks, following receipt of near real time authorization or copy of capture data from electronic payment transactions by the customer at the at least one merchant participating in the loyalty and rewards platform of the present invention. At least one primary account number associated with a customer is used for automatic enrollment with the loyalty and rewards platform; other cards or electronic payment accounts may be further included and associated with that customer profile based upon future transactions (and automatic inputting of alternate accounts at the time of the transactions for customers already associated with the loyalty and rewards platform). Customers may create a corresponding customer profile at the time of enrollment.

Optionally, additional method steps include: automatically associating the customer profile with at least one merchant registered within the loyalty and rewards platform of the present invention; automatically generating at least one advertisement, promotion, and/or incentive for the customer based upon patterns generated from customer behavior and corresponding association data that are stored in a database and analyzed by at least one server computer in electronic communication connection with the database. Significantly, no prior art enrollment methods provide for automatic enrollment of multiple cards of any card type and/or from different issuing banks, since the prior art systems and methods do not receive near real time authorization or copy of capture data.

The systems and methods of the present invention provide for activation of an offer (incentive, loyalty and rewards benefit, reward, and combinations thereof) extended by a merchant participating in the loyalty and rewards platform of the present invention to at least one customer, including at least one of the following steps: automatically adding the offer to the electronic payment account of the corresponding customer(s); automatically presenting an offer for the customer(s) to purchase and redeem later in association with at least one of the customer accounts identified or stored with the loyalty and rewards platform; and/or automatically crediting the account and/or triggering the offer when a customer makes a purchase of goods or services associated with the offer and/or the merchant associated with the offer.

Offers, incentives, and/or rewards (including financing or installment offers and/or terms) are operable to be initiated, managed, redeemed, and/or targeted, via the platform by third party partners (including merchants, financial institutions, digital marketing institutions, locality-based organizations (e.g., shopping malls), multi-merchant retailers and networks, and others) or by the platform directly. In one embodiment, the platform provides both customer accounts and third-party accounts, wherein third party accounts and customer accounts have access to different functionality, and wherein third party accounts are operable to initiate, target, track, analyze, and manage campaigns for one or more merchants or organizations. In another embodiment, each type of account is provided access by the platform to one or more programs (e.g., mobile, web, or desktop applications) or websites, wherein the access provides each of the management and campaign tools for creating offers, incentives, or rewards, and tracking usage and feedback.

Loyalty and Rewards Platform Communication and Data.

The present invention systems and methods provide for the ability to communicate with any customer member following enrollment by any means for any electronic payment card or device account associated with the customer member. The communications methods may be provided by email, text or SMS, native application on mobile and tablet computer devices, automatically through geographic location functionality and corresponding software, email CRM and marketing communications, etc. Advantageously, the presentation, targeting, communicating, tracking, reporting, analytics, offer types, redemption, and customer behaviors relating to spend compared with offers presented are included with the present invention loyalty and rewards platform communications and data associated with the customer electronic payment transactions. All methods of merchant offer discovery by the customers and/or promotion to customers is provided within the scope of the present invention. The data analytics and reporting may be provided to member merchants, to member customers, or to partners of the loyalty and rewards platform to facilitate assessment of success of the loyalty and rewards behavior corresponding to digital incentives provided by any means. Thus, the present invention uniquely provided direct correlation of targeted advertising in any electronic format to actions taken and to spend activity by the customers on a transaction basis and with respect to trends or behavior over time.

Track and Utilize Transaction Activity

Advantageously, the systems and methods of the present invention are operable to use both real-time transaction data, preferably in the form of authorization files or notification of authorization files, and latent transaction data, which is preferably in the form of clearing files or notification of clearing files. Transaction data is obtained from, inter alia, a server computer or cloud of a financial services provider, a point-of-sale, a server associated with a point-of-sale, or any other source including the authorization files or clearing files. Transaction data is used for targeting and sending messages and/or digital content, which provides for targeting or segmenting users based on transaction history to send a message or notification, including a promotion or offer, electronically to a user, via, by way of example and not limitation, email, text, mobile app notifications, an ad, an offer, or other digital content. The transaction history preferably includes history relating to merchants, services, goods, classes/types of goods, and/or classes/types of services. Preferably, these messages or notifications are sent by the network services tier, which is operable to send a message or notification to a consumer or merchant in the platform. In another embodiment, transaction data is used in real-time to send a message or notification electronically to a user via any of the methods listed above relating to the user earning a reward, incentive, or receiving an offer, as well as providing an opportunity for the user to provide feedback or a review. Transaction data is also used in real time by the platform to trigger the earning of an incentive (offer, reward, etc.). In contrast to merely just notifying the user about an incentive, this involves actually activating the incentive. Notably, the present invention also provides for the ability to use transaction data in real time to trigger the redeeming of an incentive (offer, reward, etc.). Transaction data is also used in real time to enroll a user into a loyalty, rewards, or offers program which is part of the platform or to send a message or notification electronically via any of the methods referenced above related to enrollment. Advantageously, a user enrolled in the platform of the present invention can join specific platform programs throughout the network on an opt out or opt in basis.

Spend Informed User Base and Spend Informed User Base Service(s).

Spend-informed user base or audience and spend informed user base service(s) includes any consumer user active with any form of digital surface or asset, including a web page, email, mobile application, text message, etc., where that activity by the consumer user can be informed by or services enhanced by that user's past or future spend behavior information using a payment mechanism or form factor including a payment card account (including account number) or functionally equivalent mechanism. Examples of use of previous "upstream" payment information include targeting certain messages or advertisements or content to the user based on such data. For example, the presentation of advertisements (ads) or other content to users varies based on user spend information and ability for platform to discern user status (e.g., to identify if the user is in a merchant rewards program or not, if the user has made a purchase or spend at predetermined merchant(s) within last predetermined number of days or not, whether the user spends a financial value above a predetermined amount or not, already in merchants email list or not, and combinations thereof; if the user has spent at predetermined geography scope, location(s), category or time, therefore a content is likely to be relevant to user; enable different pricing to merchant depending on character of user (e.g. new customer within last predetermined timeframe or not) and presentation surface; and combinations thereof.

An example of use of future or "downstream" spend behavior by consumer users includes any tracking of user spend behavior after interacting with content on digital surface.

In another use case, the platform provides an aggregated group of consumer users with platform-registered (or platform-enrolled) corresponding payment card account information, and the platform is operable for receiving by the at least one server computer, storing and analyzing in the database, the consumer users' spend data and product and/or services included in each purchase. A merchant client runs a non-digital marketing campaign or a digital marketing campaign that does not include direct click-stream tracking to the users' spend behavior. The comparative aggregate normalized spend behavior of various users groups and users before and after the campaign be reported and analyzed. Example: 1,000,000 users are enrolled in Spring in Chicago. 50K in a given merchant's rewards program. Merchant runs a radio campaign. The spend behavior of both user pools is tracked and analyzed to show "view through" or "hear through" vs. click through response.

Spend Informed User Base Service(s) should also include any service with a mechanism to credit value to users based on their spend behavior in relation to any marketing or promotion activity or service. For example, crediting a user $X because they took a certain action in relation to a promotion to that user.

Methods of Developing Spend Informed User Base.

Associated with Customer Use of a Payment Card Account.

The present invention systems and methods provide for consumer user sign up mechanisms with the platform that are automatically activated when the consumer user makes a purchase using an electronic payment card account, such as by way of example and not limitation, by making a payment for goods and/or services via a credit card having a magnetic strip at a point of sale (POS) device ("a card-swipe"). Currently, card-swipe works with the platform of the present invention when the consumer user has registered or signed up online or via a platform-enabled mechanism (e.g., a tablet computer located at a merchant that is registered or associated with the platform), subsequently the user makes a transaction at another registered merchant, and the consumer user is presented with a message on a graphic user interface of a display on the POS mechanism, that allows the user to activate another unrelated part of the platform ecosystem (e.g. at an unrelated second merchant's program). These steps may include an opt-out, opt-in or automatic (no message at all) basis.

The systems, methods, and platform of the present invention operate to allow the consumer user to register automatically remotely via different mechanisms and methods that functionally operate to "sign user up once anywhere in the network", i.e., to provide for the consumer user to register in a single instance within the platform from any one of a variety of methods, mechanisms, and/or activities that include a single purchase or spend by the consumer user at any of the registered merchants within the platform using the at least one consumer user electronic payment card account. By sharp contrast to the present invention, all prior art rewards programs require that users enroll multiple times at multiple merchants, and/or take more than one action to activate rewards or digital incentives with multiple merchants and/or multiple payment card accounts; they must re-enroll the user including their need to provide their payment card account number through at least a second specific subscription process or step(s).

Associated with Payment to a Business or Through a Service.

The present invention systems and methods provide that when a consumer user pays a merchant for goods or services, capturing users or audience for any service other than customer paying their bill for that transaction through any mechanism of card account number capture, and/or a way to communicate with user (e.g. through email or text), whether through user opt-in, opt-out or automatically (without explicit consent). So, for example, the way customers pay through prior art tablet POS payment system (e.g. SQUARE or other similar providers, including BREADCRUMB, GROUPON POS, SHOPKEEP, CLOVER, etc.), would not allow the service to then convert those customers into users of some other service e.g. a rewards or loyalty program, unless they sign up a different way; this is a longstanding problem with the prior art. The present invention provides for automatic capture of a customer user's payment card account information and/or capture of a customer user email address or text number for a mobile phone or smartphone, followed by and/or associated with automatically generating and sending a message at the at least one server computer over the network to the consumer user's mobile device, wherein the message indicates that the user can opt-in or out of joining the platform automatically. Preferably, the systems, methods, and platforms of the present invention extends to and includes any and all other payment card acceptance vehicles or mechanisms (e.g. VERIFONE terminals, conventional POS, payment for something online on a website, etc.).

Conversion of Payment Card Accounts on File.

Many e-commerce companies have large user bases who have purchased something through that company's website and given permission to maintain that card on file. Notable examples include online music stores (e.g., APPLE ITUNES), e-commerce marketplaces (e.g., GROUPON, LIVINGSOCIAL, AMAZON), digital payment systems (e.g., BRAINTREE and their VENMO e-commerce service that allows sites to share this permission), and the like. For example, if you buy something on a transportation app (e.g., UBER) and provide a card on file, you can buy something through a lodging app (e.g., AIRBNB) without providing a new payment card, but just using the one in the digital payment system (e.g., VENMO) enabled service.

Preferably, the systems and methods of the present invention provide for the automatic conversion of these payment-card-on-file accounts into electronic payment card accounts enrolled in a service that enables or utilizes spend informed users, as described herein, and/or registered with the platform of the present invention, which is not described, disclosed, or used in the prior art. By way of example, the following use cases are illustrated for the present invention.

When a consumer user purchases something, the consumer user spend or purchase activity with a payment card account, the system co-incidentally and automatically is enrolling the payment card account and providing a permission to terms of use or privacy policies that are a Spend Informed User service. Whether opt in, opt out or automatically. Once a consumer user has registered with the platform of the present invention, including providing at least one electronic payment card account and a profile, if there is a card-on-file, separate from a purchase transaction, the consumer user provides a permission, such as opt in, opt out, or automatically, to include the other payment card accounts, such as the card-on-file.

Scheduling App+Card Linked Offer.

The present invention provides the system with the ability to present or accept or use any advertisement or marketing content to a consumer user that may be accepted and linked to their electronic payment card account through or in association with or adjacent to their use of any appointment booking or scheduling application. For example and not limitation, the method steps of: making a reservation at a restaurant using a restaurant table-finding app (e.g., OPENTABLE or similar web-based application), or making a reservation at a health or beauty provider using SalonBooker.com, SpaBooker.com, SpaFinder.com, or LifeBooker.com or similar web-based application. Either of these method steps that provide for making an appointment or scheduling a reservation automatically provide the functionality of sign up for the user with the systems and methods of the present invention. Additionally, a time-window based incentive that is conditional upon taking an action or making a step such as scheduling an appointment or reservation using a predetermined website-based application from a remote communications device may be provided, e.g. dine Tuesday after 5 p.m. and receive $20 off your bill. Enrollment also occurs according to one embodiment of the present invention in connection with making an order for goods or services, by way of example and not limitation, ordering food delivery, food pickup, a ride from a transportation app (e.g., UBER, LYFT), a taxi, or any other order for goods and/or services.

Protect Products that Monetize.

Digital incentives are operable automatically within any of the at least one consumer user payment card accounts registered with the platform by the consumer user and/or associated with the consumer user profile on the platform. Digital incentives may be provided as a flat rate discount, a flat rate for predetermined products or services in specified, predetermined, and/or quantity, a discount rate as a percentage for total spend or purchase at at least one merchant registered within the system to participate in the platform of the present invention. For example, a digital incentive may provide the consumer user to save $10, save 10%, and/or save $10 or 10%, on the next purchase at predetermined merchant(s) of the platform.

Digital incentives created by and associated with the platform, systems, and methods of the present invention are provided to consumer users can be activated many ways, based on many conditions or automatically, for example, a click-select action by a customer user in a GUI of a website or mobile app GUI automatically activates a digital incentive associated therewith.

Digital incentives (DIs) can have conditions, restrictions, and/or limitations required for their redemption automatically on the consumer user's payment card account(s) registered with the platform and/or associated with the consumer user profile stored on the platform database. By way of example and not limitation, automatically triggering the automatic redemption by satisfying conditions, restrictions, and/or limitations associated with the digital incentive occurs in the following types of scenarios: purchase amount or spend of X value (in a currency) is required to trigger the DI, a predetermined number of visits within a predetermined time frame to a predetermined merchant or merchants are required to trigger the DI, a transaction for purchase or spend must occur within a predetermined time window defined by a start time, or a start time and an end time (e.g., beginning Tuesday after 5 p.m., or Tuesday between 10 a.m. and 2 p.m., etc.), only a limited quantity of items or instances of services are available, customer user must have a certain status (e.g., has not yet completed a transaction with at least one predetermined merchant in last predetermined number of days, or is or is not a member of merchant's rewards program or on their email list), a pre-purchase is required (and then the DI works automatically through use of that or any payment card on the consumer users' profile or platform account, an advance sale product or service for a predetermined merchant as agreed upon in advance, and combinations thereof.

None of the prior art publications and/or commercial providers or promoters of deals provide for any mechanism to electronically link to or integrate with a payment card or with a payment card account for consumer users. In those prior art references, users purchase a deal using a payment card such as a credit card used online for completing the purchase, but any aspect of redemption, including tracking and crediting, is not managed through the user's payment card account, as with the platform, systems and methods of the present invention. The present invention systems, methods, and integrated platform operate to promote a deal or other incentive to consumer users, have consumer users purchase it, or otherwise activate it including through a click-select or other input or event, and/or with a device or mechanism as described herein), and have its presentation and redemption in relation to the corresponding transaction with the merchant associated with and receivable of the deal or incentive, and provide for automatic administration and management of the redemption through the consumer user payment card account.

By way of additional detailed description of the platform, systems and methods of the present invention, included in the functionality and operation for providing for any mechanism to electronically link to or integrate with a payment card or with a payment card account for consumer users, the following illustrative steps, components or features are provided: the purchase or spend behavior of consumer users evidenced by data from the consumer user payment card account(s) is preferably tracked, analyzed, and/or reported, which then provides for significantly improved targeted content and targeted advertisement that is data-confirmable by the purchase or spend behavior of consumer users and the corresponding granularity of the data from their payment card accounts. Additionally and advantageously, consumer users payment card account mechanism is operable to convey value to the user, for example by automatically applying an electronic financial credit related to an incentive to the consumer user through one of their payment card accounts registered with their profile within the platform of the present invention.

Multi-Merchant or Multi-Visit Incentive Products.

The virtualized computing and network-based platform, systems, and methods of the present invention function to provide consumer users with incentives that are merchant-agnostic, i.e., they may work at more than one merchant or more than one visit. For example, in an alternative embodiment, platform is configured so that the consumer user having a registered consumer user account with at least one consumer user payment card account associated therewith, and having a user profile within the platform, when a consumer user pays a predetermined amount $X and receive an incentive worth $X multiplied by Y, which generates a credit for the multiplied digital incentive (up to a maximum or cap that is predetermined), wherein the multiplied digital incentive value usable in $X increments for each transaction at any merchant in the platform's network. Following the steps of purchasing or otherwise activating via click-select or other GUI in a web site or mobile app, a consumer user can visit a platform-registered merchant (digitally online or physically in a merchant location) and automatically receive a digital incentive in a predetermined amount (e.g., $10) and this repeats until up to a maximum predetermined amount or cap (e.g., $200, which is 20 multiplied by $10) worth of digital incentives are aggregated or used. In an alternative embodiment, platform is configured so that the consumer user having a registered consumer user account with at least one consumer user payment card account associated therewith, and having a user profile within the platform, pay $X and receive $X as digital incentive whenever the consumer user visits merchant A until the end of B time period. For example, once activated by purchase or otherwise, a consumer user as patron of a restaurant (merchant A) automatically receives the digital incentive each time they transact within the predetermined time period B. There are other permutations of multi-merchant and multi-visit digital incentive packages that can be formulated; preferably, merchant users of the platform select predetermined digital incentive packages offered by the platform after their registration to participate as sponsoring merchants for a merchant subscription service fee in one business model implementation of the present invention, and/or for a customized digital incentive package having a corresponding customized fee.

The present invention systems, methods, and platform provide for automated customer loyalty and/or rewards programs that function on, through, and/or in association with payment card accounts of consumer users, preferably those consumer users that are registered to participate in the platform, and who have a customer profile and have registered at least one consumer user payment card account, thereby providing for automated and integrated functionality with any activity for payments of those at least one consumer user payment card account. Thus, the spend behavior evidenced by the activity for payments of those at least one consumer user payment card account is provided automatically and stored within the database(s) associated with the platform and the at least one server computer of the system, illustrated in FIG. 1. The spend behavior includes at least the amount of the purchase and detailed information about the goods and/or services included in each purchase, date and time of purchase, location of purchase (or indication of online website- or mobile app-based purchase), and combinations thereof. The platform for targeted digital incentives of the present invention provides for spend or visit based programs where the consumer user earns a digital incentive for spend behavior, wherein the spend behavior related digital incentives are selected from the following activities: spend at the merchant directly associated with the initial digital incentive (a first merchant), spend at other merchants, earn a reward at the first merchant, earn another reward currency, such as a notional value currency. Notional value currencies are useable by consumer users at one or more merchants affiliated within the integrated platform for marketing, advertising, and management of digital incentives with more than one otherwise unrelated merchants who are participating within the platform. Also, points based currencies redeemable at various places or for various goods and services.

The systems and methods of the present invention also function to provide consumer users the ability to enroll multiple payment cards in their profile and have spent on any of them aggregate up to their benefit on the profile level.

In a business model application of the present invention, the platform access is provided in exchange for payment by consumer users and/or merchant users for subscription-based services which allow access and profile management and maintenance during the subscription services period. In one example of the business method model, each of the consumer users pays a subscription fee on a periodic basis (e.g., monthly) for access to incentives (offers and rewards) and privileges useable at platform-affiliated or registered merchants.

Marketing Products Connect to Customer Rewards Program.

A differentiator from the prior art is that marketing incentive products provided by the present invention platform, systems and methods that merchant clients or registered merchants with the platform use to advertise to potential new customers, also drive customer memberships in their rewards program in a seamless and integrated manner, without requiring additional steps, documentation, or registration by the customer, since the consumer user registers with the platform of the present invention, creates a single profile, registers at least one customer user payment card account with the platform, and is automatically registered for all participating merchant members and their merchant rewards programs. For example, if a business sends an audience a $10 incentive, those potential customers from that audience that accept the digital incentive, register with the present invention platform in a single registration as described herein, and automatically and immediately receive the benefit of that digital incentive, and are automatically enrolled in that merchant's rewards program without requiring a redundant, or second registration step or action by the consumer user, according to the present invention. Thus, the present invention provides for consumer user interaction with the platform, and the ad or marketing product digital incentive received and used by the consumer user provide for automatic enrollment and registration in merchant-specific reward programs or membership listing or other mechanism of any kind that allows merchant to have access to that consumer user's spend behavior data and/or to communicate with them (e.g. through email or otherwise) in the future regarding advertising, digital or other incentives, awards, rewards, coupons, and combinations thereof, and to track the efficacy of those communications by comparison with the corresponding consumer user spend behavior data, including trends, patterns, confirming specific actions with respect to communications in time, frequency and type of spend, and combinations thereof.

Protecting Access to the Payment Data.

The platform, systems and methods of the present invention protect access to the payment data from any and all payment data sources, including but not limited to card networks (e.g., VISA, MASTERCARD, AMERICAN EXPRESS, DISCOVER), payment processors associated with merchants, financial institutions and card issuers, Point of Sale (POS) and card acceptance terminals (such as terminals from VERIFONE payment transaction company), and any combinations thereof.

Methods the Facilitate Redemption of an Offer or Incentive through a Payment Card Account.

Prior art provides for many consumers to purchase offers from distributors, like e-commerce marketplaces GROUPON or LIVINGSOCIAL, wherein redemption is managed through the presentation of a voucher by the consumer to the merchant. In most cases, this process is manual, and use a physical paper voucher to present to the merchant for receipt of the goods and/or services. In prior art electronic vouchers, consumers present an electronic voucher through a GUI representation of the voucher, e.g., a mobile app, for example an app for e-commerce marketplace GROUPON. Prior art methods also provide for merchants to manage redemption through a device provided by the distributor (e.g., e-commerce marketplace GROUPON), however this method still requires a manual entry or other input, such as by scanning a bar code; another process provides for a device provided by the distributor at merchant locations at the POS that employs proximity-based detection if a user of a mobile app is present (e.g. an app for e-commerce marketplace GROUPON), and if so, it facilitates redemption of the electronic voucher.

By contrast to the prior art, the present invention systems and methods facilitate redemption of offers and incentives ("deals"), including those provided by third party distributors (such as e-commerce marketplace GROUPON), by allowing consumer users to link the offer to their payment card account. Advantageously, the present invention provides for a transaction at one merchant to activate an incentive, offer, or reward redeemable at a second merchant in the platform. The two merchants optionally have an agreement under the platform for these "referral" incentives, offers, or rewards. Incentives, offers, or rewards are also issued according to one embodiment of the present invention in connection with making a reservation and/or making an order for goods or services, by way of example and not limitation, ordering food delivery, food pickup, a ride from a transportation app (e.g., UBER, LYFT), a taxi, or any other order for goods and/or services. There are several methods providing for redemption of offers and incentives and for managing redemption. By way of example, a consumer user purchases an offer through a deal distributor (e.g., online marketplace AMAZON LOCAL), wherein the deal is provided by a third party on behalf of a merchant; the system provides an electronic voucher by transmitting a message or presenting on a GUI of a computer display or mobile communications device, such as a smartphone, wherein the consumer user receives an electronic voucher including a code or link having an identifier; the consumer user, via a website interactive GUI or mobile device app, enters the identifier if already a member of the platform, or if not a member first registers or joins the platform; the system automatically associates or links the offer or deal represented by the inputted identifier with the consumer user profile on the platform, and with any enrolled payment card accounts associated with the platform; the redemption is automatically executed by the platform of the present invention with the next transaction by the consumer user with the merchant using an enrolled payment card account. In another example, the method steps are similar to the first example described above, however, the user at the time of presentation of the offer or deal to the merchant has not yet linked the offer to their payment card account; in this example, the system accepts the identifier via at least one input mechanism or device at the merchant location, physical and/or virtual; in one embodiment, the consumer user inputs the identifier in a tablet computer that presents platform, with or without branding or identifier of the merchant's customer rewards program; this overall redemption facilitation mechanism is also used to track customer spend behavior and data capture, and provides a way to communicate with the consumer user in the future even if the merchant does not have a structured rewards program. In this use case example, the consumer user enrolls in the platform by providing a communication attribute (by way of example and not limitation, email, and/or phone number for text message) and electronic payment account number or identifier (e.g., enrollment is activated by the step of providing input via swiping on a card reader or magnetic strip mechanism, touch or proximity activation mechanism, smart chip, etc., or other mechanism including but not limited to providing a photo or digital image of the user); an action is taken to link the presented offer to the users Spring account, for example, in an automated method with code entry, bar code scan, QR code scan, or a just a button or GUI interactive selection to "Link Offer"; thereafter, the consumer user completes a purchase transaction with the merchant using an enrolled payment card account, and the platform administers redemption as described hereinabove. Another use case example provides for the merchant not to utilize this platform redemption mechanism to manage the crediting portion of the redemption of the incentive, but instead deducts the value of the incentive from the customer's transaction at the time in-store. So, in this case, the platform does not automatically manage the redemption or crediting of the incentive back to the consumer user's payment card account. But since the consumer user is enrolled then the platform will automatically track and report their payment behavior with their payment card account so that the platform and the merchant may track customer spend related to the redemption transaction and downstream. Notably, in addition to enabling redemption by linking an offer to the payment card account, the merchant also automatically through the platform obtains a member in its customer loyalty or rewards program and/or database and the consumer user obtains the benefits of this membership.

Another redemption mechanism provided by the present invention is the combination of a payment card account mechanism with a software application to a specific "item-level" product or service. Notably, the prior art payment card account data streams on their own do not identify the exact item or product purchased for any given transaction. The present invention provides for automatic redemption of these specific item-level transactions which are specific to a product or service, through the various mechanisms described herein. By way of example and not limitation, one category of mechanisms provides for a member of the merchant staff to confirm a purchase by the user of the eligible item, product, and/or service through a predetermined, platform-supported mechanism, such as activation of a code, button, functional identifier, virtual button, GUI input identifier, active icon, etc., on a tablet computer or consumer user's mobile communications device or smartphone software application (app), etc. Another category includes platform integration with an item level data source, such as the merchant's POS or branded loyalty platform; preferably, the systems and methods of the present invention provide for automatically creating a multiplicity of customer user accounts on the platform wherein the merchant has aggregated its proprietary customer user account information from a loyalty program, a rewards program, a customer mailing list, etc. by importing the aggregated data by the at least one server computer and/or database associated with the systems, methods, and platform of the present invention.

Yet another redemption mechanism provided by the present invention is redemption based on location (is the offer accepted at the store where the user transacted?), transaction date (is the offer still valid and not blacked out on the given date?), transaction time (offers can be setup to be good at only set times of the day), minimum purchase (is the transaction amount sufficient to redeem the offer?).

Purchase Financing

For brick-and-mortar stores, it has heretofore been difficult to provide point-of-sale financing to consumers. Some businesses provide opportunities for financing by providing systems through point of sale (POS) terminals; however, these systems often require several minutes to fill out personal information, wait for loan approval, and agree to terms of a loan. In contrast, the present invention provides a new system with no analog before the advent of the internet or computer technology and provides a solution to the problem of the laborious process of signing up for loans at a POS by providing a streamlined system that does not require a long sign-up and approval process. Additionally, while some online systems have implemented financing options that are available at online checkout, the systems do not extend to point-of-sale systems for in-store counterparts, they do not provide for shopping behavior tracking between online and in-store customers, and these systems do not provide for financing options for additional, non-enrolled merchants.

In one embodiment, a financing system detects that a purchase has been made by a consumer and detects a corresponding charge applied to the consumer's account. In response, the financing system provides financing options for the purchase. In this embodiment, when the system detects a purchase has been made (via a POS system, web browser, or other gateway or processor), the system delivers a communication to the consumer via the point of sale, web browser, email, text message, or other avenue of communication, wherein the communication includes an offer to finance the transaction (e.g., through deferred payment, including a variety of potential deferred payment schedules such as monthly payments, payments over a preset number of installments at specified time intervals, wherein the payments are charged with or without interest). If the offer is declined, the system makes no financing action. In the event that a consumer accepts the financing offer, a full amount of the purchase is refunded to the consumer's account and a credit or deferred payment account is opened with the financing system for the consumer. The consumer is then billed according to terms of the financing agreement.

The systems and methods of the present invention provide for customer spend data to be automatically obtained directly from the electronic payment card networks or associations (e.g., VISA, MASTERCARD, AMERICAN EXPRESS, or DISCOVER); additionally or alternatively, data is acquired from issuers or processors of the electronic payment cards. Upon detection of the spend data, the financing system delivers a communication to a consumer based on device or contact information associated with the account number of the spend data. In one embodiment, if the account number (e.g., the credit card number, debit card number, device identification number, or other identifying information attached to the transaction) is not registered within the system, the system is operable to automatically enroll the account number with the system and create a consumer profile for the consumer account number. Based on contact information in a new consumer profile or in an existing consumer profile, the system transmits a financing offer. For example, the contact information in one embodiment includes at least one of an email address, a phone number, a device identification number, or a consumer profile identifier. The financing offer is operable to be transmitted via a text message, phone call, email, push notification, instant message, pop-up within a mobile application, notification through a POS system, or any other communication method that is operable to reach a consumer associated with a consumer profile. The financing system is operable to receive a response to the communication, for example a packet transmission via "accept" or "reject" buttons within a mobile application, a text message response, a push-tone over a phone call, or other form of communication. The financing offer further includes terms of the financing, including a message, an indication of an approved loan amount, an interest rate, a repayment plan, a minimum monthly payment, or any other terms required for financing the purchase. Additionally, the financing offer is operable to include multiple financing options. For example, the financing options in one embodiment include: monthly payments for 3 months at an annual interest rate (APR) of 20%, monthly payments for 6 months at an APR of 21%, or monthly payments for 12 months at an APR of 22%. Each option includes an indication of the calculated monthly payments, total interest, and total future amount to be paid. In one embodiment, financing offers further include at least one of a cash back offer, a discount offer, or any other offer, incentive, or reward operable to be paired with the transaction. In a further embodiment, a financing offer further includes one or more of a benefit, offer, incentive, reward, or discount in combination with one or more financing options (e.g., a fixed discount with payments at a 20% interest rate, four quarterly payments at 10% interest rate, or a 15% discount for two payments at 0% APR). Notably, time periods for repayment and payment plans are operable to be adjusted or calculated to meet any desired length of time by a merchant and/or a consumer. For example, in one embodiment, a merchant sets three different payment plans available to a consumer, including a 30-day delayed payment plan, an installment payment plan with the following terms—25% at the time of the purchase and three 25% installments two, four and six weeks later, and a monthly installment plan over a preset number of selected months. In another embodiment, installment plans are offered in quarterly, bi-annual, annual, and semi-annual options. In a further embodiment, the financing offer is operable to be governed by a set financing formula, wherein the system is operable to receive input from a consumer identifying a desired delayed payment time and/or a payment plan installment, and wherein the system operable to calculate an interest rate and/or an upfront cost based on the set financing formula and the consumer desired payment time and/or desired payment plan installment.

Accounts are identified by the platform, in one embodiment, by matching a payment method, a phone number, consumer account information, consumer profile information, a name, an address, a user name, a digital wallet address, or any other identifying information to stored user data and/or consumer accounts and/or consumer profiles.

In another embodiment, the platform provides a "Buy Now, Pay Later" financing option, wherein payment for a transaction is not charged or approved for a set time frame. The time frame is determined, for example, by a preset time interval offer from the merchant or by shipping, handling, or delivery progress or notification, or by terms and agreements for installment or financing payments. In one embodiment, the platform is in network connection with at least one shipping, handling, and/or delivery service, wherein credits, debits, withdraws, holds, offers, incentives, or rewards for an account are governed by rules associated with package purchasing and fulfilment. For example, the platform provides an offer to purchase an item using a connected payment account at a 10% discount when using a "Buy Now, Pay Later." Upon acceptance and purchase of the offer via an enrolled account, the platform is operable to credit the account for an amount of the purchase. Upon receiving an indication that the item has been fulfilled and delivered to a final destination or by reaching a preset time interval, the platform is operable to charge the account for 90% of the total transaction amount. Financing offers or other offers, incentives, and/or rewards are operable to include any variation of terms, amounts, time frames, values, or combinations known in the art of digital incentives or consumer finance. For example, the offer, incentive, or reward is one of: a cash back fixed amount, a cash back percentage of a transaction, a fixed rate financing offer, a variable rate financing offer, a delayed or no-interest financing offer (e.g., a 0% interest offer), a daily payment plan, a quarterly payment play, a yearly payment plan, a payment plan with an upfront cost, a payment plan with variable payment amounts, or installment payments.

The platform is operable to target financing and installment offers based on user purchase or spending history, location data, browsing activity, demographics, number of payment methods, enrolled payment accounts, enrolled loyalty systems, frequency of system interaction, frequency of payment method or loyalty system usage, qualifications identified by loyalty system or third parties, analytics based on platform usage, or any other method of identifying and targeting users for an offer, incentive, or reward known in the art of digital marketing and advertising. For example, the platform is operable to identify a user with a loyalty account to Merchant T and with a credit score of 650 or other internal credit criteria or model utilized by the platform, and based on this information provide an offer for financing a future purchase at Merchant T. In another embodiment, based on a received request from a Merchant W account, the platform is operable to facilitate and communicate a financing offer and a 10% cash back offer to users who are enrolled in the platform but are not enrolled in the Merchant W's loyalty system and/or who do not have a private label payment method.

Alternatively, a consumer is operable to initiate a transaction, register with the system, and set up financing with the financing system through a POS computer device, such as a tablet. For example, a consumer is operable to swipe a credit card at a POS tablet, and if the card number is registered with the system, the tablet presents a financing offer from the financing system, which the consumer can accept or decline. If the card number is not registered with the system, the tablet is operable to either enroll the card number within the system automatically or upon manual request from the tablet user. The system is further operable to offer via the tablet a financing offer prior to registration with the system.

Notably, the present invention provides for the initiation of financing through any merchant, even those not registered with the system, since the system is based on detecting a transaction history of a consumer and interfacing and financing with the consumer directly. In one embodiment, the system is operable to detect consumer spend data at non-enrolled merchants by interfacing with electronic payment card networks or associations (e.g., VISA, MASTERCARD, AMERICAN EXPRESS, or DISCOVER) and send a notification to the consumer with financing options.

Spend data is further not limited to POS interactions but additionally includes website-based transactions. In one embodiment, a merchant website includes a gateway that is in network communication with the financing system. Upon detecting an initiation of a transaction through the website, the system is operable to offer financing options to the consumer. If an account number provided to the website is enrolled with the system and associated with a consumer profile, the financing system is operable to send a notification to the consumer indicating financing options. If the account number is not enrolled with the system, the system is operable to automatically enroll the account number or enroll the account number based on manual input from a website consumer. In addition, the system is operable to provide financing offers prior to registration.

In one embodiment, the financing system does not include access to financial accounts directly but instead connects the consumer profile to at least one external entity, such as a bank or other financial institution, for handling the payments and financing. Alternatively, the financing system includes access to a system-controlled financial account and is operable to credit and charge a consumer-controlled financial account associated with at least one consumer profile. In one embodiment, the full amount of the purchase is credited to a bank account or credit account associated with the purchase, and payments are setup to automatically charge a required amount at an agreed upon interval. In another embodiment, a portion of the purchase amount is credited to the bank account or credit account, a bill or invoice is communicated to the consumer associated with the consumer profile at the agreed upon interval, and the consumer then manually pays the required amount.

The financing system further provides banks, other payment card issuers and/or third-party financing systems to provide direct methods for financing purchases. In one embodiment, a bank detects that a purchase has been made on a line of credit held by a client. The bank is able to send a financing offer through the Spring platform or directly to the device indicating an approved financing amount, terms, and conditions. Upon acceptance, a full amount of the purchase is refunded to the credit line, and a charge is applied from the Spring platform based on the financing terms of the offer (e.g., monthly payments at 20% APR). In a further embodiment, when a bank detects a charge through a debit card to a checking or savings account, the bank or the platform is operable to approve the account holder instantly, whereas when a credit card or credit line is used, the platform or bank determines a financing offer (or determines not to provide a financing offer) based on past credit history, a credit score, or other financial analytics corresponding to the financial account holder.

Some embodiments of the invention include financing offers that are generated and transmitted before a purchase is made. For example, in one embodiment, the financing system is operable to transmit a financing offer to a consumer of a consumer profile including a pre-approved loan amount and interest rate. The financing offer is also operable to be linked to a specific merchant, store, geographic location, or time period. In one embodiment, a consumer receives an offer through an application on a mobile device, wherein the offer indicates that the consumer is approved for a loan of $1,000 at an annual percentage rate (APR) of 0% when shopping at the store Crate & Barrel. In another embodiment, the offer indicates that the consumer is approved for a loan of $2,000 at an APR of 0% at stores within Woodfield Mall shopping mall.

FIG. 87 illustrates a diagram of one embodiment of the financing offer, wherein a consumer enrolled in the platform of the present invention makes a purchase with an enrolled payment card at an in-store merchant and an offer for financing is presented to a mobile device of the consumer. In this embodiment, the consumer already has a line of credit open with the system, which allows the consumer to accept the financing instantly.

FIG. 88 illustrates another diagram of one embodiment of the financing offer, wherein a consumer enrolled in the platform of the present invention makes a purchase with an enrolled credit card with an in-store merchant and an offer for financing is presented to a mobile device via email, text message, website, push notification, chat message, or any other method of delivering the financing offer to the mobile device, a website, or other medium of digital communication. In this embodiment, the consumer does not already have a line of credit open with the system, requiring the consumer to apply for financing before the system will provide a financing offer.

FIG. 89 illustrates another diagram of one embodiment of the financing offer, wherein the system is operable to offer the consumer a financing offer before making a purchase. In one embodiment, the financing offer is presented to the consumer based on determined in-store or online browsing and purchasing behavior.

The financing system is operable to calculate loans independently or communicate with third party systems in order to determine an approved loan amount and interest rate. For example, in one embodiment, the financing system is in network communication with a credit bureau system and is operable to request a credit report corresponding to an individual associated with a consumer account. Based on an obtained credit report, an identification of the amount currently loaned to the consumer by the system, and a payment history of the consumer through the system, the financing system is operable to calculate a risk score and determine whether to offer a loan to a consumer account, the amount of the loan, the interest rate of the loan, a payment plan for the loan, and any other financing terms. In another embodiment, loan history information about the consumer is transmitted to a third party system, and the third party system handles the calculation and formulation of loan terms. The third party then communicates the loan calculation and terms to the system, to another party financing the loan, or directly to the consumer.

Additionally, the system is operable to integrate with an external rewards, offers, or incentives program and facilitate redemption of offers, incentives, and rewards corresponding to enrolled merchants based on financial activity. In one embodiment, a consumer financial account is operable to be linked to a merchant for redemption of offers corresponding to rewards points that were accrued through use of a financial account and a card supplied by a bank. For example, the Spring platform or an issuing bank is operable to provide an inventive offer, wherein a consumer is provided an option for linking a credit card to an offer from Bed Bath & Beyond allowing redemption of 1000 rewards points for a 20 dollar reward that will then be applied to a transaction through the merchant in real time or near-real time via a subsequent execution of an account or statement credit. Notably, this occurs in a more streamlined manner than traditional rewards services through credit cards. Whereas in other systems, an offer (e.g., a 5% off reward for purchases at BestBuy) is redeemed by a user, a purchase is made, and a significant period of time later the reward amount is credited to the financial account (e.g., a 5 dollar credit from a 100 dollar purchase), the present invention provides for instant redemption of offers through the Spring platform, which detects in real-time a purchase made with an associated consumer account and automatically applies the redeemed offer, reward, or incentive to the consumer financial account. In a further embodiment, merchants are operable to provide offers, incentives, and rewards directly to the consumer account without redeeming an additional offer, reward, or incentive through the payment card issuer (e.g., through a rewards points program). In one example, Brookstone provides an offer to a consumer account through the Spring platform for a $30 discount on an in-store purchase. Upon acceptance of the offer by a consumer of an enrolled consumer account and detection of a qualifying purchase, the amount is automatically provided as a reward or "cash back" to the consumer account by the Spring platform, and an amount of rewards points are deducted from the rewards points balance of the enrolled consumer account based on the provided offer. In one embodiment, cash back and other financial rewards are provided in one embodiment by the Spring platform directly, wherein other rewards entities provide equivalent compensatory payment to the Spring platform. In an alternative embodiment, the Spring platform acts as an intermediary system between the consumer account and the merchant, bank, or other entity, wherein the Spring platform facilitates notifications, requests for payment, and settlement of payment between two parties. In one embodiment, the Spring platform interfaces with a merchant processor, payment network (e.g., a card association including VISA, DISCOVER, AMERICAN EXPRESS), or bank to indicate transaction, credit, debit, or withdraw amount for a specific account or consumer, wherein the merchant processor, payment network, and/or the bank handles execution of the transaction, credit, debit, or withdraw amount.

FIG. 90 illustrates one embodiment of the offers, rewards, and incentives redemption system, wherein a consumer is operable to link an offer to a consumer account based on rewards points accrued by the consumer and provided by a credit issuing bank. The system is operable to present a list of offers, rewards, and incentives available to a consumer account according to available points or relevant merchants according to consumer behavior analytics. Once a reward is linked to the account, a corresponding amount of "cash back" is redeemed on the purchase, and a corresponding amount of points deducted from the consumer accounts rewards points balance. For example, in one embodiment, credit card rewards points from a financial institution, such as AMERICAN EXPRESS, are operable to be redeemed through the platform and an offer, incentive, or reward applied to the platform user account directly. Upon detecting or determining a transaction is made, the platform is operable to automatically apply or credit an enrolled payment account based on the redeemed offer, incentive, or reward. In an alternative embodiment, a rewards points offer is generated and provided by a non-financial entity. In one example, an enrolled STARBUCKS merchant provides an offer to a consumer account allowing points accrued through purchases at STARBUCKS to be redeemed at an APPLE store. Upon detection of a transaction with the consumer account at a location with a redeemed offer, any cash back or other offers, incentives, or rewards are applied to the consumer account and/or the transaction directly.

FIG. 92 illustrates one embodiment of a financing offer, incentive, or reward for a specific merchant. In one embodiment, the platform provides a "Buy Now, Pay Later" promotion to a registered user, wherein the platform is operable to identify a user account meeting desired criteria (e.g., criteria based on spending habits, credit history, credit score, determined physical locations, web browsing activity, shopping patterns, determined demographics) and notify a user of an offer, incentive, or reward. The illustrated embodiment depicts a financing offer, wherein the platform is operable to open or apply a $1,000 line of credit for a specific user account, and wherein the platform is operable to reimburse a purchase on a payment card and/or provide payment through the system directly. For example, in one embodiment, the platform provides a financing offer for use at a specific merchant to at least one user account, and upon receiving notification of acceptance of the offer, the offer is attached or associated with the at least one account. Upon detection of transaction with a payment method associated with the at least one account at the specific merchant, the platform is operable to credit the account for the transaction amount and begin financing operations according to the preset conditions of the financing offer (e.g., the card is not charged any payment for 6 months and/or is charged installments with or without interest). Alternatively, the platform is operable to directly handle purchases, wherein a digital, virtual, or physical payment method is directly linked to the consumer account of the platform, and wherein purchases, offers, incentives, and/or rewards are redeemed and charged via with the digital, virtual, or physical payment method. Additional attachment payment methods are operable to be charged for any financing or purchasing operations. For example, a user account includes a credit of $5 for a first merchant. Payment at the merchant with a platform-based digital card automatically redeems the $5 credit, and any amount in a transaction that is greater than the $5 is passed along to a second payment method (e.g., a credit card, debit card, or digital wallet) also associated with the user account.

FIG. 93 illustrates another embodiment of a "Buy Now, Pay Later" system, wherein upon redemption of the financing offer, a notification is sent to a user account via email, text message, chat message, postal mail, phone call, or any other alert mechanism including a confirmation of the financing offer redemption as well as terms for the financing offer. In one embodiment, the financing offer is presented to a user before making a purchase. For example, the financing offer is targeted based on consumer profile information, such as browsing history, purchase history, physical location history, demographics, etc., wherein the user account is preapproved based on these profile characteristics. In another embodiment, the financing offer is presented to a user upon detection of a purchase at a merchant. For example, in one embodiment, the platform determines a transaction has been made at Merchant T for $500 with a payment method associated with a user account. Upon determining that the user account qualifies for a financing offer, the platform communicates the financing offer to the user account. Upon receiving an acceptance of the financing offer, the platform credits that payment method according to the terms of the financing offer (e.g., a credit of the full amount of the transaction, a credit of 25% of the transaction, a credit of a specific monetary value ($10), or any other financing agreement known in the art). Notably, the financing offer is further operable to be any offer, incentive, or reward known in the art of digital marketing.

FIGS. 94 and 95 illustrates one embodiment of a customized financing offer through the platform according to one embodiment of the present invention. For example, in the illustrated embodiment, after detecting or determining that a transaction has been made, the platform is operable to send a notification to at least one user offering financing options. In one embodiment, payments are operable to be based on any offers dictated by the merchant, the platform, or other managing account. For example, a "Get it first. Pay Later." embodiment provides two options from the platform, including an option for delaying payment until 14 days after a confirmed delivery of an item and an option for delaying payment for multiple months with an added fee or surcharge. In an installment embodiment, the platform provides a fixed rate for monthly payments to finance the purchase, wherein the platform is further operable to calculate and charge interest based on the payments and the purchase amount. Upon selection of either of any of the financing options presented, the platform is operable to reimburse a payment method according to the financing agreement terms selected. For example, if an upfront payment is required that is 25% of a purchase, the platform is operable to credit the payment method for 75% of the purchase and charge the payment method for further payments according to the financing offer selected. Notably, the platform is operable to perform these operations for both physical, in-store transactions as well as digital or online transactions.

Preferably, the platform is operable to offer a method of paying via the platform instead of paying via a traditional payment method. For example, in one embodiment, the platform is operable to identify an authorization transaction and/or identify a payment method of at least one user, and following the identification, the platform is operable to prompt a user (via a POS terminal, tablet, mobile device, website, pop-up etc.) to pay with funds, rewards, cash back, points, or other equivalent balances and incentives attached to the at least one account. If the platform receives an acceptance of this prompt, the corresponding offer, incentive, reward, funds, cash, points, or other balance is adjusted and/or redeemed, and any corresponding amount of the transaction is reduced and/or processed through the platform directly. In another embodiment, the platform intercepts a transaction, wherein a purchase is not passed through the payment method directly, but instead the transaction is transferred to the platform, and a user account is charged through the platform either immediately or according to any offer, incentive, reward, financing offer, or installment offer.

Figure 96:
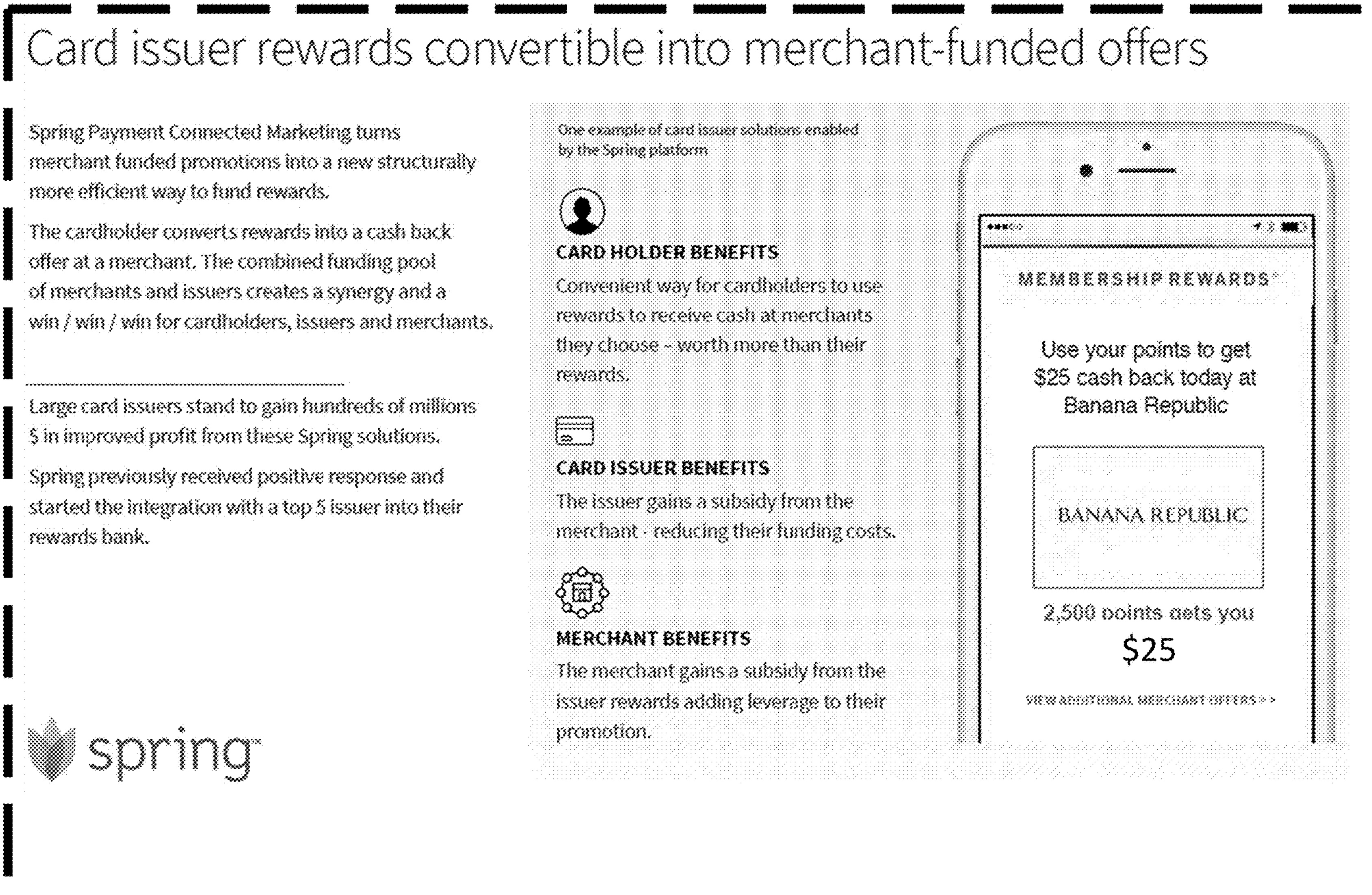
FIG. 96 illustrates one embodiment of a cash back rewards program according to one embodiment of the present invention.

FIG. 96 illustrates one embodiment of a cash back rewards program, wherein the platform is operable to offer redemption of points, currency, cash, cash-value credit, and/or other rewards managed by the platform, external loyalty systems, third party rewards systems, merchant-specific programs, and/or other offers, incentives, and rewards programs. The platform is operable to make this offer available to consumers by communicating, activating, and/or redeeming the offer based on a targeted marketing campaign and/or following a determined purchase (e.g., directly converting a redeemed rewards currency or points into a cash value credit for the transaction and/or applying the redeemed rewards currency or points after a transaction has processed).

FIG. 97 illustrates a loyalty program for a specific merchant, wherein rewards are offered based on spend activity; for example, after $250 of spend activity, a $10 credit is associated with the user account, applied to a transaction, redeemed, activated, or otherwise enabled. In another example, credits, rewards, points, or other offers, incentives, or rewards are applied based on a percent of a purchase or spend amount; for example, rewards and/or points are earned at a rate of 5% for every $1 spent. A key aspect of platform includes, in one embodiment, tracking spend activity across all payment methods on a user account for one or more loyalty or rewards programs, including private label credit card (PLCC) payment methods, and non-PLCC payment methods. Additionally, the loyalty program is operable to more broadly engage the user and, for example integrate with user feedback, survey, and analytics tools, wherein spend activity and/or activity within the platform (e.g., reward redemption) is captured, analyzed, and/or triggers, for example, a user survey to be communicated to the user account (e.g., via email, text message, chat message, postal mail, phone call, or push notification). The platform is operable to manage and communicate rewards progress for each merchant individually and as a whole, and the platform is operable to manage and trigger surveys or other communication via email, text or SMS, native application on mobile devices or to a web site. In one embodiment, the feedback and ratings are received via a mobile application or website via a GUI with selectors, sliders, buttons, or any other element known in the art of user experience design, as illustrated in FIG. 97.

FIG. 98 illustrates one embodiment of a co-brand, dual-brand, or private label payment method registration system. In one embodiment, the platform is operable to detect and/or determine a purchase using at least one registered payment method for a user account and, upon determining availability of a branded (co-brand, dual-brand, private label, etc.) payment method (e.g., a private label credit card for the merchant), the platform is operable to generate a notification and system for registration for the branded payment method. The platform is operable to offer with the notification and registration system at least one offer, incentive, or reward that is tied to or separate from rewards of the branded payment method. For example, in one embodiment, the platform notifies the user of a financing offer enabled by transferring the purchase to a private label credit card. Upon detection that the private label credit card is not associated with the targeted user account, the platform is operable to offer an application and/or registration mechanism for obtaining the private label credit card, wherein the platform and/or the registration method is operable to capture, receive, and/or transmit user personal information necessary for determining approval for the credit card and/or for registration. Once the private label credit card has been added to the user account and/or the user account has been approved, the financing offer is presented to the user account. The financing offer is alternatively any offer, incentive, or reward known in the art. In one embodiment, the registration method and/or any offers, incentives, or rewards captures information and registers a user account for a loyalty system in addition to or instead of a branded payment method.

Connected Payment Accounts

Notably, the platform of the present invention is operable, in one embodiment, to enroll one or more payment accounts (e.g., an account number such as a credit card or debit card number) with the platform and associate the one or more payment accounts with a user account and/or a user profile. The platform is further operable to debit, credit, hold funds, verify transactions, and track and analyze payment activity across each of the connected payment accounts. In one embodiment, the platform is operable to credit a first payment account for the amount of a recent transaction and charge a second account for a corresponding amount, wherein the corresponding amount is, for example, a full amount of the transaction, 25% of the transaction, 50% of the transaction, the amount of a first payment in a financed offer, the amount of a down payment on a financed offer, or a fee corresponding to a financed offer. For example, in one embodiment, a user makes a purchase at Merchant T using a first enrolled credit card. The platform generates and communicates an incentive offer of 5% off for using Credit Card T, a Private Label Credit Card (PLCC) tied to Merchant T. If the user has an enrolled Credit Card T and the offer is accepted, the platform credits an amount of the full transaction to the first enrolled credit card, and an amount equal to 95% percent of the transaction amount is charged to Credit Card T. If the user does not have an enrolled Credit Card T, the platform is operable to provide a system for applying or registering for the card. Notably, the incentive offer is operable to be any offer, incentive, reward, or financing terms, as disclosed herein; the transactions are operable to occur via one or more financial transaction and settlement institutions (e.g., a gateway, processing network, bank, or clearing house); and the platform is operable to apply, debit, withdraw, or communicate one or more flat or rate-based fees during each of these transactions.

Notably, PLCC embodiments of the present invention, dual card embodiments (e.g., PLCC with purchases not locked to a particular merchant or a PLCC with offers, incentives, and rewards specific to a merchant), and/or co-branded embodiments (e.g., PLCC with purchases locked to one or more merchants or a PLCC with offers, incentives, or rewards specific to two or more merchants) are advantageous over traditional payment systems, wherein lines of credit and payment accounts are digitally managed by multiple different entities and/or have no interoperability for managing purchase financing, offers, incentives, or rewards. Particularly, the platform of the present invention provides, in one embodiment, a way to seamlessly transfer payments between financial accounts seamlessly and in real time or near-real time as well as facilitate digital offers, incentives, rewards, and purchase financing.

In another embodiment, the platform provides a multi-tender loyalty system by managing points, offers, incentives, and rewards transfers between connected payment accounts and loyalty accounts. For example, a user account with either or both of an enrolled or non-enrolled PLCC credit card and/or an enrolled non-PLCC credit card is able to earn rewards offered under the PLCC credit card program even when paying with the non-PLCC credit card. In one embodiment, the payment methods provide offers, rewards, or incentives at different rates. For example, a purchase at Merchant T with a Merchant T PLCC credit card awards $5 of rewards currency value to the user account, whereas a purchase at Merchant T with a non-PLCC credit card awards $1 of rewards currency value to the user account. In another embodiment, the platform is further operable to manage and credit a loyalty system (e.g., a rewards currency based system, a points-based system, a cash-back system) based on purchases from either or both PLCC accounts and non-PLCC accounts, wherein transactions through merchant-locked payment methods and non-merchant locked payment methods are converted or translated into loyalty program offers, incentives, and/or rewards. For example, upon detecting, processing, or receiving a purchase from either a Merchant T PLCC and/or a non-PLCC credit card, the platform is operable to adjust an amount of loyalty points from a Merchant T loyalty account. Notably, the offers, incentives, and rewards further include financing and installment offers; payment accounts include debit accounts, credit accounts, digital payment methods, virtual currency, cryptocurrency, loyalty points, or other accounts operable to manage purchase or redemption transactions; and the multi-tender system is not constricted to only a single merchant. For example, in one embodiment, purchases at Merchant W with a PLCC or dual card for Merchant T earn offers, incentives, and rewards for Merchant T and Merchant W. Further, the platform is operable to offer a $10 reward for a Merchant W loyalty account for using a financing option on a purchase at Merchant T using a Merchant T PLCC.

Payments, statement credits, instant credits, instant debits, batch credits, batch debits, deposits, withdraws, holds, and other financial operations of the present invention are, in one embodiment, performed via any financial processing system, such as via the Automated Clearing House (ACH) network (payment rails), wire transfer, Same Day ACH, real time or near-real time payment (RTP) systems (e.g., VISA DIRECT, INSTAPAY, THE CLEARING HOUSE RTP), including Peer-to-Peer (P2P) solutions such as PAYPAL, PAYPAL INSTANT TRANSFER, VENMO, and ZELLE. In another embodiment, the processes occur in conjunction with or entirely over a blockchain payment network, such as BITCOIN, ETHERIUM, or LITECOIN. In one embodiment, the blockchain payments or blockchain transactions occur in real time or near-real time. In another embodiment, the platform generates or manages payments and transactions via virtual wallets, virtual payment accounts, virtual currency, digital currency, or any other method of managing financial transactions via a network.

Description of the Figures.

Referring now to the drawings in general, the illustrations are for the purpose of describing a preferred embodiment of the invention and are not intended to limit the invention thereto.

FIG. 1 illustrates an exemplary virtualized computing system for embodiments of the present invention loyalty and rewards platform. FIG. 1 is a schematic diagram of an embodiment of the invention illustrating a computer system, generally described as 800, operating within a communications network 810 and a plurality of computing devices 820, 830, 840. In one embodiment of the invention, the computer system supporting the platform of the present invention 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital devices 820, 840 and mobile devices 830, such as a server, blade server, mainframe, mobile phone, a personal digital assistant (PDA), a smart phone, a desktop computer, a netbook computer, a tablet computer, a workstation, a laptop, and other similar computing devices; distributed mobile communication devices, in particular wireless network mobile computer communication devices including but not limited to smartphone devices and tablet computers are preferred at the time of the present invention for use by consumer users as described herein for interfacing with the platform. The components shown here in FIG. 1, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 1, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage device 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800. A database is preferably included in the system and connected with at least one server computer of the system described, wherein the database stores consumer users' spend data, including product and/or services for each purchase made with registered electronic payment accounts, information about which are also stored on the database.

It is also contemplated that the computer system 800 may not include all of the components shown in FIG. 1, may include other components that are not explicitly shown in FIG. 1, or may utilize an architecture completely different than that shown in FIG. 1. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The present invention provides for advertising network and "spring-loaded" ad units. These flow even if the user is not signed up, with or without the card on file. They may flow if a user is signed up, whether online and cookied electronically, and in signed-in state or not. This provides a mechanism for gaining new members, financed by the promoting merchant's funding of the incentive and payment for the media.

The present invention provides for all capabilities that online advertising networks have, plus additional payment capabilities, including but not limited to targeting, advertisement serving, etc. Prizes and games may also be included.

Location data is created in the present invention using one or more hardware and/or software components. By way of example and not limitation, location data is created using satellite-based positioning systems (e.g., Global Positioning System (GPS), Differential GPS (DGPS), or Galileo), low energy Bluetooth based systems such as beacons, wireless networks such as WiFi, Radio Frequency (RF) including RF Identification (RFID), Near Field Communication (NFC), magnetic positioning, cellular triangulation, and/or combinations of these technologies. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Figure 2:
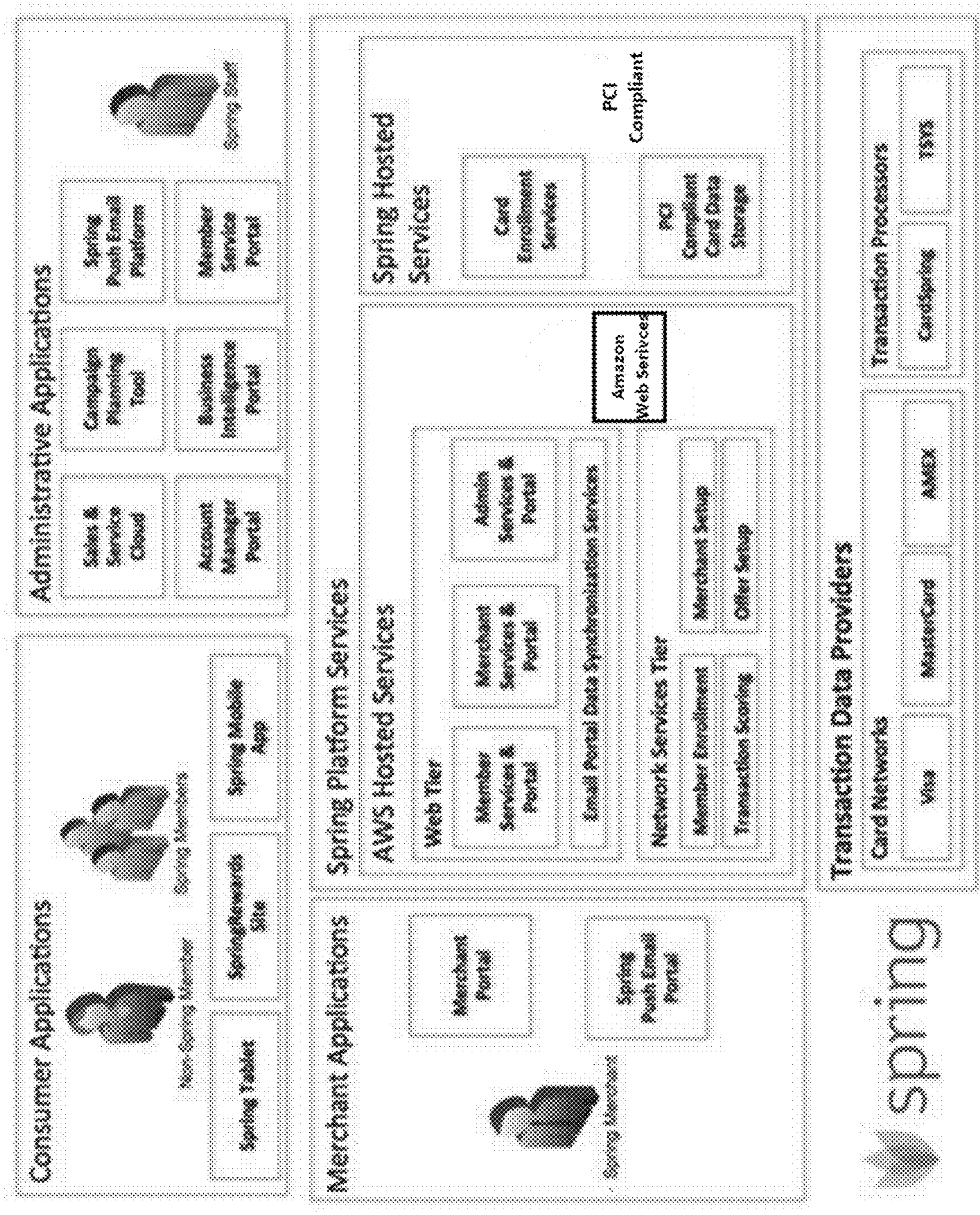
FIG. 2 illustrates a schematic diagram of one embodiment of the invention.

FIG. 2 illustrates a schematic diagram of components of the invention illustrating the consumer applications, merchant applications, administrative applications, platform, hosted services, a web tier, card enrollment services, network services tier including member enrollment, transaction scoring, merchant setup and offer setup modules, portal data synchronization services, consumer users, merchant users or members, transaction data providers and transaction processors. FIG. 2 illustrates one embodiment of the present invention for illustrative purposes only; it is an example implementation of the present invention system, methods, and platform and is provided for illustration purposes and is not intended to exclusively limit the claimed invention. The following description corresponds to the FIG. 2 schematic diagram.

Spring Consumer Applications are responsible for enrolling new members and engaging with them. The Spring Tablet is a fast and simple to use Member enrollment application. Tablets are native iOS apps written in Objective-C, typically installed on iPad Mini 2's. The Tablet uses ID Tech Uni-Mag 2 card readers and advanced DUKPT (Dynamic Unique Key per Transaction) encryption algorithms that guarantee secure communication with Spring's Card Enrollment Services. Encrypted card data is transferred to endpoints in the Spring Data Center and decrypted by a Key Appliance from StrongAuth. The card reader preferably uses an audio jack of the tablet or a lightning cable adapter to connect to the tablet. Upon payment information being received at the tablet via a card reader, an EMV reader, manual entry of payment information, or any other payment method referenced above or known in the art, encrypted payment information is added to a queue and sent over a network to a platform database on a remote server computer. The queue solves for issues where the tablet or the platform database does not have internet connectivity.

The tablet is preferably configured to accept customer enrollments remotely into different merchant reward programs and to capture different data about the consumer and/or information about merchant staff who promote sign-ups via the tablet. In another embodiment, the tablet is configured to request additional data associated with enrollment and membership including but not limited to a mobile phone number, account password, date of birth, and/or merchant specific questions (favorite brand, team, etc) that can be used for personalizing future marketing messages. In yet another embodiment, the tablet is configured to enable a staff code to be transmitted to the platform database to incentivize merchant staff members to enroll consumers in the Rewards program. A shift mode for the tablet is used in one embodiment to cause all enrollments for the remainder of the shift to use the staff code. Alternatively, the tablet prompts the merchant staff member to enter the staff code after each customer enrollment. Preferably enrollment data includes identifying customer information such as email address, credit card, merchant location where the enrollment occurs, tablet device identifiers, and staff identifiers.

Tablet computers capture and transmit Member emails, card tokens and merchant enrollment data to the Spring Platform. The SpringRewards.com web site (aka Member Portal) allows consumers to sign-up for Spring, enroll their credit or debit cards, join Merchant Rewards Programs, Claim Cash Back Offers and Gifts, Purchase Advance Sale Offers, Invite Friends, View Offer Reward, and Transaction Status, and Modify their profile. The responsively designed web site is hosted in the cloud (e.g., at web hosting service AWS) and built in Backbone.js, Bootstrap, HTML, CSS and object-oriented programming languages (e.g., RUBY, JAVASCRIPT). SpringRewards.com is supported by a RESTful set of web services written in an object-oriented language (e.g., RUBY). Event driven member SMS and email messages are delivered through cloud communication platforms, including TWILIO and AMAZON SIMPLE EMAIL SERVICES (SES).

Spring Mobile Apps include Native ANDROID and IPHONE Mobile Apps for Members. These Apps provide push notifications, geo-location based searching and geo-targeted offering capabilities. These native apps are built using APACHE CORDOVA, HTML, CSS and object-oriented programming languages (e.g., JAVASCRIPT). Spring Administrative Applications enable Spring staff to manage the Spring Platform and Operations.

Spring has customized Sales & Services Clouds and integrated them with the Spring Platform. As Merchants and/or Offers are closed through the sales process they can be added to SpringRewards.com with a push of a button via custom integrations built in APEX code.

Spring Members may open Service Cases or use Live Chat directly from SpringRewards.com, which places these into the platform's Service Cloud.

Campaign Planning Tool: the system supporting Spring Marketing generates predetermined and/or custom offer sets for each Spring Member for use in various campaigns using a rule based relevancy engine. The custom offer sets are determined by scoring all available offers using a custom rule engine that looks at Geographic Data, and Consumer Behavior, Recency and Frequency data to rank each offer. Offer sets can then be published to Spring's Push Email Platform via the Campaign Planning Tool. The Campaign Planning Tools are built in an object-oriented programming language (e.g., RUBY) and run in the cloud (e.g., AMAZON WEB SERVICES (AWS) cloud services).

The platform (Spring) Push Email Portal allows the platform (Spring) to deliver mass promotional mailings to Spring and Merchant email lists using the MyEmma platform. The Spring Platform integrates with MyEmma in real time via an API that provides membership data for targeting and segmentation. Opt-in and opt-out data is also synchronized in real time. Campaign response data is also synchronized with Spring's Merchant and Account Manager Portals.

Data Synchronization Services are built in to be integrated with the system and methods of the present invention and platform as described hereinabove.

The Account Manager Portal allows Spring Staff to lookup Spring Merchants and review key Membership, Program and Campaign business Metrics.

The application may be hosted in the cloud at AWS and built in Backbone.js, HTML, CSS and object-oriented programming languages (e.g., RUBY, JAVASCRIPT).

The Business Intelligence Portal application provides Spring Staff with pull and push reporting of key operational and business metrics. The Spring Business Intelligence Portal is built on the Logi Analytics platform.

The Member Services Portal allows Spring staff to troubleshoot customer issues and perform basic customer service functions. The application is hosted in the cloud at AWS and built in Backbone.js, HTML, CSS and object-oriented programming languages (e.g., RUBY, JAVASCRIPT).

Merchant Applications include a Merchant Portal, which allows Spring Merchants to review key Membership, Rewards Program and Campaign business Metrics.

The application is hosted in the cloud at AWS and built in Backbone.js, HTML, CSS and object-oriented programming languages (e.g., RUBY, JAVASCRIPT).

Spring Push Email Portal. The Spring platform supports Merchants who wish to deliver their own Newsletter or Communication mailings using the MyEmma platform. The Spring Platform integrates with MyEmma in real time via an API which provide membership data for targeting and segmentation. Opt-in and opt-out data is also synchronized in real time. Campaign response data is also synchronized with Spring's Merchant and Account Manager Portals.

Spring Platform Services include a Web Tier wherein all Consumer, Merchant and Administrative applications are supported by a variety of web services hosted in the Cloud, preferably at a webhosting service, such as AMAZON WEB SERVICES, and is preferably built in an object-oriented language (e.g., RUBY). The Web Tier is also hosted on one or more server computers in one embodiment. The Web Tier provides data and services to power platform websites, Wi-Fi Captive portals, tablet kiosks, mobile apps, third party partner sites, and other enterprise sites. The Web Tier also handles consumer communication via emails and texts (SMS, MMS, etc.). Preferably, the emails and/or texts are automated. The Web Tier is preferably in communication with at least one remote consumer device, a WiFi portal provider, ISP, a third party partner site, and any other enterprise sites.

Network Services Tier includes the platform website, SpringRewards.com, and the Web Tier is integrated with a back end set of services collectively referred to as the Network Services tier. The Network Services tier is preferably on one or more remote server computers or is hosted on the cloud. The Network Services tier provides integration of the Spring Platform with external transaction providers and financial services parties having card and account data, such as card networks VISA, MASTERCARD, AMERICAN EXPRESS, CARDSPRING, and TSYS. These services enroll Members and Cards with the external partners, and are responsible for receiving and scoring any type of transaction which is processed through the external partners, including card swipe, EMV, NFC, RFID, account entry, mobile payments via apps, or any other type of transactions involving cards. The services receive notifications from these partners once a transaction has occurred. One embodiment of receiving and scoring a transaction processed through the external partners includes the merchant POS or online portal sending an authorization request to the external partner, the external partner authorizing the transaction, the merchant POS or online portal sending a transaction file to the external partner with enrollment data or rewards, incentive, or offer redemption data, and the external partner sending the enrollment data or rewards, incentive, or offer redemption data and/or transaction data to the Network Services tier of the platform for processing according to the rules of the platform, including enrollment the account in the platform and/or verifying the enrollment data with the external partners. The Network Services tier is preferably built in JAVA, using the Vert.x application framework. The Network Services tier handles communication with data partners, including but not limited to, merchants, financial service providers, and a WiFi portal provider or ISP, and is responsible for card enrollment and processing transaction notifications from data partners, enforcing redemption rules, and issuing statement credit instructions.

Data is distributed and synchronized across the tiers via messaging, preferably real-time or near real-time messaging.

Partner transaction notification files are preferably sent once a day and contain information for all settled transactions received at the partner for that business day. The files are preferably transmitted via SFTP to a partner specified SFTP server setup during the on-boarding process. The files are preferably tab delimited or tab-separated. The files preferably include a merchant ID, a consumer ID, a card token, a transaction time, a transaction amount, and a transaction ID.

Spring Data Center: Card Enrollment Services are a special class of Network Services and are hosted in the Spring Data Center for PCI Compliance. Card Data is kept encrypted from point to point and stored in a security key appliance from StrongAuth. Card Data Services communicate with transaction providers during the enrollment and un-enrollment processes.

Card Data Services communicate with transaction providers during the enrollment and un-enrollment processes.

Figure 3:
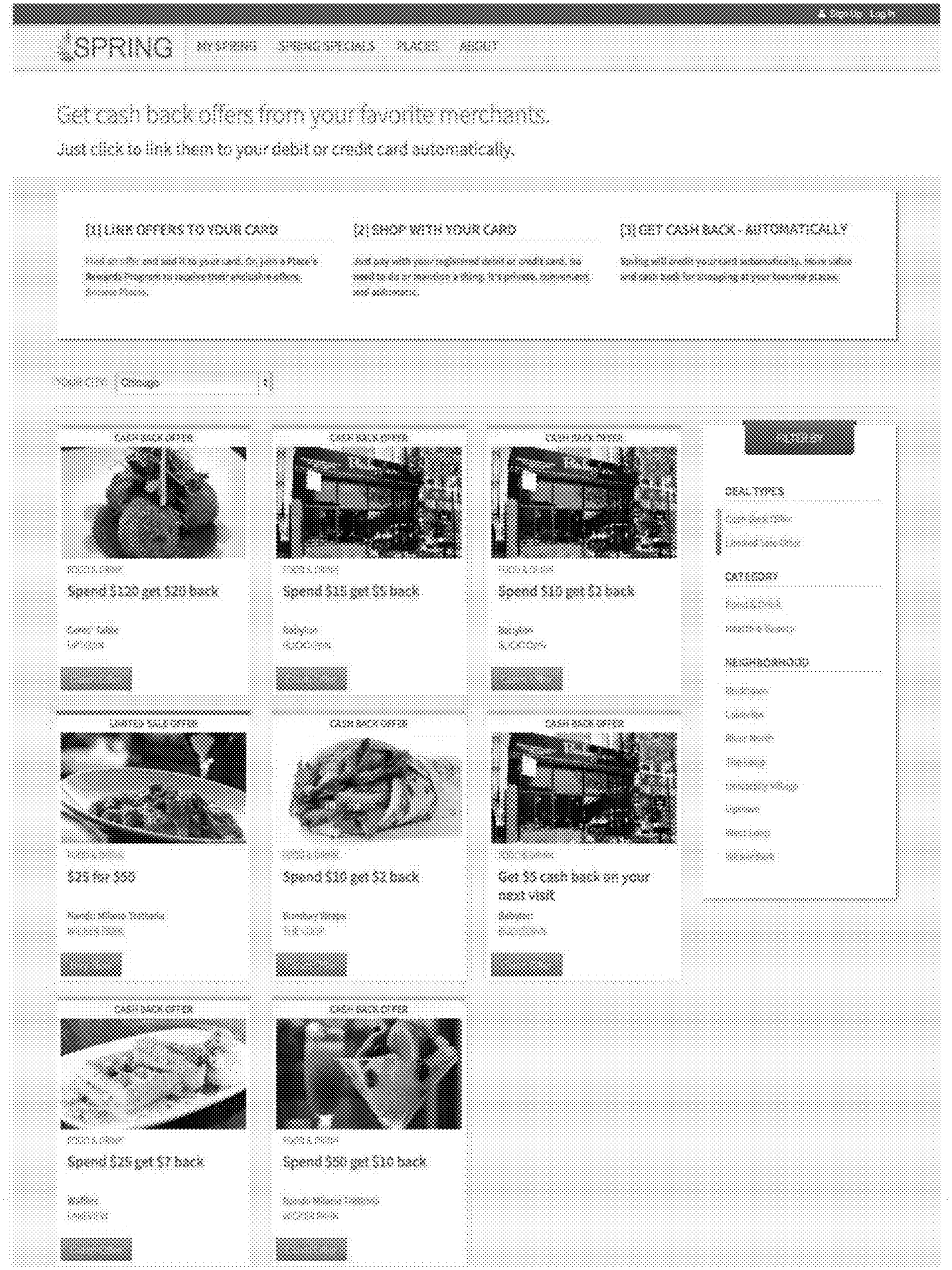
FIG. 3 illustrates a graphical user interface (GUI) of an embodiment of the invention.
Figure 4:
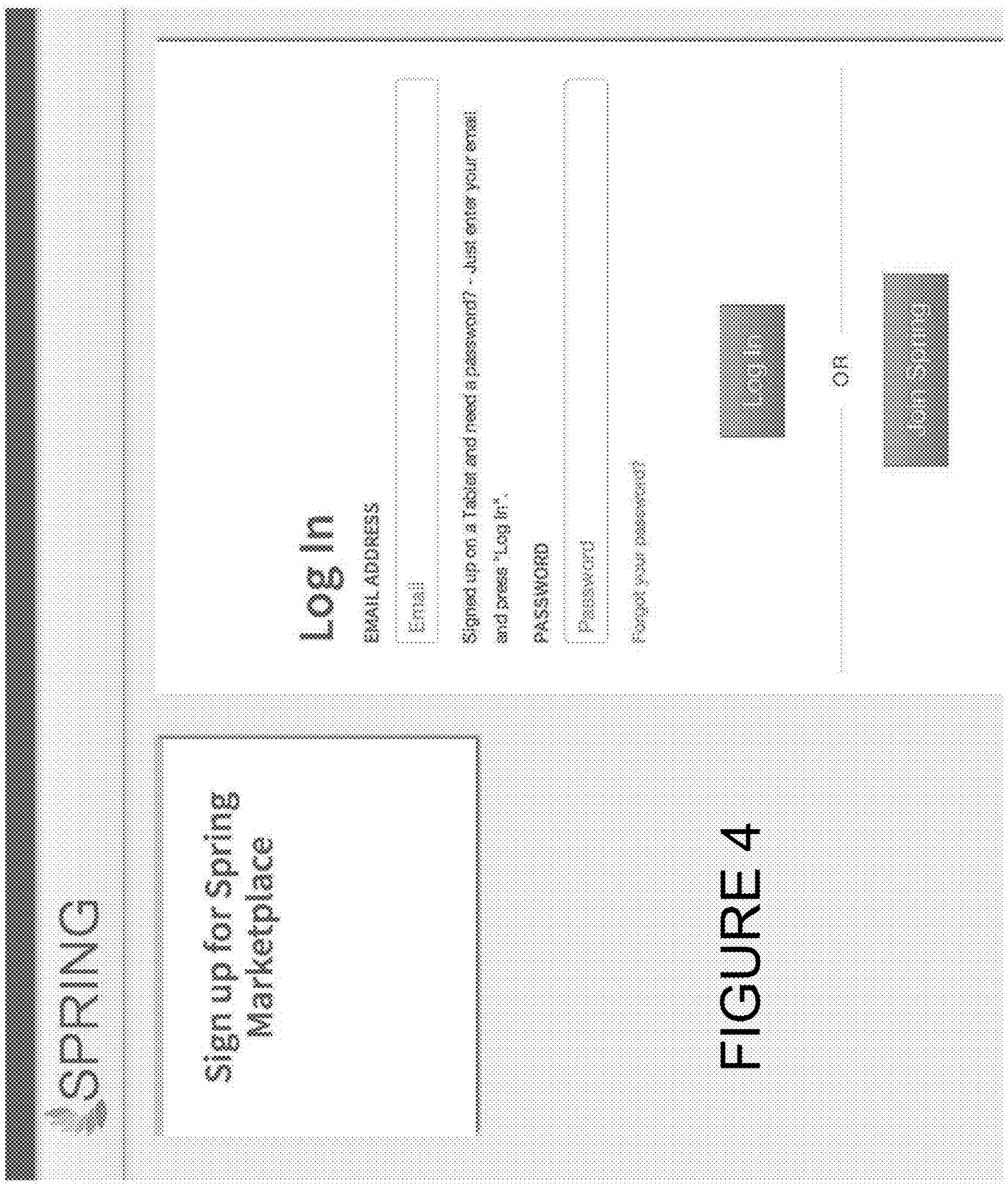
FIG. 4 illustrates another GUI of an embodiment of the invention.
Figure 5:
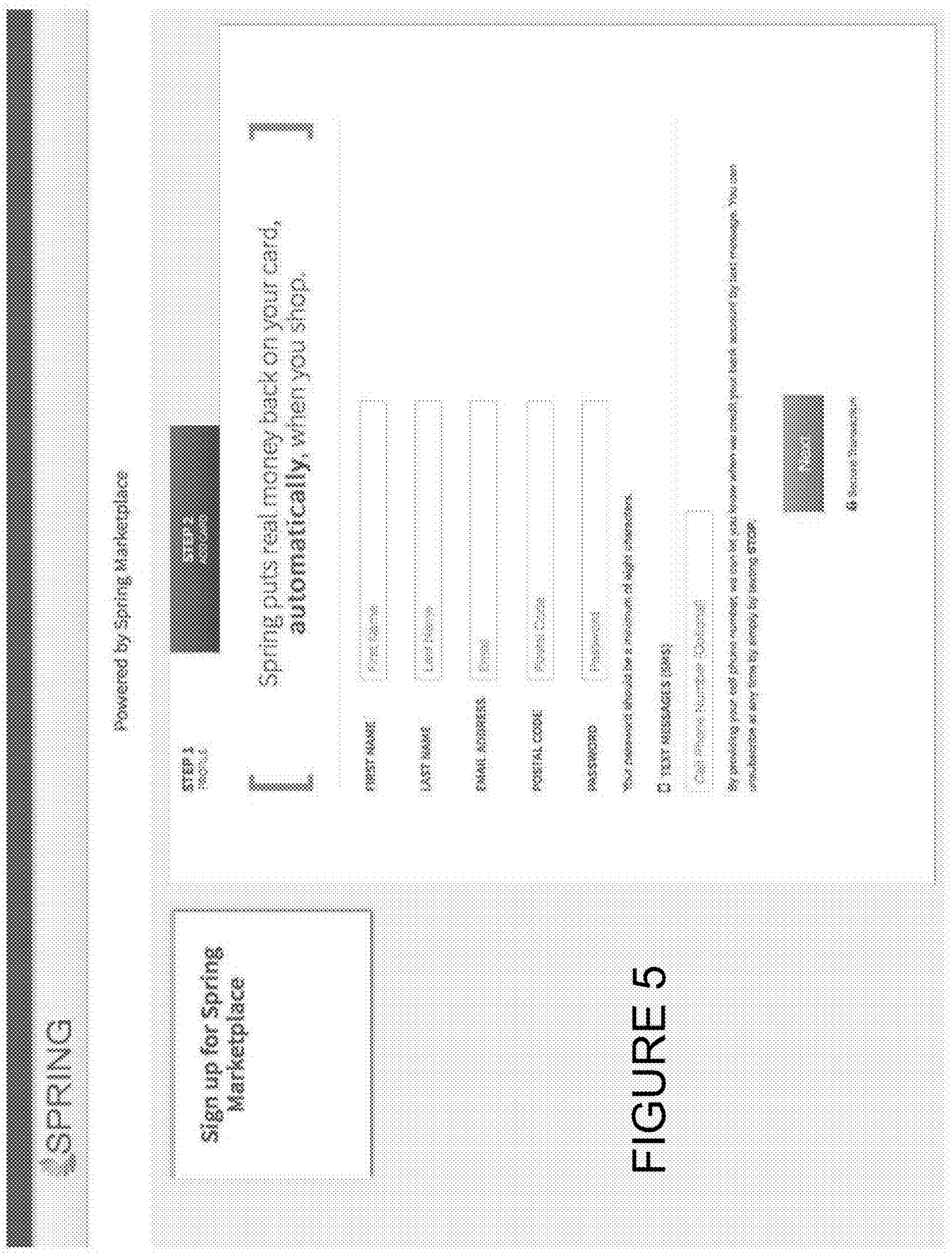
FIG. 5 illustrates another GUI of an embodiment of the invention.
Figure 6:
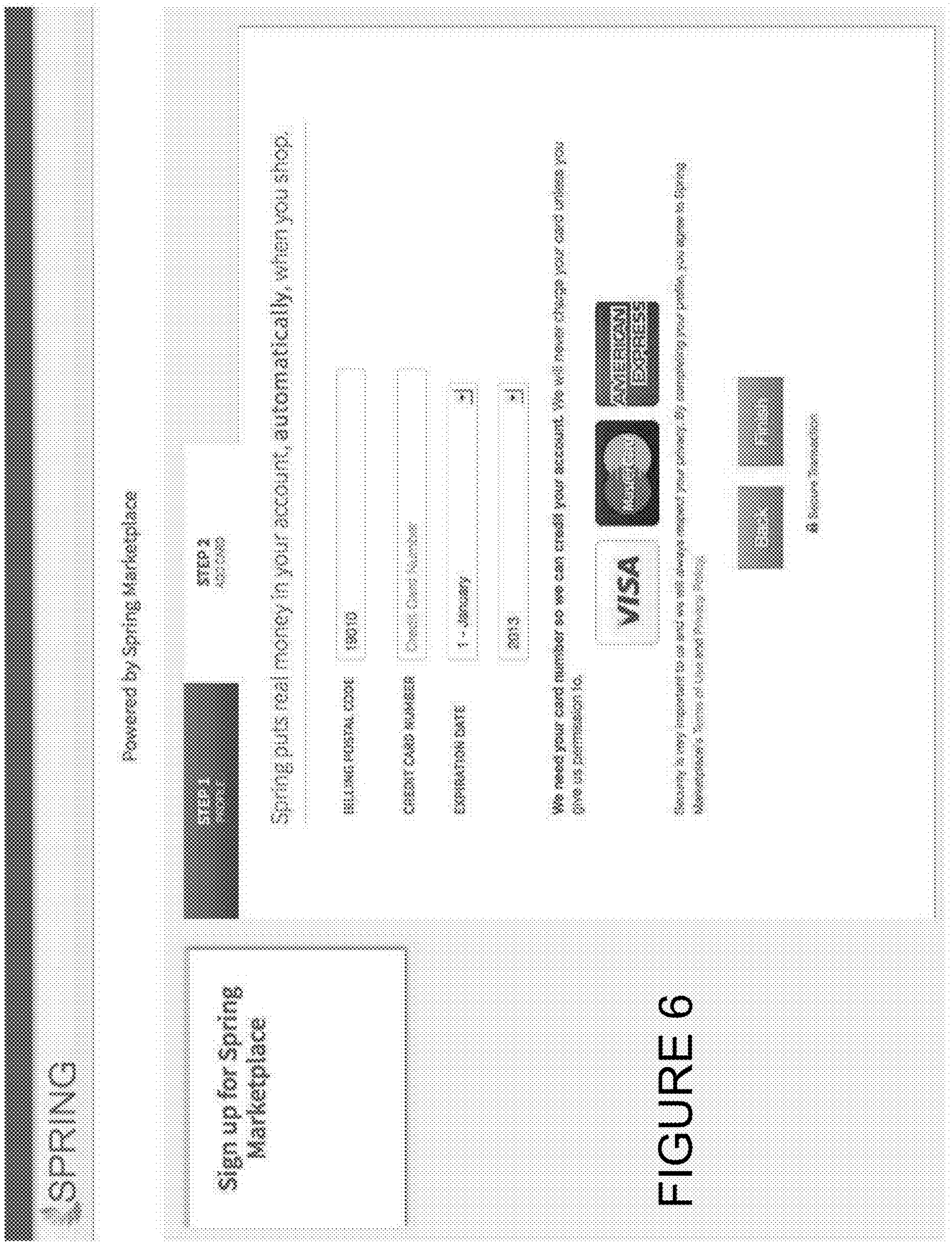
FIG. 6 illustrates another GUI of an embodiment of the invention.
Figure 7:
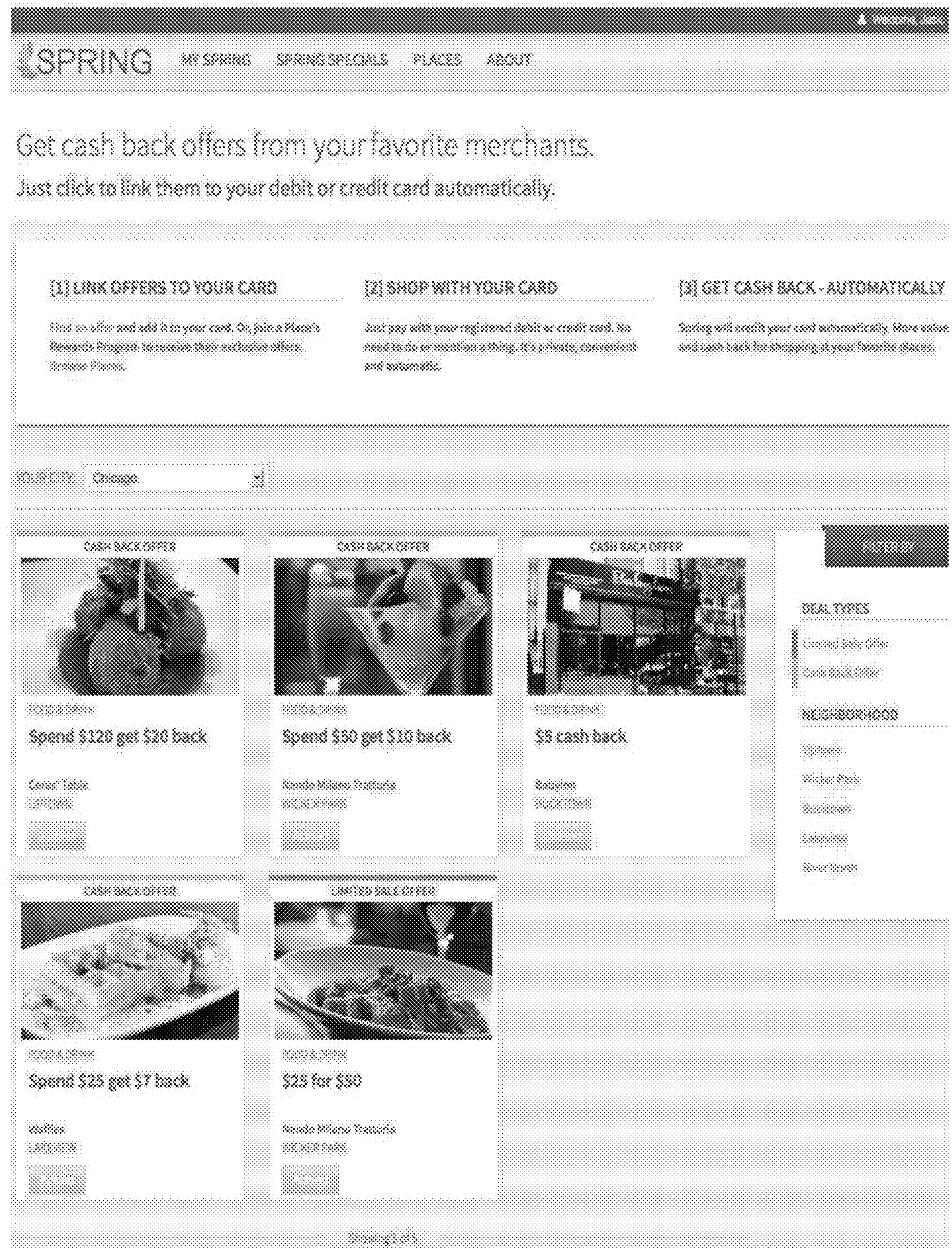
FIG. 7 illustrates another GUI of an embodiment of the invention.
Figure 8:
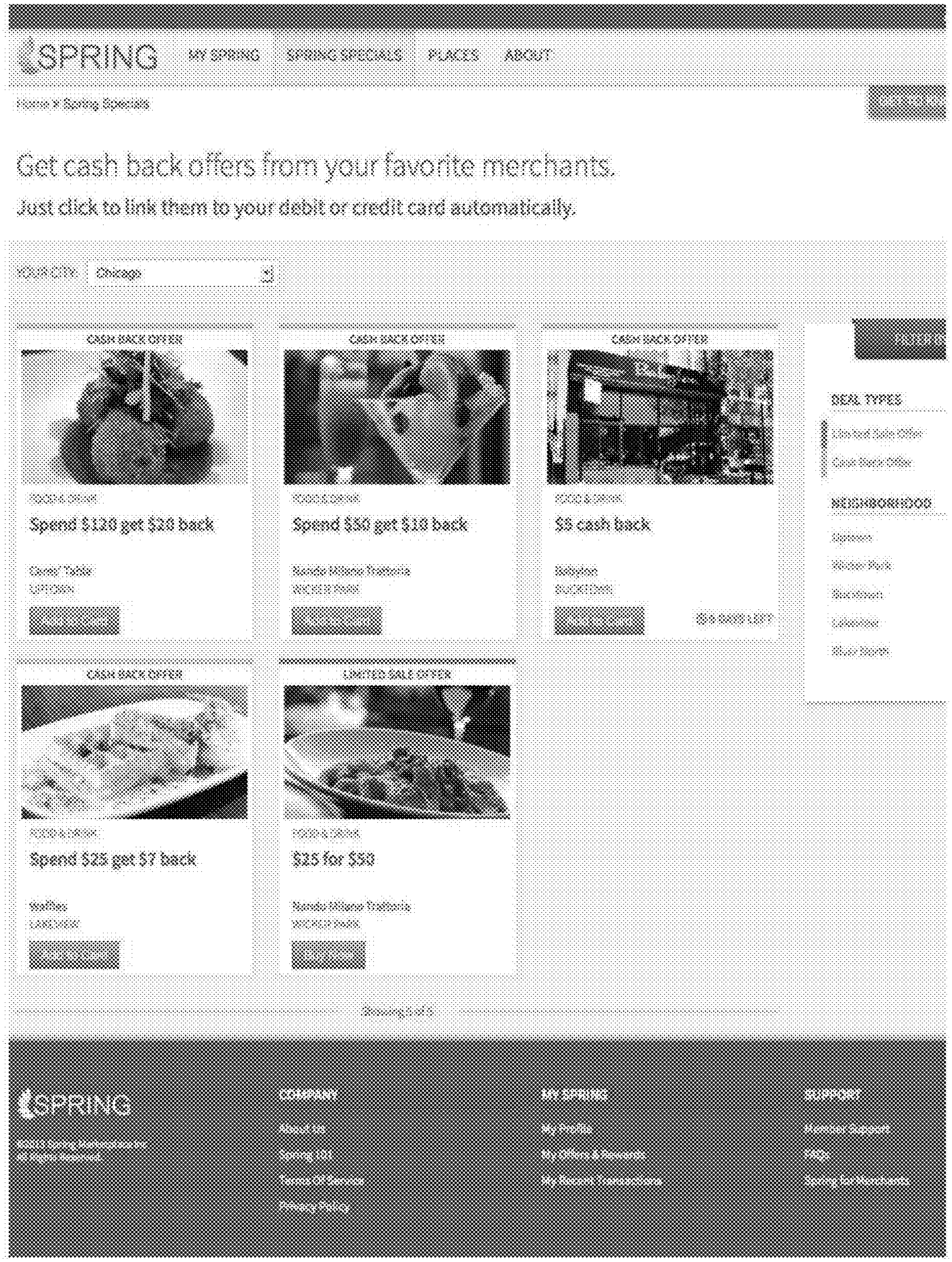
FIG. 8 illustrates another GUI of an embodiment of the invention.
Figure 9:
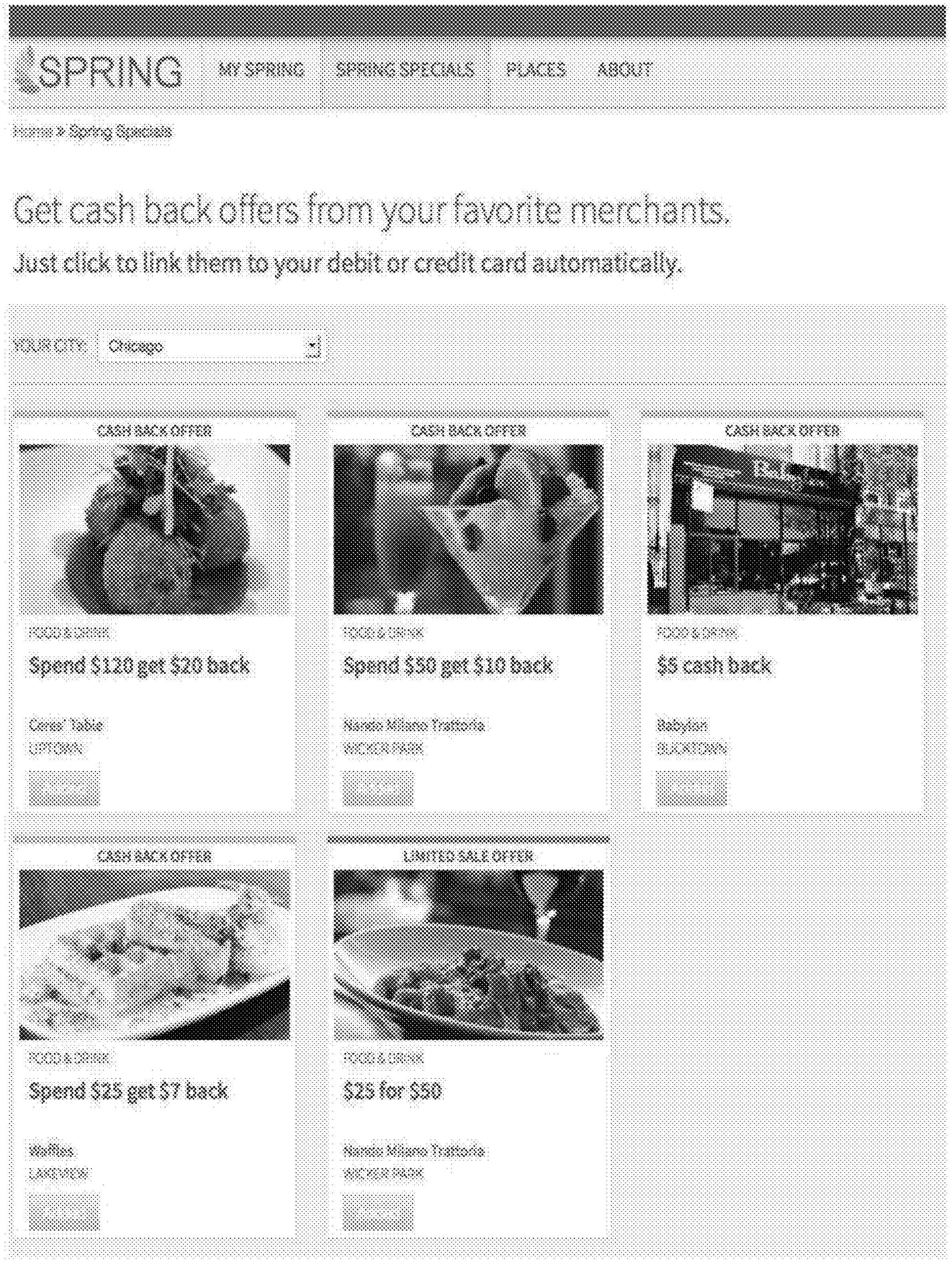
FIG. 9 illustrates another GUI of an embodiment of the invention.
Figure 10:
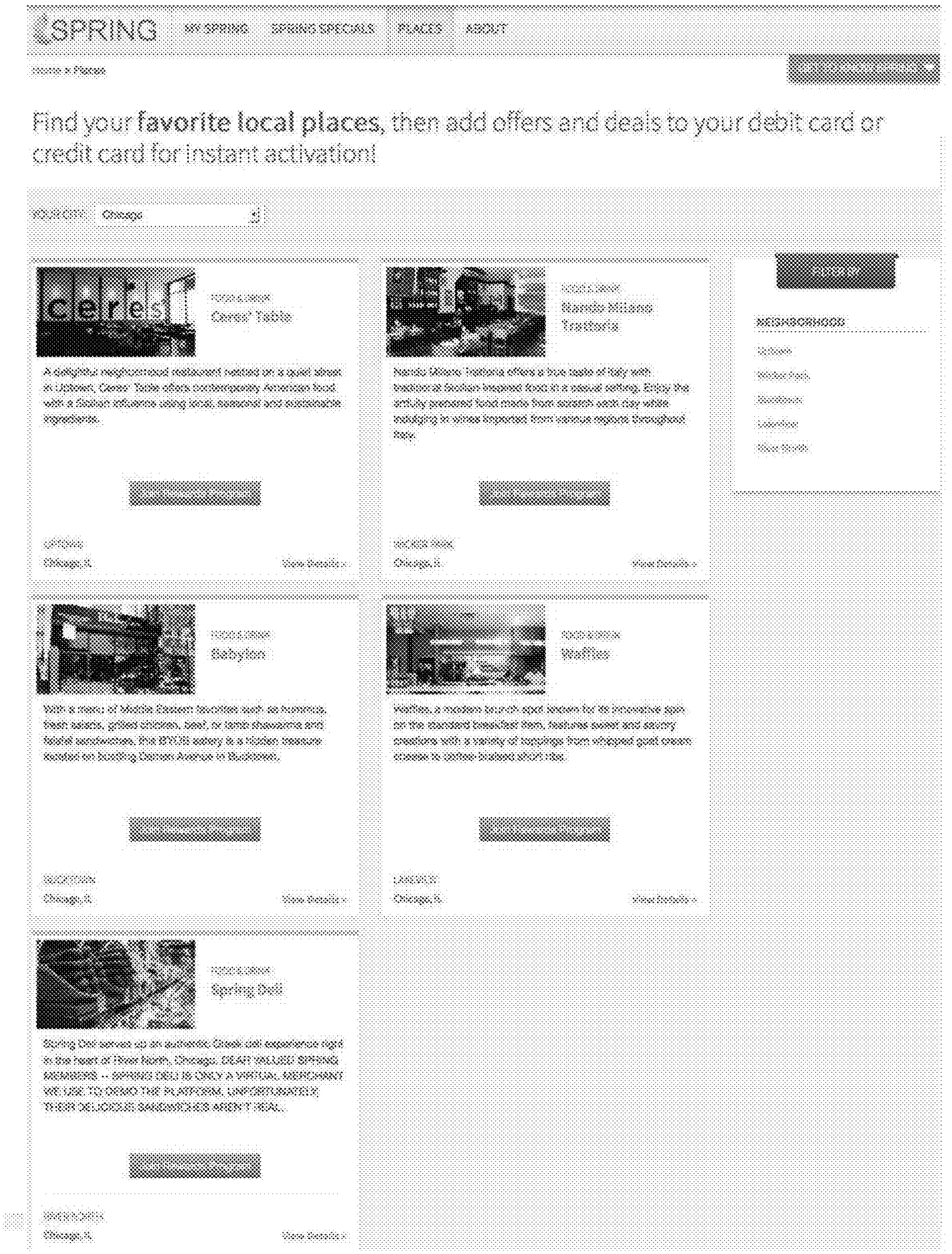
FIG. 10 illustrates another GUI of an embodiment of the invention.
Figure 11:
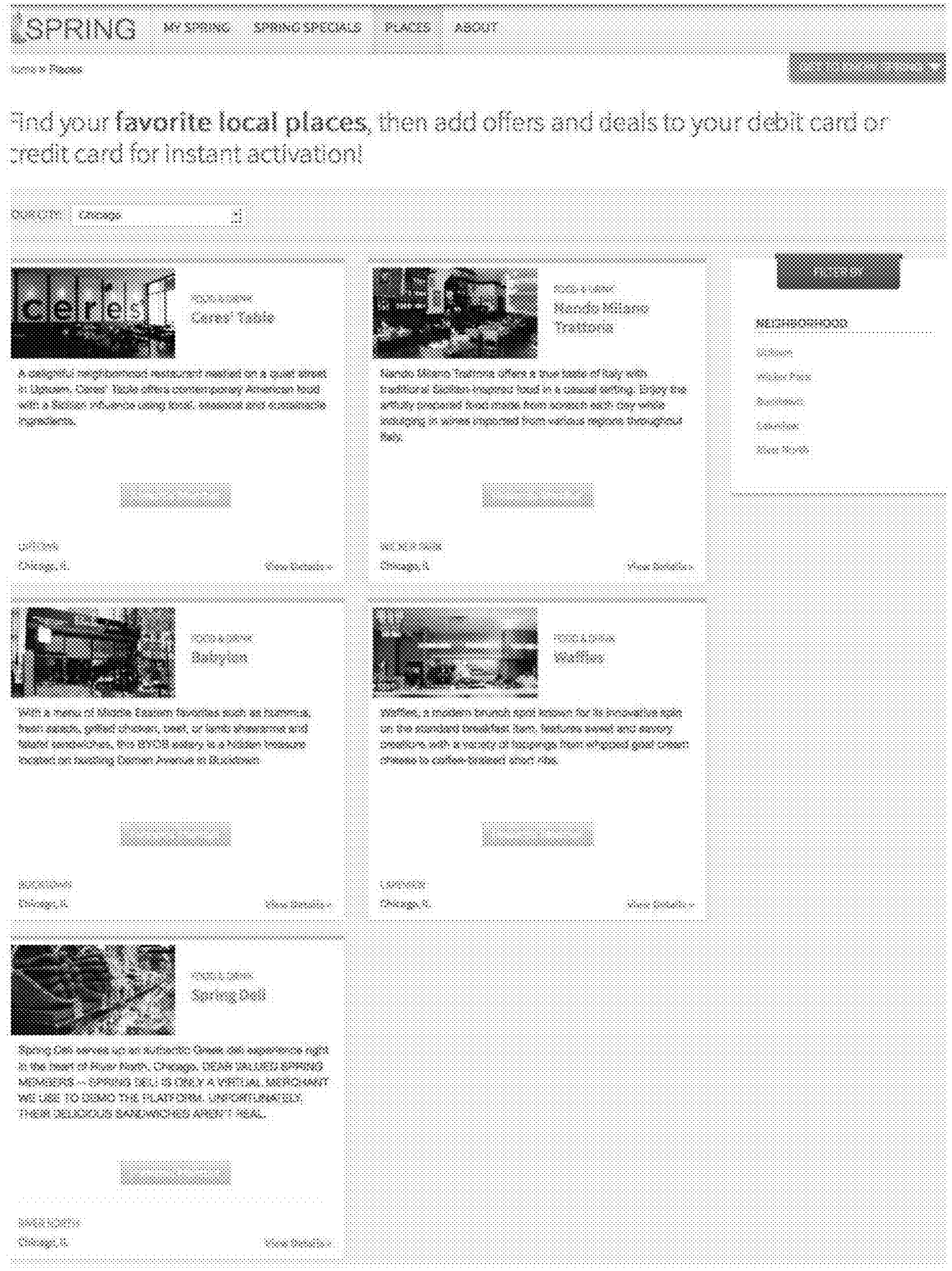
FIG. 11 illustrates another GUI of an embodiment of the invention.
Figure 12:
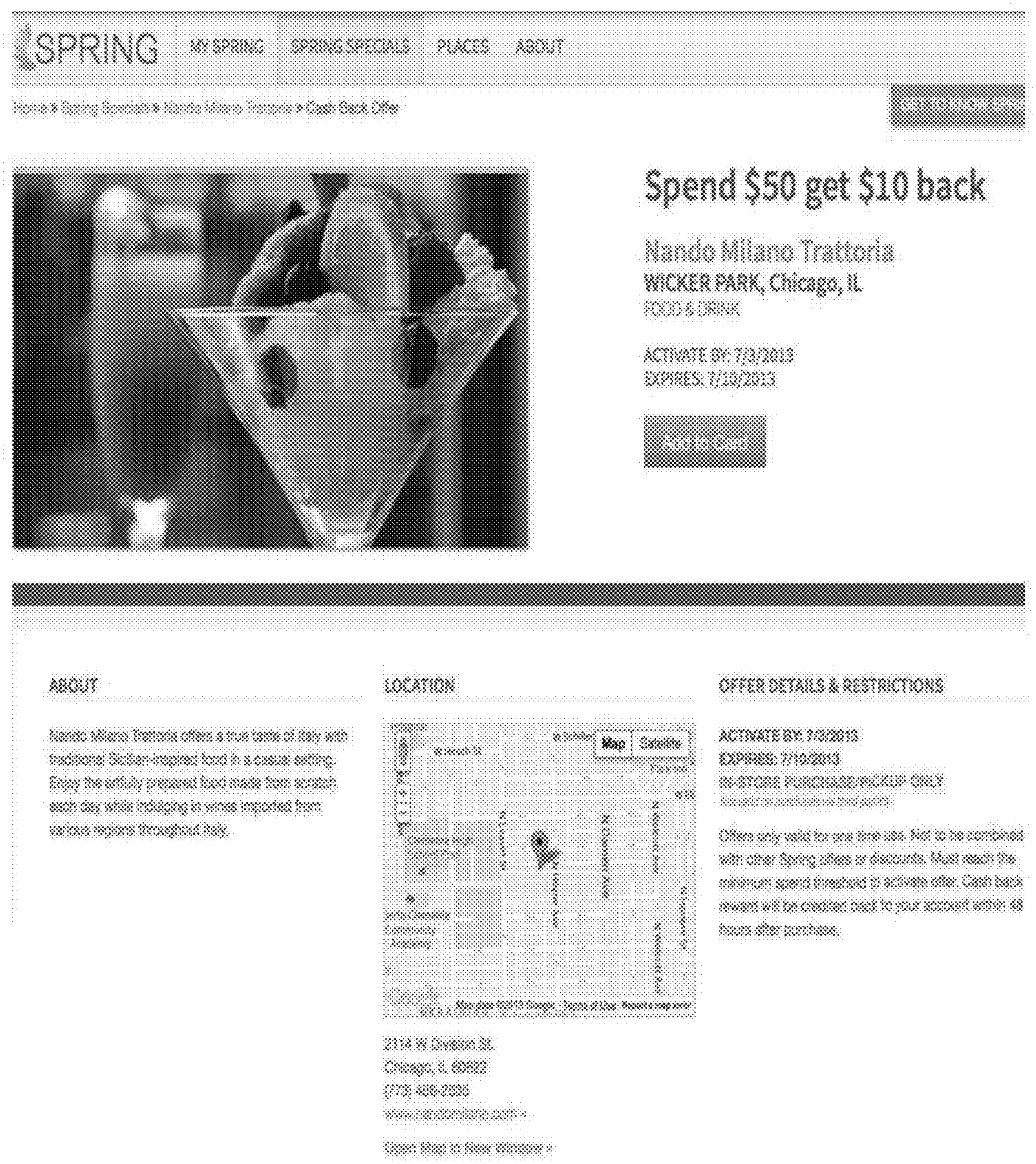
FIG. 12 illustrates another GUI of an embodiment of the invention.
Figure 13:
FIG. 13 illustrates another GUI of an embodiment of the invention.
Figure 14:
FIG. 14 illustrates another GUI of an embodiment of the invention.
Figure 15:
FIG. 15 illustrates another GUI of an embodiment of the invention.
Figure 16:
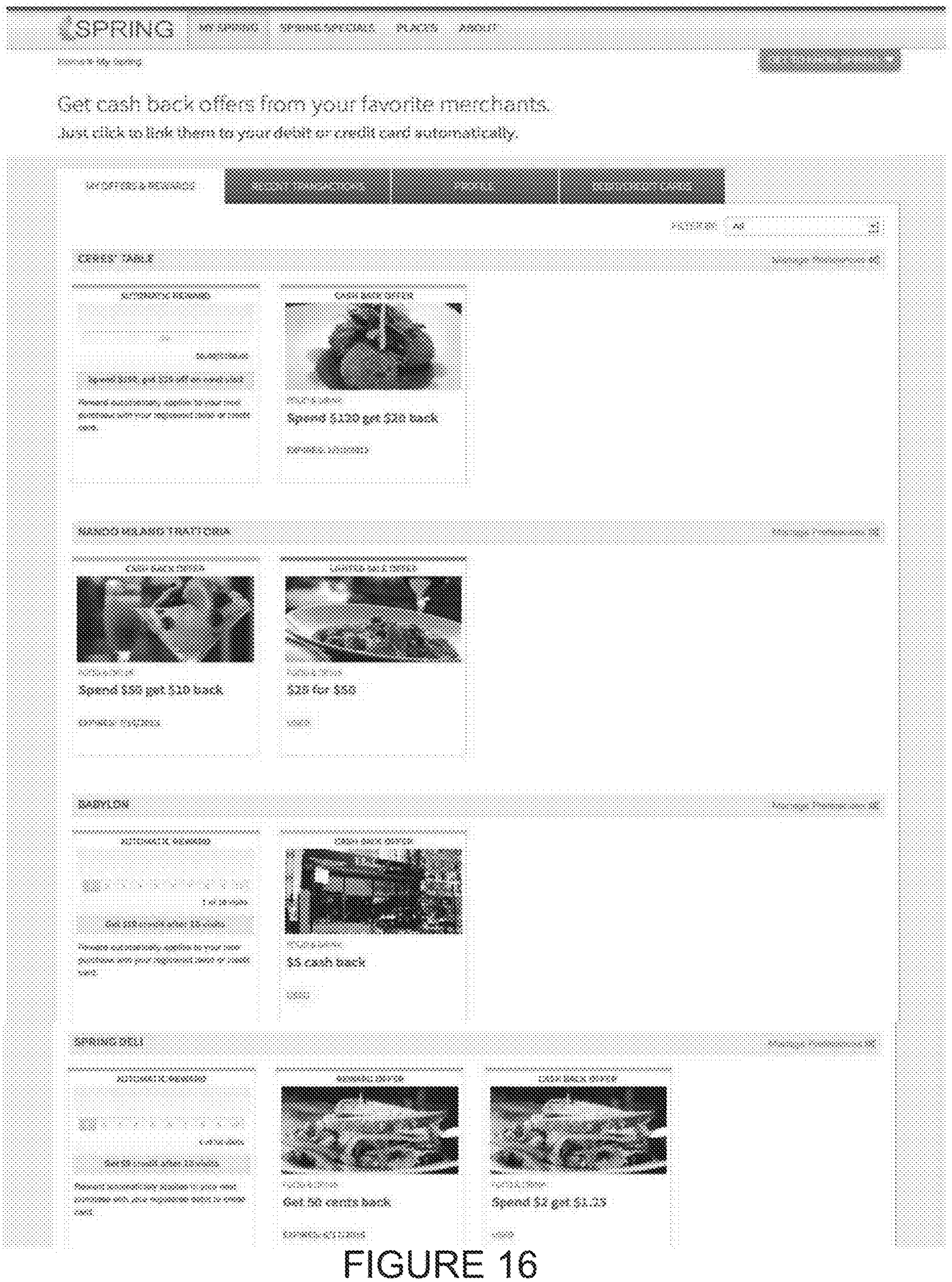
FIG. 16 illustrates another GUI of an embodiment of the invention.
Figure 17:
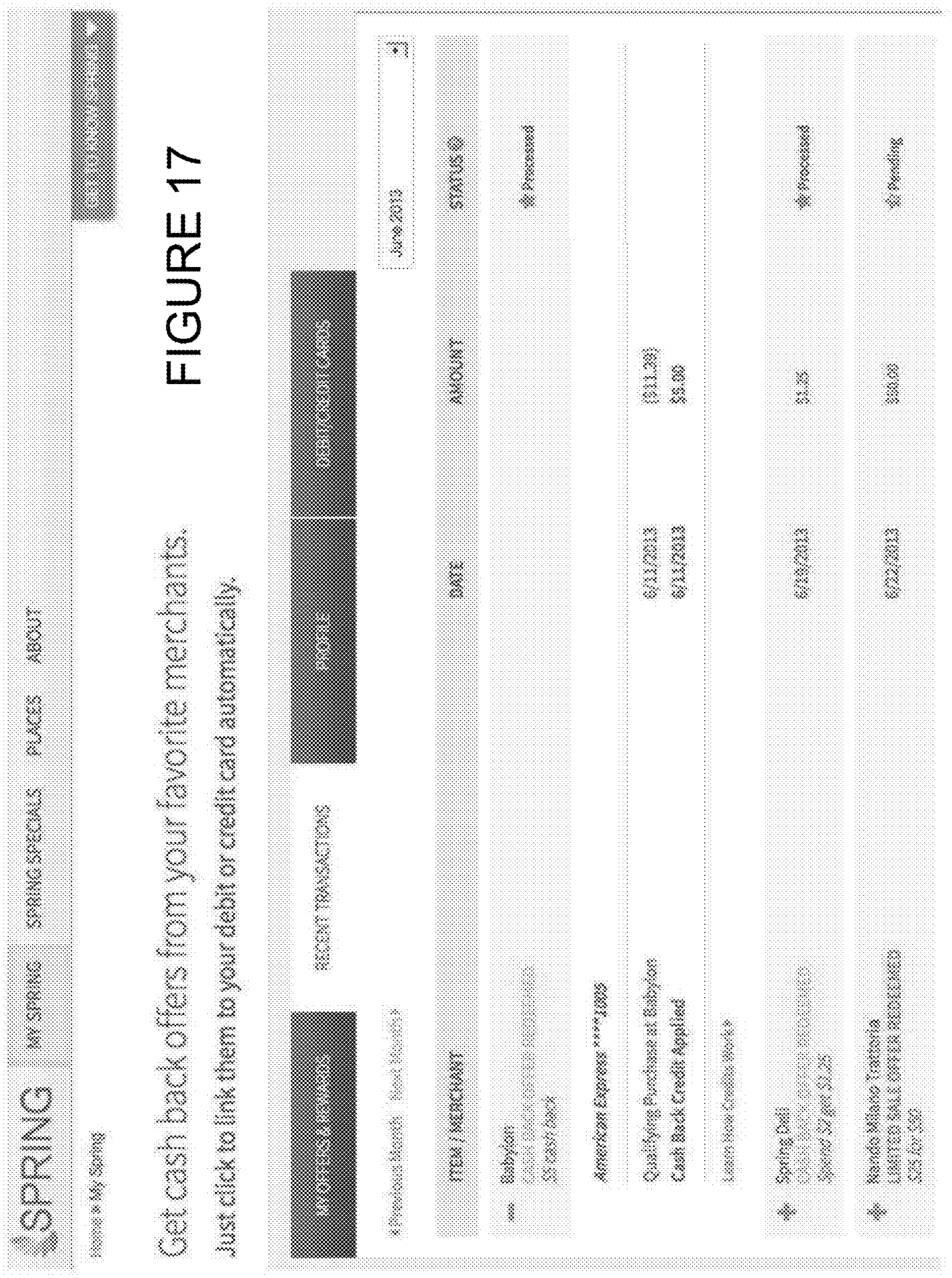
FIG. 17 illustrates another GUI of an embodiment of the invention.
Figure 18:
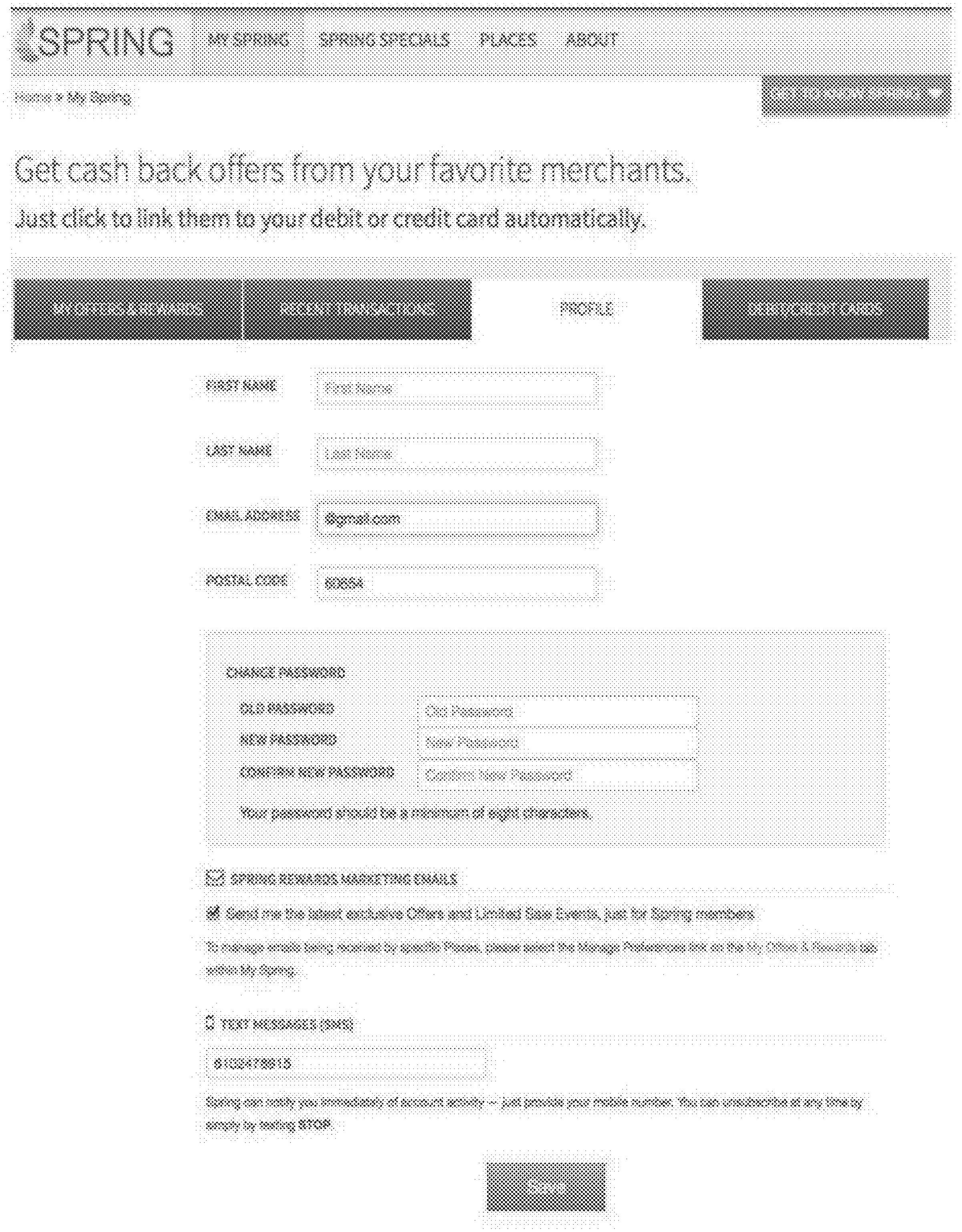
FIG. 18 illustrates another GUI of an embodiment of the invention.
Figure 19:
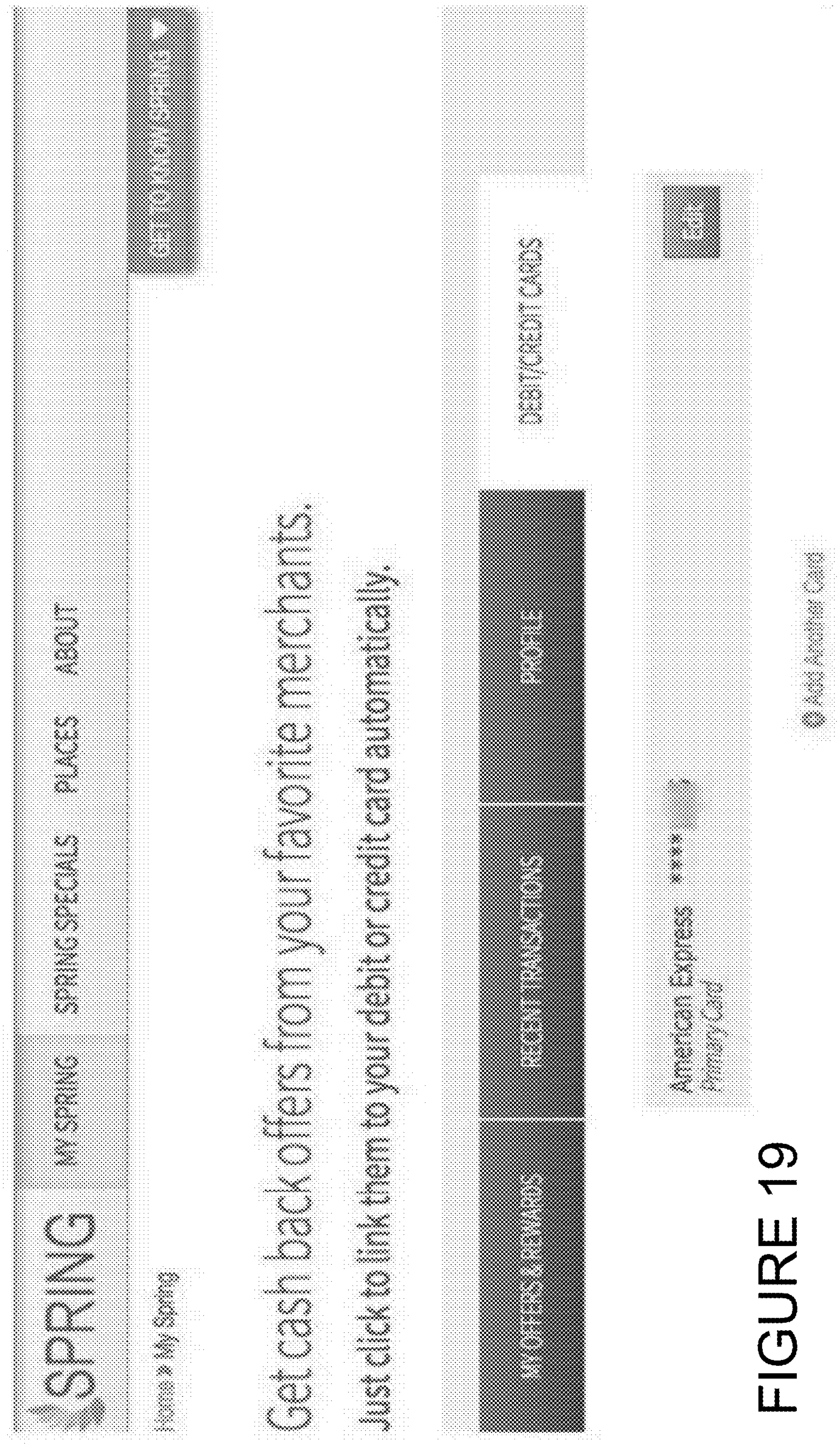
FIG. 19 illustrates another GUI of an embodiment of the invention.
Figure 20A:
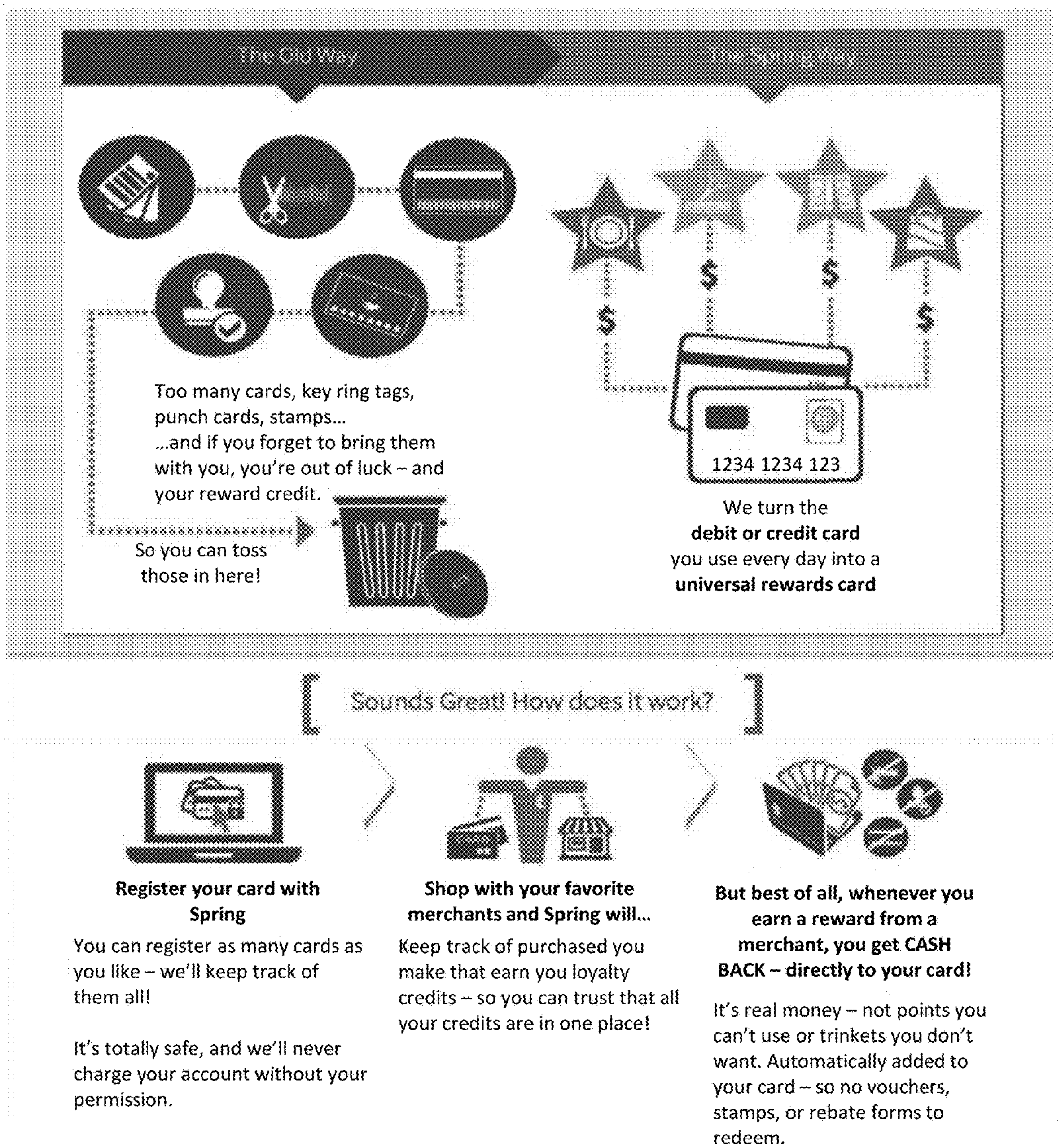
FIG. 20A illustrates card registration features according to one embodiment of the present invention.
Figure 20B:
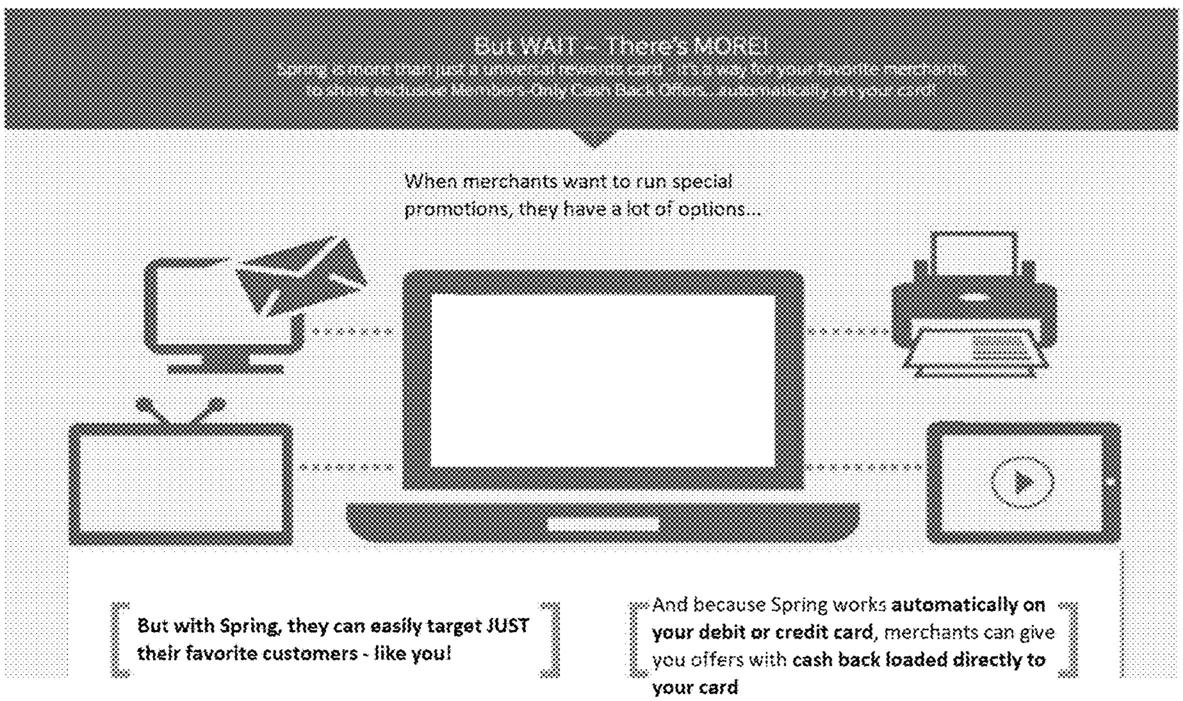
FIG. 20B illustrates cash back features according to one embodiment of the present invention.
Figure 21:
FIG. 21 illustrates another GUI of an embodiment of the invention.
Figure 22:
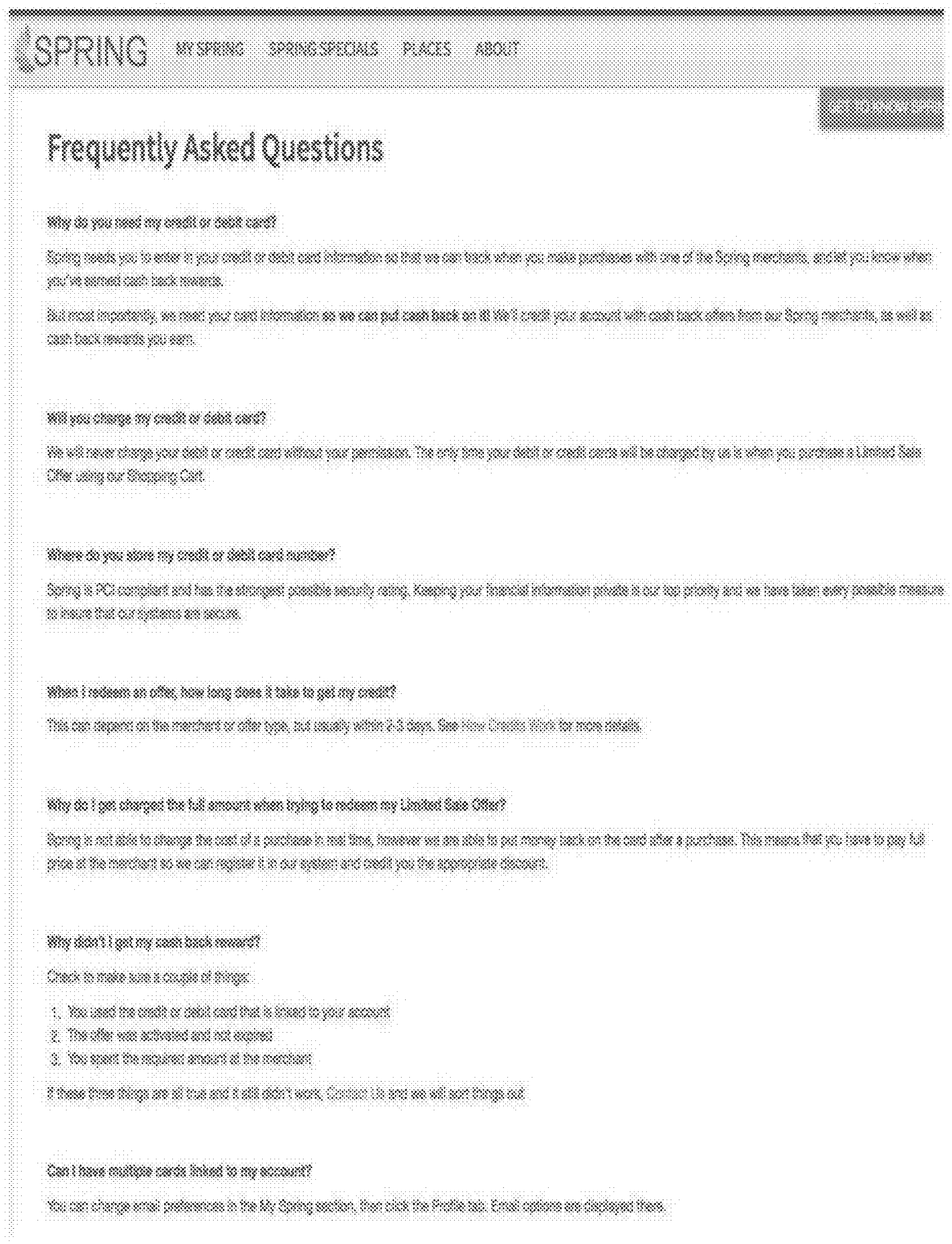
FIG. 22 illustrates another GUI of an embodiment of the invention.
Figure 23:
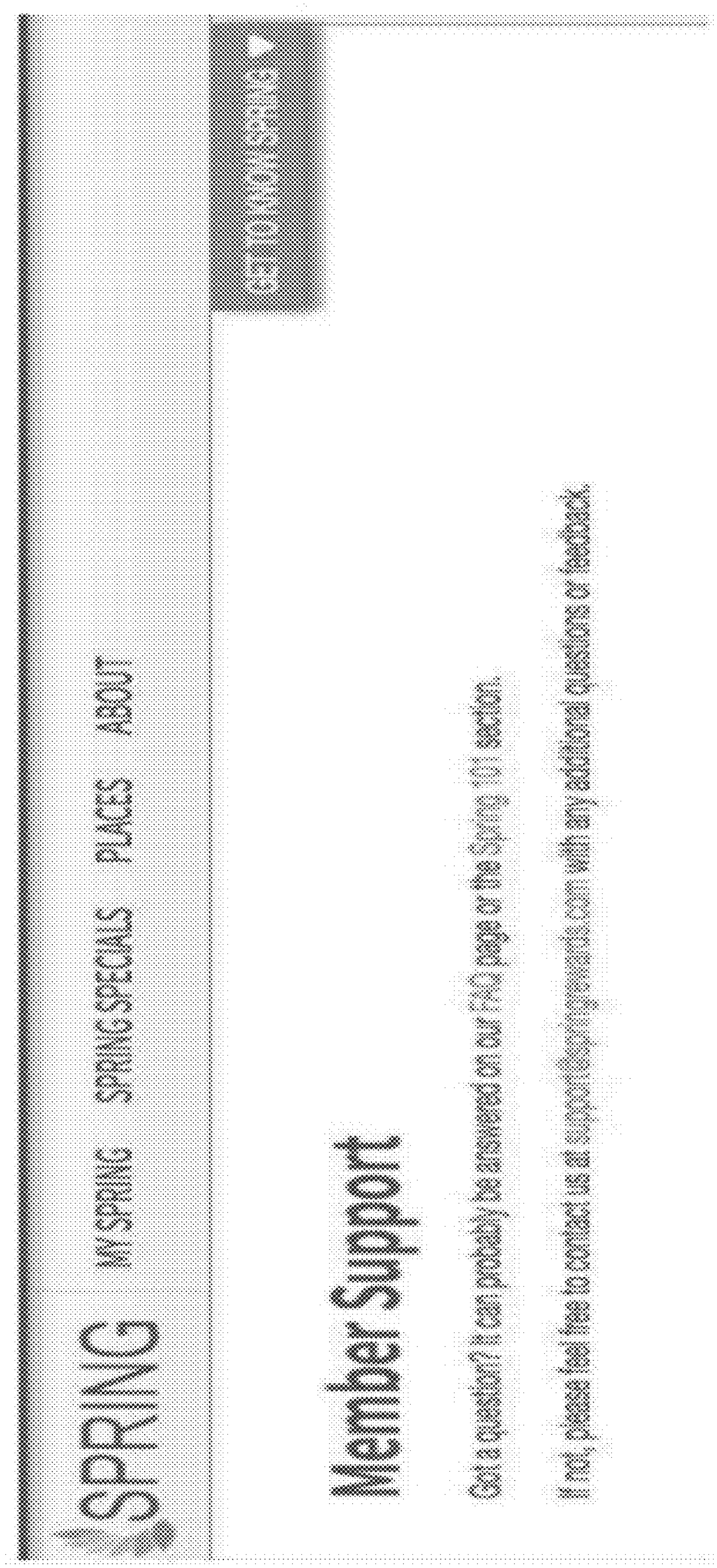
FIG. 23 illustrates another GUI of an embodiment of the invention.
Figure 24:
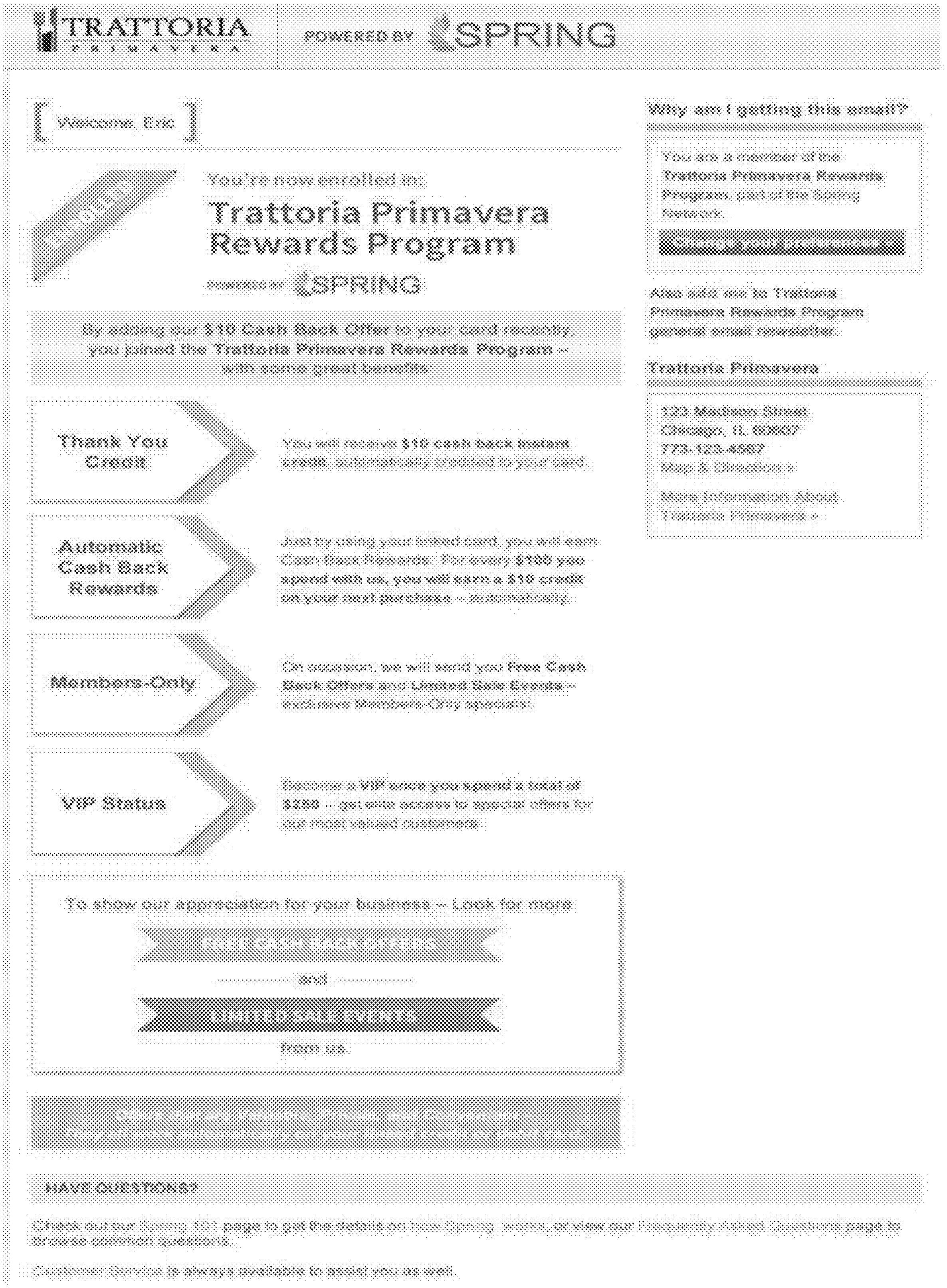
FIG. 24 illustrates another GUI of an embodiment of the invention.
Figure 25:
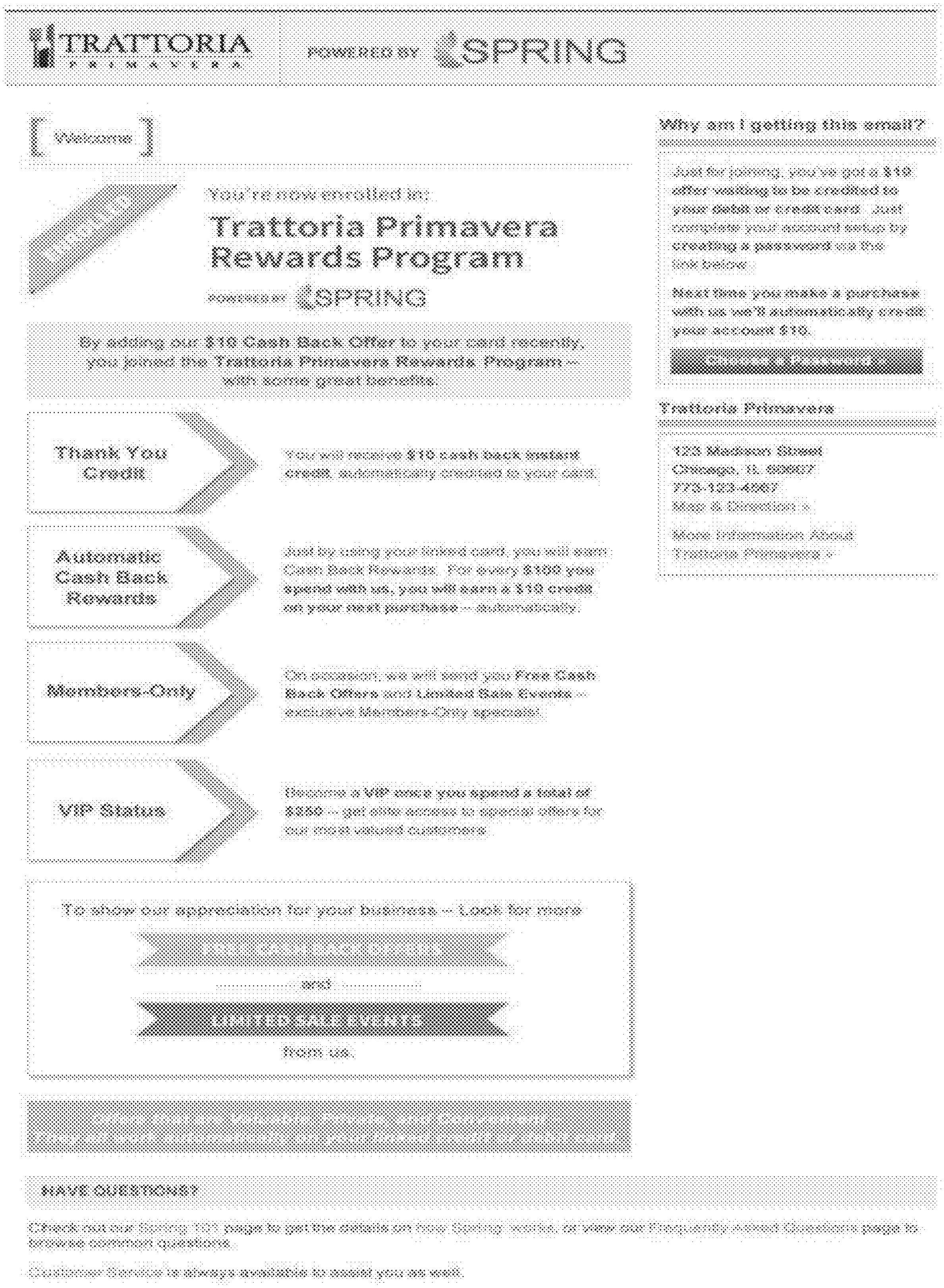
FIG. 25 illustrates another GUI of an embodiment of the invention.
Figure 26:
FIG. 26 illustrates another GUI of an embodiment of the invention.
Figure 27:
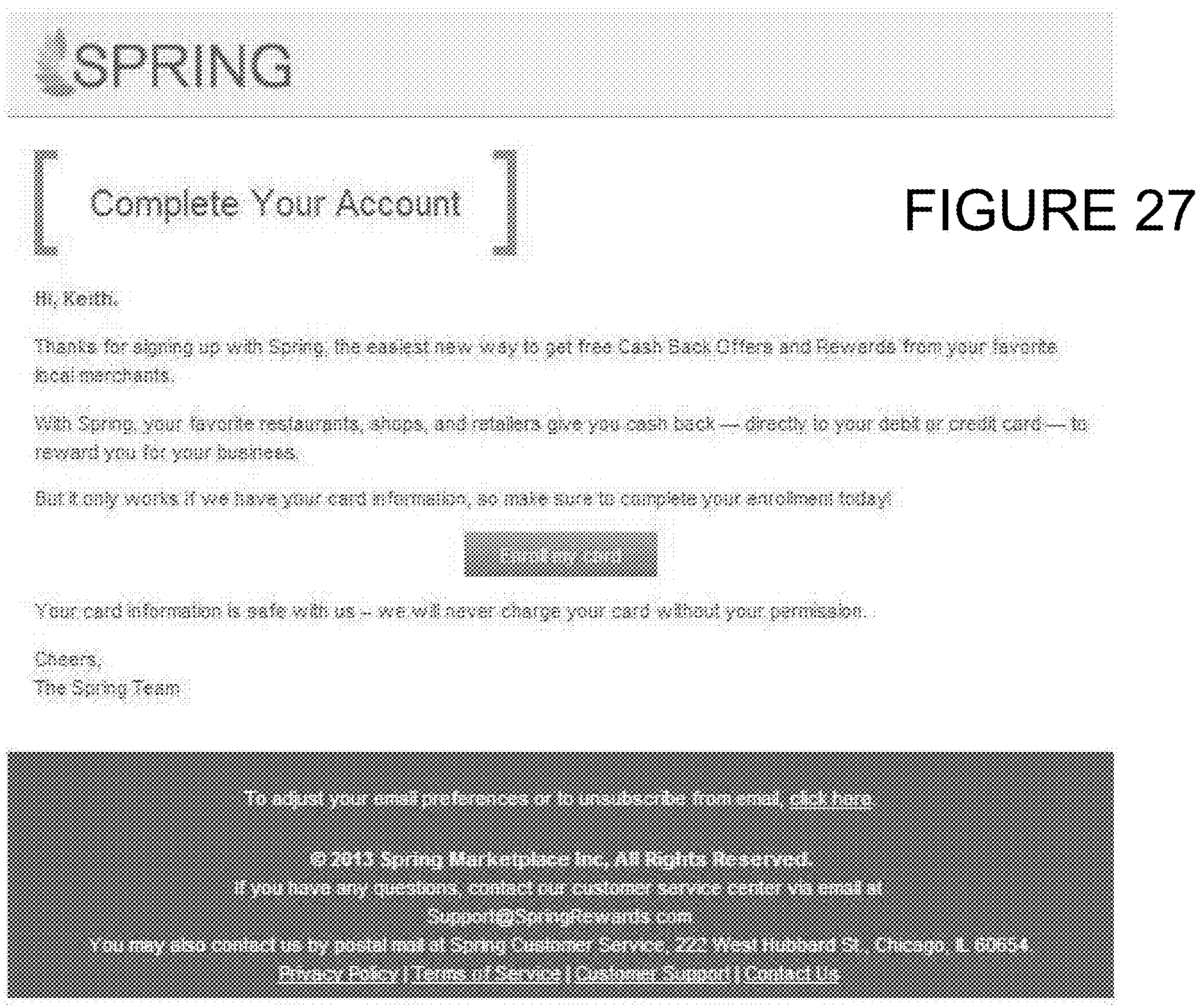
FIG. 27 illustrates another GUI of an embodiment of the invention.
Figure 28:
FIG. 28 illustrates another GUI of an embodiment of the invention.
Figure 29:
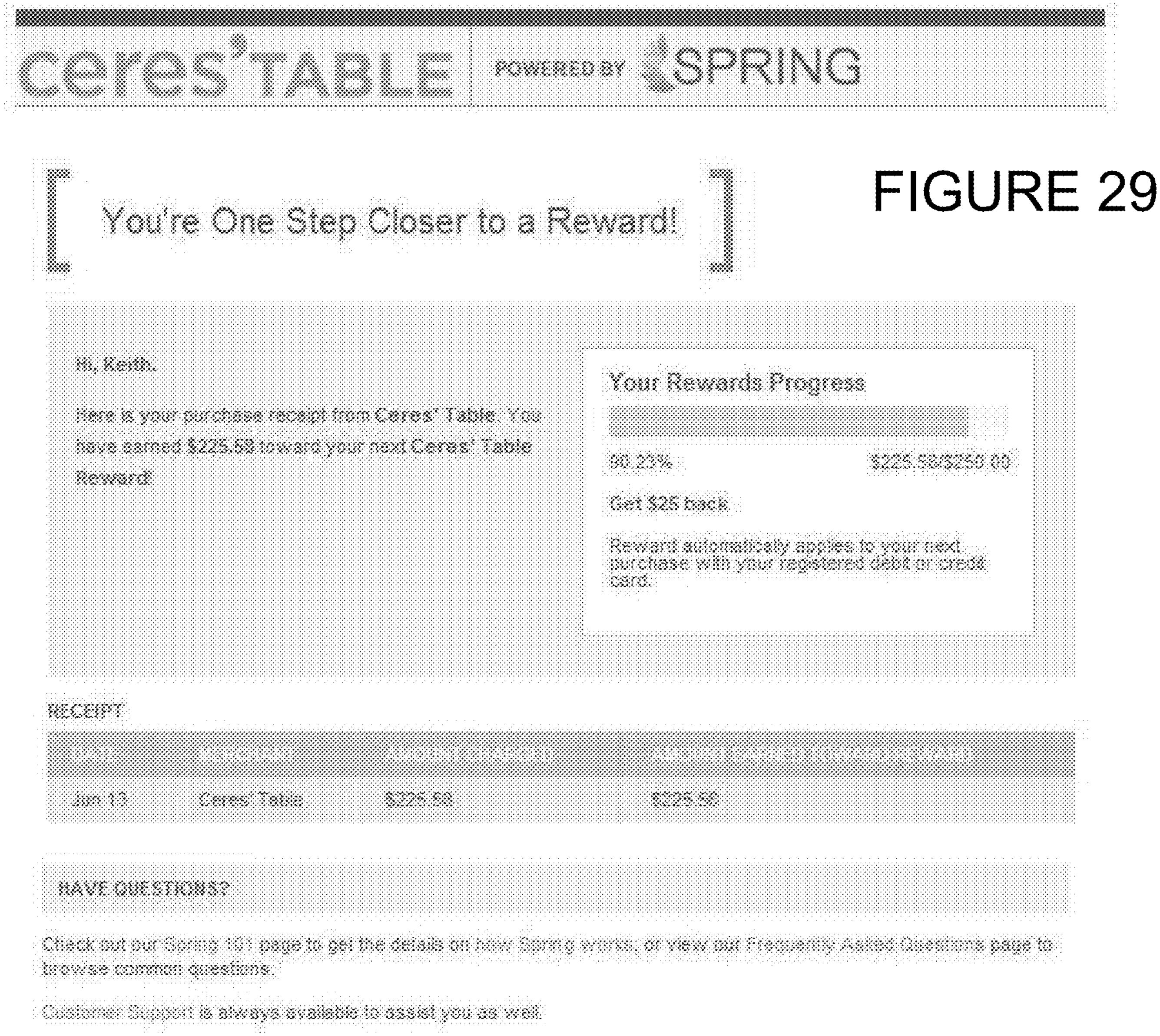
FIG. 29 illustrates another GUI of an embodiment of the invention.
Figure 30:
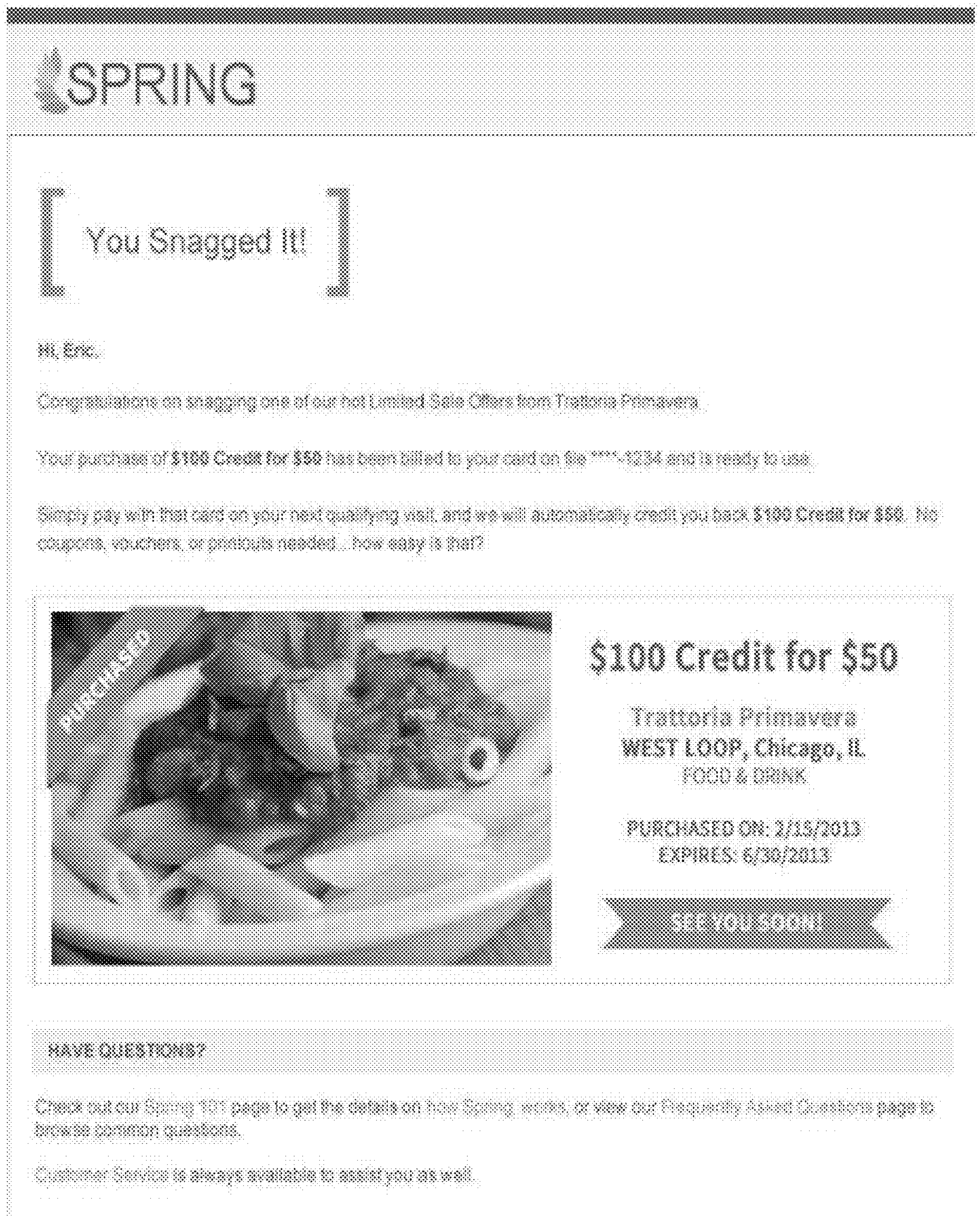
FIG. 30 illustrates another GUI of an embodiment of the invention.
Figure 31:
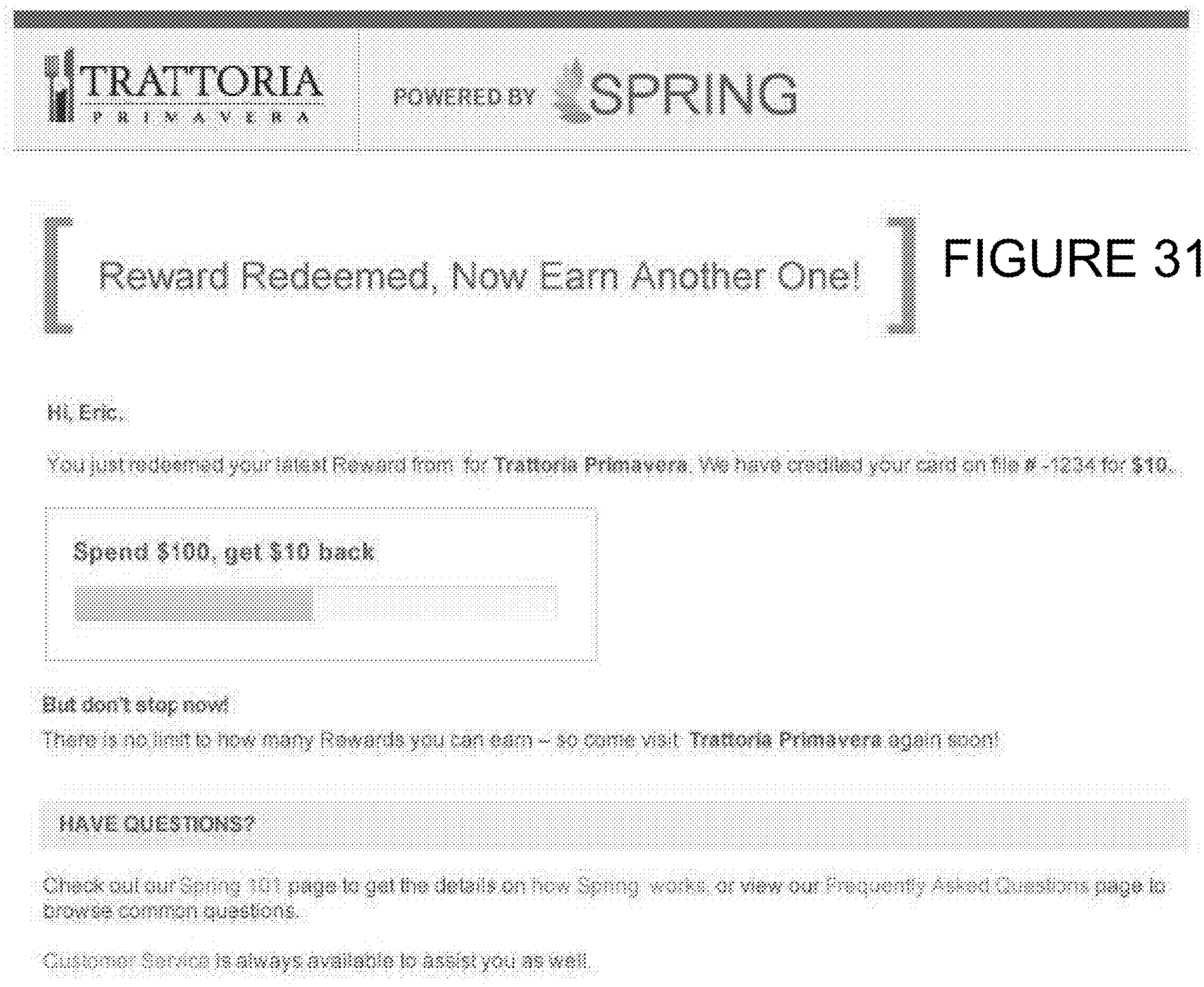
FIG. 31 illustrates another GUI of an embodiment of the invention.
Figure 32:
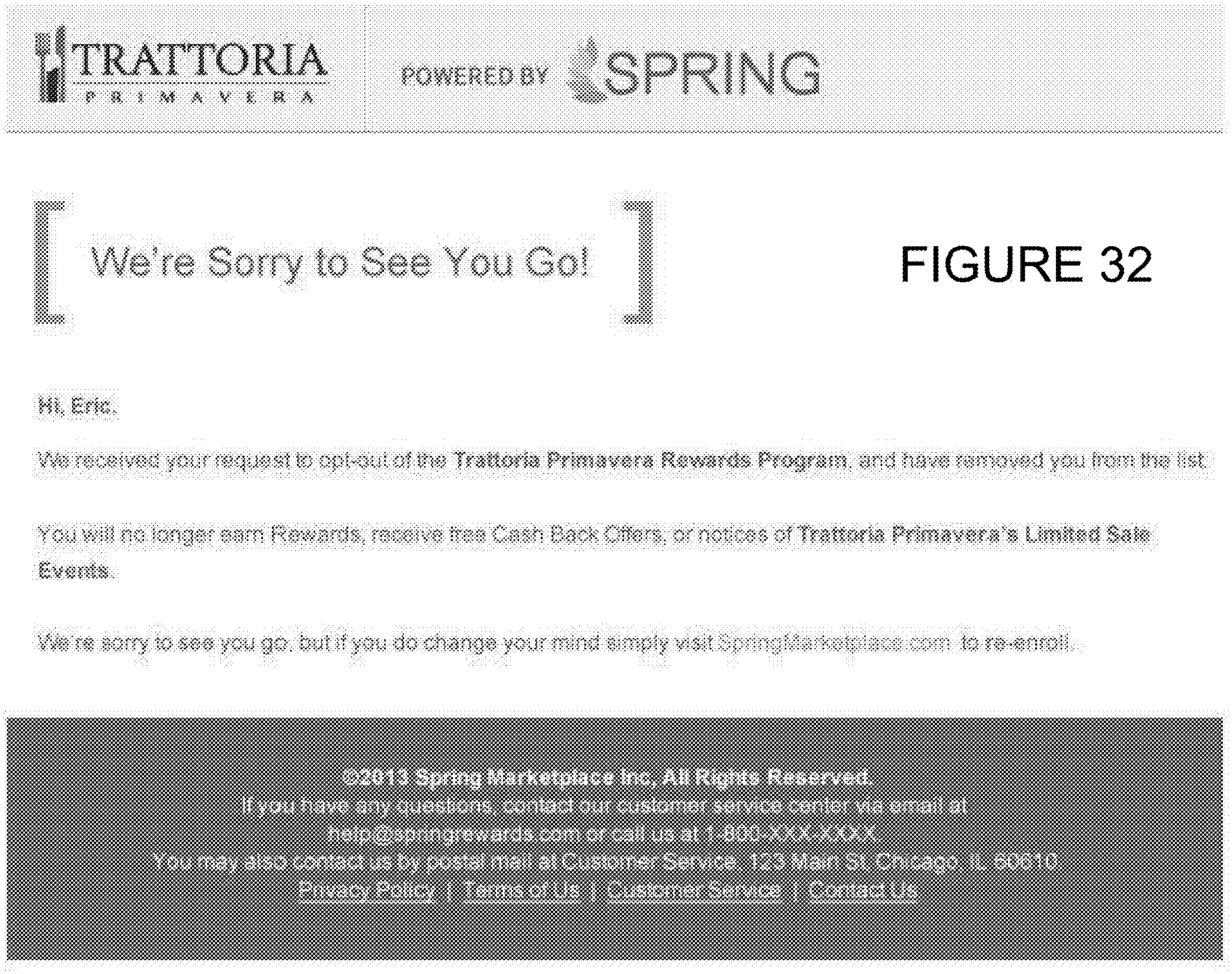
FIG. 32 illustrates another GUI of an embodiment of the invention.
Figure 34:
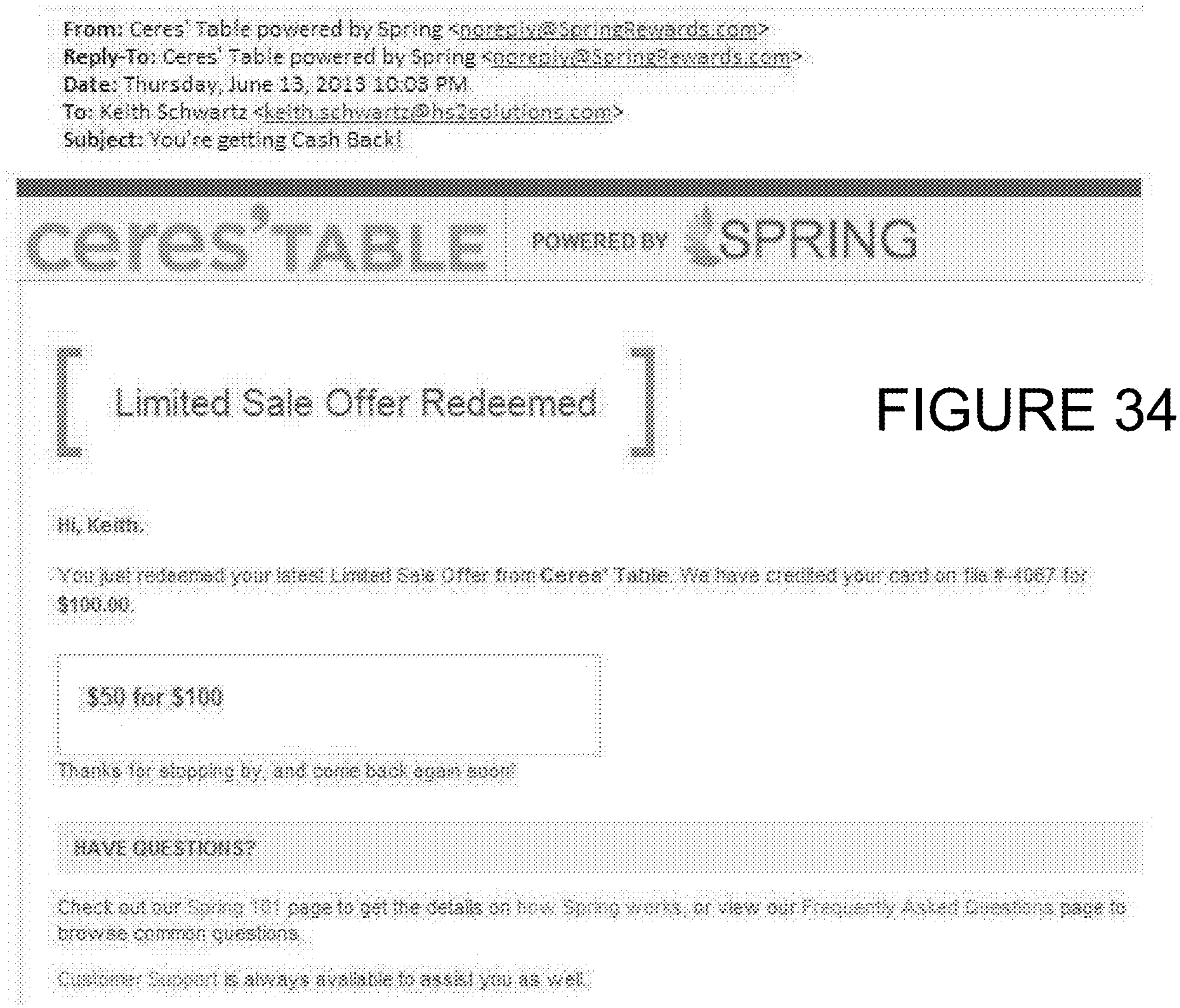
FIG. 34 illustrates another GUI of an embodiment of the invention.
Figure 35:
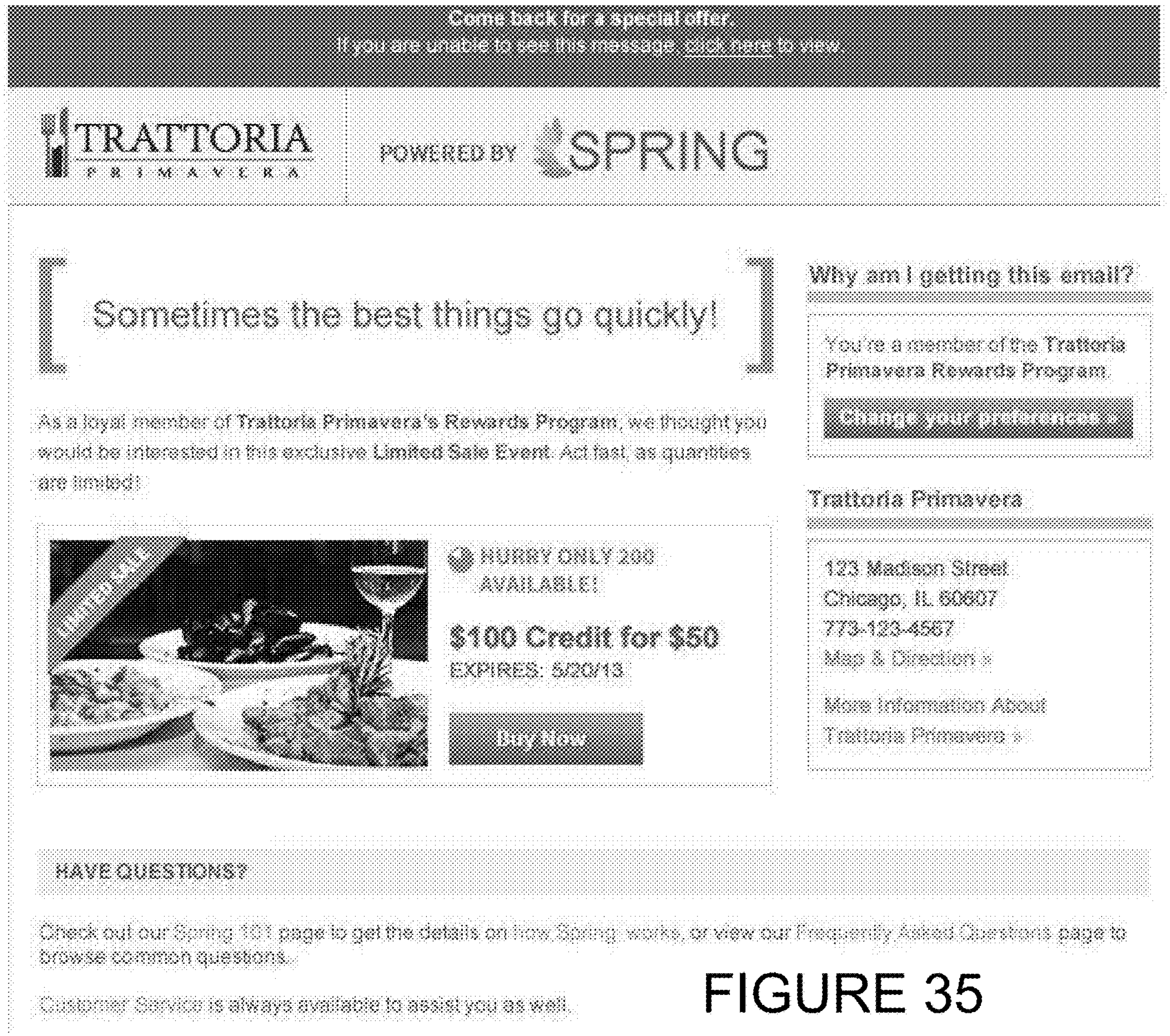
FIG. 35 illustrates another GUI of an embodiment of the invention.
Figure 36:
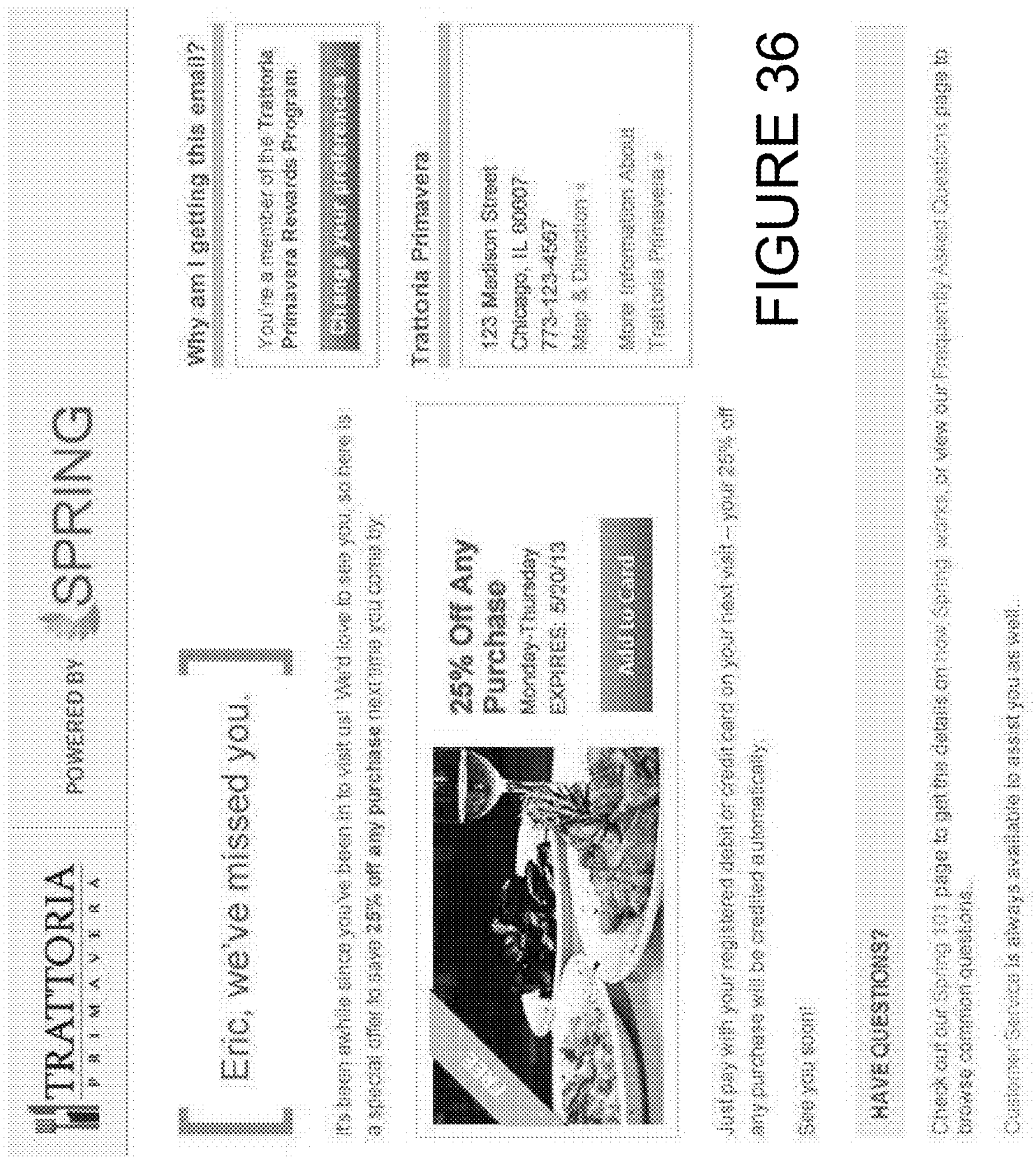
FIG. 36 illustrates another GUI of an embodiment of the invention.
Figure 37:
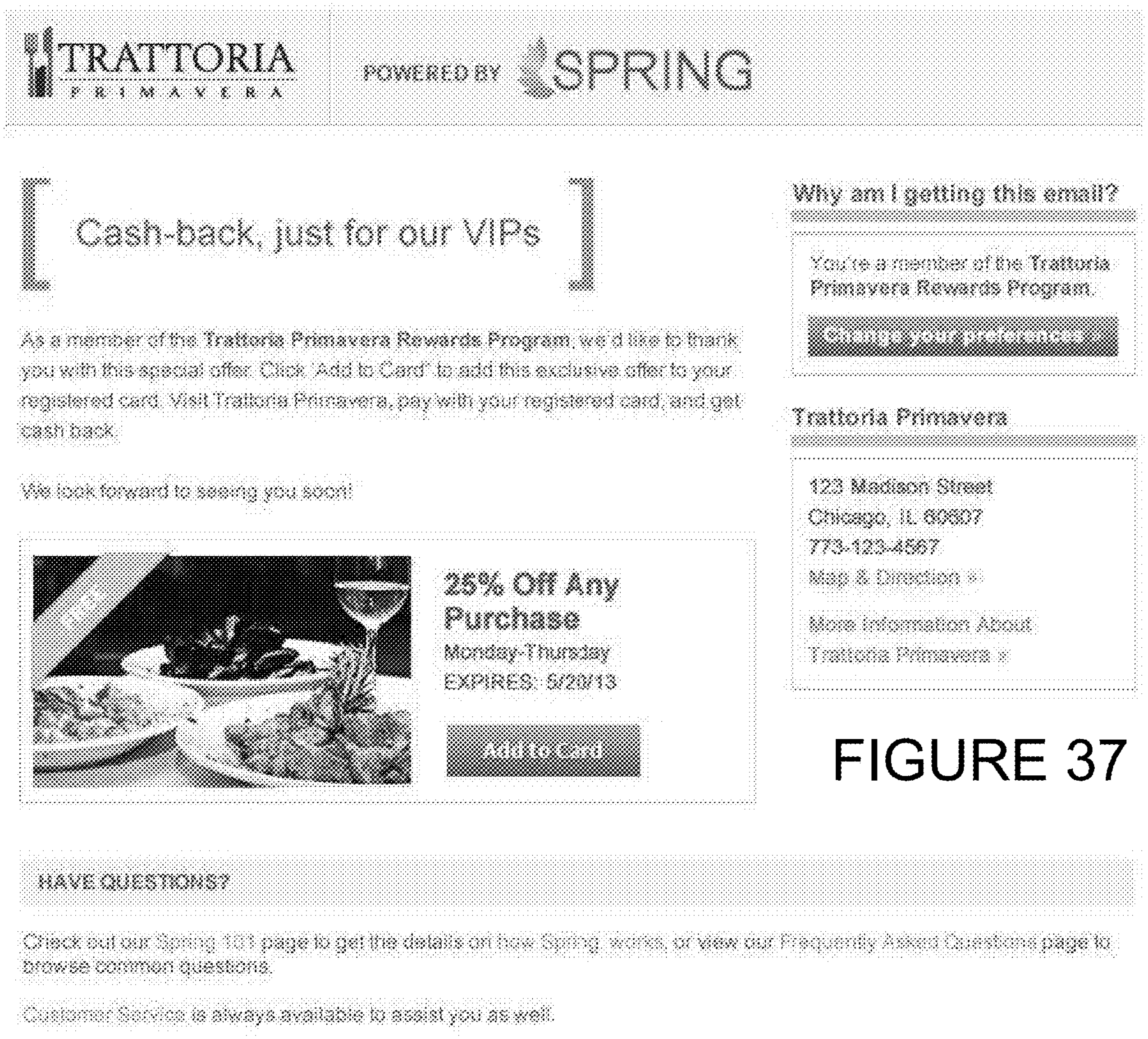
FIG. 37 illustrates another GUI of an embodiment of the invention.
Figure 38:
FIG. 38 illustrates another GUI of an embodiment of the invention.
Figure 39:
FIG. 39 illustrates another GUI of an embodiment of the invention.
Figure 40:
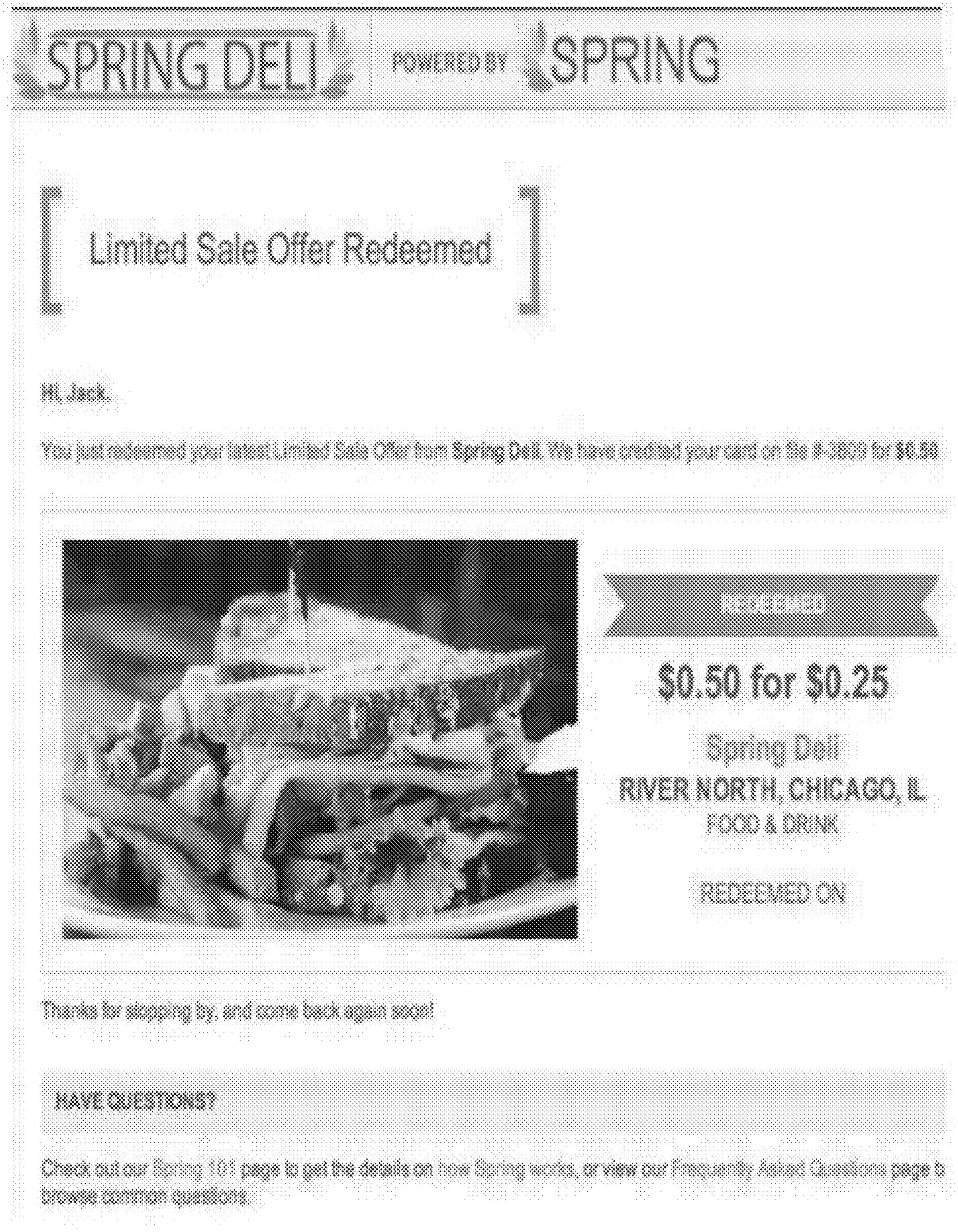
FIG. 40 illustrates another GUI of an embodiment of the invention.
Figure 41:
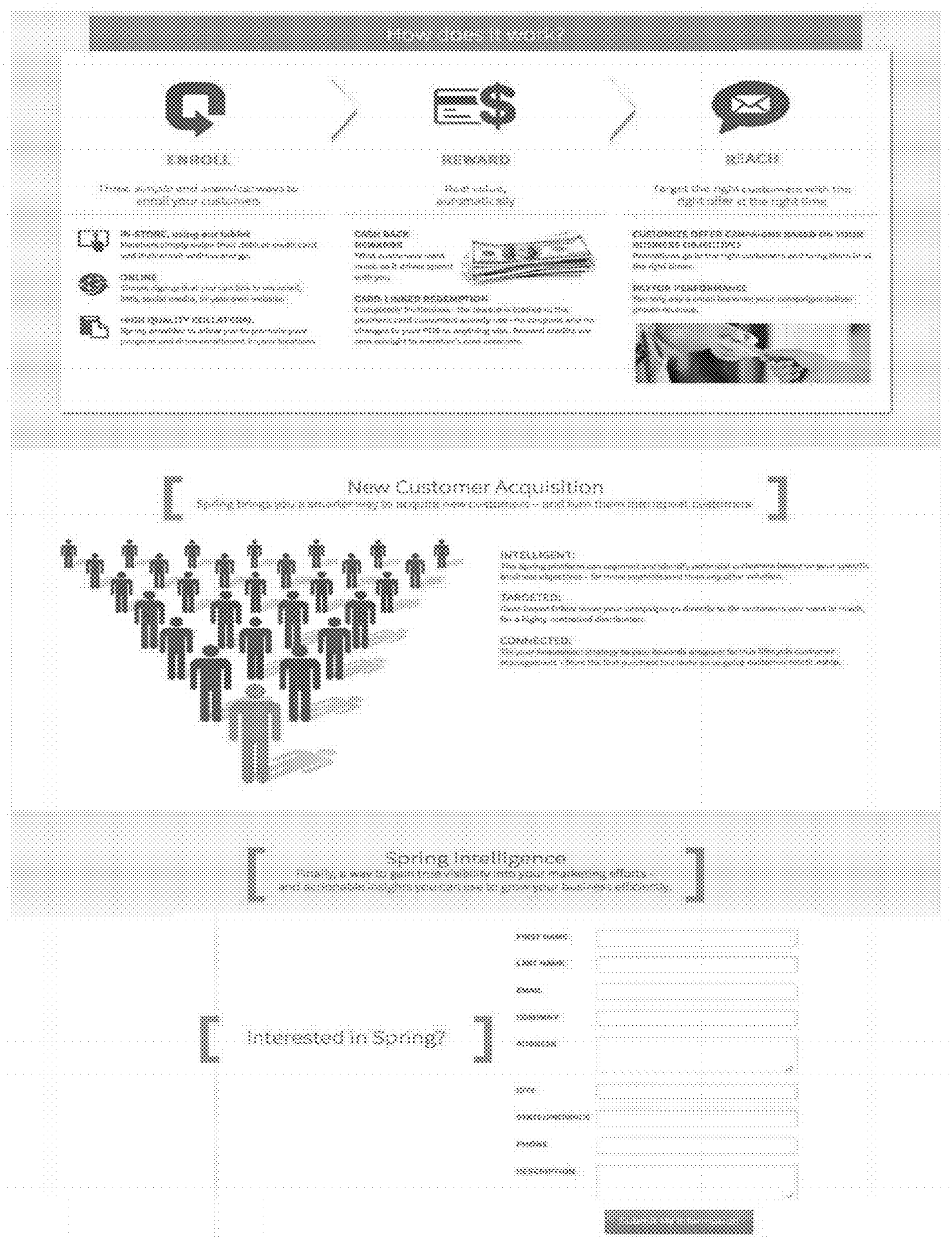
FIG. 41 illustrates another GUI of an embodiment of the invention.
Figure 42:
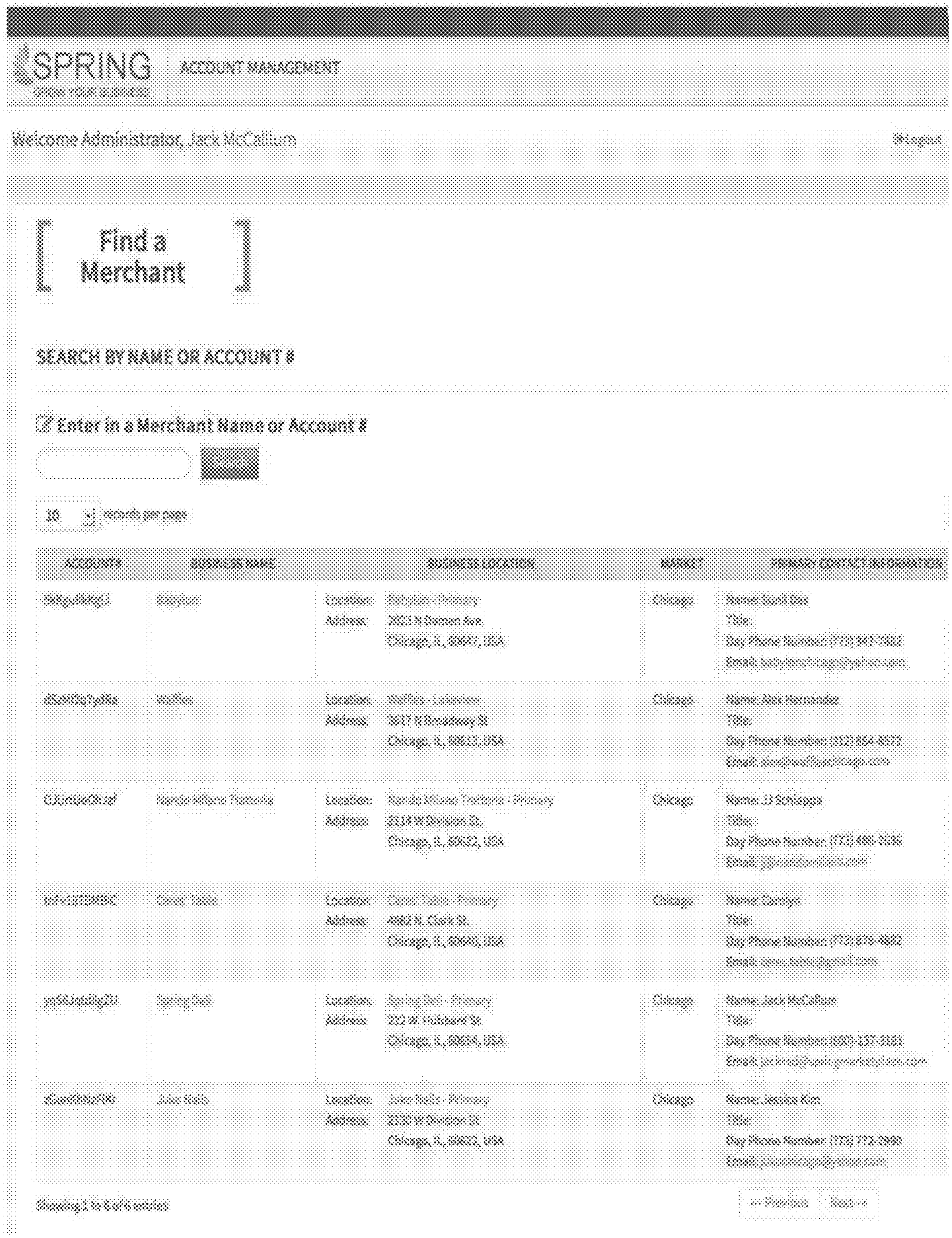
FIG. 42 illustrates another GUI of an embodiment of the invention.
Figure 43:
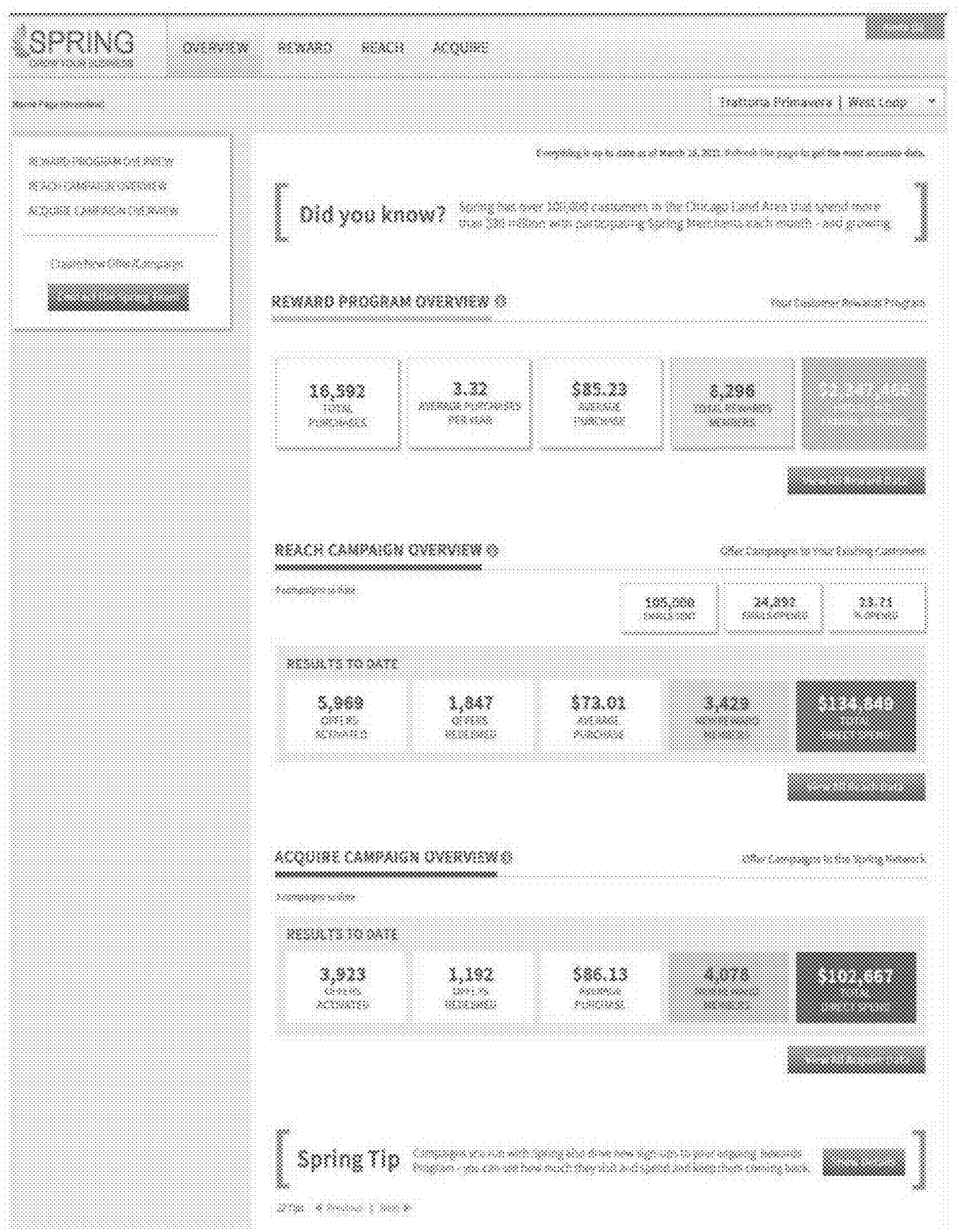
FIG. 43 illustrates another GUI of an embodiment of the invention.
Figure 44:
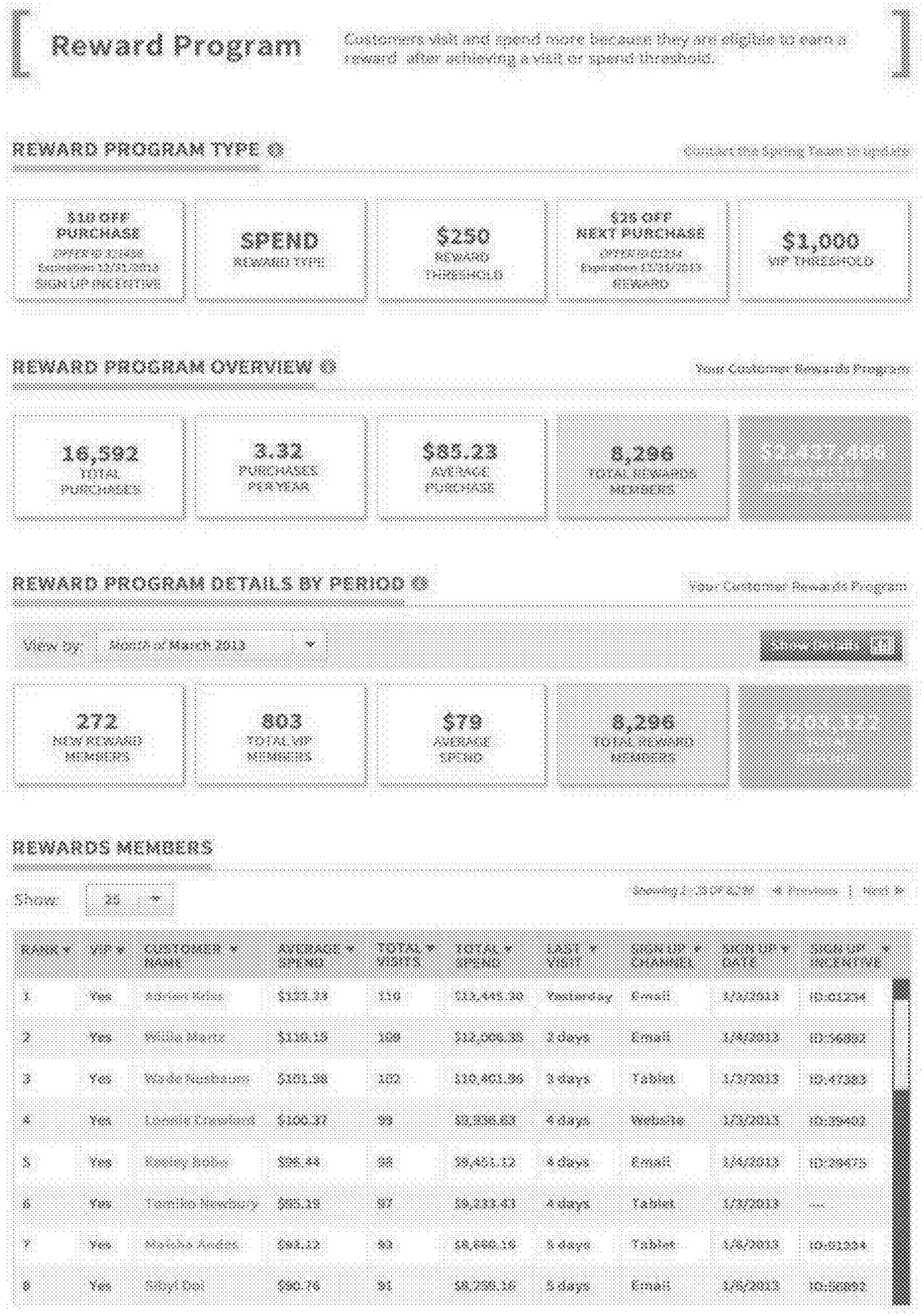
FIG. 44 illustrates another GUI of an embodiment of the invention.
Figure 45:
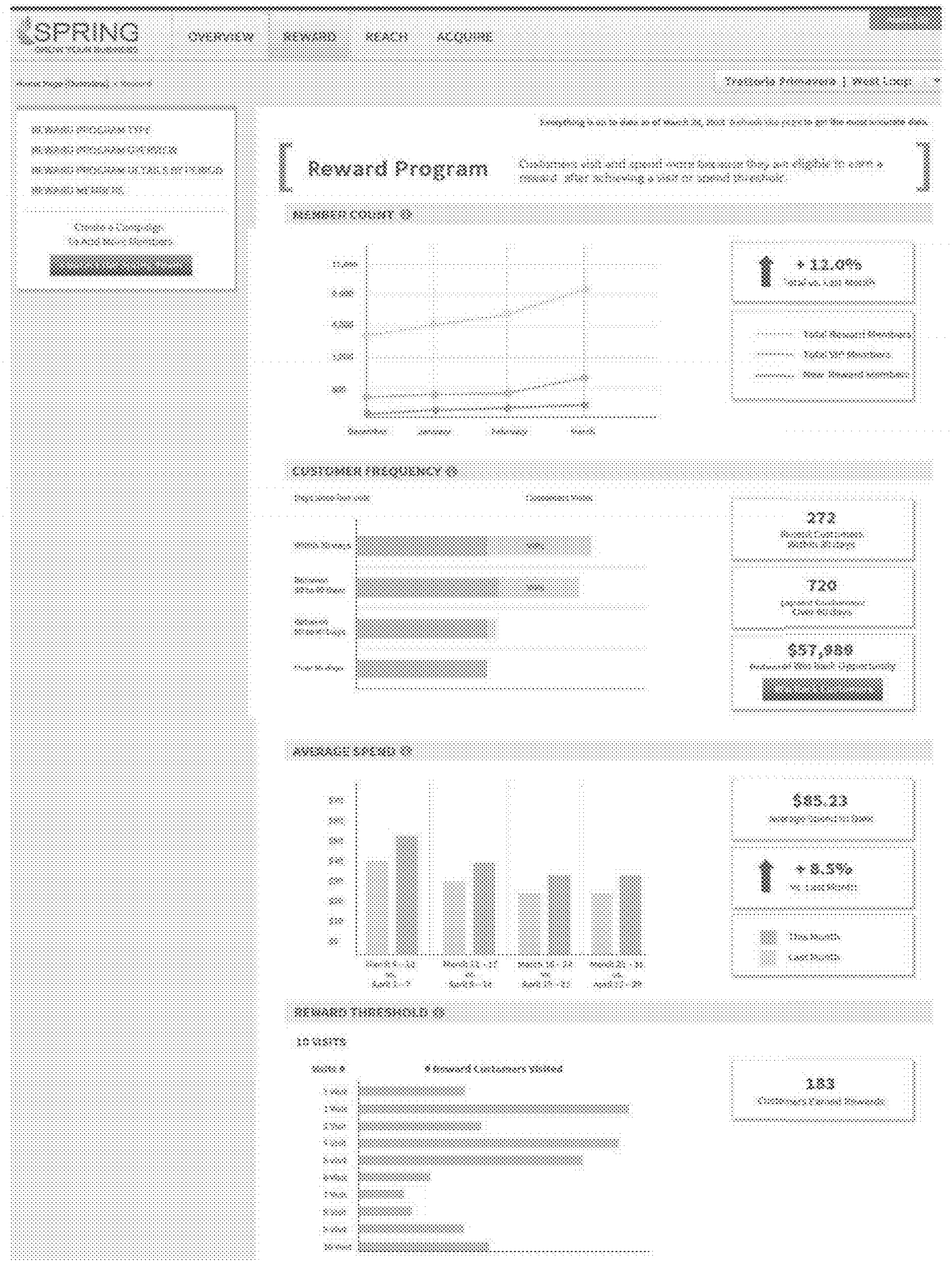
FIG. 45 illustrates another GUI of an embodiment of the invention.
Figure 46:
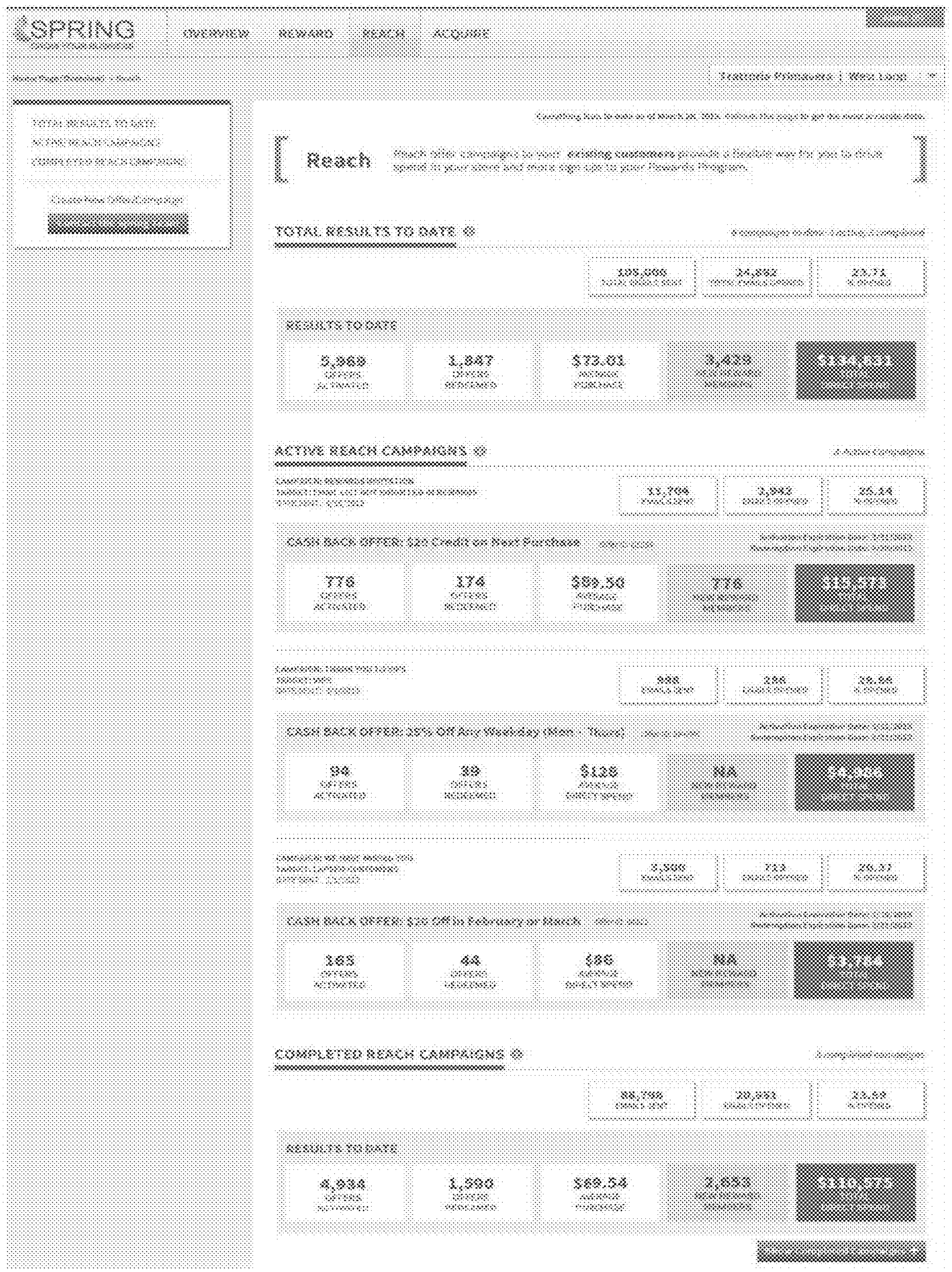
FIG. 46 illustrates another GUI of an embodiment of the invention.
Figure 47:
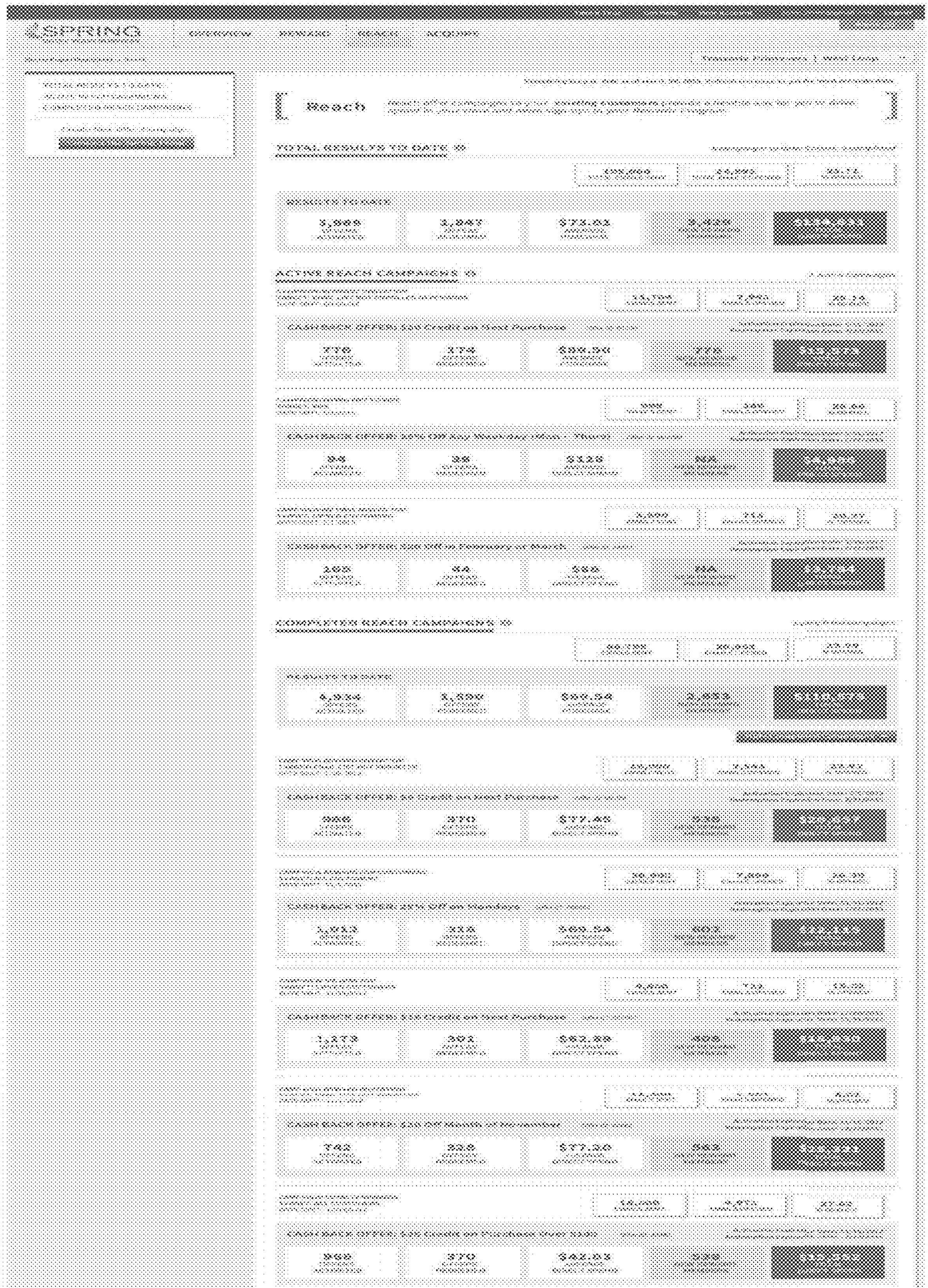
FIG. 47 illustrates another GUI of an embodiment of the invention.
Figure 48:
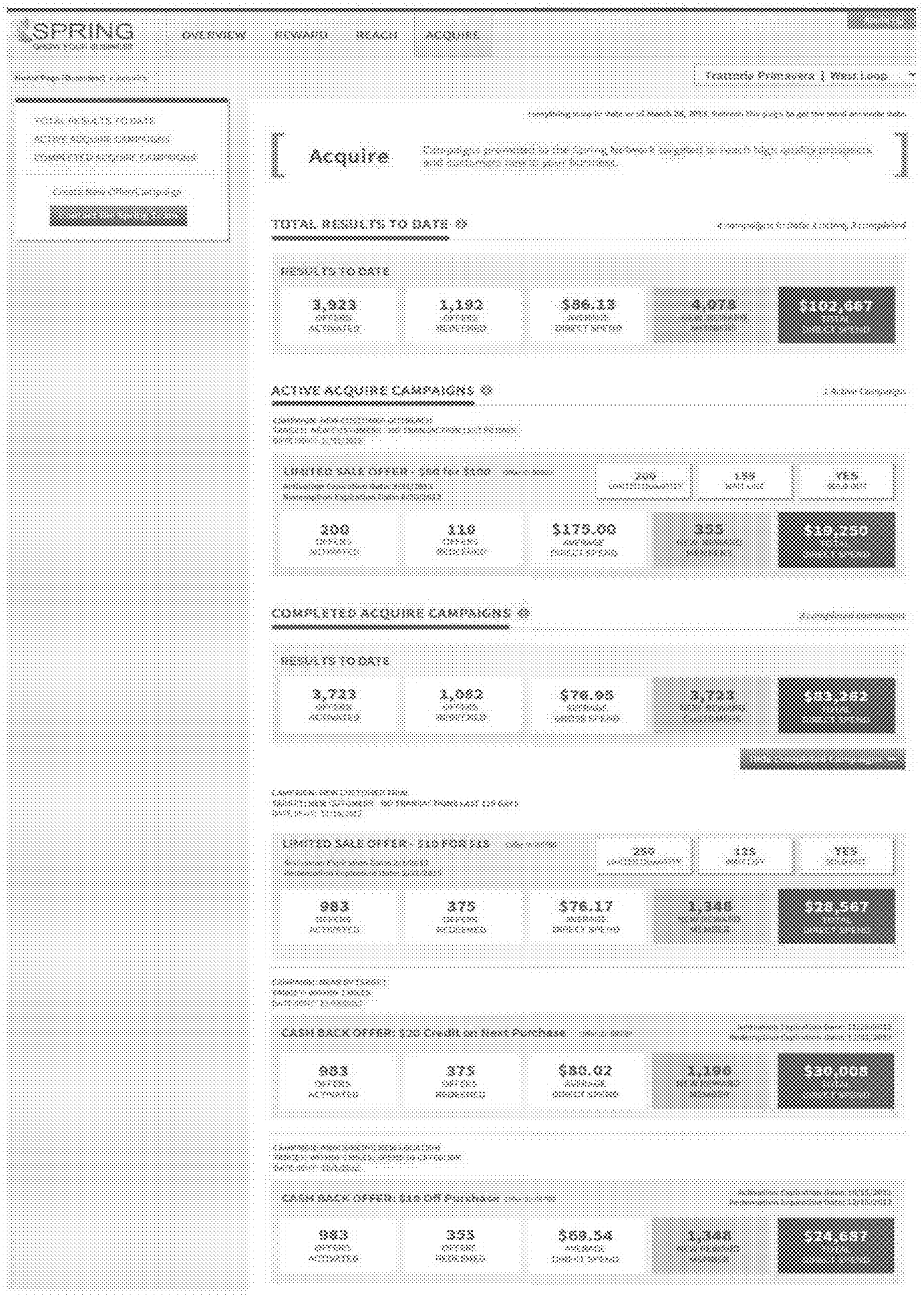
FIG. 48 illustrates another GUI of an embodiment of the invention.
Figure 49:
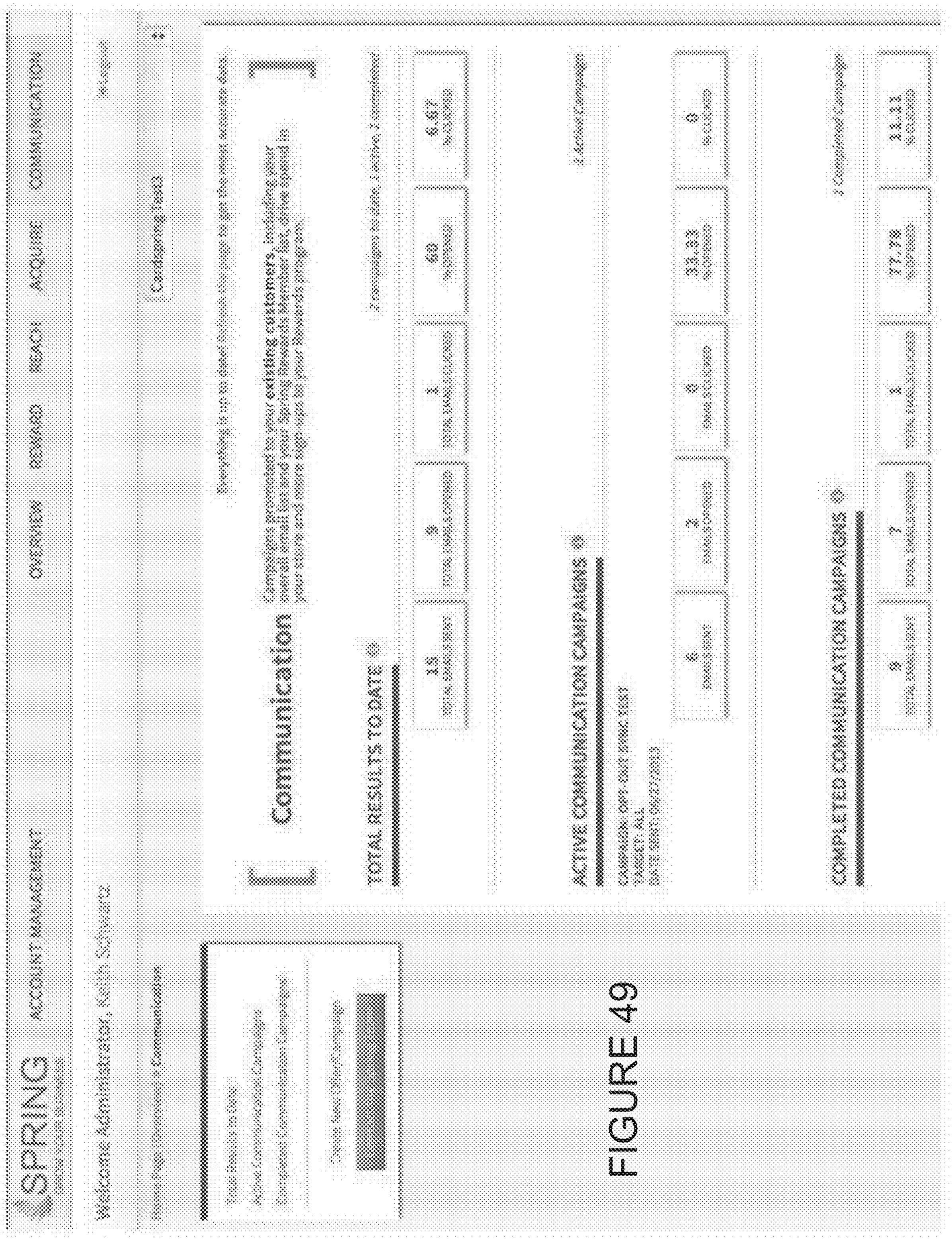
FIG. 49 illustrates another GUI of an embodiment of the invention.
Figure 50:
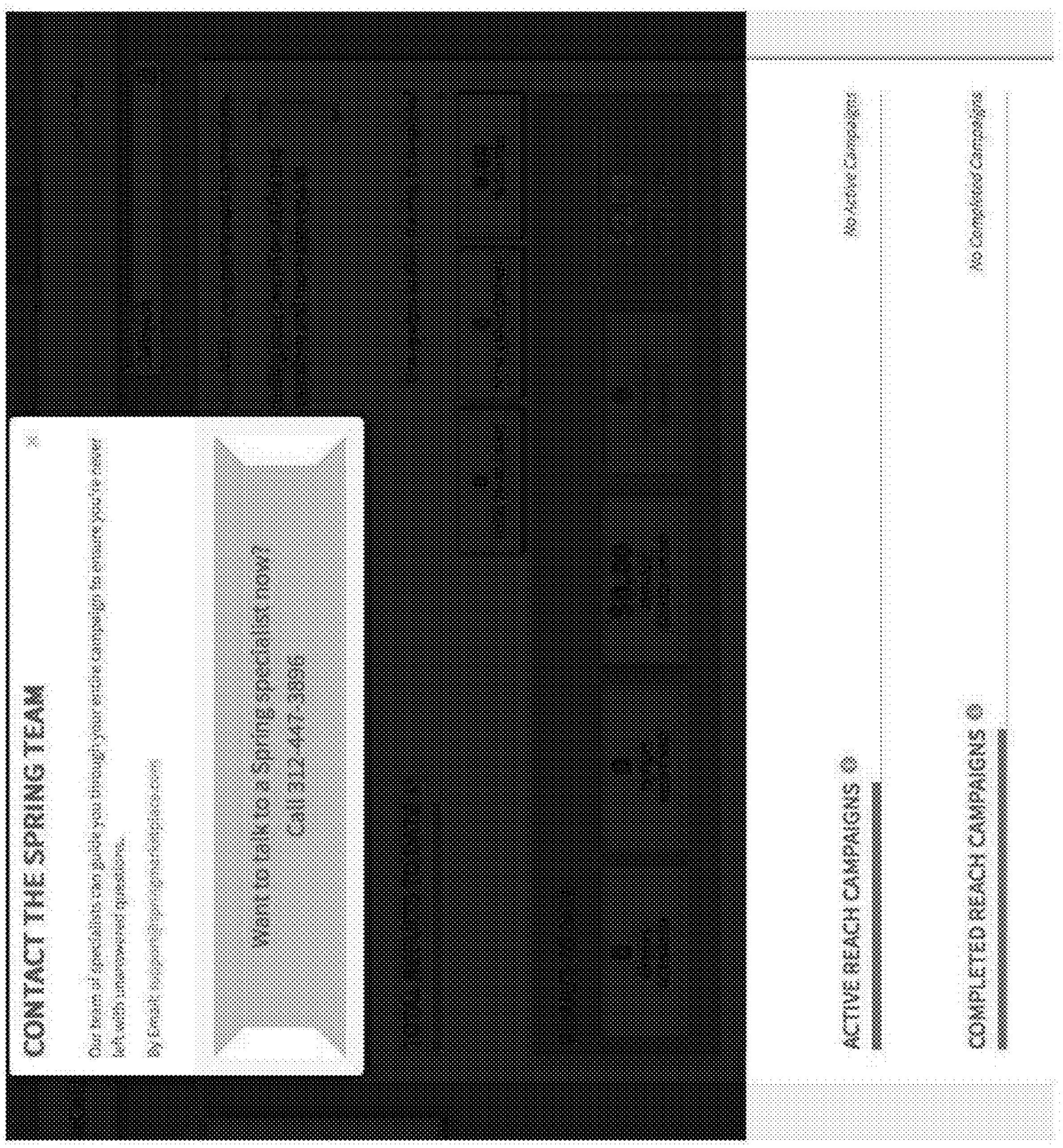
FIG. 50 illustrates another GUI of an embodiment of the invention.
Figure 51:
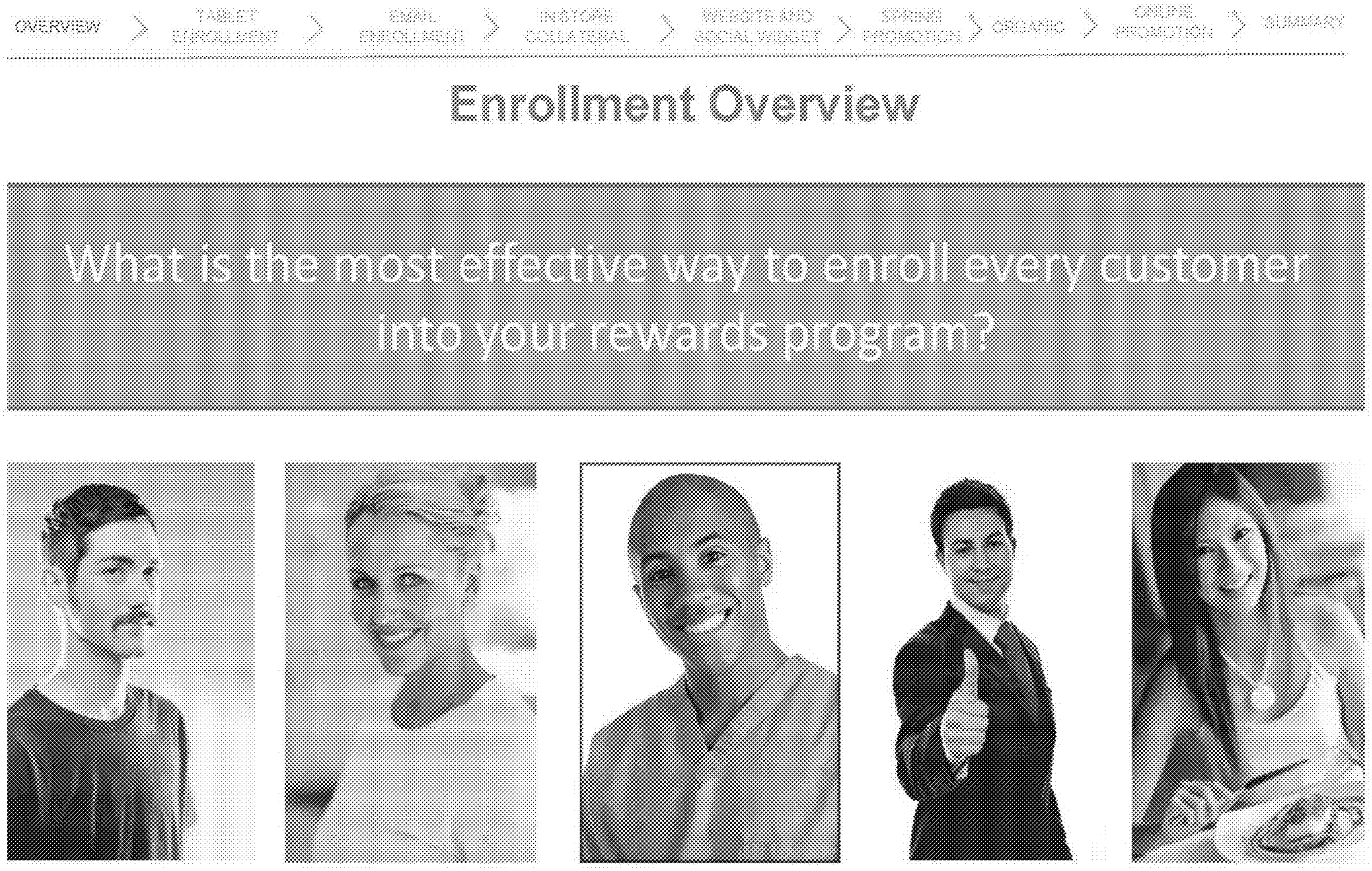
FIG. 51 illustrates another GUI of an embodiment of the invention.
Figure 52:
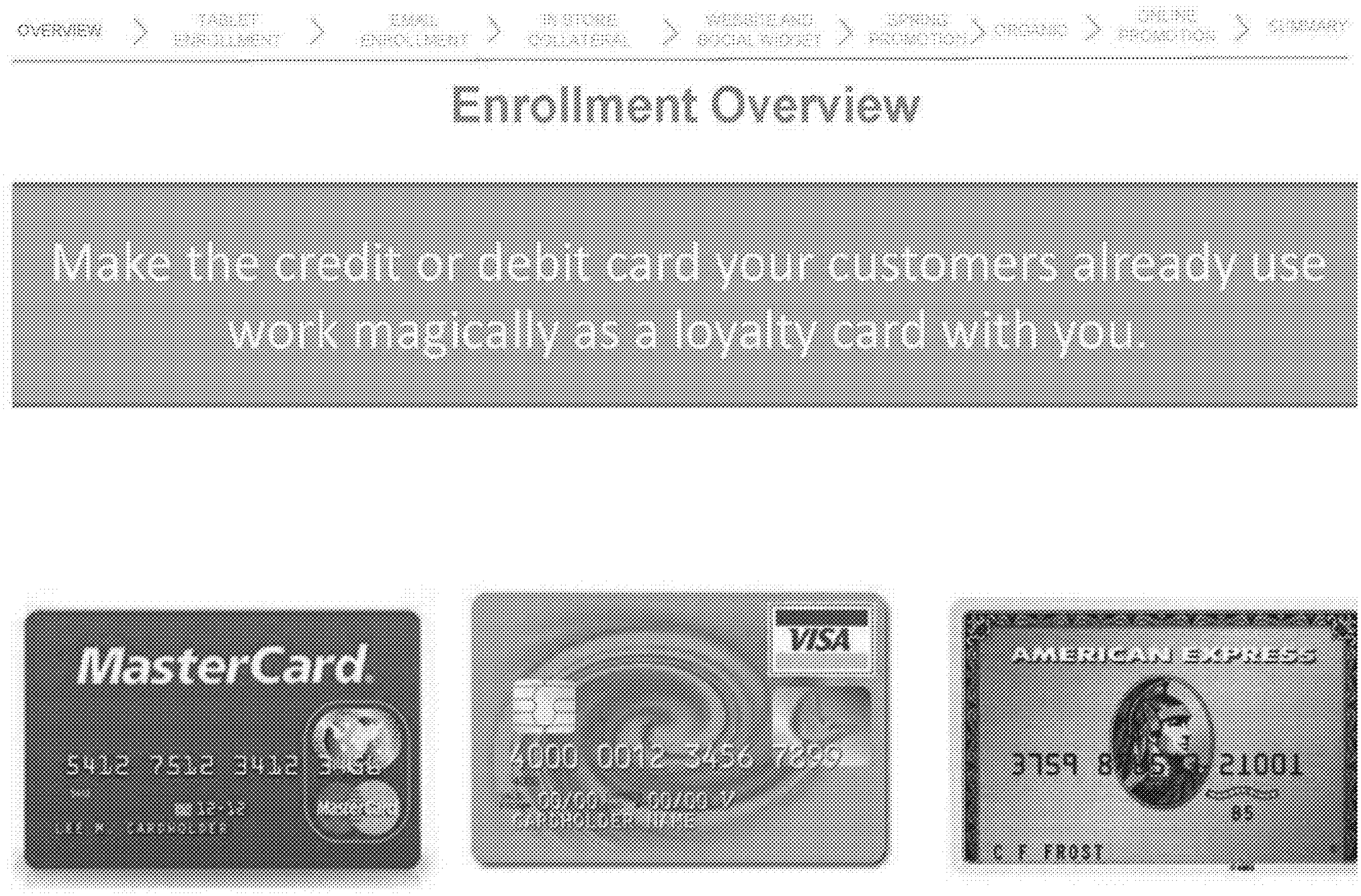
FIG. 52 illustrates another GUI of an embodiment of the invention.
Figure 53:
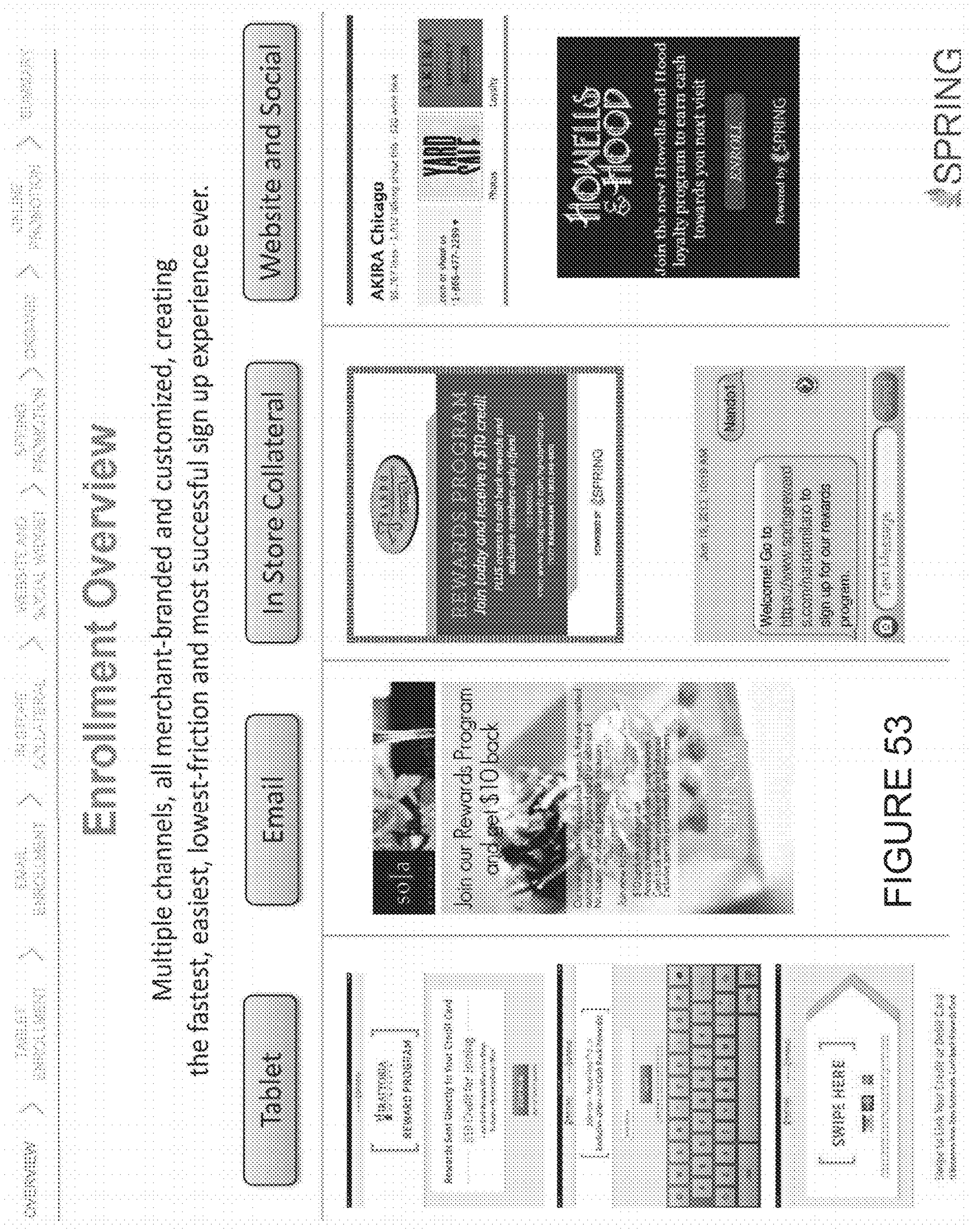
FIG. 53 illustrates another GUI of an embodiment of the invention.
Figure 54:
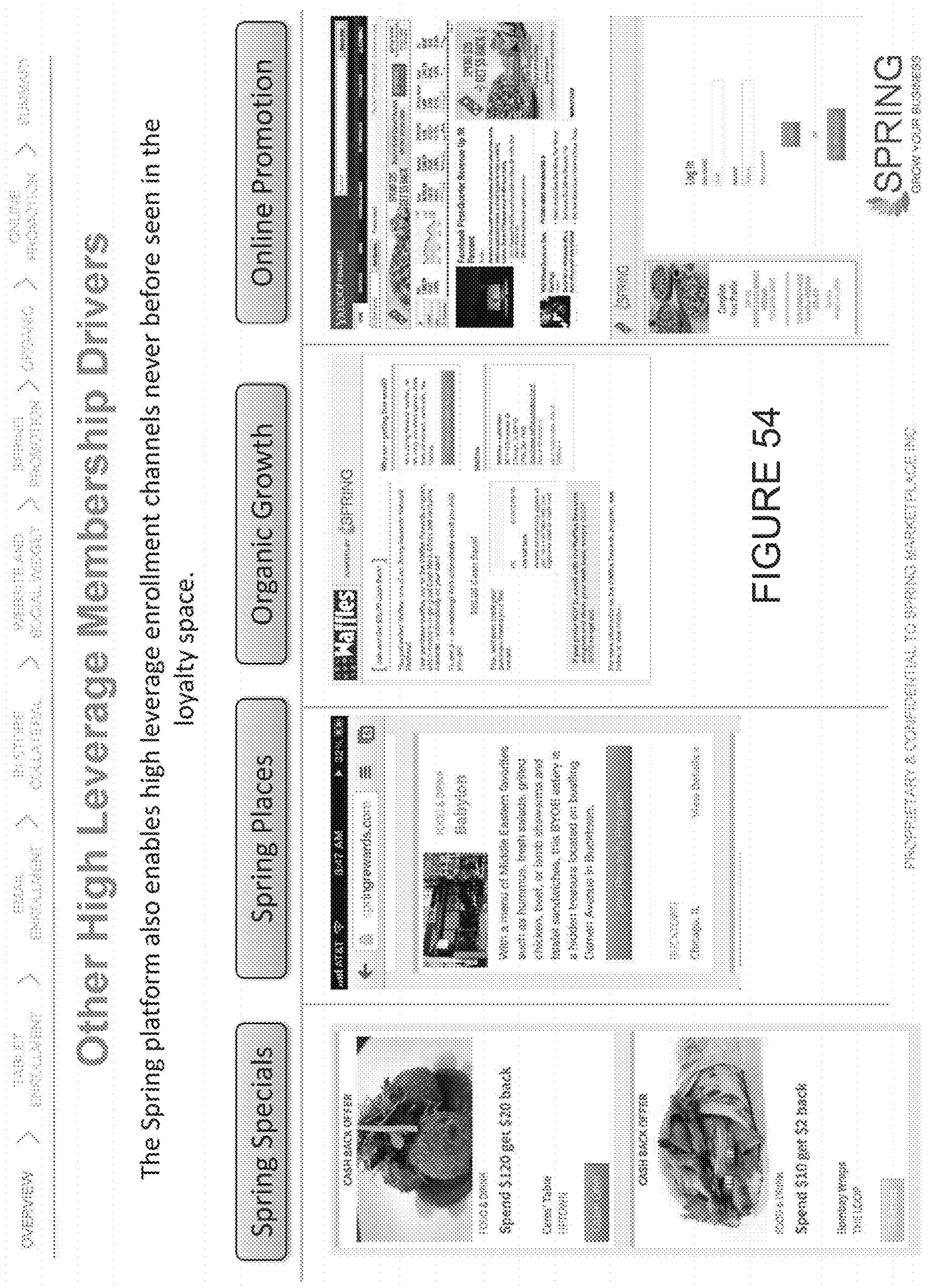
FIG. 54 illustrates another GUI of an embodiment of the invention.
Figure 55:
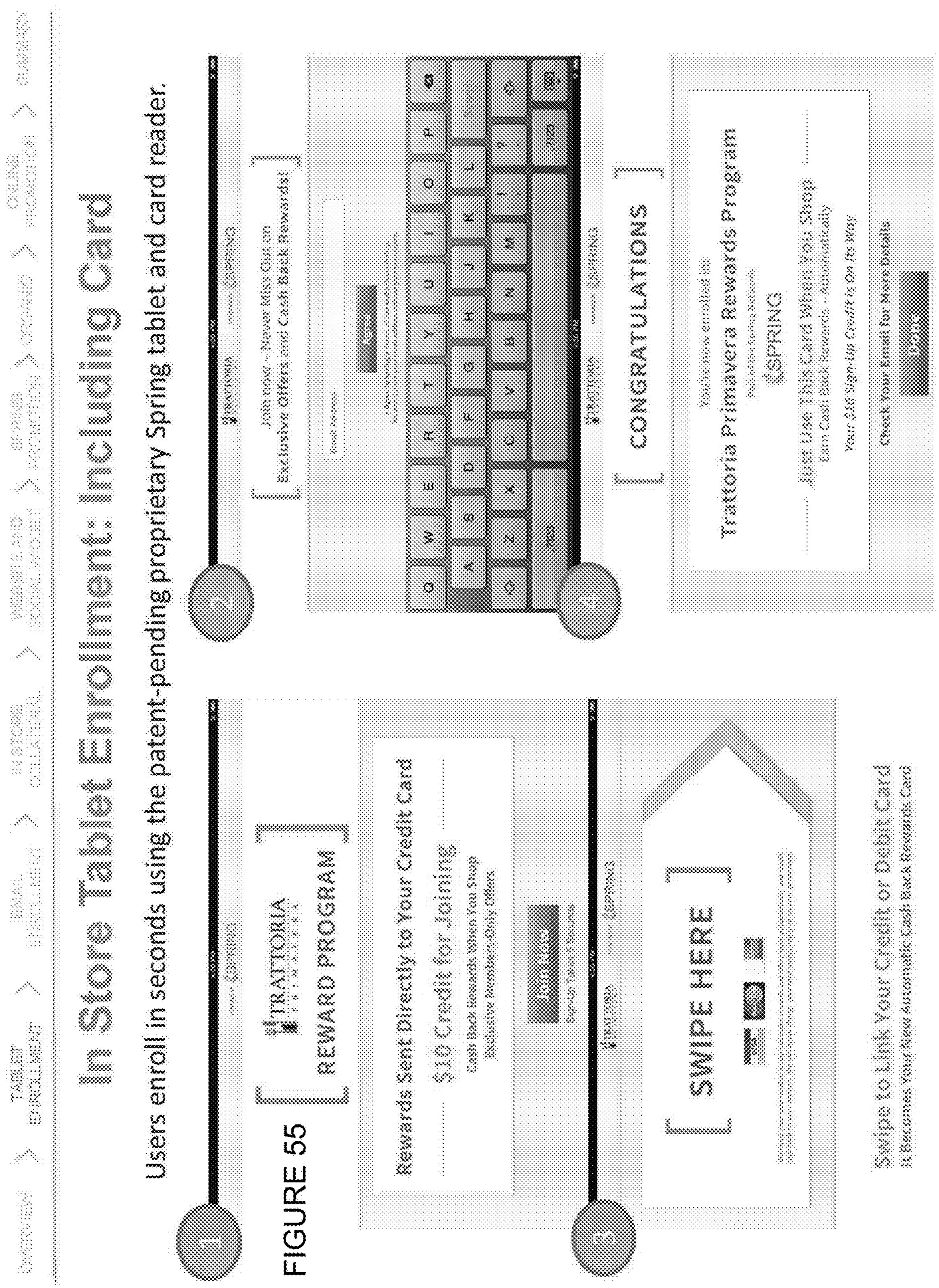
FIG. 55 illustrates another GUI of an embodiment of the invention.
Figure 56:
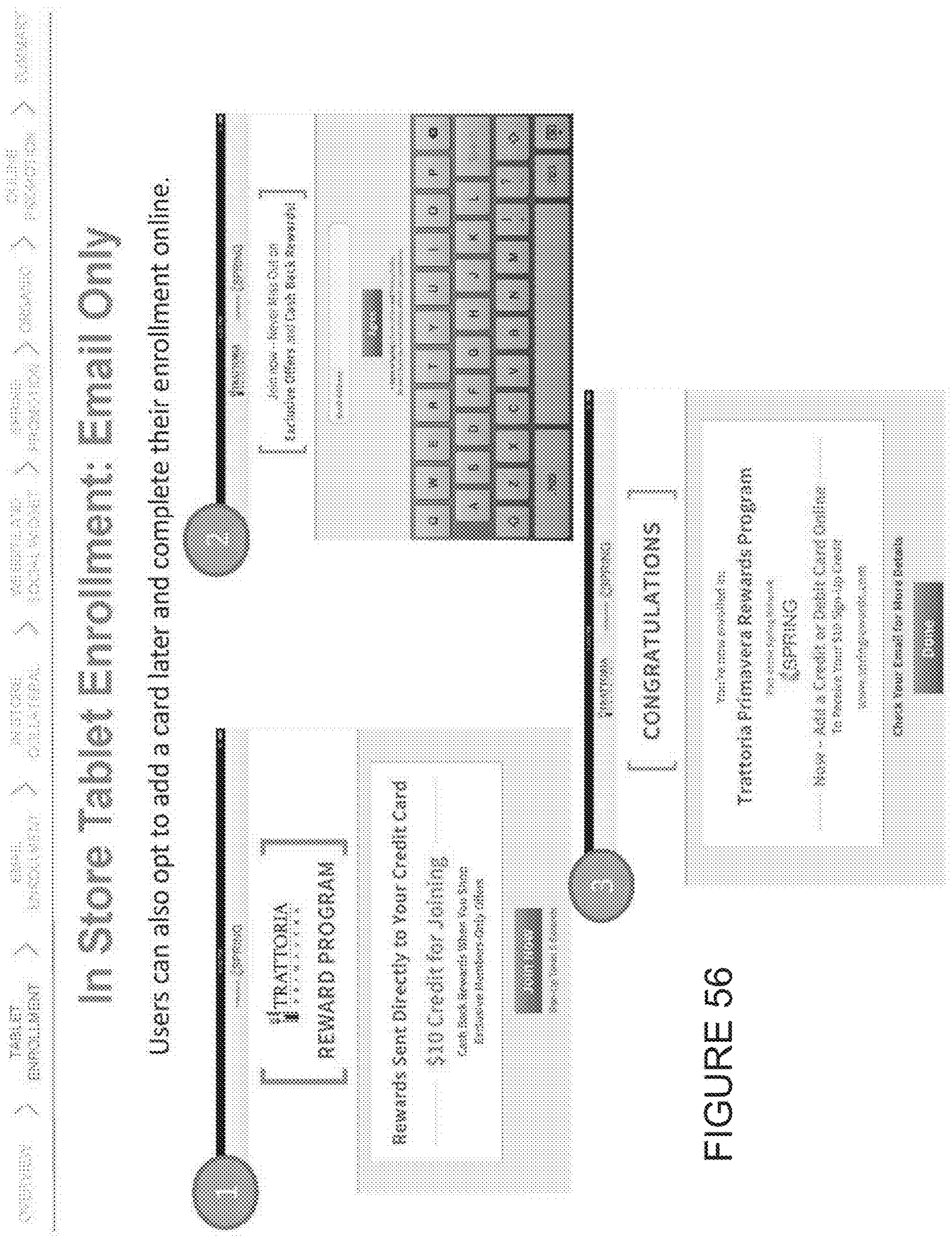
FIG. 56 illustrates another GUI of an embodiment of the invention.
Figure 58:
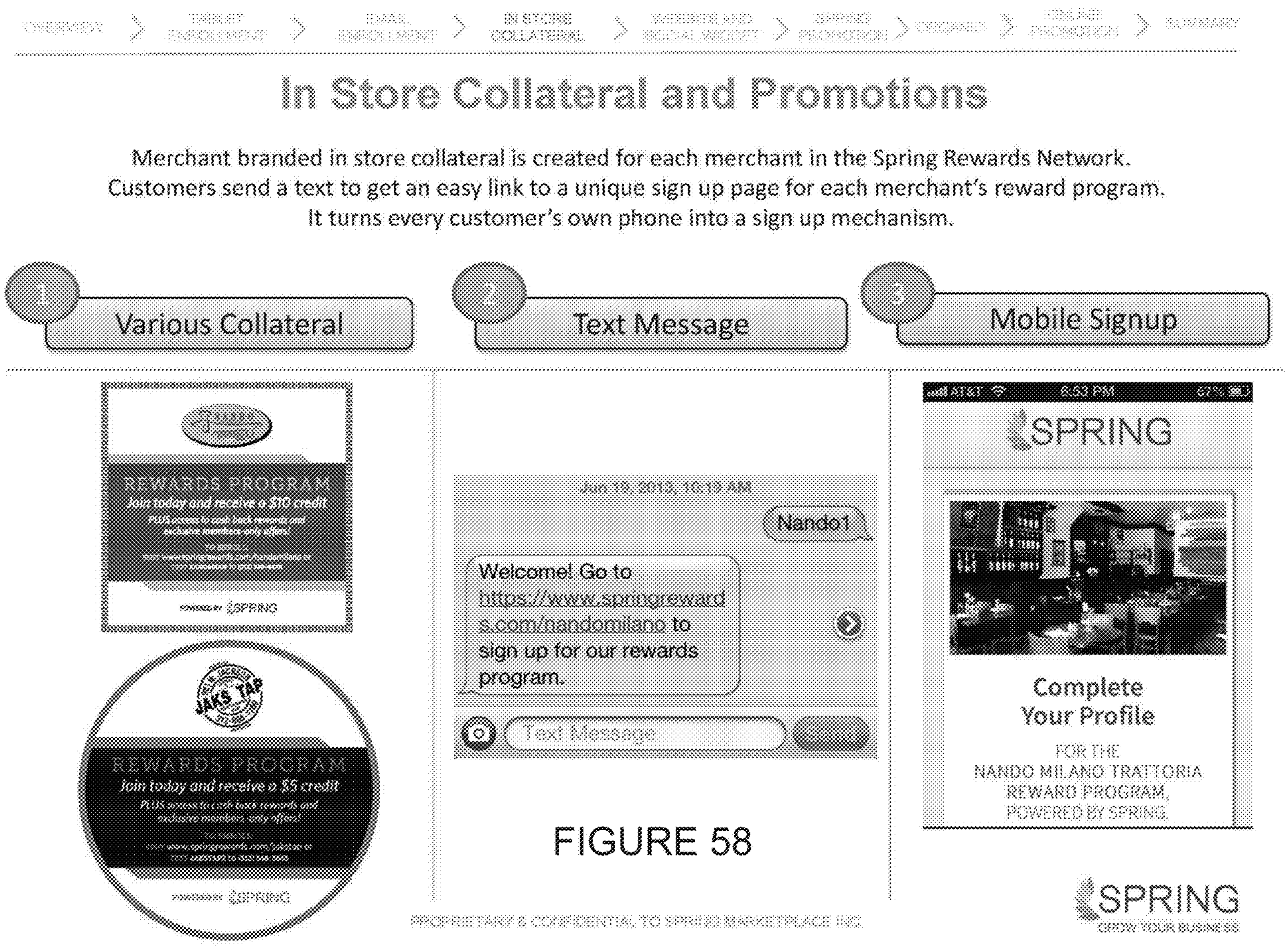
FIG. 58 illustrates another GUI of an embodiment of the invention.
Figure 59:
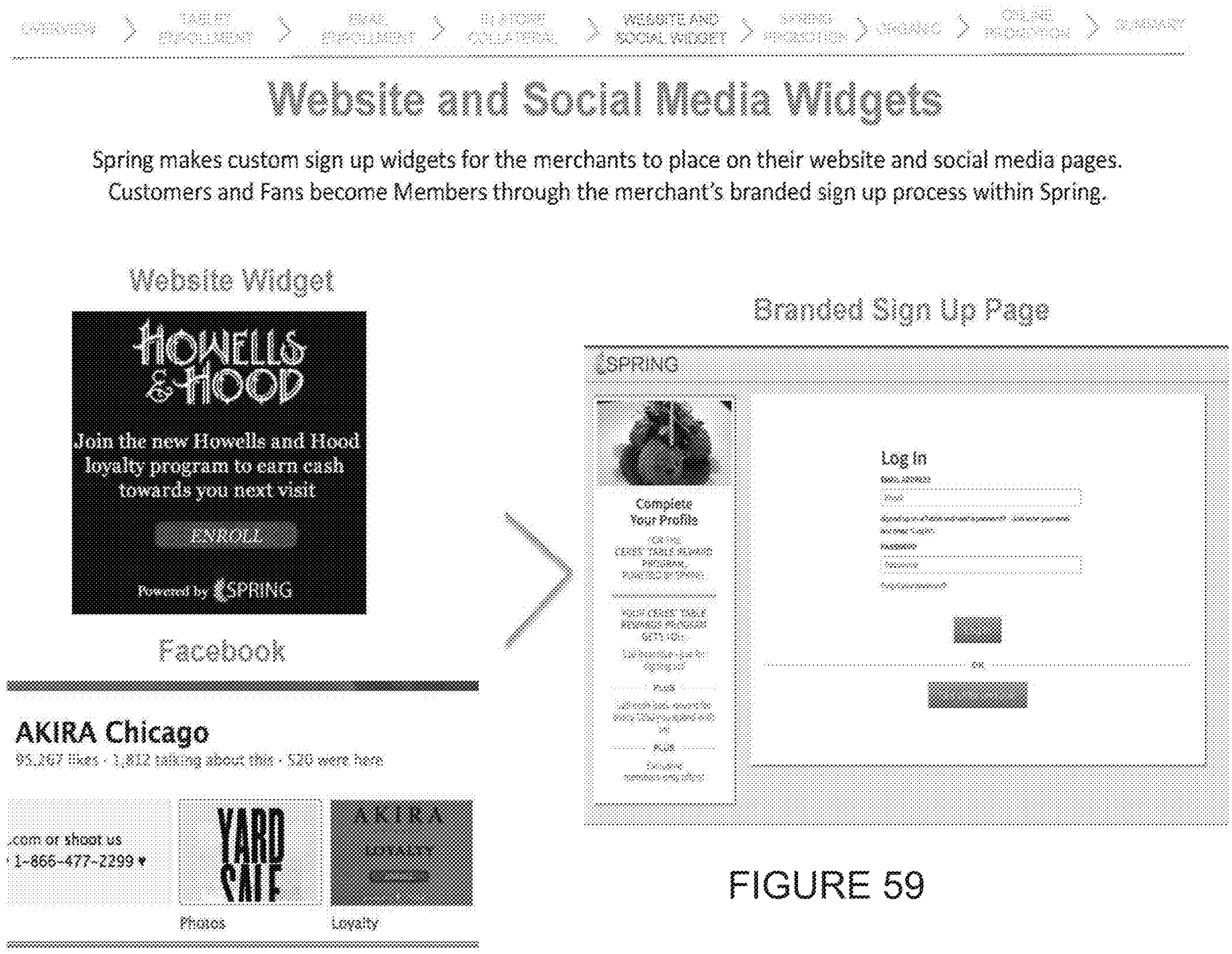
FIG. 59 illustrates another GUI of an embodiment of the invention.
Figure 60:
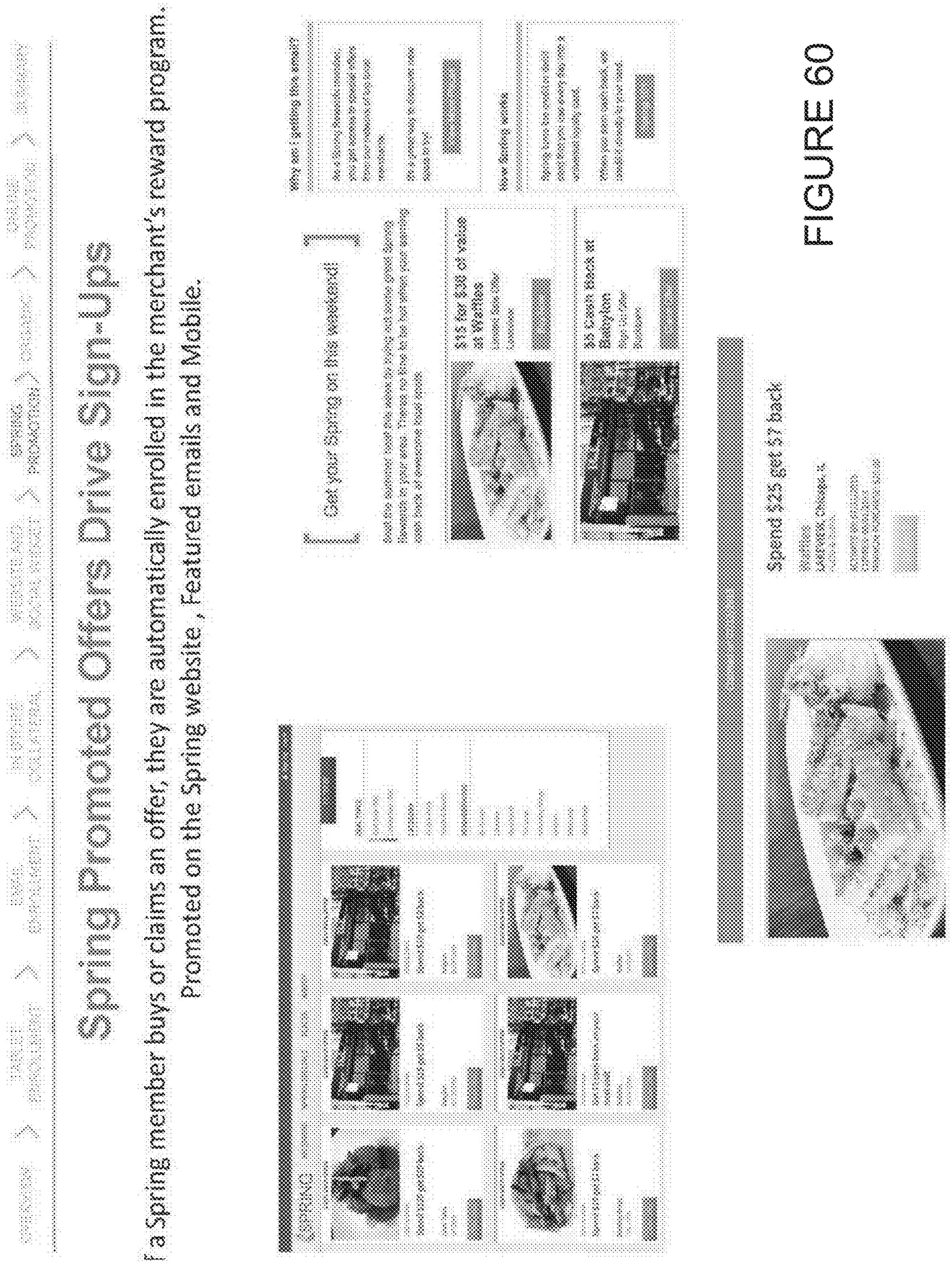
FIG. 60 illustrates another GUI of an embodiment of the invention.
Figure 61:
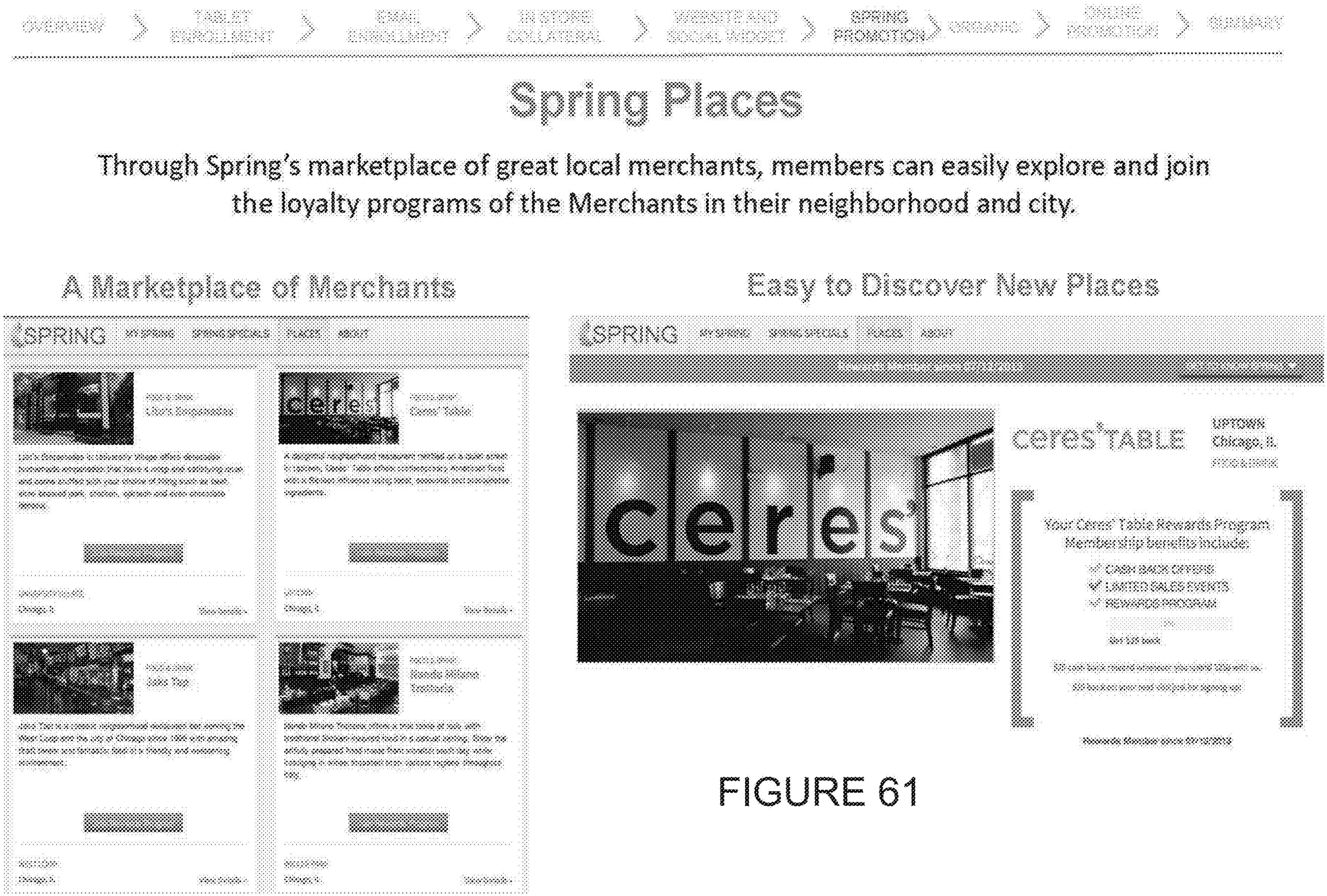
FIG. 61 illustrates another GUI of an embodiment of the invention.
Figure 62:
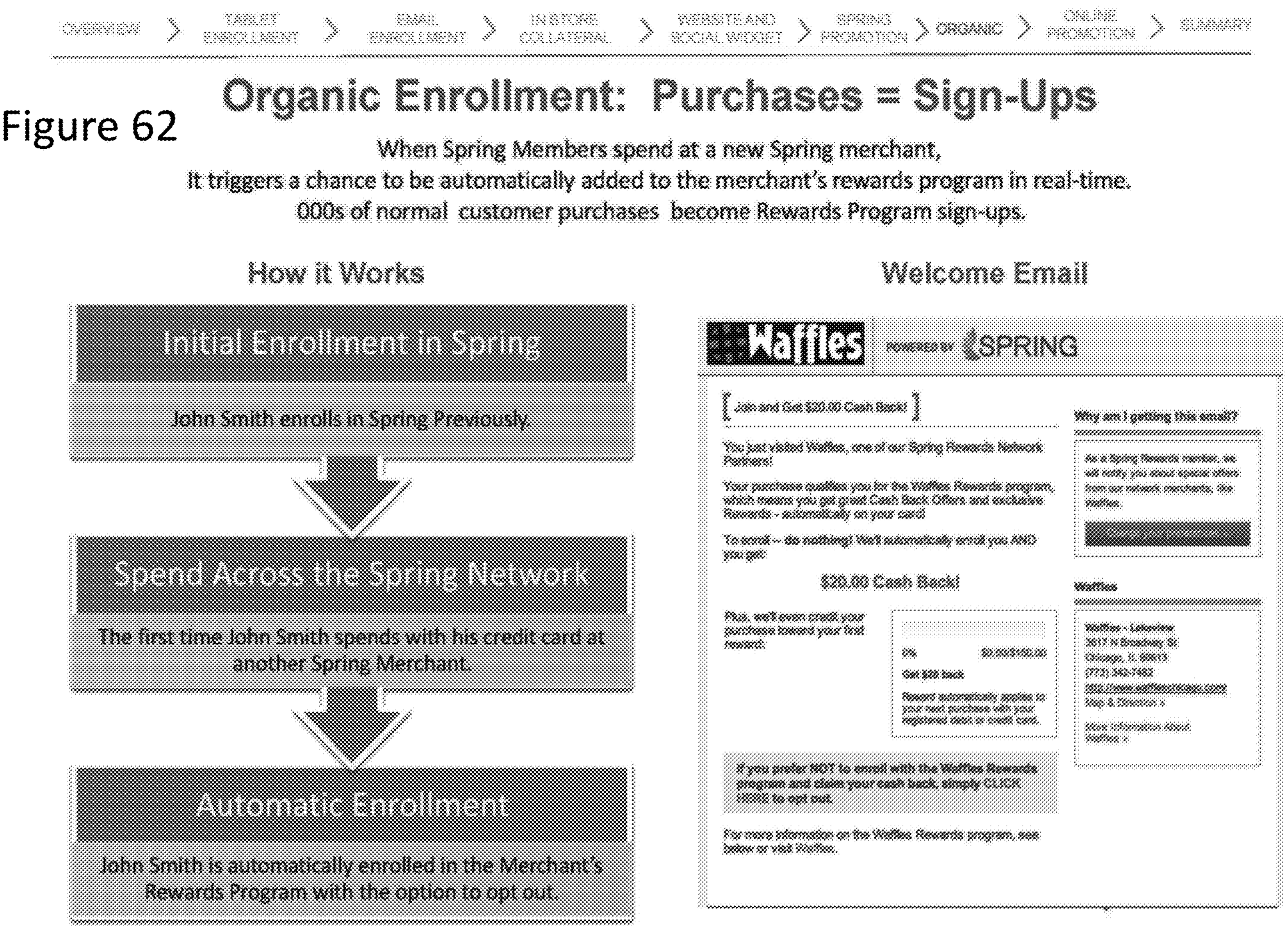
FIG. 62 rewards program enrollment features according to one embodiment of the present invention.
Figure 64:
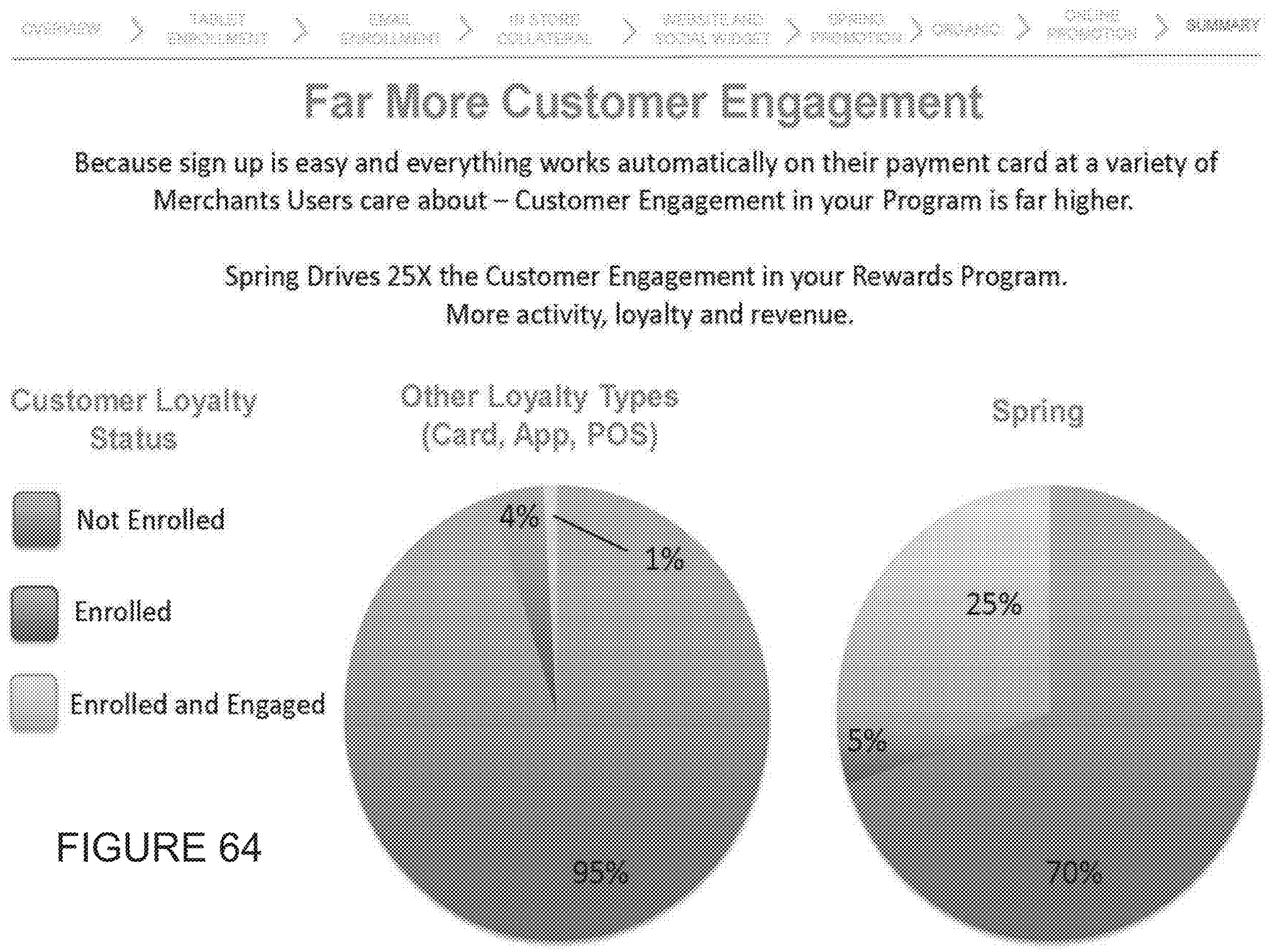
FIG. 64 illustrates another GUI of an embodiment of the invention.
Figure 66:
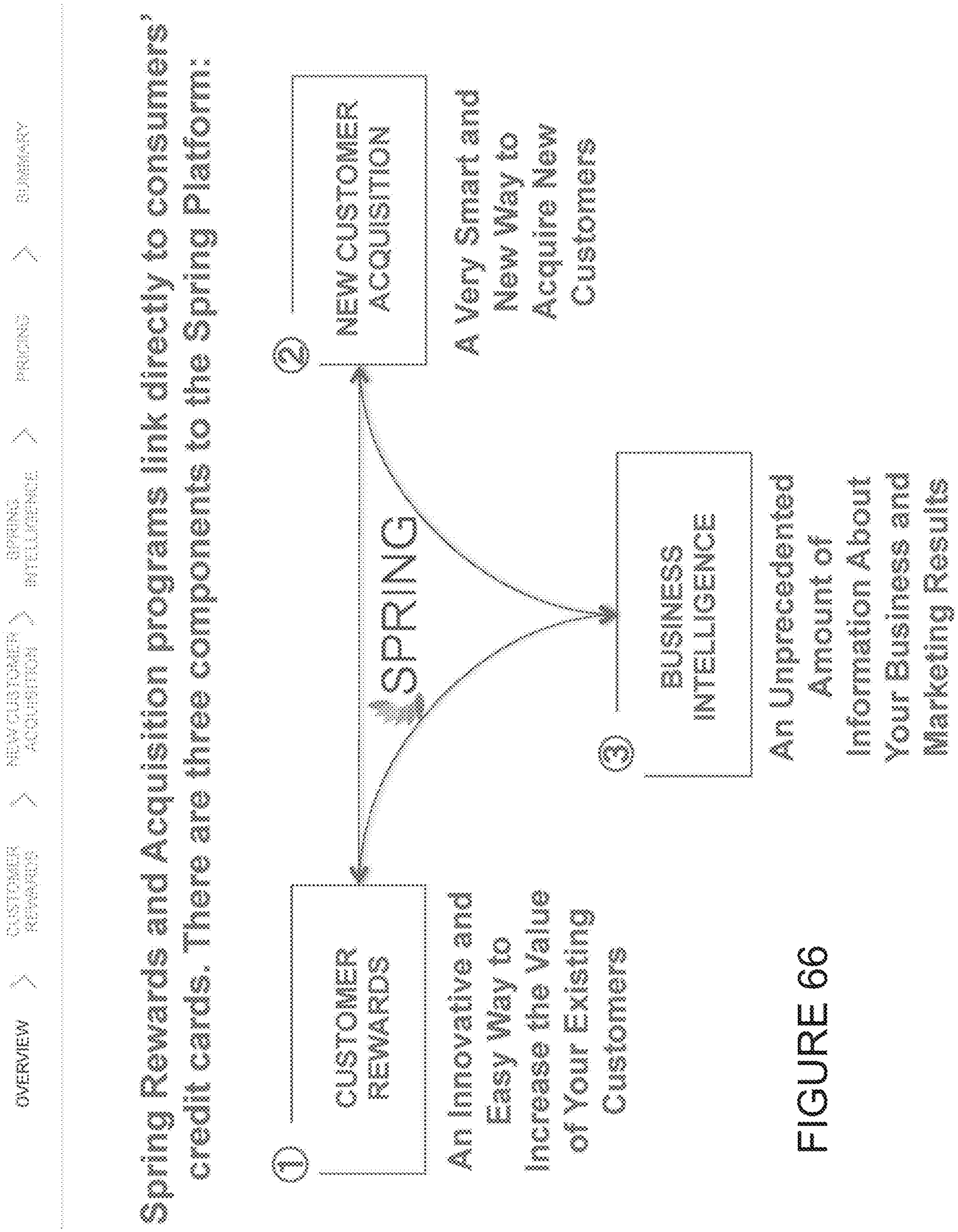
FIG. 66 illustrates another GUI of an embodiment of the invention.
Figure 68:
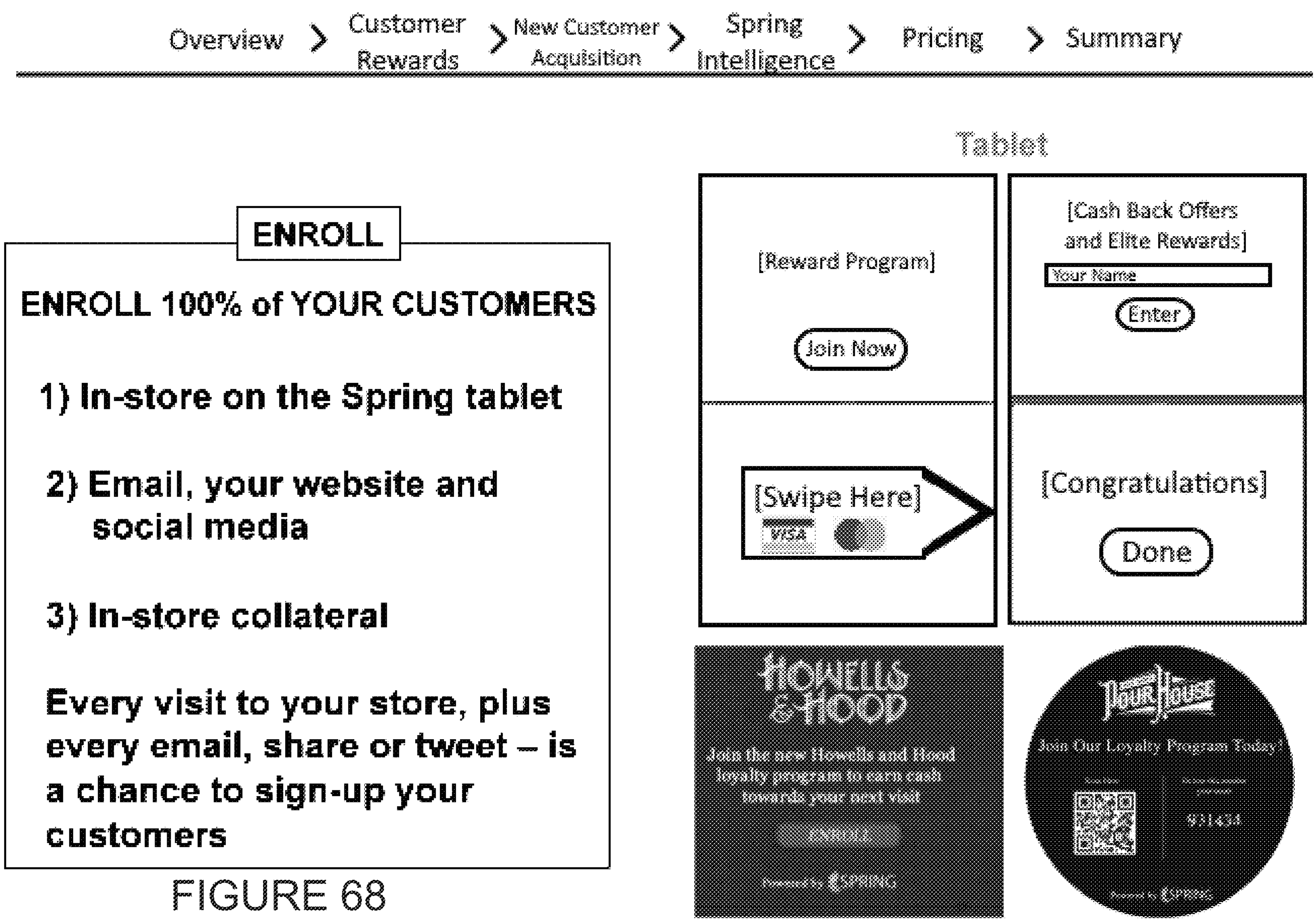
FIG. 68 illustrates another GUI of an embodiment of the invention.
Figure 69:
FIG. 69 illustrates another GUI of an embodiment of the invention.
Figure 70:
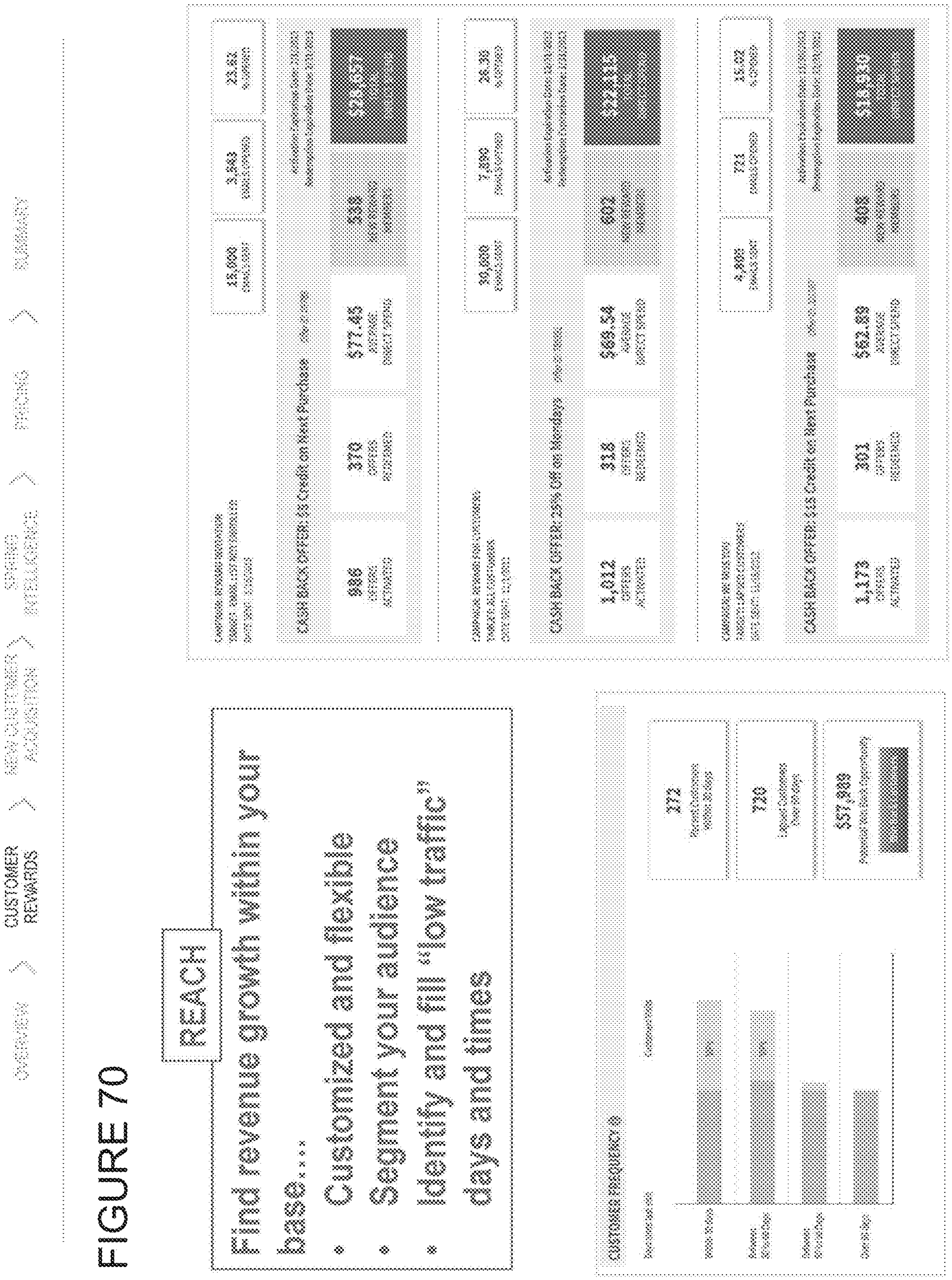
FIG. 70 illustrates another GUI of an embodiment of the invention.
Figure 71:
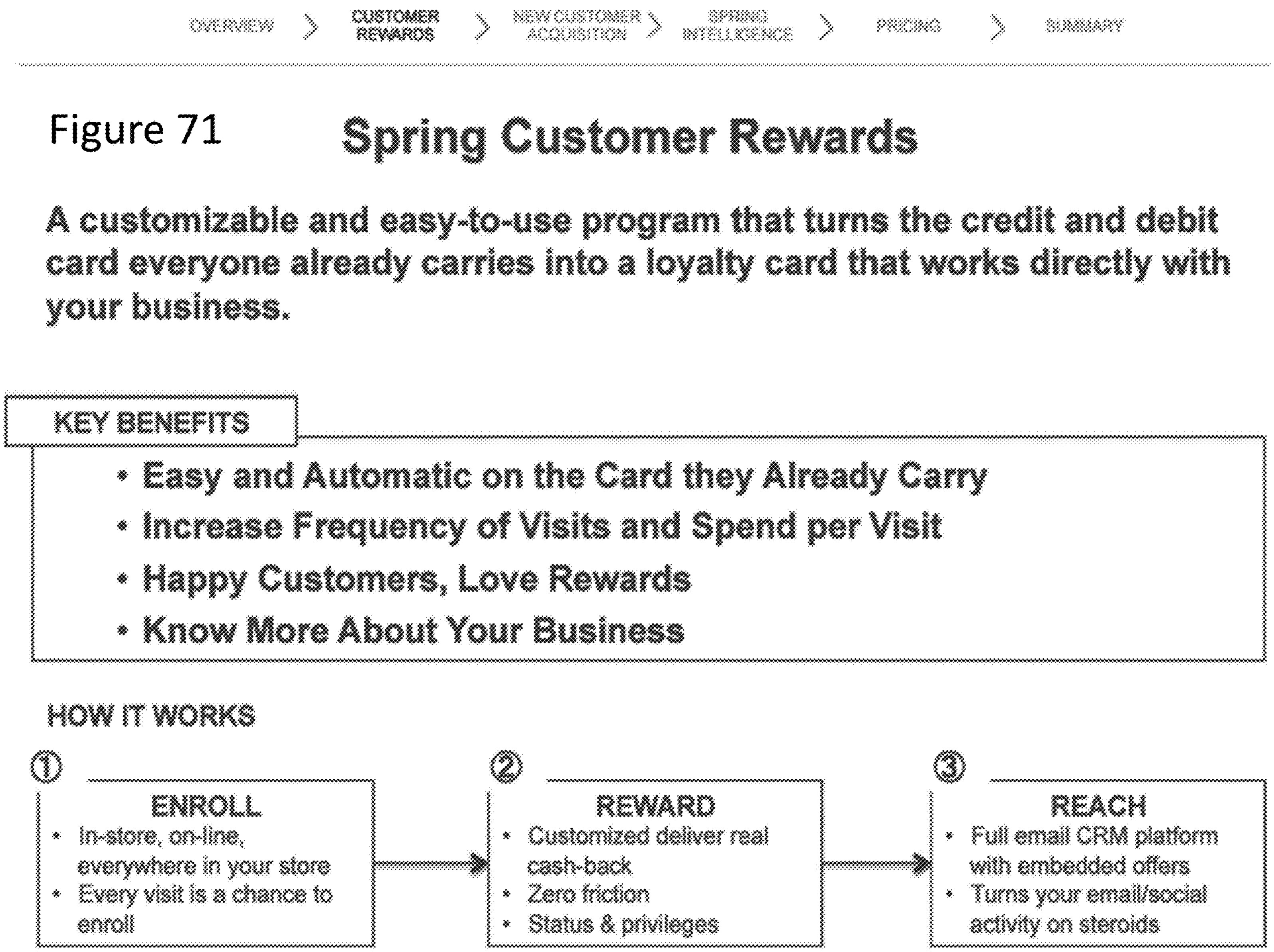
FIG. 71 illustrates credit and debit card enrollment features and benefits according to one embodiment of the present invention.
Figure 74:
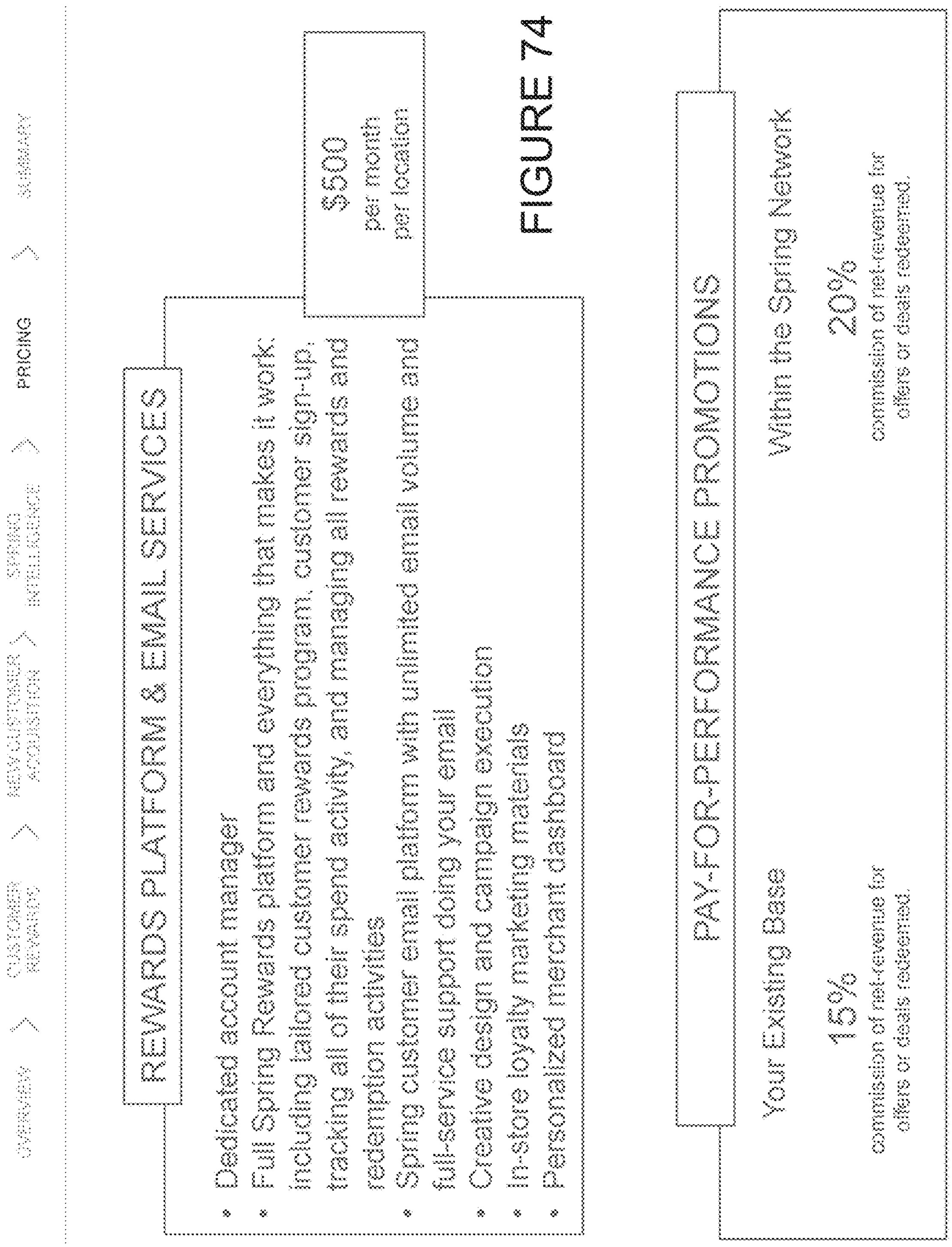
FIG. 74 illustrates another GUI of an embodiment of the invention.
Figure 75:
FIG. 75 illustrates another GUI of an embodiment of the invention.
Figure 76:
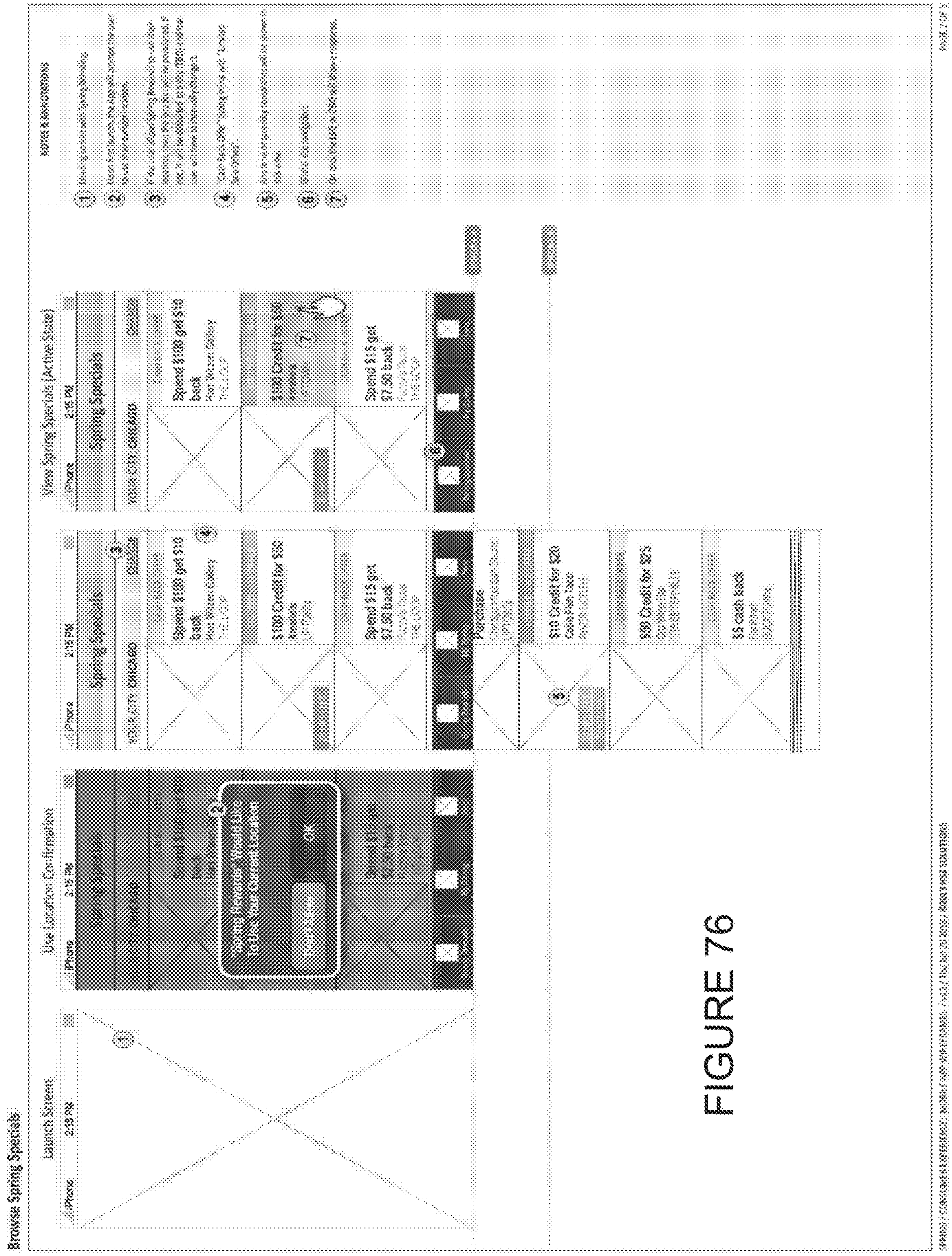
FIG. 76 illustrates another GUI of an embodiment of the invention.
Figure 77:
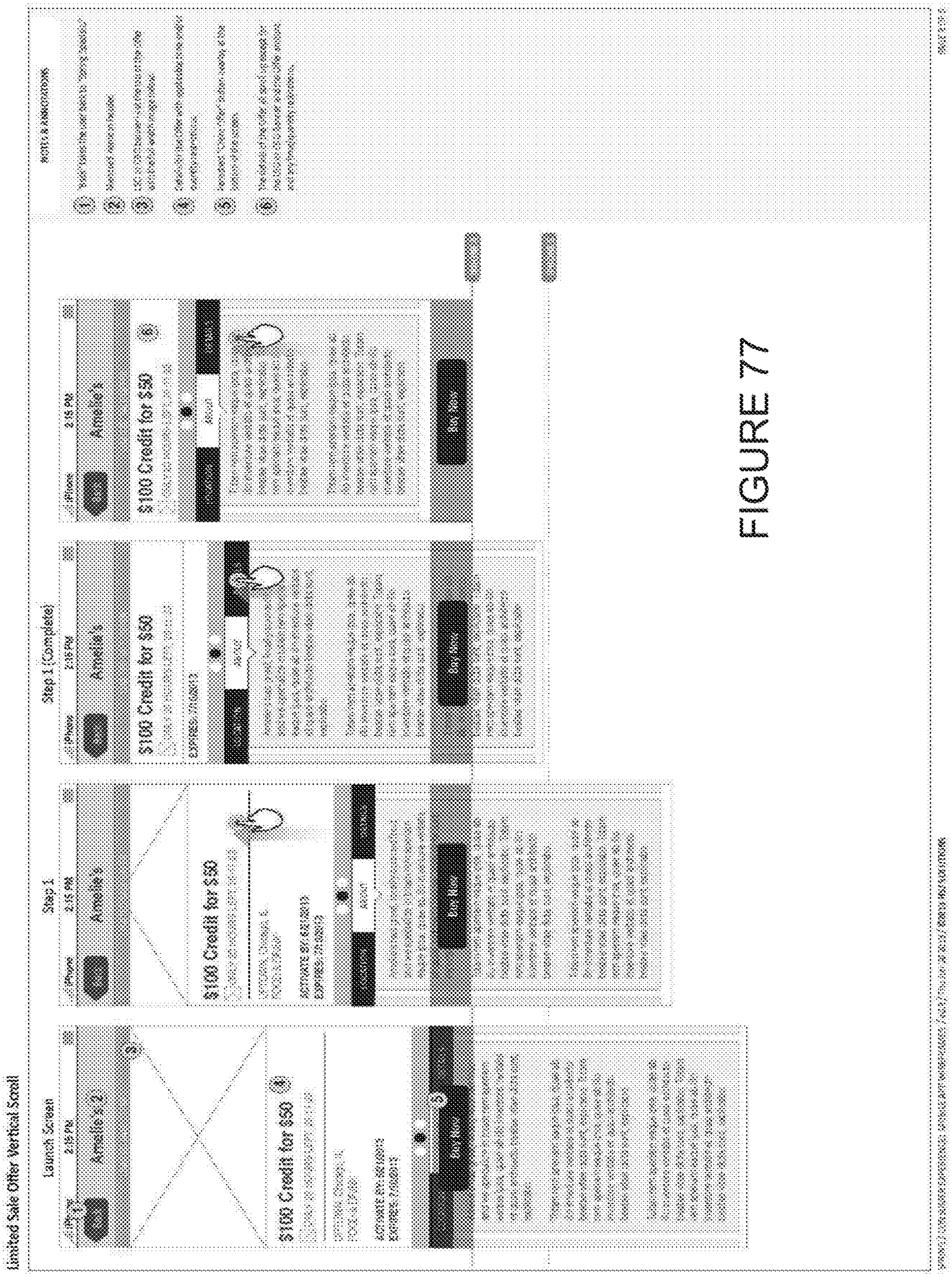
FIG. 77 illustrates another GUI of an embodiment of the invention.
Figure 78:
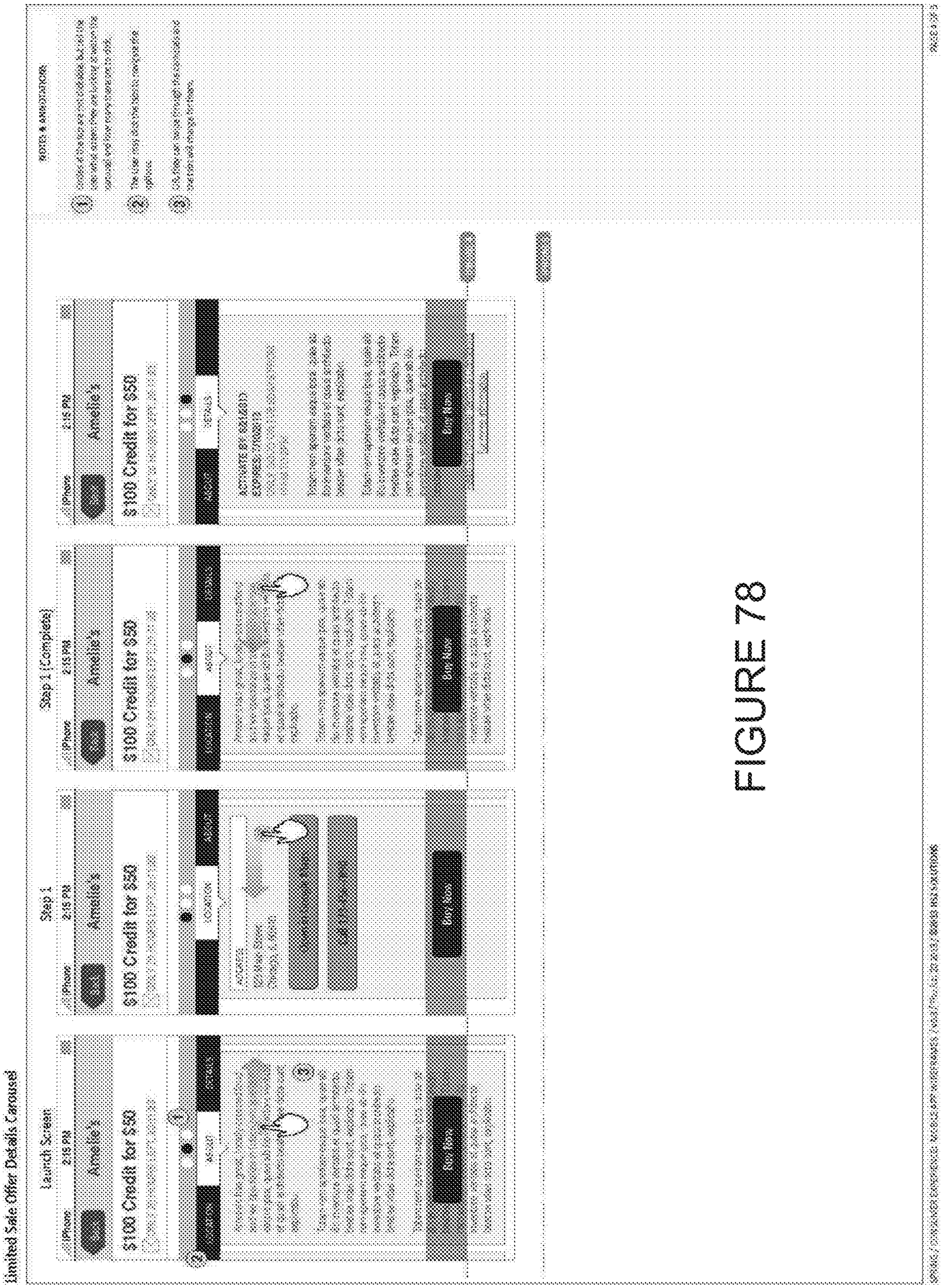
FIG. 78 illustrates another GUI of an embodiment of the invention.
Figure 79:
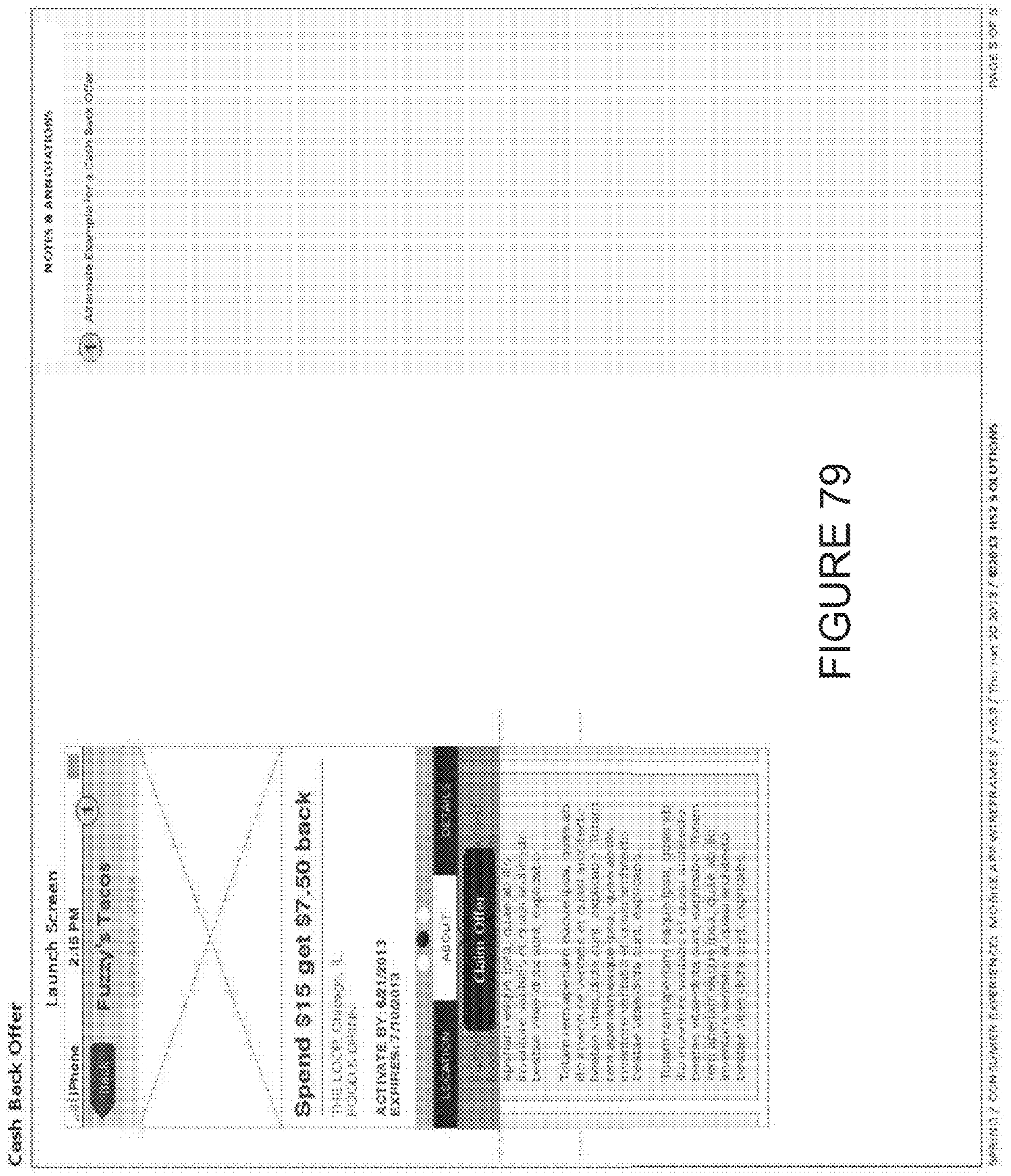
FIG. 79 illustrates another GUI of an embodiment of the invention.
Figure 80:
FIG. 80 illustrates another GUI of an embodiment of the invention.
Figure 81:
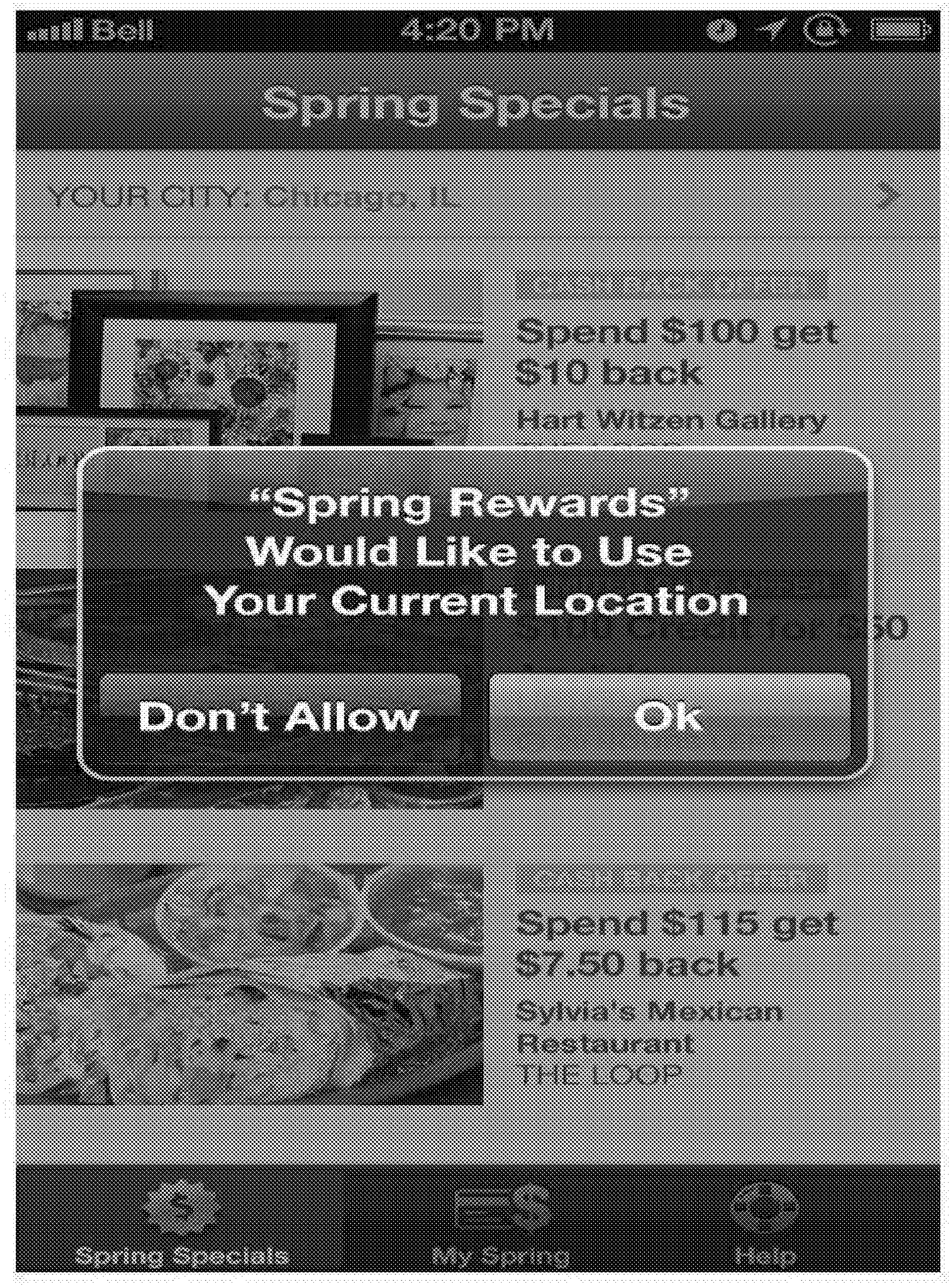
FIG. 81 illustrates another GUI of an embodiment of the invention.
Figure 82:
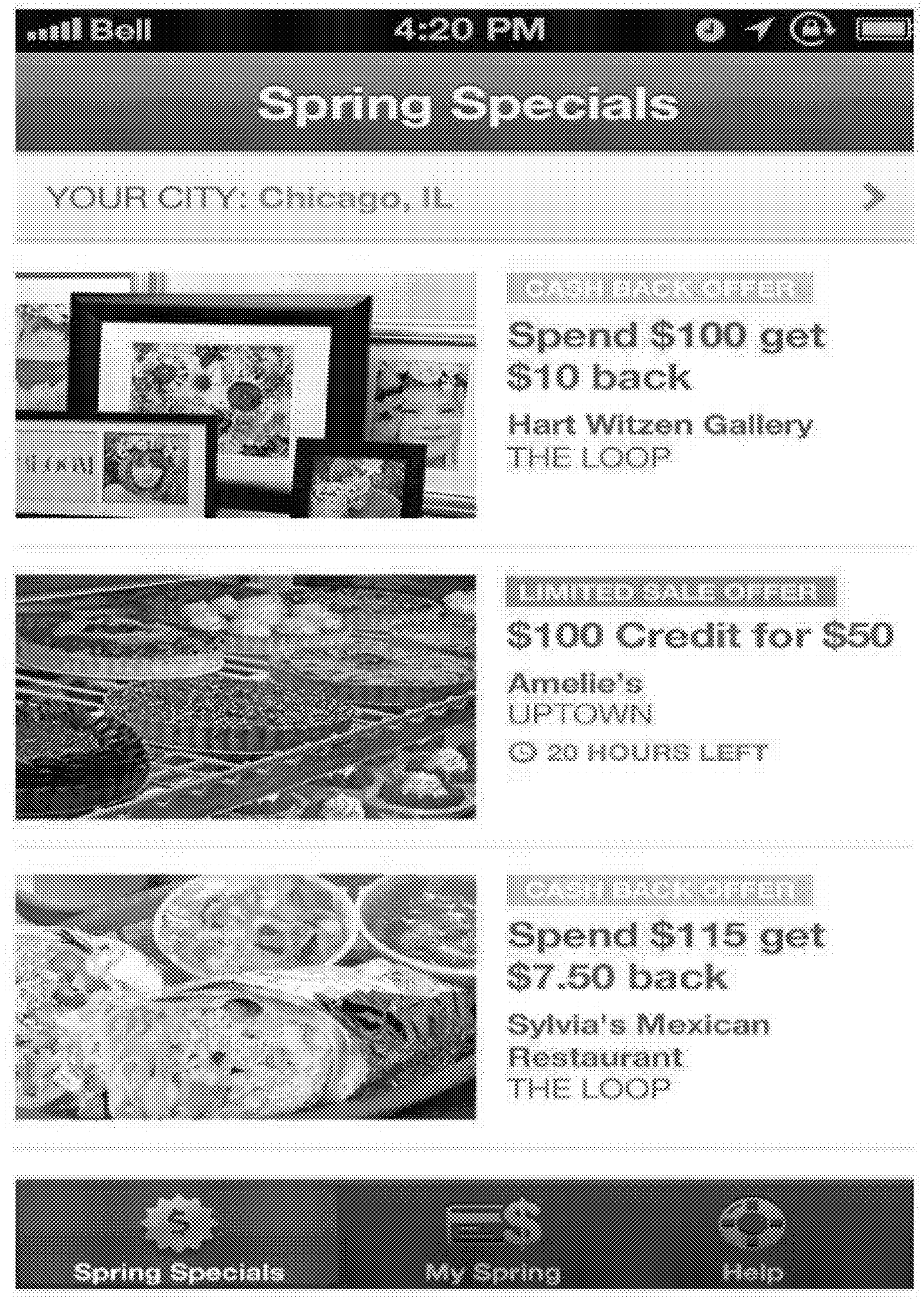
FIG. 82 illustrates another GUI of an embodiment of the invention.
Figure 83:
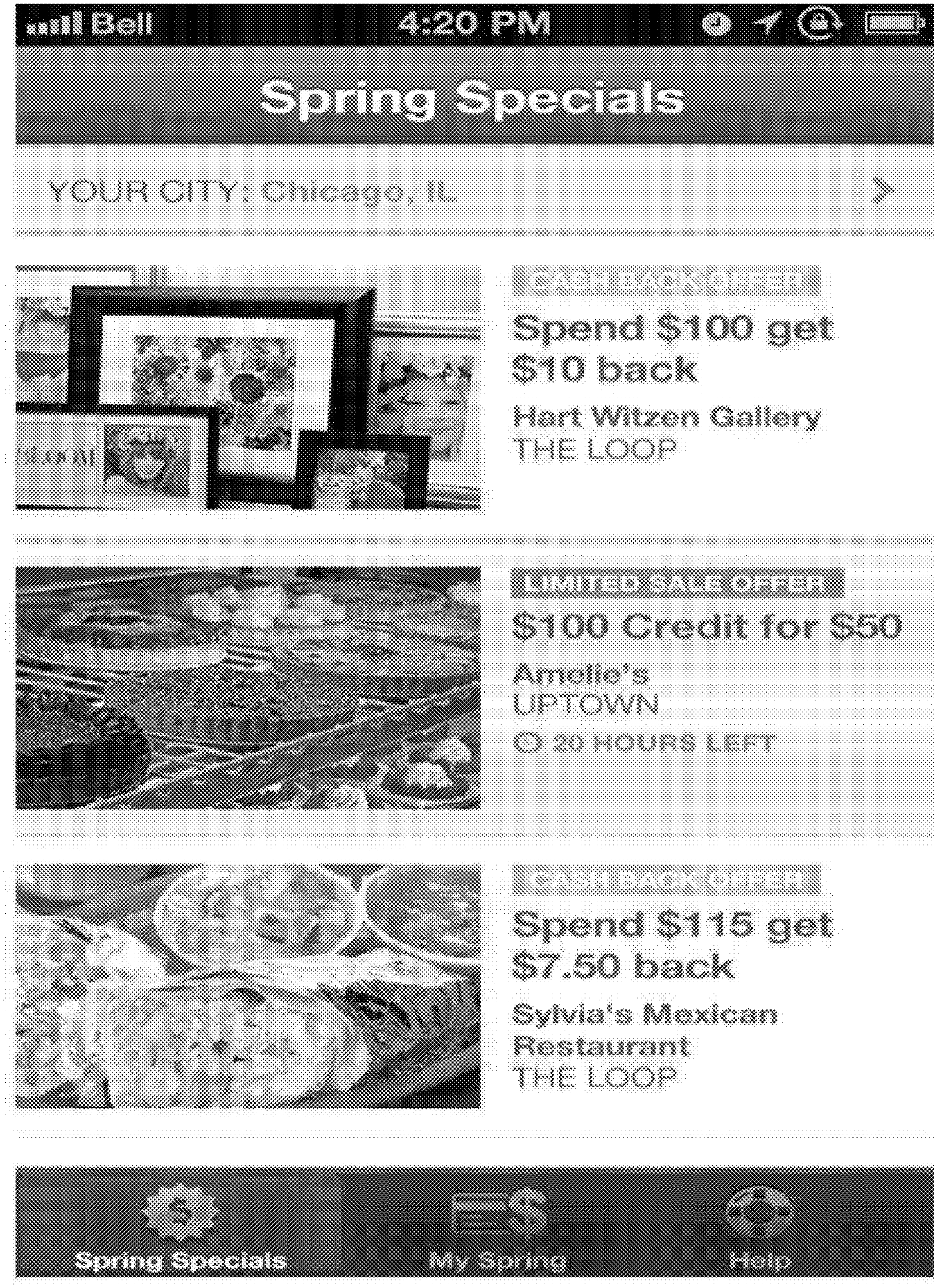
FIG. 83 illustrates another GUI of an embodiment of the invention.
Figure 84:
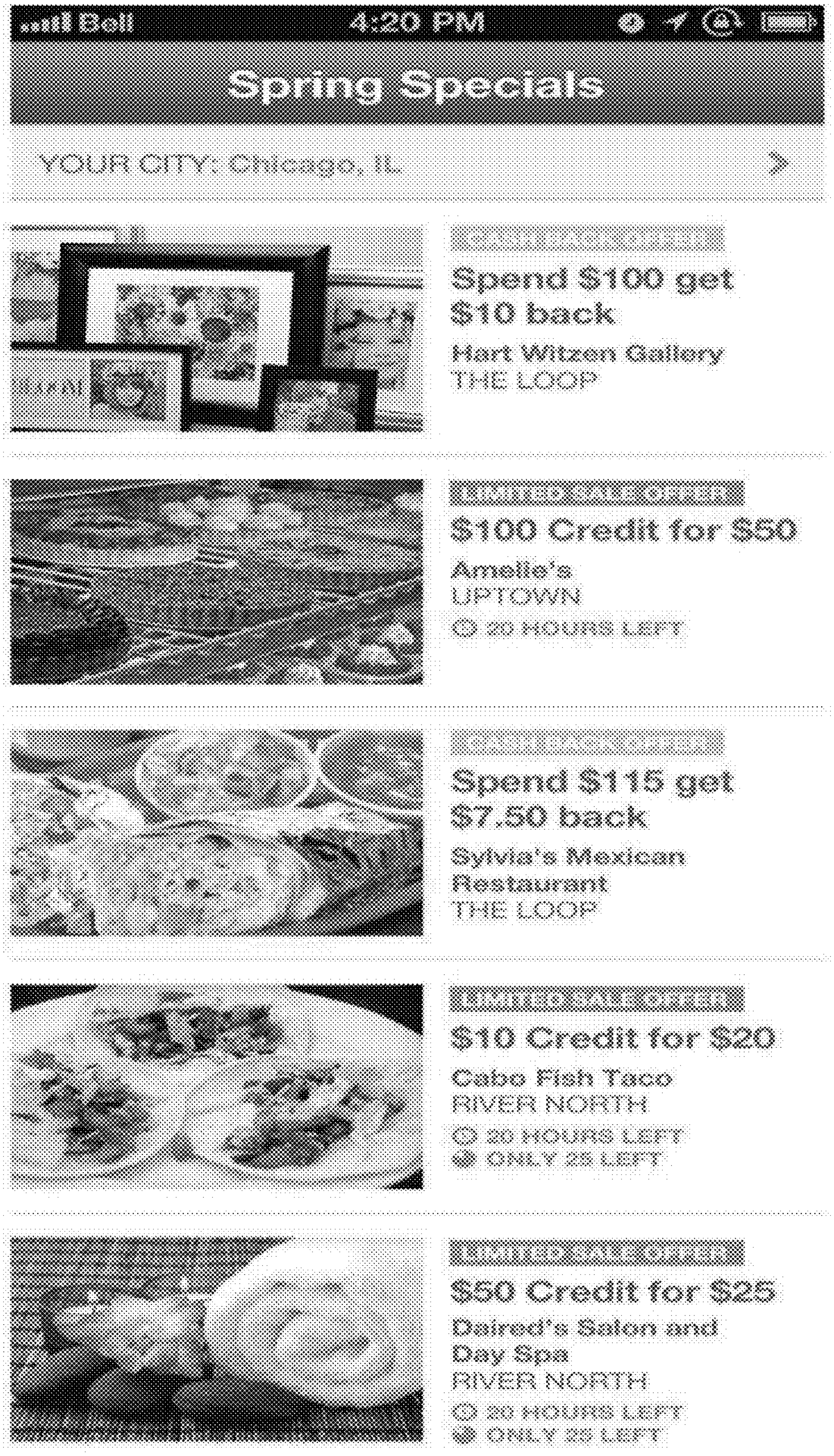
FIG. 84 illustrates another GUI of an embodiment of the invention.

FIGS. 3-84 illustrate graphic user interface (GUI) diagrams of embodiments of the invention (corresponds to GUIs from PPA).

Figure 85:
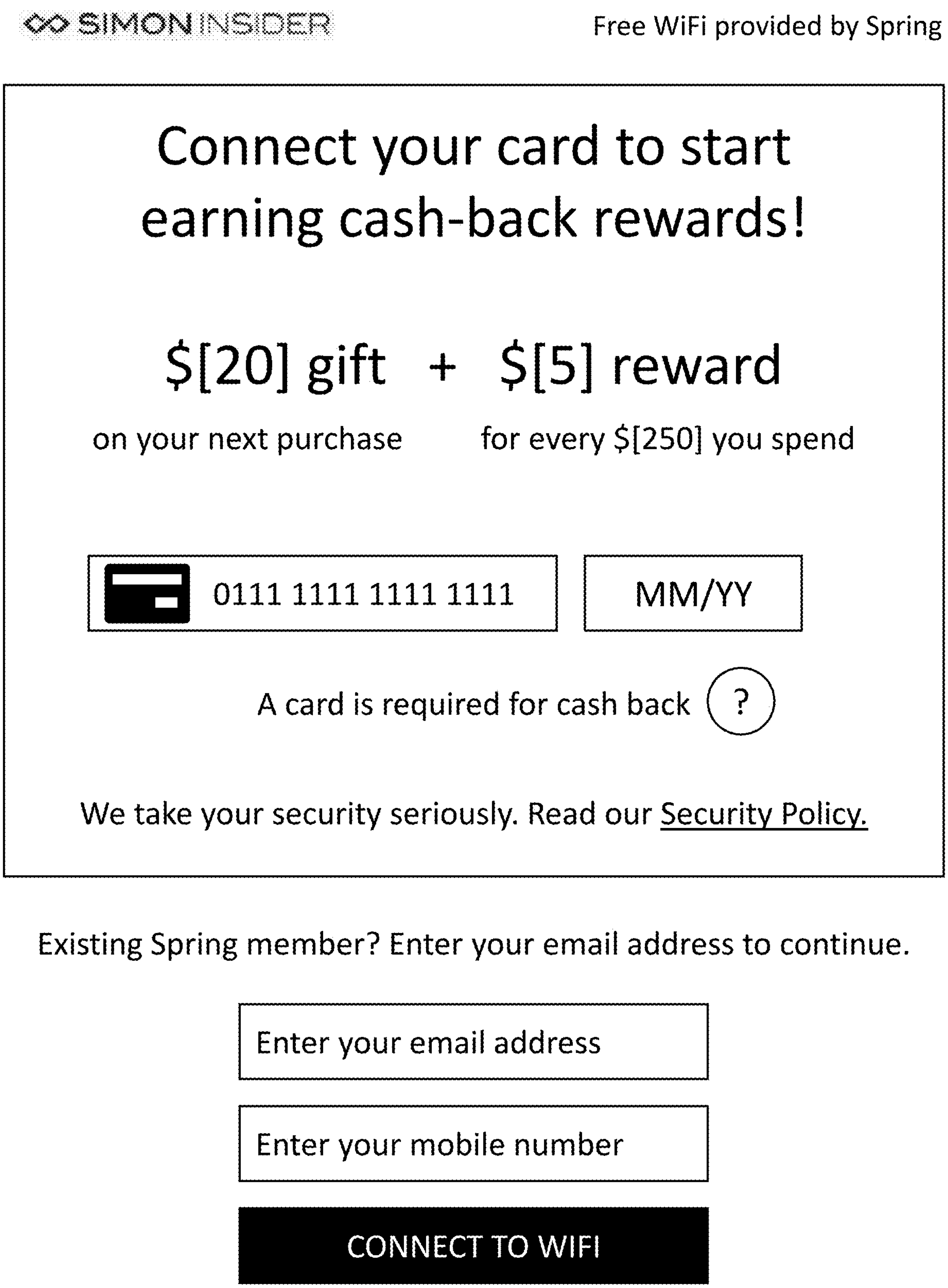
FIG. 85 illustrates for a WiFi enrollment system according to one embodiment of the present invention.
Figure 86:
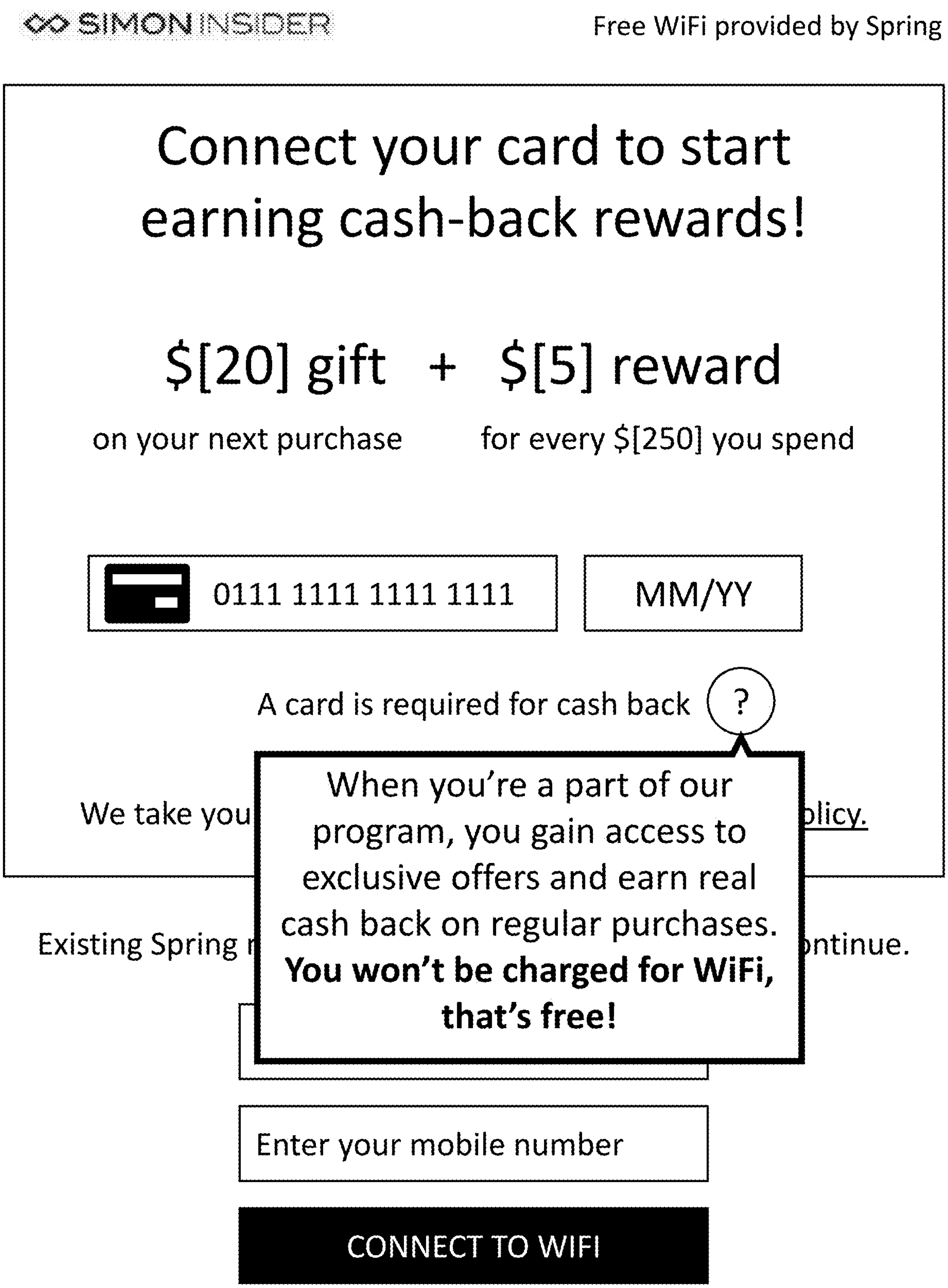
FIG. 86 illustrates another GUI of an embodiment of the invention.

Another embodiment of the present invention includes using a WiFi captive web portal to enroll users in the platform of the present invention. FIG. 85 and FIG. 86 illustrate two embodiments of utilizing a WiFi captive web portal according to the present invention. Upon receiving a request from an electronic user device to access WiFi at a merchant location, a page is displayed on the electronic user device which prompts entry of a credit or debit card number and expiration date. Fields in which to enter an email address and phone number are also preferably displayed on the page. The page also displays fields for an existing user to enter an email address and phone number to login to their account to access WiFi. In one embodiment, registering with the platform or logging into the platform is required to access the WiFi.

The credit or debit card number is preferably encrypted on the electronic user device requesting WiFi access using public and private key pairs. The platform database is operable to unencrypt the credit or debit card number and enroll the associated card in the platform. If enrollment in the platform is accomplished through the WiFi captive portal, the enrollment is confirmed in real-time via email, SMS, MMS, or other messaging. If more information or confirmation of the user's wish to enroll is needed, an email, SMS, MMS, or other messaging is used to prompt for this information or confirmation of the user's wish to enroll. In another embodiment, upon connecting to WiFi through the WiFi portal and not connecting a card or account to the platform, an SMS message, email, MMS, or other message is sent to the connected device or a provided phone or email account 5 minutes after connecting to the WiFi portal or signing up for the platform. Alternatively, the message is sent 10 minutes, 15 minutes, 20 minutes, 25 minutes, 30 minutes, 1 hour, 2 hours, 4 hours, etc. after connecting to the WiFi portal or signing up for the platform.

The WiFi portal preferably includes a field for a user to enter a mobile number to enroll their mobile device. For a user who has already provided a mobile number and wants to reconnect to the WiFi, a cookie shows that the mobile number has been entered and prevents the mobile number field from being displayed on the WiFi portal or shows the mobile number field filled in with the mobile number that has been entered. If a cookie shows that a mobile number was once entered but is no longer on the back end of the platform, the mobile number field is displayed on the portal.

Additionally, in one embodiment, a server in network communication with a wireless network hotspot is operable to detect and store a device identifier (ID) corresponding to a device attempting to connect to the hotspot and/or a device within detectable proximity of the wireless network hotspot. A device ID includes any of: a Media Access Control (MAC) Address, Internet Protocol (IP) address, a device name, a device serial number, or any other identification information transmitted by a device within a detectable proximity of the wireless network hotspot. Based on a location technology such as satellite-based global positioning signal provided by the device, a correlation of router location with detection data corresponding to the device, communication with wireless beacons, communication with a geofence server, etc., the server is operable to track a location of the device and determine shopping behaviors of device users in-store. For example, in one embodiment, a wireless network hotspot router in Store A identifies that Device A with MAC address A1-B2-C3-D4-E5-F6 attempts to connect to the network. The server logs the MAC address with the store location. The user logs into a Spring Account or provides an account identifier (e.g., a credit card number, a debit card number, a phone number, or an email address) through a captive web portal, and if the account identifier is associated with a consumer profile, the profile is updated to include the MAC address of the device. Alternatively, the MAC address (or IP address) of the device is associated with the consumer profile and/or account identifier upon registration of the consumer with the platform or upon the consumer accessing his or her Spring account on the device at any time, regardless of whether the device is within a proximity of the wireless network hotspot. If the account identifier is not associated with a consumer profile, then a new consumer profile is created based on the account identifier. Additionally, the system is operable to receive at time of interaction with a user an indication of a permission to create an account and send communication to the user. The indication of a permission to create an account is preferably received in response to a SMS, MMS, text, email, push notification, web-browser based notification, app-based notification, or any other type of electronic message sent by the system. When the user device leaves the store and subsequently connects to a second wireless network hotspot associated with or located in Store B, an indication of the device being located near or within Store B is tracked and stored in the consumer profile. Wireless network hotspots are operable to be linked to the Spring system on a per-router basis, wherein each merchant supplies a network router and opts into the Spring system or on a shopping locality basis, wherein a shopping locality management entity opts into the system for a network of routers.

The wireless network hotspot, a router of the wireless network hotspot, or a system in network communication with the router is operable to construct a physical presence indicator. In one embodiment, the physical presence indicator includes a physical presence record of a computer device connected to the hotspot or wireless network. The physical presence record includes at least one of: a geolocation of the wireless router, a geolocation of the computer device, or a geolocation of an associated merchant, store, or locality-based commerce location. In addition, the wireless network hotspot, router, or system in network communication is operable to construct the physical presence indicator by combining a device identification (ID) with the physical presence record. Thus, the physical presence indicator identifies a presence of the at least one device and a location of a computer device and a consumer. In a further embodiment, the computer device is operable to send consumer information to the wireless network hotspot, the router of the wireless network hotspot, or the system in network communication with the router, wherein the consumer information includes a device ID, records of online browsing and purchasing activity, digital cookies, a consumer account number, contact information, and other identifying information or information used for online and in-store purchasing behavior tracking and analysis.

In one embodiment, the device directly communicates and connects to the wireless network hotspot. In another embodiment, a router of the wireless network hotspot identifies devices broadcasting a device identification (ID), for example when searching for available wireless networks. Although the term "router" is used for convenience throughout the specification, the present invention incorporates one or more beacons to perform the same functions as a router in all embodiments in which the term "router" is used. By way of example, a beacon within close proximity to the consumer device identifies the consumer device using a device ID, requests the platform server to analyze consumer information relating to the device ID and/or create an offer specific to the device ID, and sends the offer to the consumer device. The beacon communicates with another beacon or a router to send the offer to the consumer device in another embodiment. In yet another embodiment, one or more beacons and/or routers determine a direction of movement of the consumer device by a comparison of device IDs within connectivity range and/or comparing a strength of a signal received from the consumer device.

Alternatively, digital cookies, single sign-ons (SSOs) through email, social media, digital media, or any other app or web-based account, web beacons, web bugs, and/or pixels are operable to be used for tracking device location history, browsing history, purchase history, or consumer account association. For convenience, the term "cookie" is used throughout the specification; however, the term "cookie" denotes any type of tracking technology for web, app, or device based activity. For example, upon connecting to a wireless network hotspot and connecting to a captive web portal, the server identifies a digital cookie stored on the device indicating previous activity associated with the device, including, for example: information about connection to a previous wireless network hotspot within the system, merchant websites visited, merchant items purchased, offers redeemed, or pre-approved offers communicated to the device. In one embodiment, this information is packaged into a network activity record. The network activity record is operable to be stored on a device associated with the online activity or stored in a consumer profile associated with the device or the consumer of the device. The network services tier, the at least one mobile computing device, and/or the remote server computer is operable to create the network activity record. The at least one mobile computing device and/or the platform database on the remote server computer is operable to store the network activity record and update the network activity record in real-time or near real-time.

Advantageously, consumer information including email address(es), phone number(s), and device identification number(s) are correlated with specific in-store and online activity including spend amounts, spend frequencies, spend times, spend locations, presence at stores including duration of presence, time of presence, and specific, online activity including browsing, app activity, social media activity, email activity, etc. Email activity includes which emails are opened, which emails are deleted, which email lists are recently subscribed to, which email lists are recently unsubscribed to, etc. Combining this consumer information with real-time or near real-time presence of a consumer device detected via a wireless router or other geo-location methods enables for more effective targeted offers than the prior art.

System detection, registration, and tracking are also available in one embodiment through a mobile application installed on a device. When a device enters a shopping establishment (e.g., a store or shopping mall), the mobile application identifies that the device is within proximity of a geographic location of the shopping establishment, within detection range of a wireless network hotspot associated with the system, or within detection range of a wireless beacon associated with a geofence of the shopping establishment. The detection information is then transmitted to the server and stored for analytics and offers. Notably, any consumer information stored by the system of the present invention is operable to be used for analytics and offers. This consumer information includes, by way of example and not limitation, purchase activity including amount, date, and location. The purchase activity is specific to stores located within a shopping establishment or mall in one embodiment. Alternatively, the purchase activity is all purchase activity associated with one or more consumer accounts linked to the Spring platform. Consumer information also includes any other information associated with the consumer and stored by the platform such as historical, real-time, or near real-time location data of consumer devices, offers previously sent to consumer devices, offers previously accepted by consumer devices, rewards earned by a consumer account, etc. In one embodiment, if the mobile application detects that a user is within a store that the user has previously redeemed an offer, the application or the server transmits a notification to the device indicating that the user is operable to use the redeemed offer on a purchase.

Alternatively, a server or other device associated with a router identifies when a consumer device is within connection range of the router or is connected to the router, notifies the Spring platform server, and the Spring platform server performs analytics and generates an offer which the platform server, the server associated with the router, or other device associated with the router sends to the consumer device.

Analytics includes analysis of any of the information stored in the Spring platform server for the consumer account profile associated with the consumer device and/or other consumer account profiles with similar information or demographics. Analysis is preferably performed by the Spring platform server or by an analytics engine running on the Spring platform server. Alternatively, a server or other device associated with the router stores consumer profile information locally for consumer accounts associated with consumer devices that have previously connected to the router, and synchronizes this information with the Spring platform server computer at predetermined time intervals. The information is analyzed, individually or in combination, for the consumer and/or for other consumers with similar attributes or behavior to the consumer. By way of example, information analyzed includes the current location of the consumer device, historical locations of the consumer device, web browsing history including e-commerce webpage views, online purchases, online "cart" or "basket" additions, online searches, social media posts, likes, tweets, images, etc. of the consumer device or another consumer device associated with the consumer account, user activity such as activity by online friend(s) or follower(s) of a social media account associated with the consumer account including social media posts, likes, tweets, images, etc.

In a further embodiment, the Spring platform server is operable to request a credit score, a credit history, or a credit report from a server of a credit bureau (e.g., EQUIFAX, EXPERIAN, or TRANSUNION). The platform is operable to store the credit information, analyze the credit information, correlates it to other online and in-store behavior, and provide offers, incentives, or rewards based on the credit information or analysis of the credit information.

By way of example, upon a consumer device coming into connectivity range of a router, the router identifies the consumer device and sends an identity of the consumer device and the location of the consumer device to the platform server. The platform server then performs the analytics using any information stored on the platform server. In this example, the platform server determines which stores are within a proximity to the consumer device and then analyzes the information stored on the platform server for the consumer account to determine which offers currently offered by those stores match the information stored for that consumer account. In this example, the platform server computer determines that location history for the consumer device indicates that the consumer device previously spent 10 minutes inside Store A. Additionally, the platform server computer determines that the browsing history associated with the consumer device includes searches for luggage from earlier in the day, and that the social media account of the consumer includes a post from the prior day that indicates that the consumer is excited to travel to Chicago on Monday. Based on the information that the consumer is interested in luggage, has a timeline of purchase by next Monday, and is in close proximity to Store B (determined by comparing the device location to a map of the shopping center), the platform server computer determines that an offer of 25% off luggage from Store B, which is right next to Store A, is appropriate to send to the consumer. The platform server creates this offer, sends the offer to the router or a server or other device associated with the router, and the router pushes the notification to the consumer device. Alternatively, the platform server sends the offer directly to the consumer device.

In another example, the platform server receives a current location of the consumer device in the same method as described in the previous example, and the platform server performs analytics on the information stored in the consumer profile associated with the consumer device. In this example, the consumer account includes two past records of transactions at Store A and one historical record of the consumer device at Store A that did not result in a transaction. The two past records of transactions at Store A occurred with redemptions of offers associated with the platform. Upon analysis of this information, the platform server determines that an offer for Store A should be pushed to the consumer device, and the offer is pushed to the consumer device as in the previous example.

In yet another example, a cookie or other web tracker indicates that the consumer device is browsing a website of Store A. The cookie or other web tracker sends notification to the platform server that the consumer device is browsing the website of Store A, and the platform server analyzes this information along with the information in the consumer profile to determine whether an offer should be sent to the consumer device. The consumer profile includes information that shows the consumer device was present in the brick and mortar Store A within the last week. Furthermore, the consumer profile includes information that shows that the consumer device was present in competing Store B within the last week and that the consumer device browsed Store B's website and added an item to the shopping cart, but has not yet purchased the item. Based on this analysis, the server determines that an offer should be sent to the consumer device. In one embodiment, the server sends a push notification to the consumer device with an offer for 10% off any purchase at Store A. Alternatively, the server emails or texts the offer to the consumer device. In yet another alternative, the offer appears in an "add-on," extension, app, or other mechanism of interfacing with the consumer through the web page on the consumer device. In another embodiment, the server communicates an offer for 15% off any purchase over $100 at the brick and mortar location.

Figure 91:
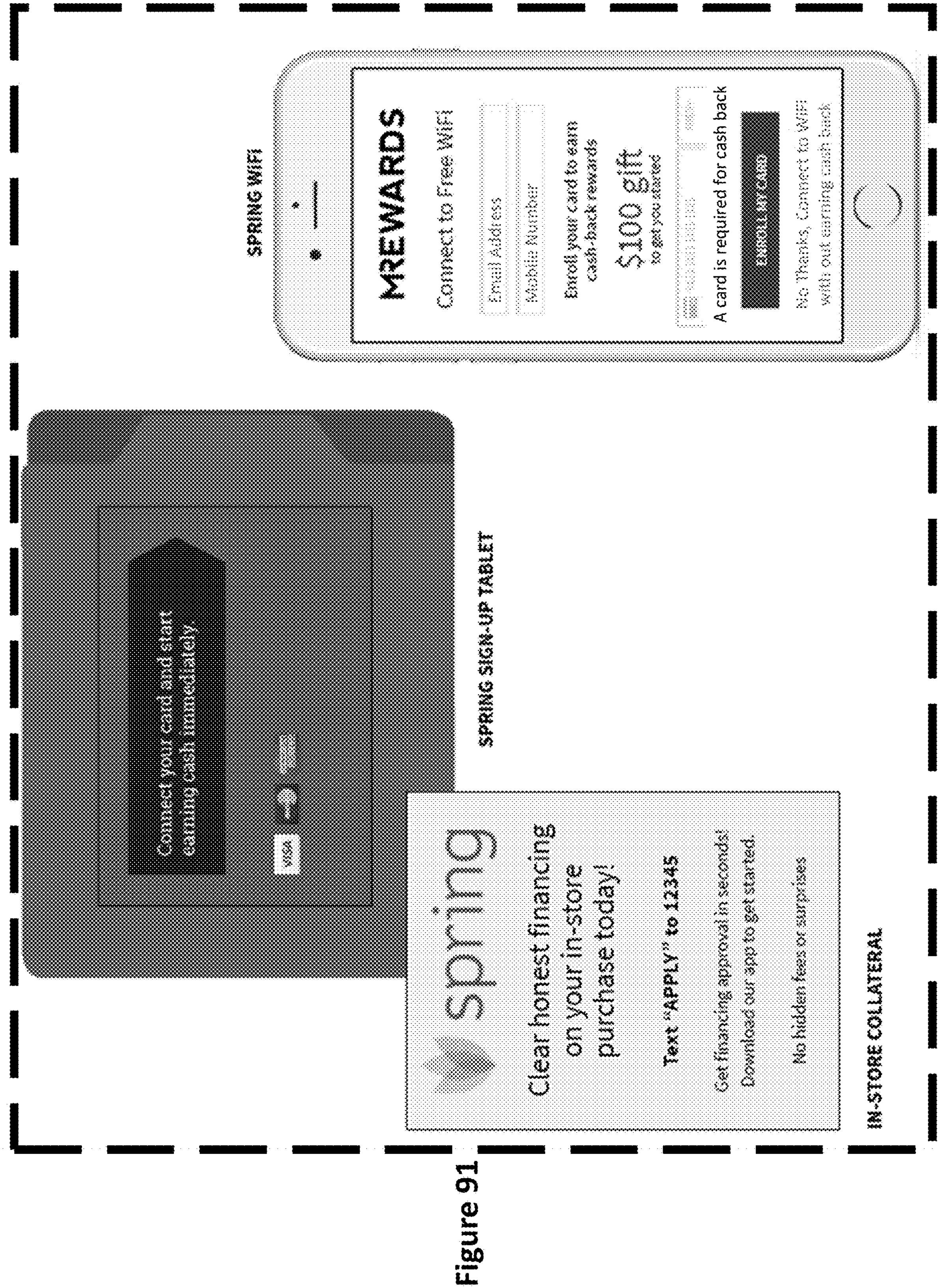
FIG. 91 illustrates a GUI diagram of a financing embodiment of the invention.

FIG. 91 illustrates one embodiment of a financing offer provided to a user based on device activity. In this embodiment, a consumer is operable to register by providing enrollment information through a captive web portal of the wireless network or through or through a initiating a transaction at a POS tablet. Based on this activity, the system is operable to provide offers, rewards, or incentives, such as a financing offer.

Online Purchase Tracking

An increasingly encountered problem by business is obtaining and matching analytics corresponding to consumers who visit or purchase in-store as well as online. This is a problem resulting from the rise of computer technology and was not encountered before computer networks and internet technology. Often, it is not possible to track user behavior in-store and then determine whether the same user is purchasing items online (or vice versa). Advantageously, the present invention solves this problem through, inter alia, a new system that obtains a new form of user behavior data from unique sources in order to obtain previously unavailable information about device behavior (and corresponding user behavior) both online and in-store.

The system of the present invention is operable to collect in-store data collected by the server or device (e.g., wireless network connection data, location history information, or credit card/debit card purchase history using a Spring-enabled account) and match the in-store data with browsing activity or purchases made through online stores corresponding to in-store merchants. In one embodiment, an account number (e.g., credit card number, debit card number, or other account indicator) is provided to a merchant website through a web browser on a computer device for purchasing an item. When the transaction is initiated, the Spring system identifies a consumer profile associated with the transaction and logs information about the purchase within the server. Additionally, the website is operable to store a cookie or other web or app tracker on the computer device detailing information about the transaction. In some embodiments, the cookie or other web or app tracker is encrypted such that account information and transaction history is only accessible through the Spring system.

Once a user visits a store, the system is operable to identify in-store behavior and match the in-store behavior to the online browsing or purchase history. In one embodiment, the in-store behavior is matched to the online behavior through identification of transactions made with the same account number (e.g., transactions made with the same credit card number, debit card number, or other account indicator), through identification of a digital cookie on at least one mobile device, or through identification of a presence of a mobile device associated with a consumer profile (e.g., through detection of the device within detection range of a wireless network hotspot, through the connection of a device MAC address or other device ID to a consumer profile, or through beacons which are operable to transmit Bluetooth or other wireless signals to a consumer device and recognize a device ID of the consumer device). In one embodiment, the online behavior and the in-store behavior originate on or are tracked on the same computer device. In a further embodiment, the computer device is a mobile phone. In a further embodiment, the browsing and the initiating of online transactions occurs through a merchant-specific application or a Spring system-based application.

The system is additionally operable to operate in a reverse method, wherein in-store behavior data associated with a consumer profile is used to match online user activity, including browsing or purchase activity. In this embodiment, location, transaction, and network information (e.g., from a wireless network hotspot, beacon, or a geofence) associated with a consumer profile is stored within the server. When online activity occurs, including browsing or purchasing through a merchant website, identifying information from the device, such as a device ID (e.g., a MAC address) or a digital cookie stored on the device, is retrieved by the server or sent to the server by the device or the merchant website. This identifying information is matched with a consumer profile and associated in-store activity. Notably, this provides a method for tracking both in-store and online activity of users and provides a method for providing relevant offers, rewards, or incentives to a consumer.

In one embodiment, online behavior is not limited to websites related to a merchant enrolled in the system. Instead, online behavior is operable to include browsing history and transaction history from a plurality of web sites not associated with merchants enrolled with the system. Browsing history and transaction history in this embodiment are obtained through collection of browsing activity through an application on a computer device, through collection of browsing history supplied by third-party websites, through identification of tracking cookies supplied to third-party websites and/or downloaded to devices that browse or initiate transactions on a third-party website, or through collection of a device ID (e.g., MAC address) associated with a device through third-party websites and supplied to the Spring system.

In-Store and Online Offers, Rewards, and Incentives

The combination of in-store and online behavior provides for unique marketing and shopping incentives to be targeted and delivered to consumers. For example, in one embodiment, the system identifies that a device within a shopping mall has been previously browsing a website for the store Pottery Barn and has been searching for kitchen tables on the web site. The system is operable to provide a notification to the device indicating an approved financing offer that can be redeemed by making a purchase at Pottery Barn.

Additionally, the system is operable to provide offers, incentives, and rewards to users browsing online for items. For example, if a consumer profile indicates that a user was shopping in-store at Pottery Barn and is currently browsing Pottery Barn's website, the system is operable to provide a notification to a device of the user providing a digital coupon that may be redeemed through Pottery Barn's website. Alternatively, if a consumer profile indicates that a consumer was shopping in-store at Pottery Barn and is currently browsing related products on a third party's website (ex: Costco, Amazon, Ikea, etc.), the system is operable to provide a notification to a device of the consumer providing a digital coupon, advertisement on the third party's website, email, text, or any other type of notification to the device of the consumer. This notification is store-specific in one embodiment, but alternatively is product specific or specific to a class of product. One or more routers or beacons is operable to determine historical locations of the consumer device within a store that correspond to a specific product or class of product in one embodiment. In yet another alternative, a product or class of products is added to a consumer profile stored on the platform server upon a consumer device scanning a bar code, QUICK RESPONSE code, or any other type of image capture, including taking a picture using a camera of the device, for a product or advertisement associated with a product or service. This information is used in subsequent analysis and offers.

The present invention further provides a method for matching and providing targeted advertisements to users based on in-store and online behaviors. For example, the system is operable to identify that a user device has been present within a Pottery Barn store and has purchased items on Pottery Barn's website. Based on this identification, the system is operable to interface with a third-party advertisement system or an internal advertisement system to match customers to relevant advertisements that correspond to their brick-and-mortar and online shopping behaviors. The system is operable to transmit the matched advertisements or the behavior data to a third party for delivery to a user and/or is operable to display the matched advertisements directly to a consumer when the consumer is browsing a site associated with the Spring system.

Third Party Partner Integration Scenarios

Third Party Partners are partner merchants, groups of merchants, malls, or any other party who provides for customer accounts, including cards, which may be part of an existing reward or offers program at that merchant, to be enrolled into the platform of the present invention. Preferably, the members or customers are able to enroll/unenroll accounts independently from any activities that occur on the platform. Advantageously, the present invention provides for Third Party Partner members to receive cash back directly to their enrolled accounts. Preferably, Third Party Partner members can convert reward "points" (or any other equivalent) balances to cash through the platform. Additionally, through the platform, Third Party Partner members can incentivize specific member actions (repeat visits, predetermined spend activities, i.e., where a certain product, good, service, time of day, day, spend level, purchase at a location, online purchase, and/or frequency of purchase through cash back. Third Party Partner members may be only Third Party Partner members and not be members of the platform of the present invention. Third Party Partner members may also be members of the platform of the present invention and also independently be Third Party Partner members. Challenge in integrating these "dual" members in the prior art include the fact that these dual members may add or remove cards from either program at any time, may associate cards with different email addresses in either program, and the passwords they use to protect their accounts may be different. These dual members may also receive email communications and text messages to members as they enroll themselves, their cards, claim offers and transact from either the platform of the present invention or from the Third Party program. The Third Party program and the platform of the present invention may include different web and mobile interfaces and links to these different web and mobile interfaces created using different programming.

Advantageously, the present invention provides for restricting enrollment in one mall or shopping center group if a user is enrolled in another mall or shopping center group. Preferably, upon a user who is enrolled in one mall or shopping center group attempting to enroll in the second mall or shopping center group via a transaction at a POS, electronically via email or an ad, via an app, or via any of the other enrollment mechanisms described above, the enrollment in the second mall or shopping center group is denied.

The present invention overcomes the challenges associated with integrating the functionality of the platform with the Third Party program. Particularly, the present invention provides for Third Party Partner Members to receive cash back on an enrolled card to enable the Third Party Partner to incentivize certain behaviors independent of a full offer experience. This includes, but is not limited to, allowing Third Party Partner members to convert point balances or any other type of reward balances to cash back or to award cash back for various user actions, such as repeat visit incentives. In one embodiment, this is accomplished by providing a secure Application Program Interface (API) to allow the Third Party Partner app or website to request a specific cash back amount to be placed on the account.

Authentication of API calls (examples of API calls include specific operations that client applications can invoke at runtime to perform specific tasks) are preferably performed over Hypertext Transfer Protocol Secure (HTTPS). To avoid PCI exposure for the Third Party Partner, API calls preferably originate in the client application. This is advantageous because it avoids the Third Party Partner's backend entirely, ensuring that the Partner is never directly in possession of credit card data. JSON Web Tokens are preferably used to authenticate all API calls, with each client application having a JSON Web Token (JWT) from the Partner backend before calling the Partner Notification API. Notably, JWTs expire, and the client application must request a new JWT from the partner backend upon expiration of a JWT. The client application passes the JWT in a custom HTTP header, preferably named X-JSON-Web-Token. Preferably, the JWT is encoded per the standard. The JAVASCRIPT Object Signing and Encryption (JOSE) header preferably specifies a RS256 algorithm. The Partner signs all JWTs with a private key, preferably with a minimum of 2048 bit length. The Partner shares the private key with the platform to verify the signature. In one embodiment, the JWT payload includes the following Claim Names: (1) the issuer is set to the partner_uuid supplied by the platform, (2) the subject is set to the consumer_id generated and maintained by the Partner, (3) the Issued At is set to the date that the token is generated, and (4) the expiration date is set to a future date.

All API calls are scoped by the authentication token. For security, the API will respond with a 401 Unauthorized message if any of the following are untrue: the algorithm specified is not RS256, the signature could not be verified, the issuer is not recognized, the issuer in the JWT does not match the partner_uuid in the API request, the subject in the JWT does not match the consumer_id in the API request, the issued at is more than 1 minute in the future, the expiration is in more than 1 minute in the past, the expiration is before the issued date, and/or the expiration is more than a set number of hours/minutes ahead of the issued date.

The Partner resource is preferably immutable and created by the platform. The partner_uuid of the Partner resource is shared with the Partner and is used in API calls to address the Partner's resources. The Partner shares the public key with the platform that is used to verify the JWT authentication tokens. A public/private key pair is used to encrypt card information.

Request JSON and Response JSON code is used to get a consumer resource, create or update a consumer resource, and/or delete a consumer resource in a consumer API. Request JSON and Response JSON code is used to get card resources, create card resources, and/or delete card resources in a card API. Request JSON and Response JSON code is used to get membership resources and/or update/create membership resources in a membership API. Preferably, a card token uniquely identifies a card or account in this system using between 5-9 digits and/or alpha numeric characters, more preferably 7 digits.

PAN encryption is generated by encrypting plaintext PAN using the platform's RSA public key. In one embodiment, the algorithm for accomplishing this is (1) encrypt the pan using the public key and PKCS1_OAEP_PADDING and (2) encode the resulting encrypted pan using the URL safe base64 encoding algorithm. An example implementation of the algorithm is written in an object-oriented language (e.g., RUBY).

Rewards

Cash back rewards are discrete cash back amounts, good anywhere. Preferably, the cash back rewards are credited directly to an account or card. Mall cash rewards are discrete cash back amounts, good anywhere in a mall, shopping center, or other connected group of stores, preferably stores connected by location. In one embodiment, mall cash rewards are accumulated and the earner must decide where to use it before redeeming. This advantageously shifts the cost of the mall cash to mall or shopping center tenants. Mall incentives and offers function similarly to mall cash rewards by providing incentives or offers linked to an account or card that are useable across stores in a mall or shopping center.

Earning "actions" for rewards include a repeat visit incentive (automatically activating a reward in a supported currency after a user spends to a configurable targeted amount), a sign up incentive configurable by signup channel, and an invite a friend referral. Notably, sign up incentives are configurable based on the channel used to sign up for the platform, including but not limited to, web, mobile, tablet, wi-fi captive portal, and referral by existing user. Rewards for inviting a friend reward the user who referred the friend to the platform. In one embodiment, friend referrals are performed through a social network such as Facebook, Twitter, Linkedin, etc. Notably, referrals through a social network utilize unique capabilities of social networking in the referral and/or signup process, including but not limited to "liking" a page, sending/accepting a friend request, having the platform suggested to a user of the social network based on one or more friends liking the platform, hashtags, etc.

Incentives or offers sent via SMS/MMS, email, text, mobile apps, or any other digital methods preferably provide for users to claim/activate these incentives or offers by clicking on text or an email. This advantageously provides a technology based solution to the prior art by providing no login friction to claim the incentive or offer when a card or account is enrolled with the platform. "Merchant welcome" offers or incentives are also provided under the present invention, wherein an enrolled or un-enrolled user on a mobile device receives an offer or incentive based on the user's proximity to or presence in a merchant location. Preferably, the location is determined via WiFi, but is also determined via GPS in another embodiment. Merchant welcome offers are merchant specific or alternatively apply to an entire mall or shopping center in another embodiment. Additionally, a merchant welcome offer or any other merchant incentive or offer is operable to be sent via email with a corresponding SMS, MMS, mobile app, or any other type of electronic message notifying the platform user to check their email for offers. Offers are single offers or catalogs of offers (preferably up to 6 in one communication).

Enterprise Application

Another embodiment of the present invention is directed to an enterprise application which is operable to be included on a third-party web site via inclusion of a reference to object oriented code, (e.g., JAVASCRIPT). Significantly, the object oriented code causes the enterprise application to adopt the look and feel of the hosting site such that the consumer would reasonably believe that the enterprise application is native to the hosting site. In other words, the object oriented code causes the enterprise application to adapt a plurality of visually perceptible elements visually corresponding to the third-party website. Notably, this solution is necessarily rooted in computer technology in order to overcome a problem specifically arising in the realm of computer networks. There is no pre-Internet or pre-computing technology analogous to causing an application to adopt the look and feel of a hosting site such that a consumer would reasonably believe that the enterprise application is native to the hosting site. Importantly, this is an advancement over prior art methods such as iFrame because the application "inherits" styling from the webpage. This reference enables management of a card linked offer reward program directly via the third-party site. Additionally, the enterprise application (via the reference to the object oriented code) provides for enrollment in a specific merchant's rewards program in the platform, see available offers, control a profile and account features including offers added and earned rewards ready for redemption, view rewards progress, view transaction history including all rewards progress transactions and any credits or offers that have been earned or claimed, maintain profile data, as well as consumer and card enrollment into the platform, claim offers, add or delete debit or credit cards, login/logout of the platform account, etc.

In one embodiment, the object oriented code causes the enterprise application to have the look and feel of the third party website via (a) a computer store containing data, for the third party website, defining a plurality of visually perceptible elements, which visually perceptible elements correspond to the third party website, (b) a computer server at an outsource provider, the computer server coupled to the computer store and programmed to: (i) receive from the web browser of a computer user a signal indicating presence of the enterprise application on the third party website; (ii) automatically identify as the source page the third party website on which the enterprise application has been activated; (iii) in response to identification of the source page, automatically retrieve the stored data corresponding to the source page; and (iv) using the data retrieved, automatically generate and transmit to the web browser a second web page that displays: (A) information associated with the platform and (B) the plurality of visually perceptible elements visually corresponding to the source page.

Preferably, the containing webpage and any landing webpages that link to the containing page utilize HTTPS protocol for reaching the object oriented code. The platform sends a subdomain to the owner of the third-party website to be used on the website. The subdomain value is preferably embedded in the script on the third-party website where the enterprise application is to be displayed.

In contrast to the prior art, which requires complex code, the present invention provides for only the subdomain value to be utilized on the third-party site to provide the enterprise application with the same look and feel as the third-party site. By way of example and not limitation, an example of the embedded subdomain is as follows, wherein SUBDOMAIN is the subdomain value sent by the platform:

```
<!DOCTYPE html>
<html>
<head>
<meta>
<title>Our Rewards Program</title>
<link rel="stylesheet" type="text/css" href="yourcssfile.css">
...
<script type="text/javascript" src="yourscripts.js"></script>
</head>
<body>
<h1>Our Rewards Program</h1>
<script src="https:// SUBDOMAIN .springmarketplace.com/loadSpring.js"
type="text/j avascript"></script>
</body>
</html>
```

Notably, the subdomain value can also be added to the <head> portion of the code or at the very end of the file by adding a DIV to the page <div id="app_container"></div>.

The enterprise app script adds a few items to the hosting webpage, including by way of example and not limitation, a CSS file and a few object oriented code files as well as a container for the content (with an ID of "app container"). The applications CSS file is preferably appended to the very top of the <head> tag, so that the containing pages' CSS can override any styles they want to. Almost all of the application's CSS is prefixed with #app_container, so that any styles are confined to the app, and won't conflict with the containing page.

Advantageously, the present invention provides for overriding any default styles by including the code "#app_container" along with any other desired selectors for the element for which the style should be overridden. The present invention does not require the use of the code "!important" in any override. The object-oriented code (JAVASCRIPT) is appended after any existing scripts in the <head> and does not conflict with any existing scripts including but not limited to GOOGLE ANALYTICS/GOOGLE TAG MANAGER, etc.

Notably, the subdomain value can also be added to the <head> portion of the code or at the very end of the file by adding a DIV to the page <div id="app_container"></div>.

In a further embodiment of the present invention, a gift card is linked or the balance of a gift card is transferred to a card or account registered with the platform of the present invention. Preferably, the gift card or balance of the gift card is useable at a specific retailer associated with the gift card. Alternatively, the gift card or balance of the gift card is useable at a collection of retailer (i.e., across stores in a mall or shopping center). Gift cards are issued directly to a member enrolled in the platform or previously issued gift cards are linked to the account or card of the platform member. Preferably, upon performing a transaction at the merchant with the card or account registered with the platform, the full balance or a partial balance from the gift card is automatically applied to the transaction. Alternatively, the consumer is asked whether the consumer would like to apply the gift card balance to the transaction via a GUI, pop up message, or any other electronic notification.

Notably, the unconventional and non-generic combination of known elements which form the platform of the present invention provides an improvement to the technology of an integrated platform for merchants and consumers which provides a novel framework for tracking consumer spending as well as providing offers, rewards, and incentives. Advantageously, the platform provides for single enrollment in a single platform which provides offers, rewards, and incentives across a multiplicity of merchants in a platform. The platform solves numerous problems of the prior art, including providing for users to earn rewards that are redeemable at merchants where the user spends as well as earning rewards redeemable outside the merchant. This platform leverages existing computer technology to provide technological solutions to problems of the prior art as well as inventive concepts. Specifically, the present invention provides an integrated platform which provides offers, rewards, and incentives for a variety of merchants. The present invention also provides for automatic electronic redemption for prepurchased offers, non-prepurchased offers, incentives, or rewards, by a user checking out with their payment account or card at a merchant in the platform, either online or at a point of sale, wherein the prepurchased offers, non-prepurchased offers, incentives, or rewards are for the specific merchant or for a mall or shopping center group which includes the specific merchant. The present invention also provides for proximity-based detection by a point-of-sale, a beacon, or any other proximity sensing technology, of a mobile app with prepurchased offers, non-prepurchased offers, incentives, or rewards, and facilitates redemption of the prepurchased offers, non-prepurchased offers, incentives, or rewards through the mobile app when a consumer checks out, online or at a point of sale, with the mobile app or a payment card linked to the mobile app. These particular, practical applications represent improvements to the technology of, inter alia, electronic payment systems, mobile apps, and electronic rewards, offers, and incentives. Unlike the prior art, which requires separate rewards accounts and separate actions for redemptions of incentives, rewards, offers, etc., the present invention provides a technology based solution of an integrated platform which solves these prior art problems. Additionally, the present invention provides for offers, rewards, incentives, etc. for specific "item-level" products and services by, in one embodiment, automatically electronically confirming the purchase upon scanning a code of the good or service and/or by automatic recognition during check out on an online platform. Upon the user presenting their card or account for payment, the platform is notified that the good or service has been purchased and the offer and/or incentive is redeemed and/or the incentive is earned with no further action required by the user.

Certain modifications and improvements will occur to those skilled in the art upon a reading of the foregoing description. Preferably the loyalty and rewards platform of the present invention is compatible with any electronic payment systems or formats, including any point of sale (POS) electronic payment transaction at a merchant. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for tracking transactions across multiple payment processing networks, comprising:

a server computer, wherein the server computer is part of a cloud network;

wherein the server computer is in network communication with at least one electronic payment card network or at least one payment processor;

a network services tier in communication with the server computer;

the server computer configured to:

store consumer information and at least one loyalty program, at least one offer program, or at least one benefits program enrollment associated with a consumer account, the consumer information including an account identifier of at least one payment account of an owner of the consumer account;

wherein the consumer account further includes one or more payment options, with enrollment and participation of the consumer account and the one or more payment options in the at least one loyalty program, the at least one offer program, or the at least one benefits program being independent of any financial institution associated with the one or more payment options and independent of any card issuer associated with the one or more payment options;

receive, after a transaction is authorized, a real-time purchase record from the at least one electronic payment card network or the at least one payment processor, wherein the real-time purchase record includes at least one corresponding consumer account number or the account identifier of the at least one payment account of the owner of the consumer account, the account identifier of the at least one payment account of the owner of the consumer account, including a card token, and an authorization file, wherein the real-time purchase record further includes indication of a merchant, at least one corresponding merchant account, and a purchase amount;

receive, after the transaction is settled, the consumer account number or the account identifier of the at least one payment account of the owner of the consumer account, wherein the account identifier of the at least one payment account of the owner of the consumer account includes the card token, the indication of the merchant, and the purchase amount;

provide, after the transaction is authorized or settled, at least one post-transaction financing offer offered by at least one offering entity including an option to finance at least some amount of the purchase amount and charge the at least one payment account of the owner of the consumer account based on terms of the at least one post-transaction financing offer;

generate a message corresponding to the at least one post-transaction financing offer, the message comprising a selectable interface with a selectable button configured to transmit an acceptance message to the server computer upon selection;

transmit the message to at least one user device associated with the at least one payment account in real time;

receive, in response to a user selecting the button, an acceptance message from the at least one user device indicating acceptance of the at least one post-transaction financing offer;

the server computer or the network services tier configured to:

transmit, upon acceptance of the at least one post-transaction financing offer, in real time the at least some amount of the purchase amount and crediting the at least one payment account of the owner of the consumer account based on the terms of the at least one post-transaction financing offer;

the server computer further configured to:

transmit in real-time a post-transaction financing offer confirmation message to the at least one user device upon transmitting the at least some amount of the purchase amount;

wherein the acceptance of the at least one post-transaction financing offer occurs after the transaction is authorized or settled; and automatically authorize a transfer of funds from a payment account associated with the at least one offering entity to the at least one payment account of the owner of the consumer account in connection with acceptance of the at least one post-transaction financing offer.

2. The system of claim 1, wherein the server computer is further configured to attach at least one third-party pre-purchased offer to the consumer account, wherein the third-party pre-purchased offer is not provided by the financial entity issuer of the at least one payment account.

3. The system of claim 2, wherein, after the server computer receives the consumer account number or the account identifier of the at least one payment account of the owner of the consumer account, the server computer further configured to automatically identify at least one corresponding third-party pre-purchased offer attached to the corresponding user account, and the server computer further configured to automatically redeem the at least one corresponding third-party pre-purchased offer in real-time.

4. The system of claim 1, wherein the at least one post-transaction financing offer is targeted based on browsing history, physical location history, purchase history, and demographics of the consumer associated with the consumer account.

5. The system of claim 1, wherein the at least one device configured to transmit a physical presence indicator to the server computer.

6. The system of claim 1, wherein the server computer is further configured to receive at least one image of a payment method and automatically associate the payment method with the consumer account.

7. The system of claim 1, further comprising a point-of-sale (POS) system in network communication with the at least one electronic payment card network or the at least one payment processor, wherein the point-of-sale (POS) system is configured to perform the transaction, wherein the POS system is further configured to transmit the real-time purchase record to the at least one electronic payment card network or the at least one payment processor.

8. The system of claim 1, further comprising at least one remote device in network communication with the server computer, wherein the at least one remote device is in network communication with the at least one electronic payment card network or the at least one payment processor, wherein the at least one remote device is further configured to perform the transaction.

9. The system of claim 1, wherein the server computer is in network communication with at least one remote device, wherein the server computer is further configured to receive remote device data from the at least one remote device, wherein the remote device data includes activity performed via the at least one remote device including browsing history of the at least one remote device, wherein the server computer is further configured to provide at least one financing offer based on the remote device data, wherein the at least one financing offer based on the remote device data includes at least one condition for a transaction, wherein the server computer is further configured to automatically attach the at least one financing offer based on the remote device data with the consumer account, wherein the server computer is further configured to determine whether the real-time purchase record includes the at least one condition, wherein the server computer is further configured to automatically apply the at least one financing offer based on the remote device data to the consumer account when the real-time purchase record indicates the transaction includes the at least one condition.

10. The system of claim 1, wherein the server computer is further configured to create location data corresponding to the location of the at least one user device by using Global Positioning System (GPS), Differential GPS (DGPS), low energy Bluetooth systems, magnetic positioning, cellular triangulation, and/or via an Internet Protocol (IP) address of the at least one user device connected to a wireless network and transmit the message corresponding to the at least one post-transaction financing offer to at least one user device based on the location data.

11. The system of claim 10, wherein the server computer is further configured to determine, based on the location data, that the at least one user device is within a predetermined proximity of a shopping establishment and transmit the message corresponding to at least one offer associated with the shopping establishment.

12. The system of claim 11, wherein the server computer is further configured to create consumer information associated with purchase activity, rewards earned, offers redeemed, and time spent while within the predetermined proximity of the shopping establishment.

13. A system for tracking transactions across one or more payment processing networks, comprising:

a server computer, wherein the server computer is part of a cloud network;

wherein the server computer is in network communication with at least one electronic payment card network or at least one payment processor;

a network services tier in network communication with the server computer;

the server computer configured to:

store consumer information and information regarding at least one loyalty program, at least one offer program, or at least one benefits program associated with a consumer account, the consumer information including an account identifier of at least one payment account of an owner of the consumer account;

receive, after a transaction is authorized, a real-time purchase record from the electronic payment card network or at least one payment processor, the real-time purchase record including a corresponding consumer account number or the account identifier of the at least one payment account of the owner of the consumer account, wherein the account identifier of the at least one payment account of the owner of the consumer account includes a card token, at least one corresponding merchant account, an authorization file, and a purchase amount;

receive, after the transaction is settled, the real-time purchase record from the at least one electronic payment card network or the at least one payment processor, wherein the real-time purchase record includes the consumer account number or the account identifier of the at least one payment account of the owner of the consumer account, wherein the account identifier of the at least one payment account of the owner of the consumer account includes the card token, and a settlement file, wherein the real-time purchase record further includes the at least one corresponding merchant account and a purchase amount;

redeem, after the transaction is authorized or settled, at least one post-transaction financing offer offered by at least one offering entity based on the real-time purchase record;

wherein the at least one post-transaction financing offer includes an option to finance at least some amount of the purchase amount and charge the at least one payment account based on terms of the at least one post-transaction financing offer;

generate a message corresponding to the at least one post-transaction financing offer, the message comprising a selectable interface with a selectable button configured to transmit an acceptance message to the server computer upon selection;

transmitting the message to at least one user device associated with the at least one payment account in real time;

receive, in response to a user selecting the button an acceptance message from the at least one user device indicating, acceptance of the at least one post-transaction financing offer;

the server computer or the network services tier further configured to:

transmit, after the transaction is authorized or settled, the at least some amount of the purchase amount and crediting the at least one payment account of the owner of the consumer account based on the terms of the at least one post-transaction financing offer; and the server computer further configured to:

transmit, upon transmitting the at least some amount of the purchase amount, in real-time a post-transaction financing offer confirmation message to the at least one user device.

14. The system of claim 13, wherein the at least one post-transaction financing offer is targeted based on browsing history, physical location history, purchase history, and demographics of the consumer information associated with the consumer account.

15. The system of claim 13, wherein the server computer is further configured to communicate, activate, and redeem offers, incentives, or rewards using an external rewards program or an external points program.

16. A method for tracking transactions across one or more payment processing networks, comprising:

storing, by a server computer, consumer information and at least one loyalty program, at least one offer program, or at least one benefits program associated with a consumer account, and wherein the consumer information includes an account identifier of at least one payment account of an owner of the consumer account;

receiving, by the server computer, after a transaction is authorized, a real-time purchase record with at least one corresponding consumer account number and an authorization file, the real-time purchase record further including an indication of a purchase amount, the account identifier of the at least one payment account of the owner of the consumer account or an account identifier, wherein the account identifier includes a card token, at least one corresponding merchant account, an authorization file, and a purchase amount;

receiving, by the server computer, after the transaction is settled, the real-time purchase record from at least one electronic payment card network or at least one payment processor, wherein the real-time purchase record includes the consumer account number or the account identifier, wherein the account identifier includes the card token, and a settlement file, wherein the real-time purchase record further includes indication of a merchant, at least one corresponding merchant account, and a purchase amount;

redeeming, by the server computer, after the transaction is authorized or settled, at least one post-transaction financing offer offered by at least one offering entity based on the real-time purchase record;

wherein the at least one post-transaction financing offer including an option to finance at least some amount of the purchase amount and charge the at least one payment account based on terms of the at least one post-transaction financing offer;

generating, by the server computer, a message corresponding to the at least one post-transaction financing offer, the message comprising a selectable interface with a selectable button configured to transmit an acceptance message to the server computer upon selection;

transmitting, by the server computer, the message to at least one user device associated with the at least one payment account in real time;

receiving, by the server computer, in response to a user selecting the button, an acceptance message from the at least one user device indicating acceptance of the at least one post-transaction financing offer;

transmitting, by the server computer or a network services tier in network communication with the server computer, after the transaction is authorized or settled, the at least some amount of the purchase amount and crediting the at least one payment account based on the terms of the at least one post-transaction financing offer;

transmitting, by the server computer, upon transmitting the at least some amount of the purchase amount, in real-time a post-transaction financing offer confirmation message to the at least one user device;

automatically authorizing, by the server computer, after the transaction is authorized or settled, a transfer of funds from a payment account associated with the at least one offering entity in connection with acceptance of the at least one post-transaction financing offer to the at least one consumer account.

17. The method of claim 16, further comprising attaching, by the server computer, at least one third-party pre-purchased offer to the consumer account, wherein the pre-purchased offer is not provided by a financial entity issuer of the at least one payment account.

* * * * *